US012580673B2

(12) United States Patent
Hand

(10) Patent No.: US 12,580,673 B2
(45) Date of Patent: Mar. 17, 2026

(54) OPTICAL COMMUNICATION SYSTEM TRANSMITTING AND RECEIVING OPTICAL SUBCARRIERS HAVING DIFFERENT SPECTRAL WIDTHS AND/OR POWER VALUES

(71) Applicant: Infinera Corporation, Sunnyvale, CA (US)

(72) Inventor: Steven Joseph Hand, Los Gatos, CA (US)

(73) Assignee: Infinera Corporation, San Jose, CA (US)

( * ) Notice: Subject to any disclaimer, the term of this patent is extended or adjusted under 35 U.S.C. 154(b) by 1009 days.

(21) Appl. No.: 16/943,154

(22) Filed: Jul. 30, 2020

(65) Prior Publication Data
US 2021/0091873 A1      Mar. 25, 2021

Related U.S. Application Data

(63) Continuation-in-part of application No. 16/893,323, filed on Jun. 4, 2020, and a continuation of
(Continued)

(51) Int. Cl.
  *H04B 10/00*        (2013.01)
  *H04J 14/02*        (2006.01)
  (Continued)

(52) U.S. Cl.
  CPC ........ *H04J 14/022* (2013.01); *H04J 14/0227* (2013.01); *H04L 1/1607* (2013.01); *H04L 5/0005* (2013.01); *H04L 5/1446* (2013.01)

(58) Field of Classification Search
  CPC combination set(s) only.
  See application file for complete search history.

(56) References Cited

U.S. PATENT DOCUMENTS 4,483,000 A    11/1984  Yamamoto et al.
4,528,565 A     7/1985  Hauptmann
(Continued)

FOREIGN PATENT DOCUMENTS

EP        0512642      11/1992
EP        3208957       8/2017
(Continued)

OTHER PUBLICATIONS

J. Leuthold et al., "Super Channels Based on Nyquist Multiplexing," 2012 17th Opto-Electronics and Communications Conference (OECC 2012) Technical Digest, Jul. 2012, Busan, Kor.
(Continued)

*Primary Examiner* — Agustin Bello
(74) *Attorney, Agent, or Firm* — David L. Soltz

(57)        ABSTRACT

An example system includes a hub transceiver and a plurality of edge transceivers. The hub transceiver is operable to transmit, over a first communications channel, a first message to each of the edge transceivers concurrently, including an indication of available network resources on an optical communications network. The message may be transmitted through amplitude modulation of a plurality of optical subcarriers output from the hub. Each of the edge transceiver is operable to transmit, over a second communications channel, such as a subcarrier having a reduced spectral width and/or power than optical subcarriers carrying user data. The second communications channel carries a respective second message to the hub transceiver including an indication of a respective subset of the available network resources selected by the edge transceiver for use in communicating over the optical communications network. Further, the edge transceiver is operable to receive, from the hub transceiver, a third message acknowledging receipt of a selection and a fourth message confirming an assignment of
(Continued)

the selected subset of the available network resources to the edge transceiver.

33 Claims, 55 Drawing Sheets

Related U.S. Application Data application No. 16/893,067, filed on Jun. 4, 2020, and a continuation-in-part of application No. 16/578,078, filed on Sep. 20, 2019, now Pat. No. 10,965,378.

(60) Provisional application No. 62/937,060, filed on Nov. 18, 2019.

(51) Int. Cl.
| | |
|---|---|
| *H04L 1/1607* | (2023.01) |
| *H04L 5/00* | (2006.01) |
| *H04L 5/14* | (2006.01) |

(56) References Cited

U.S. PATENT DOCUMENTS

| | | | | |
|---|---|---|---|---|
| 5,153,762 | A | 10/1992 | Huber | |
| 5,208,692 | A | 5/1993 | McMahon | |
| 5,596,436 | A | 1/1997 | Sargis | |
| 5,790,287 | A * | 8/1998 | Darcie | H04B 10/07 |
| | | | | 379/257 |
| 5,822,094 | A | 10/1998 | O'Sullivan | |
| 5,825,857 | A | 10/1998 | Reto | |
| 5,956,165 | A * | 9/1999 | Fee | H04B 10/27 |
| | | | | 398/78 |
| 6,046,838 | A | 4/2000 | Kou | |
| 6,362,913 | B2 | 3/2002 | Ooi et al. | |
| 6,525,857 | B1 | 2/2003 | Way | |
| 6,563,880 | B1 | 5/2003 | Hunsinger et al. | |
| 6,580,544 | B1 | 6/2003 | Lin et al. | |
| 6,583,903 | B1 * | 6/2003 | Way | H04B 10/2569 |
| | | | | 398/152 |
| 6,687,044 | B2 | 2/2004 | Paquet | |
| 6,980,736 | B1 * | 12/2005 | Fee | H04Q 11/0005 |
| | | | | 398/12 |
| 7,228,077 | B2 * | 6/2007 | Newell | B82Y 15/00 |
| | | | | 398/141 |
| 7,266,306 | B1 | 9/2007 | Harley et al. | |
| 7,346,284 | B2 | 3/2008 | Wan | |
| 7,376,358 | B2 | 5/2008 | Roberts et al. | |
| 7,421,199 | B2 * | 9/2008 | Bai | H04B 10/00 |
| | | | | 398/25 |
| 7,447,436 | B2 | 11/2008 | Yee | |
| 7,466,919 | B1 | 12/2008 | Birk et al. | |
| 7,701,842 | B2 | 4/2010 | Roberts et al. | |
| 7,715,710 | B2 | 5/2010 | Wan | |
| 7,729,621 | B2 | 6/2010 | Nahapetian et al. | |
| 7,756,421 | B2 | 7/2010 | Roberts | |
| 7,826,752 | B1 | 11/2010 | Zanoni | |
| 8,184,992 | B2 | 5/2012 | Kikuchi | |
| 8,203,777 | B2 | 6/2012 | Smith et al. | |
| 8,412,047 | B2 | 4/2013 | Tanaka | |
| 8,437,645 | B2 | 5/2013 | Boffi et al. | |
| 8,472,810 | B2 | 6/2013 | Akiyama | |
| 8,477,056 | B2 | 7/2013 | Sun et al. | |
| 8,477,656 | B2 | 7/2013 | O'Mahony | |
| 8,478,137 | B2 | 7/2013 | Komaki et al. | |
| 8,655,190 | B2 | 2/2014 | Wu et al. | |
| 8,682,180 | B1 | 3/2014 | Nimon et al. | |
| 8,730,079 | B2 | 5/2014 | Tudose | |
| 8,768,177 | B2 | 7/2014 | Wu et al. | |
| 8,861,977 | B2 | 10/2014 | McNicol | |
| 8,929,750 | B2 | 1/2015 | Ishihara | |
| 8,965,203 | B1 | 2/2015 | Vahdat | |
| 8,971,723 | B2 | 3/2015 | Emmanuel | |
| 8,989,593 | B2 | 3/2015 | Sun et al. | |
| 9,020,363 | B2 | 4/2015 | Yasuda | |
| 9,048,957 | B2 | 6/2015 | Nakashima | |
| 9,112,609 | B2 | 8/2015 | Kim et al. | |
| 9,154,231 | B2 | 10/2015 | Kaneda | |
| 9,166,692 | B1 | 10/2015 | Felderman | |
| 9,197,320 | B2 | 11/2015 | Vassilieva | |
| 9,244,928 | B1 | 1/2016 | Nishimoto | |
| 9,270,379 | B2 | 2/2016 | Huang et al. | |
| 9,281,915 | B2 | 3/2016 | Kaneda | |
| 9,363,585 | B2 | 6/2016 | Carpini | |
| 9,419,720 | B2 | 8/2016 | Akiyama | |
| 9,444,553 | B2 * | 9/2016 | Lee | H04B 10/61 |
| 9,461,749 | B2 | 10/2016 | Jansen et al. | |
| 9,485,554 | B1 | 11/2016 | Kim | |
| 9,553,675 | B2 | 1/2017 | Karar et al. | |
| 9,608,866 | B2 | 3/2017 | Rajan | |
| 9,673,907 | B1 | 6/2017 | Vassilieva | |
| 9,686,020 | B2 | 6/2017 | Mochizuki et al. | |
| 9,705,592 | B1 | 7/2017 | Schmogrow | |
| 9,735,881 | B1 | 8/2017 | Agazzi et al. | |
| 9,991,953 | B1 | 6/2018 | Fludger | |
| 10,014,975 | B2 | 7/2018 | Krause et al. | |
| 10,027,424 | B2 | 7/2018 | Zhuge et al. | |
| 10,243,653 | B2 | 3/2019 | Wiswell | |
| 10,243,688 | B2 | 3/2019 | Vassilieva | |
| 10,348,410 | B1 | 7/2019 | Charlton | |
| 10,371,889 | B1 * | 8/2019 | Barzegar | H04B 3/56 |
| 10,374,623 | B1 | 8/2019 | Oveis Gharan | |
| 10,374,721 | B2 | 8/2019 | Awdalla | |
| 10,389,447 | B1 | 8/2019 | Khandani | |
| 10,397,190 | B2 | 8/2019 | Akhavain Mohammadi | |
| 10,491,302 | B1 | 11/2019 | Morris | |
| 10,523,315 | B2 | 12/2019 | Jiang | |
| 10,547,388 | B2 | 1/2020 | Ikeda | |
| 10,574,362 | B2 | 2/2020 | Chen | |
| 10,587,358 | B1 | 3/2020 | Ebrahimzad | |
| 2002/0003641 | A1 | 1/2002 | Hall | |
| 2002/0005971 | A1 | 1/2002 | Sasai | |
| 2002/0034194 | A1 | 3/2002 | Shattil Steve J | |
| 2002/0067883 | A1 | 6/2002 | Lo | |
| 2002/0114038 | A1 | 8/2002 | Arnon | |
| 2002/0122518 | A1 | 9/2002 | Yasuda et al. | |
| 2002/0131114 | A1 * | 9/2002 | Yoo | H01R 13/53 |
| | | | | 398/84 |
| 2002/0145783 | A1 | 10/2002 | Chang | |
| 2003/0020995 | A1 | 1/2003 | Harasawa | |
| 2003/0025957 | A1 * | 2/2003 | Jayakumar | H04B 10/00 |
| | | | | 398/5 |
| 2003/0223751 | A1 | 12/2003 | Shimizu | |
| 2004/0016874 | A1 | 1/2004 | Rao | |
| 2004/0019459 | A1 | 1/2004 | Dietz | |
| 2004/0032643 | A1 | 2/2004 | Chimfwembe | |
| 2004/0033074 | A1 | 2/2004 | Hsu | |
| 2004/0105682 | A1 | 6/2004 | Roberts | |
| 2004/0151109 | A1 | 8/2004 | Batra | |
| 2004/0197103 | A1 | 10/2004 | Roberts | |
| 2004/0198265 | A1 | 10/2004 | Wallace | |
| 2004/0208614 | A1 | 10/2004 | Price | |
| 2004/0252996 | A1 | 12/2004 | McNicol | |
| 2005/0008085 | A1 | 1/2005 | Lee | |
| 2005/0074037 | A1 | 4/2005 | Rickard | |
| 2005/0111789 | A1 | 5/2005 | Hayes | |
| 2005/0147415 | A1 | 7/2005 | Fee | |
| 2005/0169585 | A1 | 8/2005 | Aronson | |
| 2005/0175112 | A1 | 8/2005 | Pisani | |
| 2005/0175339 | A1 | 8/2005 | Herskowits | |
| 2006/0078336 | A1 | 4/2006 | McNicol et al. | |
| 2006/0093052 | A1 | 5/2006 | Cho | |
| 2006/0159454 | A1 | 7/2006 | Bjornstad | |
| 2006/0215540 | A1 | 9/2006 | Krishnamoorthi | |
| 2006/0233147 | A1 | 10/2006 | Karabinis | |
| 2006/0269295 | A1 | 11/2006 | Way | |
| 2006/0280510 | A1 | 12/2006 | Onaka | |
| 2007/0004465 | A1 | 1/2007 | Papasakellariou | |
| 2007/0025421 | A1 | 2/2007 | Shattil | |
| 2007/0092263 | A1 | 4/2007 | Agazzi | |
| 2008/0063409 | A1 | 3/2008 | Toliver | |
| 2008/0085125 | A1 | 4/2008 | Frankel | |
| 2008/0232816 | A1 | 9/2008 | Hoshida | |

(56)          References Cited

U.S. PATENT DOCUMENTS

| | | |
|---|---|---|
| 2008/0267630 A1 | 10/2008 | Qian |
| 2009/0092389 A1 | 4/2009 | Wei |
| 2009/0110033 A1 | 4/2009 | Shattil |
| 2009/0154336 A1 | 6/2009 | Green |
| 2009/0190929 A1 | 7/2009 | Khurgin |
| 2009/0196603 A1 | 8/2009 | Zhou |
| 2009/0214224 A1 | 8/2009 | Cho |
| 2009/0232234 A1 | 9/2009 | Du |
| 2009/0238578 A1 | 9/2009 | Taylor |
| 2009/0238580 A1 | 9/2009 | Kikuchi |
| 2009/0257344 A1 | 10/2009 | Huang |
| 2009/0257755 A1 | 10/2009 | Buelow |
| 2010/0021163 A1 | 1/2010 | Shieh |
| 2010/0021166 A1 | 1/2010 | Way |
| 2010/0028002 A1 | 2/2010 | Qian |
| 2010/0086303 A1 | 4/2010 | Qian |
| 2010/0142964 A1 | 6/2010 | Chang et al. |
| 2010/0142967 A1 | 6/2010 | Perez |
| 2010/0178057 A1 | 7/2010 | Shieh |
| 2010/0189445 A1 | 7/2010 | Nakashima |
| 2010/0215368 A1 | 8/2010 | Qian |
| 2010/0246581 A1 | 9/2010 | Henry |
| 2010/0254707 A1 | 10/2010 | Peng |
| 2010/0329671 A1 | 12/2010 | Essiambre |
| 2010/0329683 A1 | 12/2010 | Liu |
| 2011/0097092 A1 | 4/2011 | Wagner et al. |
| 2011/0135301 A1 | 6/2011 | Myslinski |
| 2011/0142450 A1 | 6/2011 | Tanzi et al. |
| 2011/0150475 A1 | 6/2011 | Soto et al. |
| 2011/0176813 A1 | 7/2011 | Kim |
| 2011/0182577 A1 | 7/2011 | Wu |
| 2011/0249978 A1 | 10/2011 | Sasaki |
| 2011/0255870 A1 | 10/2011 | Grigoryan |
| 2012/0002703 A1 | 1/2012 | Yamashita |
| 2012/0033965 A1 | 2/2012 | Zhang |
| 2012/0045209 A1 | 2/2012 | Boyd |
| 2012/0082466 A1 | 4/2012 | Wu |
| 2012/0093510 A1 | 4/2012 | Zhang |
| 2012/0099864 A1 | 4/2012 | Ishihara |
| 2012/0141130 A1 | 6/2012 | Nakashima |
| 2012/0141135 A1 | 6/2012 | Yang |
| 2012/0148264 A1 | 6/2012 | Liu |
| 2012/0219285 A1 | 8/2012 | Dahan |
| 2012/0230694 A1* | 9/2012 | Tanaka ................. H04J 14/0298 |
| | | 398/79 |
| 2012/0251119 A1 | 10/2012 | McNicol |
| 2012/0251121 A1 | 10/2012 | McNicol |
| 2012/0263471 A1 | 10/2012 | Buchali |
| 2012/0269510 A1 | 10/2012 | Hui |
| 2012/0269515 A1 | 10/2012 | Cvijetic |
| 2013/0070785 A1 | 3/2013 | Liu |
| 2013/0070786 A1 | 3/2013 | Liu |
| 2013/0101296 A1 | 4/2013 | Nishimoto |
| 2013/0108271 A1 | 5/2013 | Tang et al. |
| 2013/0129348 A1* | 5/2013 | Mak ..................... H04B 10/564 |
| | | 398/26 |
| 2013/0136449 A1 | 5/2013 | Liu |
| 2013/0170834 A1 | 7/2013 | Cho et al. |
| 2013/0191877 A1 | 7/2013 | Rakib |
| 2013/0195452 A1 | 8/2013 | Hui |
| 2013/0202303 A1 | 8/2013 | Wilkinson |
| 2013/0251364 A1 | 9/2013 | Pachnicke |
| 2013/0286847 A1 | 10/2013 | Schmidt |
| 2014/0010543 A1 | 1/2014 | Lee |
| 2014/0056371 A1 | 2/2014 | Ji |
| 2014/0072303 A1 | 3/2014 | Pfau |
| 2014/0079390 A1 | 3/2014 | Kim |
| 2014/0079391 A1 | 3/2014 | Kim |
| 2014/0092924 A1 | 4/2014 | Krause et al. |
| 2014/0099116 A1 | 4/2014 | Bai |
| 2014/0126916 A1 | 5/2014 | Ota |
| 2014/0153925 A1 | 6/2014 | Nishihara et al. |
| 2014/0205286 A1 | 7/2014 | Ji et al. |
| 2014/0233963 A1 | 8/2014 | Le Taillandier De Gabory |

| | | |
|---|---|---|
| 2014/0241727 A1* | 8/2014 | Lim .................... H04B 10/548 |
| | | 398/76 |
| 2014/0270759 A1 | 9/2014 | Djordjevic |
| 2014/0270761 A1 | 9/2014 | Xu |
| 2014/0270803 A1 | 9/2014 | Olsson |
| 2014/0294381 A1 | 10/2014 | McNicol |
| 2014/0314411 A1 | 10/2014 | Huang |
| 2014/0314416 A1* | 10/2014 | Vassilieva ........... H04B 10/506 |
| | | 398/76 |
| 2014/0341587 A1 | 11/2014 | Nakashima |
| 2014/0363164 A1 | 12/2014 | Kim |
| 2014/0376930 A1 | 12/2014 | Shiba |
| 2015/0063808 A1 | 3/2015 | Xia |
| 2015/0071642 A1 | 3/2015 | Tanaka |
| 2015/0093118 A1 | 4/2015 | Jia |
| 2015/0098700 A1 | 4/2015 | Zhu |
| 2015/0117860 A1 | 4/2015 | Braun |
| 2015/0125160 A1 | 5/2015 | Wen |
| 2015/0188637 A1 | 7/2015 | Tanimura |
| 2015/0188642 A1 | 7/2015 | Sun |
| 2015/0229332 A1 | 8/2015 | Yuan |
| 2015/0229401 A1 | 8/2015 | Tanaka |
| 2015/0280853 A1 | 10/2015 | Sun |
| 2015/0288456 A1 | 10/2015 | Zhu |
| 2015/0289035 A1 | 10/2015 | Mehrvar |
| 2015/0296278 A1 | 10/2015 | Liu |
| 2015/0333860 A1 | 11/2015 | Rahn |
| 2016/0013881 A1 | 1/2016 | Rejaly et al. |
| 2016/0029403 A1 | 1/2016 | Roy et al. |
| 2016/0050021 A1 | 2/2016 | Hua |
| 2016/0057516 A1 | 2/2016 | Hochberg |
| 2016/0094292 A1 | 3/2016 | Mochizuki |
| 2016/0099777 A1 | 4/2016 | Liu |
| 2016/0112141 A1* | 4/2016 | Rahn ................... H04J 14/0256 |
| | | 398/79 |
| 2016/0142150 A1 | 5/2016 | Lyubomirsky |
| 2016/0191168 A1 | 6/2016 | Huang |
| 2016/0192042 A1 | 6/2016 | Mitchell |
| 2016/0197681 A1 | 7/2016 | Sun |
| 2016/0218812 A1 | 7/2016 | Okabe |
| 2016/0233963 A1 | 8/2016 | Zhuge et al. |
| 2016/0261347 A1 | 9/2016 | Karar |
| 2016/0277816 A1 | 9/2016 | Yuang |
| 2016/0315712 A1* | 10/2016 | Vassilieva ........... H04J 14/0201 |
| 2016/0316281 A1 | 10/2016 | Keyworth |
| 2016/0323039 A1* | 11/2016 | Sun ....................... H04J 14/026 |
| 2016/0344481 A1* | 11/2016 | Vassilieva ............ H04B 10/564 |
| 2017/0005747 A1 | 1/2017 | Kim |
| 2017/0019168 A1 | 1/2017 | Menard |
| 2017/0033864 A1 | 2/2017 | Nagarajan |
| 2017/0033999 A1 | 2/2017 | Nagarajan et al. |
| 2017/0041691 A1 | 2/2017 | Rickman |
| 2017/0054513 A1 | 2/2017 | Guo |
| 2017/0070313 A1 | 3/2017 | Kato |
| 2017/0078028 A1 | 3/2017 | Zhang |
| 2017/0078044 A1 | 3/2017 | Hino |
| 2017/0104535 A1 | 4/2017 | Hoshida |
| 2017/0134836 A1 | 5/2017 | Sindhy |
| 2017/0149507 A1 | 5/2017 | Le Taillandier De Gabory |
| 2017/0163347 A1 | 6/2017 | Akiyama |
| 2017/0222716 A1 | 8/2017 | Nakashima |
| 2017/0237500 A1 | 8/2017 | Nishimoto |
| 2017/0250775 A1 | 8/2017 | Kato |
| 2017/0264371 A1* | 9/2017 | Fukui ............... H04B 10/07957 |
| 2017/0324480 A1 | 11/2017 | Elmirghani |
| 2017/0366267 A1 | 12/2017 | Campos |
| 2017/0367061 A1 | 12/2017 | Kim |
| 2018/0034555 A1 | 2/2018 | Goh |
| 2018/0115407 A1 | 4/2018 | Melikyan |
| 2018/0120520 A1 | 5/2018 | Kelly |
| 2018/0145761 A1 | 5/2018 | Zhuge |
| 2018/0198547 A1 | 7/2018 | Mehrvar |
| 2018/0219632 A1 | 8/2018 | Yoshida |
| 2018/0234285 A1 | 8/2018 | Djordjevic |
| 2018/0241476 A1 | 8/2018 | Johnson |
| 2018/0278331 A1 | 9/2018 | Cao |
| 2018/0324717 A1 | 11/2018 | Zhou |
| 2018/0359047 A1* | 12/2018 | Vassilieva ........... H04J 14/0298 |
| 2019/0020409 A1 | 1/2019 | Le Taillandier De Gabory |

(56) References Cited

U.S. PATENT DOCUMENTS

| | | | |
|---|---|---|---|
| 2019/0097728 A1 | 3/2019 | Frankel | |
| 2019/0123819 A1 | 4/2019 | Jiang | |
| 2019/0149242 A1 | 5/2019 | Torbatian | |
| 2019/0149389 A1 | 5/2019 | Torbatian | |
| 2019/0253153 A1 | 8/2019 | Sun | |
| 2019/0260493 A1 | 8/2019 | Chimfwembe Patrick Chilufya | |
| 2019/0288777 A1 | 9/2019 | Ishimura | |
| 2019/0312640 A1 | 10/2019 | Binkai | |
| 2019/0319713 A1* | 10/2019 | Hand | H04L 1/0041 |
| 2019/0349242 A1* | 11/2019 | Zhang | H04L 5/0064 |
| 2020/0076508 A1 | 3/2020 | Jia | |
| 2020/0177525 A1 | 6/2020 | Morris | |
| 2020/0252154 A1* | 8/2020 | Wu | H04B 10/25 |
| 2020/0287621 A1* | 9/2020 | Jafari | H04J 14/005 |
| 2021/0091873 A1* | 3/2021 | Hand | H04J 14/0298 |

FOREIGN PATENT DOCUMENTS

| | | |
|---|---|---|
| WO | WO 2012100714 | 8/2012 |
| WO | WO 2014114332 | 7/2014 |

OTHER PUBLICATIONS

S. Watanabe et al., "Optical Coherent Broad-Band Transmission for Long-Haul and Distribution Systems Using Subcarrier Multiplexing," Journal Of Lightwave Technology, vol. 11, No. 1, Jan. 1993, pp. 116-127.

M. Jinno et al., "Demonstration of Novel Spectrum-Efficient Elastic Optical Path Network with Per-Channel Variable Capacity of 40 GB/s to Over 400 GB/s," ECOC 2008, Sep. 21-25, 2008, Brussels, Belgium, Th.3.F.6.

Y. Chen et al., "Experimental Demonstration Of Roadm Functionality On An Optical Scfdm Superchannel," IEEE Photonics Technology Letters, vol. 24, No. 3, Feb. 1, 2012, pp. 215-217.

Adaptive Software Defined Terabit Transceiver For Flexible Optical Networks, Public executive summary of the Final Project Periodic Report, Jun. 16, 2016.

Hillerkus, Single-Laser Multi-Terabit/s Systems, KIT Scientific Publishing, 2013, Chapters 1, 3, and 6.

Hu et al., "Flexible and Concurrent All-Optical VPN in OFDMA PON," IEEE Photonics Technology Journal, vol. 5, No. 6, Dec. 2013.

Bosco et al., "On the Performance of Nyquist-WDM Terabit Superchannels Based on PM-BPSK, PM-QPSK, PM-8QAM or PM-16QAM Subcarriers," Journal Of Lightwave Technology, vol. 29, No. 1, Jan. 1, 2011, pp. 53-60.

K. Roberts et al., "Flexible Transceivers," ECOC Technical Digest, 2012, We.3.A.3.

K. Roberts et al., "High Capacity Transport—100G and Beyond," Journal Of Lightwave Technology, vol. 33, No. 3, Feb. 1, 2015, pp. 563-578.

J. Reis et al., "Performance Optimization Of Nyquist Signaling For Spectrally Efficient Optical Access Networks [Invited]," J. Opt. Commun. Netw./vol. 7, No. 2, Feb. 2015, pp. A200-A208.

R. Ferreira et al., Coherent Nyquist UDWDM-PON With Digital Signal Processing in Real Time, Journal Of Lightwave Technology, vol. 34, No. 2, Jan. 15, 2016, pp. 826-833.

A. Shahpari et al., "Coherent Access: A Review", Journal Of Lightwave Technology, vol. 35, No. 4, Feb. 15, 2017, pp. 1050-1058.

P. Layec et al., "Rate-Adaptable Optical Transmission And Elastic Optical Networks," Chapter 15, Enabling Technologies for High Spectral-efficiency Coherent Optical Communication Networks, First Edition, 2016 John Wiley & Sons, Inc. Published 2016, pp. 507-545.

J. Altabas, "Cost-effective Transceiver based on a RSOA and a VCSEL for Flexible uDWDM Networks," IEEE Photonics Technology Letters ( vol. 28 , Issue: 10, May 15, 2016, pp. 1111-1114.

K. Roberts et al., "Beyond 100 GB/s: Capacity, Flexibility, and Network Optimization," J. Opt. Commun. Netw./vol. 9, No. 4/Apr. 2017, pp. C12-24.

Lavery et al., "Digital Coherent Receivers for Long-Reach Optical Access Networks," Journal Of Lightwave Technology, vol. 31, No. 4, Feb. 15, 2013, pp. 609-620.

V. Vujicic, "Optical Multicarrier Sources for Spectrally Efficient Optical Networks," A Dissertation submitted in fulfilment of the requirements for the award of Doctor of Philosophy (Ph.D.) to the Dublin City University, Dec. 2015, Chapters 1, 2, and 6.

Straullu et al., "Single-Wavelength Downstream FDMA-PON at 32 Gbps and 34 dB ODN Loss," IEEE Photonics Technology Letters, vol. 27, No. 7, Apr. 1, 2015, pp. 774-777.

Y. Zhang et al., "Digital subcarrier multiplexing for flexible spectral allocation in optical transport network," Oct. 24, 2011 / vol. 19, No. 22 / Optics Express 21882.

R. Schmogrow et al., "Nyquist Frequency Division Multiplexing for Optical Communications," CLEO Technical Digest, OSA 2012, CTh1H.2.

P Khodashenas. "Investigation of Spectrum Granularity for Performance Optimization of Flexible Nyquist-WDM-Based Optical Networks." Journal Of Lightwave Technology, vol. 33, No. 23, Dec. 1, 2015 pp. 4767-4774.

Mishra et al., "Flexible RF-Based Comb Generator," IEEE Photonics Technology Letters, vol. 25, No. 7, Apr. 1, 2013, pp. 701-704.

M. Jinno et al., "Multiflow Optical Transponder for Efficient Multilayer Optical Networking," IEEE Communications Magazine • May 2012, pp. 56-65.

Kim Roberts, "100G and Beyond," OFC 2014, OSA 2014, Tu3J.1.

J. Fischer, "Digital signal processing for coherent UDWDM passive optical networks," ITG-Fachbericht 248: Photonische Netze 05.— Jun. 5, 2014 in Leipzig, VDE VERLAG GMBH • Berlin • Offenbach, Germany, ISBN 978-3-8007-3604-1.

Kottke et al., "Coherent UDWDM PON with joint subcarrier reception at OLT," Optics Express, Jul. 2, 2014.

Lavery et al., "Reduced Complexity Equalization for Coherent Long-Reach Passive Optical Networks," J. Opt. Commun. Netw./ vol. 7, No. 1/Jan. 2015, pp. A16-A27.

Lazaro et al., "Flexible PON KeyTechnologies: Digital Advanced Modulation Formats and Devices," 2014 16th International Conference on Transparent Optical Networks (ICTON), Tu.B3.2.

Optical Internetworking Forum—Technology Options for 400G Implementation OIF-Tech-Options-400G-01.0, Jul. 2015.

Riccardi et al., "Sliceable bandwidth variable transponder: the IDEALIST vision," 2015 European Conference on Networks and Communications (EuCNC), pp. 330-334.

Sambo et al., "Next Generation Sliceable Bandwidth Variable Transponders," IEEE Communications Magazine, Feb. 2015, pp. 163-171.

P. Schindler et al., "Colorless FDMA-PON With Flexible Bandwidth Allocation and Colorless, Low-Speed ONUs [Invited]," J. Opt. Commun. Netw./vol. 5, No. 10/Oct. 2013, pp. A204-A212.

Schmogrow et al., "Real-time Nyquist signaling with dynamic precision and flexible non-integer oversampling," Jan. 13, 2014 | vol. 22, No. 1 | DOI:10.1364/OE.22.000193 | Optics Express 193.

Schmogrow et al., "Real-Time Digital Nyquist-WDM and OFDM Signal Generation: Spectral Efficiency Versus DSP Complexity," ECOC Technical Digest, 2012 OSA, Mo.2.A.4.

Boutaba et al., "Elastic Optical Networking for 5G Transport," J Netw Syst Manage (2017) 25m pp. 819-847 123.

S. Smolorz et al., "Demonstration of a Coherent UDWDM-PON with Real-Time Processing," OFC/NFOEC 2011, PDPD4.

H. Rohde et al. "Coherent Ultra Dense WDM Technology for Next Generation Optical Metro and Access Networks," Journal Of Lightwave Technology, vol. 32, No. 10, May 15, 2014 pp. 2041-2052.

Ze Dong et al., "Very-High-Throughput Coherent Ultradense WDM-PON Based on Nyquist-ISB Modulation," IEEE Photonics Technology Letters, vol. 27, No. 7, Apr. 1, 2015, pp. 763-766.

Rohde et al., "Digital Multi-Wavelength Generation and Real Time Video Transmission in a Coherent Ultra Dense WDM PON," OFC/NFOEC Technical Digest, 2013 OSA, OM3H.3.

International Search Report issued in connection with PCT/US2020/ 023871 dated Sep. 24, 2020.

(56) References Cited

OTHER PUBLICATIONS

Guo-Wei Lu et al.," Optical subcarrier processing for Nyquist SCM signals via coherent spectrum overlapping in four-wave mixing with coherent multi-tone pump", Optics Express, vol. 26, No. 2, Jan. 22, 2018.

International Search Report issued in connection with PCT/US2020/018180 dated Sep. 18, 2020.

International Search Report issued in connection with PCT/US2020/036209 dated Oct. 1, 2020.

International Search Report issued in connection with PCT/US2020/018292 dated Jun. 4, 2020.

International Search Report issued in connection with PCT/US2020/021024 dated Aug. 3, 2020.

Wei et al.: Mac Protocols for Optical Orthogonal Frequency Division Multiple Access (OFDMA)-based Passive Optical Networks, OFC/NFOEC 2008, paper JWA82, Feb. 24-28, 2008 (Year: 2008).

Cerisola et al., "Subcarrier multiplex of packet headers in a WDM optical network and a nouvel ultrafast header clockrecovery technique", 1995, OFC '95 Technical Digest, pp. 273-274 (Year: 1995).

Michael G. Taylor, "Coherent Detection Method Using DSP for Demodulation of Signal and Subsequent Equalization of Propagation Impairments," IEEE Photonics Technology Letters, vol. 16, No. 2, Feb. 2004, pp. 674-676.

K. Roberts, et al., "Performance of dual-polarization QPSK for optical transport system, "JLT, vol. 27, No. 16, pp. 3546-3559, Aug. 2009.

S.J. Savory et al., "Digital equalisation of 40Gbit/s per wavelength transmission over 2480km of standard fibre without optical dispersion compensation, " European Conference on Optical Communications (ECOC) 2006, paper Th2.5.5.

H. Sun et al., "Real-time measurements of a 40 GB/S coherent system," Jan. 21, 2008, vol. 16, No. 2, Optics Express, pp. 873-879.

Greshishchev et al., "A 5 6GS/s 6b DAC in 6 5nm CMOS with 256x6b Memory", ISSCC 2011/Session 1 0/Nyquist-Rate Converters/1 0.8, 2011 IEEE International Solid-State Circuits Conference, 3 pages.

Bingham, "Multicarrier Modulator for Data Transmission: An Idea Whose Time Has Come", IEEE Communications Magazine, pp. 5-14, May 1990, 8 pages.

Yan et al. "Experimental Comparison of No. Guard-lnterval-OFDM and Nyquist-WDM Superchannels", OFC/NFOEC Techincal Digest, 1/23/20212, 4 pages.

Zhuge et al., "Comparison of Intra-Channel Nonlinearity Tolerance Between Reduced-Guard-lnterval CO-OFDM Systems and Nyquist Single Carrier Systems", OFC/NFOEC Technical Digest, Jan. 23, 2012, 4 pages.

Zhang et al., "3760km, 100G SSMF Transmission over Commercial Terrestrial DWDM ROADM Systems using SD-FEC", OFC/NFOEC Postdeadline Papers, Mar. 2012, 3 pages.

Rahn et al., "250Gb/s Real-Time PIC-based Super-Channel Transmission Over a Gridless 6000km Terrestrial Link", OFC/NFOEC Posteadline Papers, Mar. 2012,3 pages.

* cited by examiner

992

Input to DAC
904-1

$Cos(\omega_{Carrier}t)$

442

$Cos(\omega_{AM}t)$

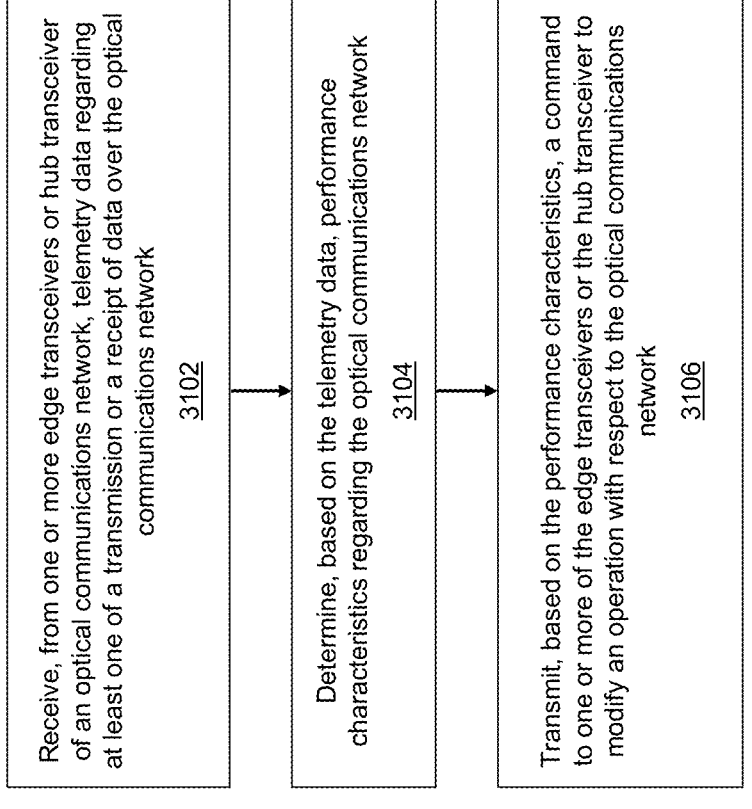

3100

Receive, from one or more edge transceivers or hub transceiver of an optical communications network, telemetry data regarding at least one of a transmission or a receipt of data over the optical communications network
3102

Determine, based on the telemetry data, performance characteristics regarding the optical communications network
3104

Transmit, based on the performance characteristics, a command to one or more of the edge transceivers or the hub transceiver to modify an operation with respect to the optical communications network
3106

FIG. 31A

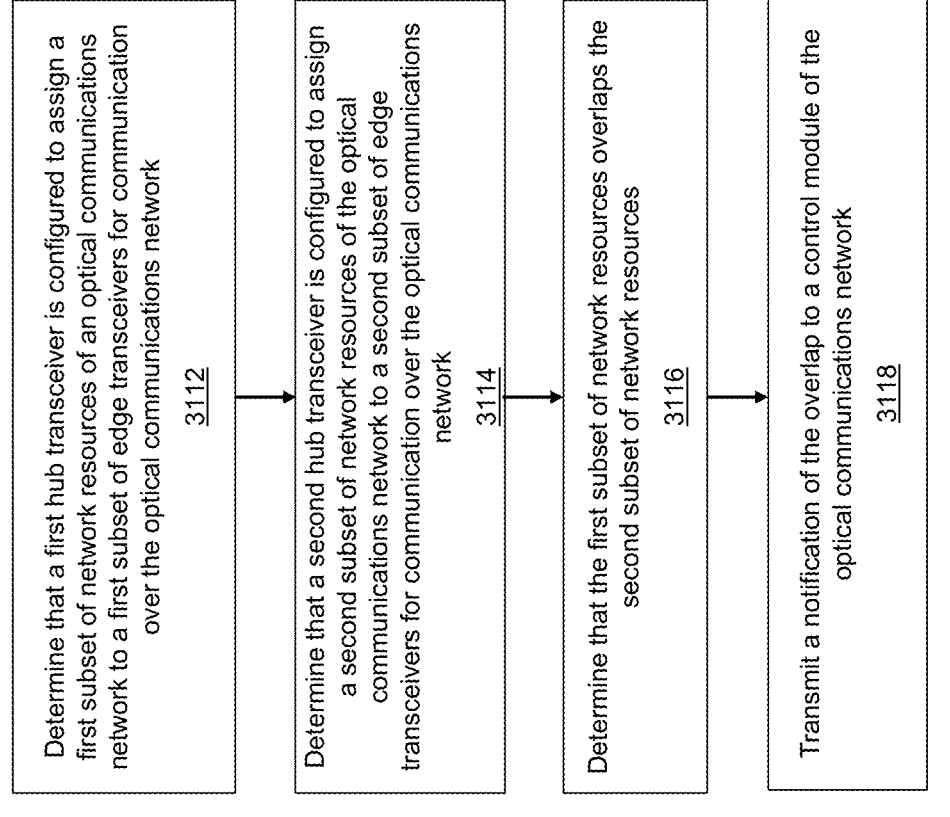

3110

Determine that a first hub transceiver is configured to assign a first subset of network resources of an optical communications network to a first subset of edge transceivers for communication over the optical communications network
3112

Determine that a second hub transceiver is configured to assign a second subset of network resources of the optical communications network to a second subset of edge transceivers for communication over the optical communications network
3114

Determine that the first subset of network resources overlaps the second subset of network resources
3116

Transmit a notification of the overlap to a control module of the optical communications network
3118

FIG. 31B

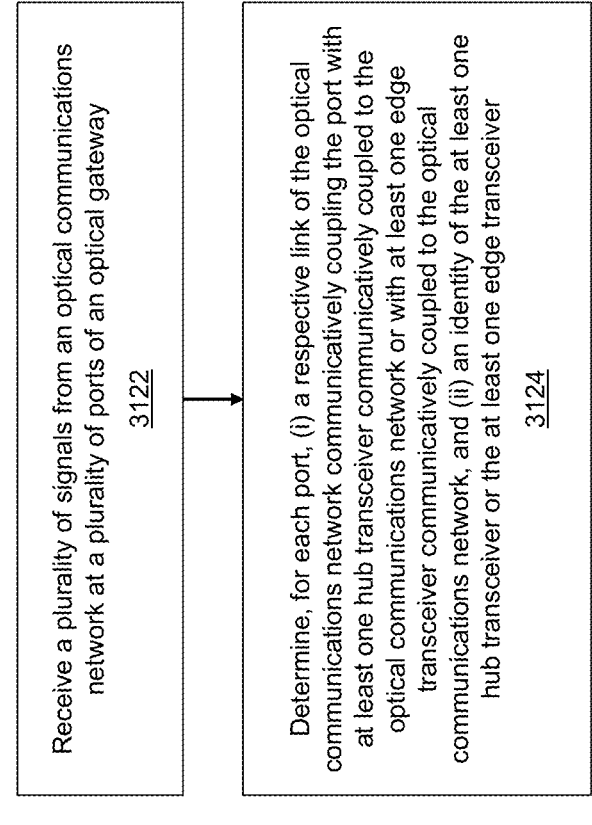

3120

Receive a plurality of signals from an optical communications network at a plurality of ports of an optical gateway

3122

Determine, for each port, (i) a respective link of the optical communications network communicatively coupling the port with at least one hub transceiver communicatively coupled to the optical communications network or with at least one edge transceiver communicatively coupled to the optical communications network, and (ii) an identity of the at least one hub transceiver or the at least one edge transceiver

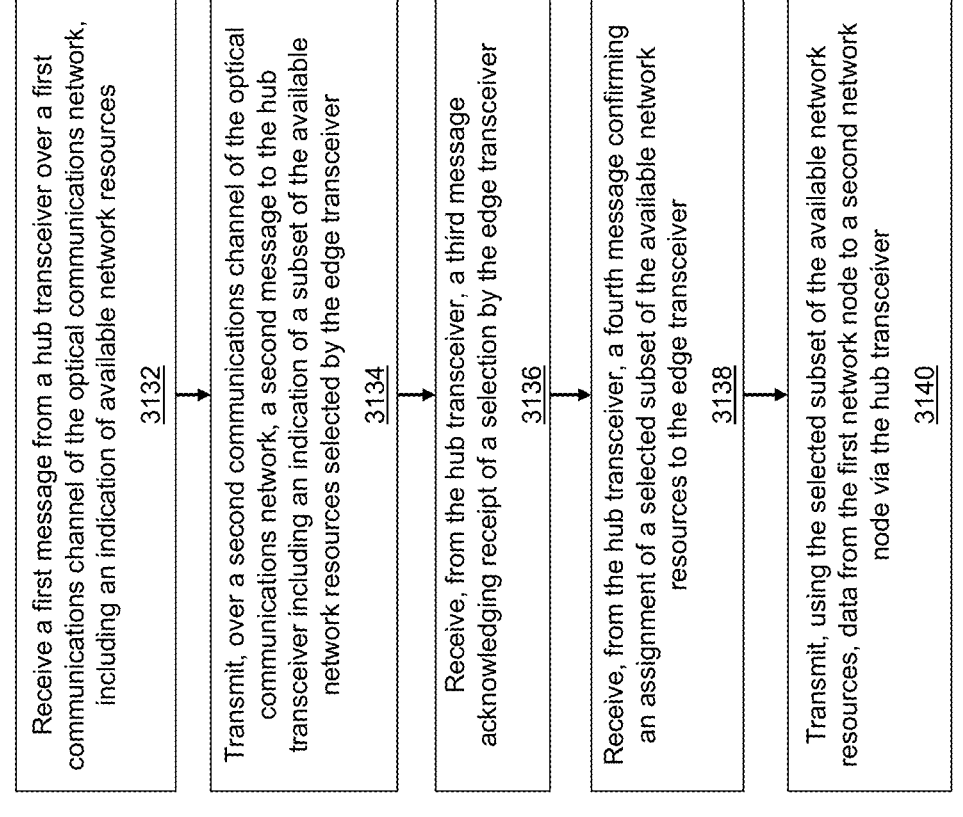

3130

Receive a first message from a hub transceiver over a first communications channel of the optical communications network, including an indication of available network resources

3132

Transmit, over a second communications channel of the optical communications network, a second message to the hub transceiver including an indication of a subset of the available network resources selected by the edge transceiver

3134

Receive, from the hub transceiver, a third message acknowledging receipt of a selection by the edge transceiver

3136

Receive, from the hub transceiver, a fourth message confirming an assignment of a selected subset of the available network resources to the edge transceiver

3138

Transmit, using the selected subset of the available network resources, data from the first network node to a second network node via the hub transceiver

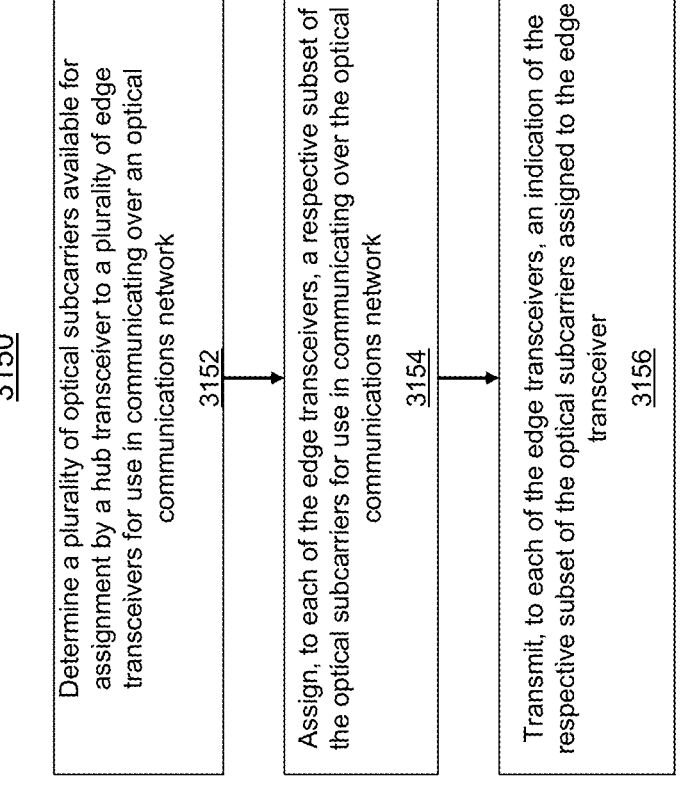

3150

Determine a plurality of optical subcarriers available for assignment by a hub transceiver to a plurality of edge transceivers for use in communicating over an optical communications network

3152

Assign, to each of the edge transceivers, a respective subset of the optical subcarriers for use in communicating over the optical communications network

3154

Transmit, to each of the edge transceivers, an indication of the respective subset of the optical subcarriers assigned to the edge transceiver

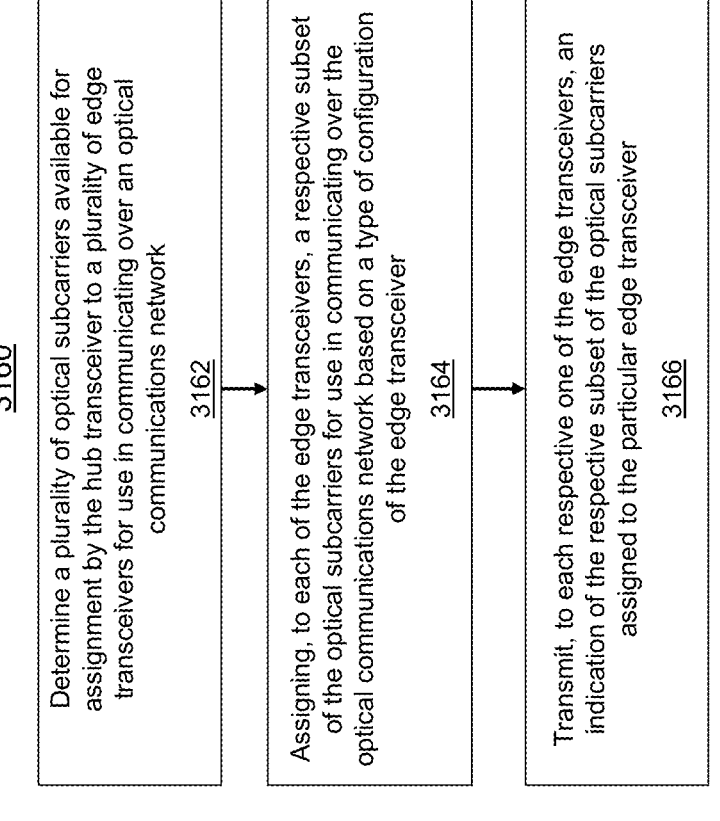

3160

Determine a plurality of optical subcarriers available for assignment by the hub transceiver to a plurality of edge transceivers for use in communicating over an optical communications network

3162

Assigning, to each of the edge transceivers, a respective subset of the optical subcarriers for use in communicating over the optical communications network based on a type of configuration of the edge transceiver

3164

Transmit, to each respective one of the edge transceivers, an indication of the respective subset of the optical subcarriers assigned to the particular edge transceiver

OPTICAL COMMUNICATION SYSTEM TRANSMITTING AND RECEIVING OPTICAL SUBCARRIERS HAVING DIFFERENT SPECTRAL WIDTHS AND/OR POWER VALUES

CROSS REFERENCE TO RELATED APPLICATIONS

This application claims the benefit of U.S. patent application Ser. No. 16/893,323, filed Jun. 4, 2020; U.S. patent application Ser. No. 16/893,067; U.S. patent application Ser. No. 16/578,078, filed Sep. 20, 2019; U.S. Provisional Patent Application No. 62/857,128, filed Jun. 4, 2019; U.S. Provisional Patent Application No. 62/937,060, filed Nov. 18, 2019; U.S. Provisional Patent Application No. 62/847,651, filed May 14, 2019, which are incorporated herein by reference in their entirety.

TECHNICAL FIELD

This disclosure relates to transmitting and receiving data using optical communications networks.

BACKGROUND

Optical communication systems typically include a first node that outputs optical carriers to one or more second nodes. The first and second nodes are connected to each other by one or more segments of optical fiber. The nodes in an optical communication system may include, for example, an internet protocol (IP) router, as well as a transceiver module that often plugs into the router and connects to the optical communication system fibers. In many circumstances, the transceiver modules and other node equipment, such as the router, are provided by the same vendor. As such, monitoring, status, clocking or timing information, and control information (one or more of each referred to herein as "control information") associated with the transceiver modules is communicated to a user's central software through the router or other node equipment. An optical service channel (OSC) or Ethernet connection, for example, may be coupled to an external port on the node equipment to provide the monitoring, status, and control information to the central software. However, the central software typically cannot access or manage the transceiver modules independently of the node equipment. Moreover, transceiver modules typically do not communicate directly with other equipment in the communication system, such as equipment coupled along the optical fibers ("line system components") in the system as well as other transceivers. That is, transceivers are typically not separately addressable managed entities from the node equipment and lack a direct data path for communicating control information to/from the transceiver. Since such data paths traditionally are made through the node equipment, transceivers purchased from a vendor other than the node equipment vendor may be limited to a reduced set of capability that is compatible with the node equipment. Accordingly, such transceivers may not be adequately monitored or controlled to enable the full set of transceiver capabilities offered by devices from another vendor.

Without a capability of communicating control information directly with the transceivers, customers may be precluded from enabling and control of the full set of capabilities offered by devices from vendors other than the vendor that also supply the node equipment. Therefore, such customers may not realize cost savings that would otherwise be achieved by purchasing node equipment and transceivers from different vendors.

SUMMARY

In an aspect, a system includes a hub transceiver configured to be communicatively coupled to a first network node and to an optical communications network, and to one edge transceiver or a plurality of edge transceivers. Each of the edge transceivers is configured to be communicatively coupled to a respective second network node and to the optical communications network. The hub transceiver is operable to transmit, over a first communications channel of the optical communications network, a first message to each of the edge transceivers concurrently, where the first message includes an indication of available network resources on the optical communications network. Each of the edge transceivers is operable to transmit, over a second communications channel of the optical communications network, a respective second message to the hub transceiver, where the second message includes an indication of a respective subset of the available network resources selected by the edge transceiver for use in communicating over the optical communications network; receive, from the hub transceiver, a third message acknowledging receipt of a selection by the edge transceiver; receiving, from the hub transceiver, a fourth message confirming an assignment of the selected subset of the available network resources to the edge transceiver for use in communicating over the optical communications network; and transmit, using the selected subset of the available network resources, data from the second network node that is communicatively coupled to the edge transceiver to the first network node via the hub transceiver.

In another aspect, an apparatus includes an edge transceiver configured to be communicatively coupled to a first network node and to an optical communications network. The edge transceiver is operable to receive, over a first communications channel of the optical communications network, a first message from a hub transceiver, where the first message includes an indication of available network resources on the optical communications network; transmit, over a second communications channel of the optical communications network, a second message to the hub transceiver, where the second message includes an indication of a subset of the available network resources selected by the edge transceiver for use in communicating over the optical communications network; receive, from the hub transceiver, a third message acknowledging receipt of a selection by the edge transceiver; receive, from the hub transceiver, a fourth message confirming an assignment of the selected subset of the available network resources to the edge transceiver for use in communicating over the optical communications network; and transmit, using the selected subset of the available network resources, data from the first network node to a second network node via the hub transceiver.

In another aspect, a method includes receiving, by an edge transceiver communicatively coupled to a first network node and to an optical communications network, a first message from a hub transceiver over a first communications channel of the optical communications network, where the first message includes an indication of available network resources on the optical communications network; transmitting, by the edge transceiver over a second communications channel of the optical communications network, a second message to the hub transceiver, where the second message includes an indication of a subset of the available network resources selected by the edge transceiver for use in communicating over the optical communications network; receiving, by the edge transceiver from the hub transceiver, a third message acknowledging receipt of a selection by the edge transceiver; receiving, by the edge transceiver from the hub transceiver, a fourth message confirming an assignment of the selected subset of the available network resources to the edge transceiver for use in communicating over the optical communications network; and transmitting, by the edge transceiver using the selected subset of the available network resources, data from the first network node to a second network node via the hub transceiver.

In another aspect, an apparatus includes a hub transceiver configured to be communicatively coupled to a first network node and to an optical communications network. The hub transceiver is operable to transmit, over a first communications channel of the optical communications network, a first message to each of a plurality of edge transceivers concurrently, where the first message includes an indication of available network resources on the optical communications network, and where each of the edge transceivers is configured to be communicatively coupled to a respective second network node and to the optical communications network; receive, from a first edge transceiver of the plurality of edge transceivers, a second message over a second communications channel of the optical communications network, where the second message comprises an indication of a subset of the available network resources selected by the first edge transceiver for use in communicating over the optical communications network; transmit, to the first edge transceiver, a third message acknowledging receipt of a selection by the first edge transceiver; assign the selected subset of the available network resources to the first edge transceiver for use in communicating over the optical communications network, and transmit a fourth message confirming an assignment of the selected subset of the available network resources to the first edge transceiver.

In another aspect, a system includes a management optical gateway (also referred to as an optical gateway) configured to be communicatively coupled to an optical communications network; a plurality of hub transceivers, where each hub transceiver is configured to be communicatively coupled to a respective first network node of the optical communications network and to the optical gateway; and a plurality of edge transceivers, where each of the edge transceivers is configured to be communicatively coupled to a respective second network node of the optical communications network and to the optical gateway. The optical gateway is operable to receive a plurality of signals from the optical communications network at a plurality of ports of the optical gateway, where each port of the optical gateway includes one or more respective photodiodes. Further, the optical gateway is operable to transmit a plurality of signals from the optical communications network at a plurality of ports of the optical gateway, where a VOA (Variable Optical Attenuator) may be operable to adjust or vary the attenuation of the signals of the optical communications network based on a control signal supplied thereto. Further, the optical gateway is operable to determine, for each port, a respective link of the optical communications network communicatively coupling the port with at least one hub transceiver of the plurality of hub transceivers or with at least one edge transceiver of the plurality of edge transceivers, and an identity of the at least one hub transceiver or the at least one edge transceiver.

In another aspect, an apparatus includes an optical gateway configured to be communicatively coupled to an optical communications network, to a plurality of hub transceivers, and to a plurality of edge transceivers. The optical gateway is operable to receive a plurality of signals from the optical communications network at a plurality of ports of the optical gateway, where each port of the optical gateway comprises one or more respective photodiodes. The optical gateway is also operable to determine, for each port, a respective link of the optical communications network communicatively coupling the port with at least one hub transceiver communicatively coupled to the optical communications network or with at least one edge transceiver communicatively coupled to the optical communications network, and an identity of the at least one hub transceiver or the at least one edge transceiver.

In another aspect, a method includes receiving, by an optical gateway communicatively coupled to an optical communications network, a plurality of signals from the optical communications network at a plurality of ports of the optical gateway, where each port of the optical gateway comprises one or more respective photodiodes; and determining, by an optical gateway for each port, a respective link of the optical communications network communicatively coupling the port with at least one hub transceiver communicatively coupled to the optical communications network or with at least one edge transceiver communicatively coupled to the optical communications network, and an identity of the at least one hub transceiver or the at least one edge transceiver.

In another aspect, a system includes a plurality of hub transceivers, where each hub transceiver is configured to be communicatively coupled to a respective first network node of the optical communications network; and a plurality of edge transceivers, where each of the edge transceivers is configured to be communicatively coupled to a respective second network node of the optical communications network. A first hub transceiver of the plurality of hub transceivers is operable to determine that the first hub transceiver is configured to assign a first subset of network resources of the optical communications network to a first subset of the edge transceivers for communication over the optical communications network; determine that a second hub transceiver is configured to assign a second subset of network resources of the optical communications network to a second subset of the edge transceivers for communication over the optical communications network; determine that the first subset of network resources overlaps the second subset of network resources; and responsive to determining that the first subset of network resources overlaps the second subset of network resources, transmit a notification of the overlap to a control module of the optical communications network.

In another aspect, an apparatus includes a first hub transceiver configured to be communicatively coupled to an optical communications network, to a second hub transceiver, and to a plurality of edge transceivers. The first hub transceiver is operable to determine that the first hub transceiver is configured to assign a first subset of network resources of the optical communications network to a first subset of the edge transceivers for communication over the optical communications network; determine that a second hub transceiver is configured to assign a second subset of network resources of the optical communications network to a second subset of the edge transceivers for communication over the optical communications network; determine that the first subset of network resources overlaps the second subset of network resources; responsive to determining that the first subset of network resources overlaps the second subset of network resources, transmit a notification of the overlap to a control module of the optical communications network.

In another aspect, an apparatus includes an optical gateway configured to be communicatively coupled to a plurality of hub transceivers. The optical gateway is operable to determine that a first hub transceiver of the plurality of hub transceivers is transmitting data to the optical gateway according to a first frequency range; determine that a second hub transceiver of the plurality of hub transceivers is transmitting data to the optical gateway according to a first frequency range transmitting data to the optical gateway according to a second frequency range; determine that the first frequency range overlaps the second frequency range; and responsive to determining that the first frequency range overlaps the second frequency range, transmit a command to the second hub transceiver to transmit data to the optical gateway according to a third frequency range that does not overlap the first frequency range.

In another aspect, a method includes determining, by a first hub transceiver communicatively coupled to an optical communications network, that the first hub transceiver is configured to assign a first subset of network resources of the optical communications network to a first subset of the edge transceivers for communication over the optical communications network; determining, by the first hub transceiver, that a second hub transceiver is configured to assign a second subset of network resources of the optical communications network to a second subset of the edge transceivers for communication over the optical communications network; determining, by the first hub transceiver, that the first subset of network resources overlaps the second subset of network resources; and responsive to determining that the first subset of network resources overlaps the second subset of network resources, transmitting, by the first hub transceiver, a notification of the overlap to a control module of the optical communications network.

In another aspect, a system includes a hub transceiver configured to be communicatively coupled to a first network node and to an optical communications network; a plurality of edge transceivers, where each of the edge transceivers is configured to be communicatively coupled to a respective second network node and to the optical communications network; and a control module communicatively coupled to one or more of the hub transceiver or the plurality of edge transceivers. The control module is operable to receive, from one or more of the edge transceivers or the hub transceiver, telemetry data regarding at least one of a transmission or a receipt of data over the optical communications network; determine, based on the telemetry data, performance characteristics regarding the optical communications network; and transmit, based on the performance characteristics, a command to one or more of the edge transceivers or the hub transceiver to modify an operation with respect to the optical communications network.

In another aspect, an apparatus includes a control module communicatively coupled to one or more edge transceivers or to a hub transceiver of an optical communications network. The control module comprises circuitry operable to receive, from one or more of the edge transceivers or the hub transceiver, telemetry data regarding at least one of a transmission or a receipt of data over the optical communications network; determine, based on the telemetry data, performance characteristics regarding the optical communications network; and transmit, based on the performance characteristics, a command to one or more of the edge transceivers or the hub transceiver to modify an operation with respect to the optical communications network.

In another aspect, a method includes receiving, by a control module communicatively coupled to an optical communications network, from one or more edge transceivers or hub transceiver of the optical communications network, telemetry data regarding at least one of a transmission or a receipt of data over the optical communications network; determining, by the control module based on the telemetry data, performance characteristics regarding the optical communications network; and transmitting, by the control module based on the performance characteristics, a command to one or more of the edge transceivers or the hub transceiver to modify an operation with respect to the optical communications network.

In another aspect, a system includes a hub transceiver configured to be communicatively coupled to a first network node and to an optical communications network; and a plurality of edge transceivers, where each of the edge transceivers is configured to be communicatively coupled to a respective second network node and to the optical communications network. The hub transceiver is operable to:=determine a plurality of optical subcarriers available for assignment by the hub transceiver to the plurality of the edge transceivers for use in communicating over the optical communications network; assign, to each of the edge transceivers, a respective subset of the optical subcarriers use in communicating over the optical communications network, where each of the subsets of the optical subcarriers includes a respective data optical subcarrier for transmitting data over the optical communications network, and where at least one of the subsets of the optical subcarriers includes one or more respective idle optical subcarriers; and transmit, to each of the edge transceivers, an indication of the respective subset of the optical subcarriers assigned to the edge transceiver. Each of the edge transceivers is operable to receive, from the hub transceiver, the indication of the respective subset of the optical subcarriers assigned to the edge transceiver; and transmit data over the optical communications network using the respective subset of the optical subcarriers assigned to the edge transceiver.

In another aspect, an apparatus includes a hub transceiver configured to be communicatively coupled to a first network node and to an optical communications network. The hub transceiver is operable to determine a plurality of optical subcarriers available for assignment by the hub transceiver to a plurality of edge transceivers for use in communicating over the optical communications network; assign, to each of the edge transceivers, a respective subset of the optical subcarriers for use in communicating over the optical communications network, where each of the subsets of the optical subcarriers includes a respective data optical subcarrier for transmitting data over the optical communications network, and where at least one of the subsets of the optical subcarriers includes one or more respective idle optical subcarriers; and transmit, to each of the edge transceivers, an indication of the respective subset of the optical subcarriers assigned to the edge transceiver.

In another aspect, a method includes determining, by a hub transceiver communicatively coupled to a first network node and to an optical communications network, a plurality of optical subcarriers available for assignment by the hub transceiver to a plurality of edge transceivers for use in communicating over the optical communications network; assigning, by the hub transceiver to each of the edge transceivers, a respective subset of the optical subcarriers for use in communicating over the optical communications network, where each of the subsets of the optical subcarriers includes a respective data optical subcarrier for transmitting data over the optical communications network, and where at least one of the subsets of the optical subcarriers includes one or more respective idle optical subcarriers; and transmitting, from the hub transceiver to each of the edge transceivers, an indication of the respective subset of the optical subcarriers assigned to the edge transceiver.

In another aspect, a system includes a hub transceiver configured to be communicatively coupled to a first network node and to an optical communications network; and a plurality of edge transceivers, where each of the edge transceivers is configured to be communicatively coupled to a respective second network node and to the optical communications network. Each of the edge transceivers has one of: a first type of configuration for communicating with the optical communications network according to a first bandwidth, where the first type of configuration is associated with a first optical subcarrier assignment protocol; a second type of configuration for communicating with the optical communications network according to a second bandwidth, where the second type of configuration is associated with a second optical subcarrier assignment protocol; or a third type of configuration for communicating with the optical communications network according to a third bandwidth, where the third type of configuration is associated with a third optical subcarrier assignment protocol. The hub transceiver is operable to determine a plurality of optical subcarriers available for assignment by the hub transceiver to the plurality of the edge transceivers for use in communicating over the optical communications network; assign, to each of the edge transceivers, a respective subset of the optical subcarriers for use in communicating over the optical communications network. Assigning the respective subset of the optical subcarriers includes, for each particular one of the edge transceivers determining that the particular edge transceiver has the first type of configuration, the second type of configuration, or the third type of configuration; and in response to determining that the edge transceiver has the first type of configuration, the second type of configuration, or the third type of configuration, assigning the respective subset of the optical subcarriers to the particular edge transceiver according to a particular one of the optical subcarrier assignment protocols associated with the determined type of configuration. The hub transceiver is also operable to transmit, to each respective one of the edge transceivers, an indication of the respective subset of the optical subcarriers assigned to the particular edge transceiver. Each particular one of the edge transceivers is operable to receive, from the hub transceiver, the indication of the respective subset of the optical subcarriers assigned to the particular edge transceiver; and transmit data over the optical communications network using the respective subset of the optical subcarriers assigned to the particular edge transceiver.

In another aspect, an apparatus includes a hub transceiver configured to be communicatively coupled to a first network node and to an optical communications network. The hub transceiver is operable to determine a plurality of optical subcarriers available for assignment by the hub transceiver to a plurality of the edge transceivers for use in communicating over the optical communications network, where each of the edge transceivers is configured to be communicatively coupled to a respective second network node and to the optical communications network. Each of the edge transceivers has one of: a first type of configuration for communicating with the optical communications network according to a first bandwidth, where the first type of configuration is associated with a first optical subcarrier assignment protocol; a second type of configuration for communicating with the optical communications network according to a second bandwidth, where the second type of configuration is associated with a second optical subcarrier assignment protocol, or a third type of configuration for communicating with the optical communications network according to a third bandwidth, where the third type of configuration is associated with a third optical subcarrier assignment protocol. The hub transceiver is also operable to assign, to each of the edge transceivers, a respective subset of the optical subcarriers for use in communicating over the optical communications network. Assigning the respective subset of the optical subcarriers includes, for each particular one of the edge transceivers, determining that the particular edge transceiver has the first type of configuration, the second type of configuration, or the third type of configuration; and in response to determining that the edge transceiver has the first type of configuration, the second type of configuration, or the third type of configuration, assigning the respective subset of the optical subcarriers to the particular edge transceiver according to a particular one of the optical subcarrier assignment protocols associated with the determined type of configuration. The hub transceiver is also operable to transmit, to each respective one of the edge transceivers, an indication of the respective subset of the optical subcarriers assigned to the particular edge transceiver.

In another aspect, a method includes determining, by a hub transceiver, a plurality of optical subcarriers available for assignment by the hub transceiver to a plurality of the edge transceivers for use in communicating over an optical communications network, where the hub transceiver is communicatively coupled to a first network node and to the optical communications network, and where each of the edge transceivers is configured to be communicatively coupled to a respective second network node and to the optical communications network. Each of the edge transceivers has one of: a first type of configuration for communicating with the optical communications network according to a first bandwidth, where the first type of configuration is associated with a first optical subcarrier assignment protocol; a second type of configuration for communicating with the optical communications network according to a second bandwidth, where the second type of configuration is associated with a second optical subcarrier assignment protocol; or a third type of configuration for communicating with the optical communications network according to a third bandwidth, where the third type of configuration is associated with a third optical subcarrier assignment protocol. The method also includes assigning, by the hub transceiver to each of the edge transceivers, a respective subset of the optical subcarriers for use in communicating over the optical communications network. Assigning the respective subset of the optical subcarriers includes, for each particular one of the edge transceivers: determining, by the hub transceiver, that the particular edge transceiver has the first type of configuration, the second type of configuration, or the third type of configuration; and in response to determining that the edge transceiver has the first type of configuration, the second type of configuration, or the third type of configuration, assigning, by the hub transceiver, the respective subset of the optical subcarriers to the particular edge transceiver according to a particular one of the optical subcarrier assignment protocols associated with the determined type of configuration. The method also includes transmitting, by the hub transceiver to each respective one of the edge transceivers, an indication of the respective subset of the optical subcarriers assigned to the particular edge transceiver.

Other implementations are directed to systems, devices, and non-transitory, computer-readable media having instructions stored thereon, that when executed by one or more processors, cause the one or more processors to perform operations described herein.

The details of one or more implementations are set forth in the accompanying drawings and the description below. Other features and advantages will be apparent from the description and drawings, and from the claims.

BRIEF DESCRIPTION OF THE DRAWINGS

FIG. 4B is a diagram of an example of an amplitude modulation (AM) signal generator circuit.

FIGS. 24A and 2B are diagrams of example optical subcarrier allotment techniques.

FIGS. 31A-31F are flow chart diagrams of example processes that can be performed using one or more of the systems described herein.

Like reference numbers and designations in the various drawings indicate like elements.

DETAILED DESCRIPTION

Figure 1A:
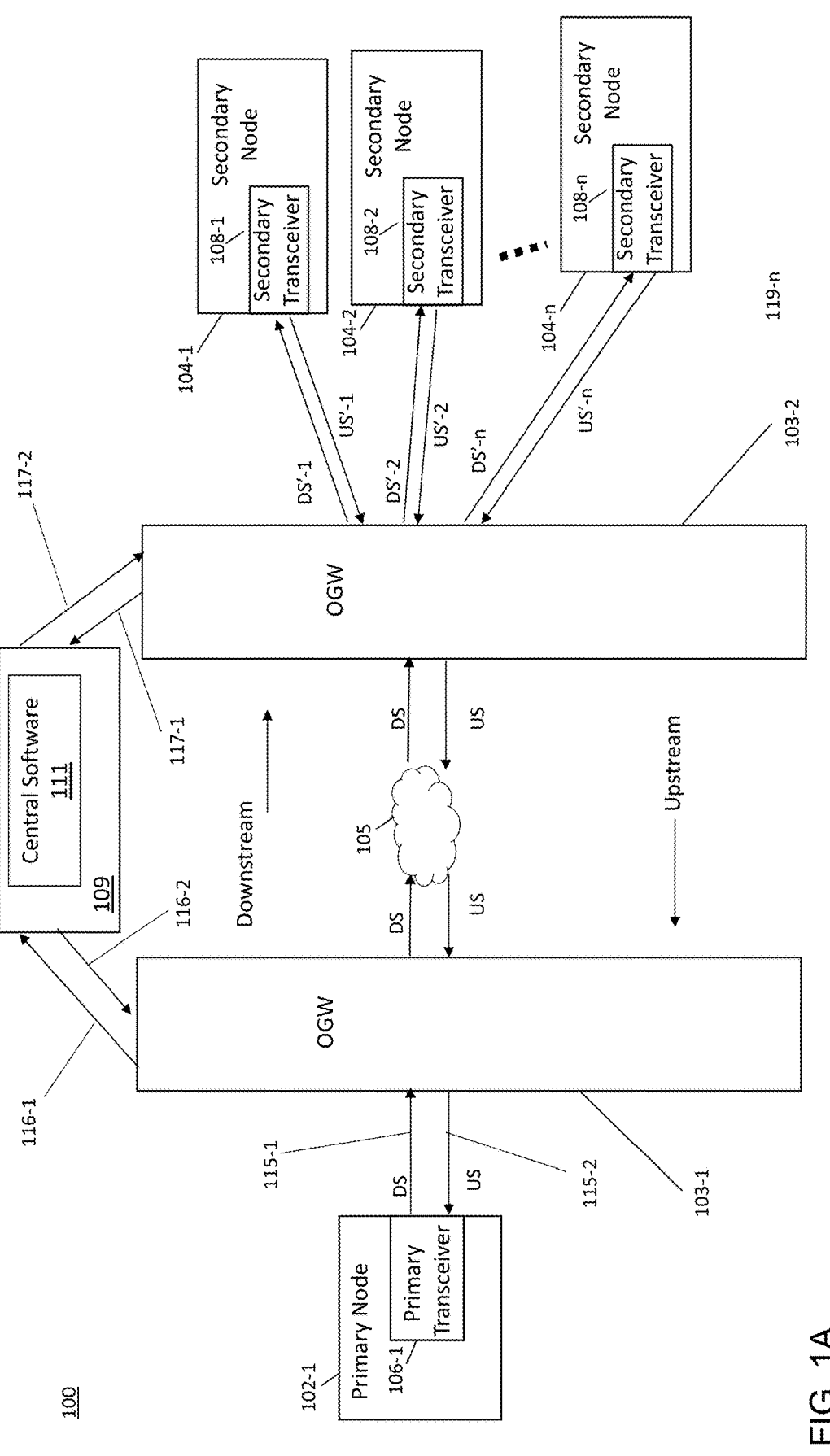
FIG. 1A is a diagram of an example of an optical communication system.

The present disclosure describes systems and methods for providing control paths and/or communication paths to and from transceivers on an optical communications network (e.g., transceivers that are installed in host equipment or added to node equipment of the optical communications network).

In some implementations, the systems and methods described herein can enable outside central software (e.g., central software implemented on one or more devices remote from the transceivers) to exchange information with the transceivers directly. Accordingly, in at least some implementations, the central software can monitor and control the transceivers independently of the host equipment or node equipment, and/or augment the control signals or communication signals that are provided by the host equipment or the node equipment.

In some implementations, the system and methods described herein can enable transceivers to exchange information with one another directly. As a result, transceivers can communicate with one another to establish control paths and/or communication path between them, and reconfigure the control paths and/or communication paths dynamically (e.g., to correct for misconfigurations with respect to the network, to optimize the performance of the transceivers, etc.). In some implementations, this process can be performed by the transceivers, independent of the central software, the host equipment, and/or the node equipment.

In some implementations, the data paths disclosed herein can also enable a line system component near a hub (or edge) node to send information to and receive information from a transceiver located in the hub (or edge) node directly, without access through the node equipment. Moreover, the data paths disclosed herein can also facilitate the exchange of control and management information between transceivers, such as transceivers provided in hub and edge nodes. Further, because the data paths are independent of the node equipment, bi-directional communication of control information can occur simultaneously without direct coordination between the transceivers and the node equipment. Accordingly, customers can combine transceivers or transceiver modules and node equipment from different vendors to optimize performance and/or minimize costs.

The data paths can be realized through several example mechanisms that reduce or prevent interference between the data paths. In one example, a first data path between line system components and the transceivers can be implemented with a low rate amplitude modulated signal that is superimposed on high data rate optical signal output from the transceivers. In addition, a second data path can be implemented through polarization modulation (e.g., polarization shift keying) of an optical signal that is also output from the transceiver.

In a further example, control information can be exchanged over a first data path between a transceiver (e.g., a hub or edge transceiver) and a line system component by way of a first amplitude modulation over a first band of frequencies or at a first frequency. The first amplitude modulation can superimposed on optical signals output from the transceiver module. The second data path can implement, for example, by a second amplitude modulation over a second band of frequencies or a second frequency. The second amplitude modulation can be further superimposed on the optical signals output from the transceiver along with the first amplitude modulation. The second amplitude modulation facilitates communication over a data path, for example, between transceivers.

In a further example, control information can be exchanged directly between a transceiver and central software through the transceiver's host node over a management virtual local area network (VLAN) channel. In this example, the transceiver receives and sends packets with VLAN tags with a central software entity. The host node configuration of VLANs directs the management VLAN packets to the transceiver enabling the transceiver to be the source and destination of these management VLAN packets. In some implementations, this configuration does not require any line system components.

Figure 17:
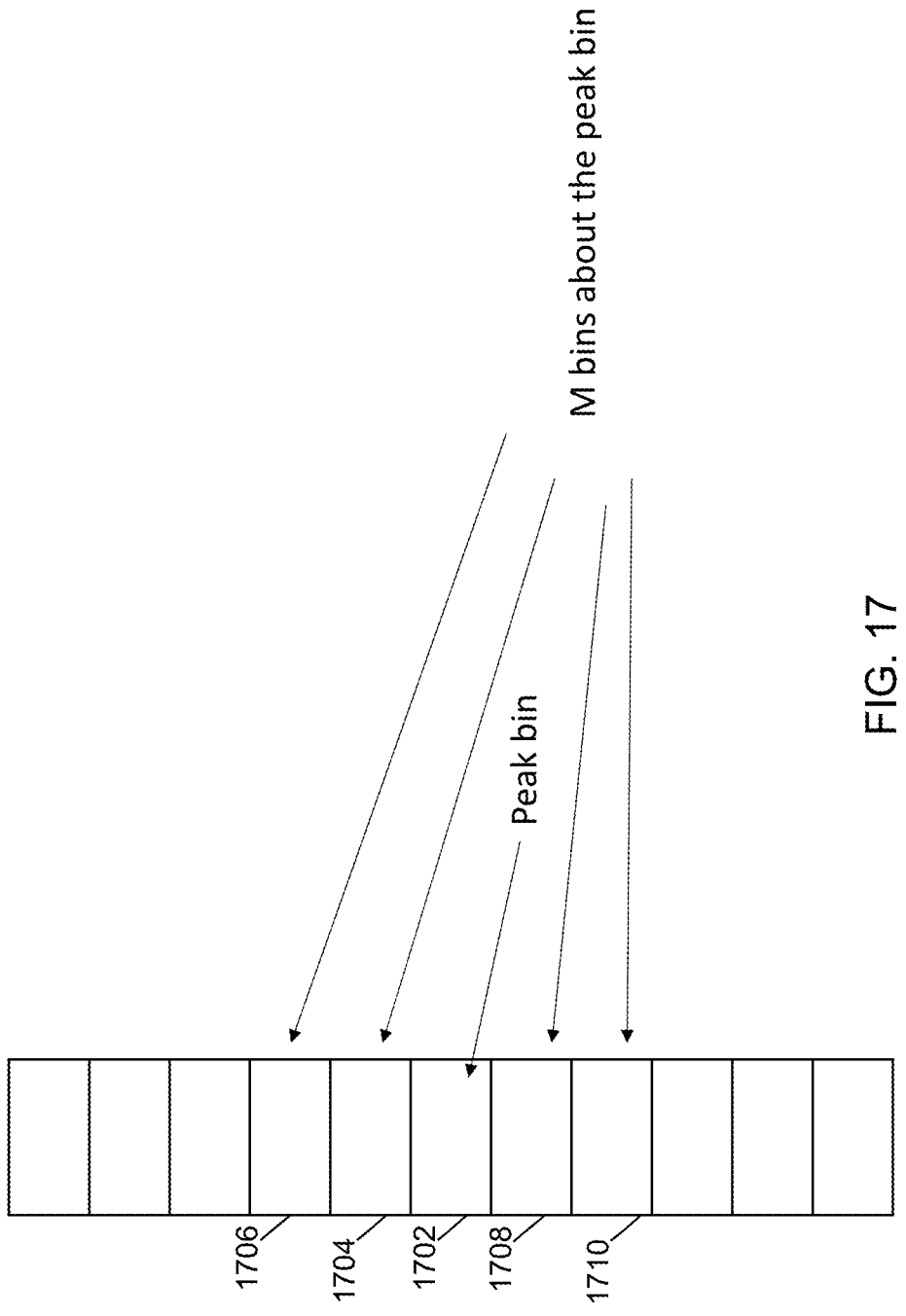
FIG. 17 is a diagram of example frequency bins associated with an out-of-band communication signal.
Figure 18:
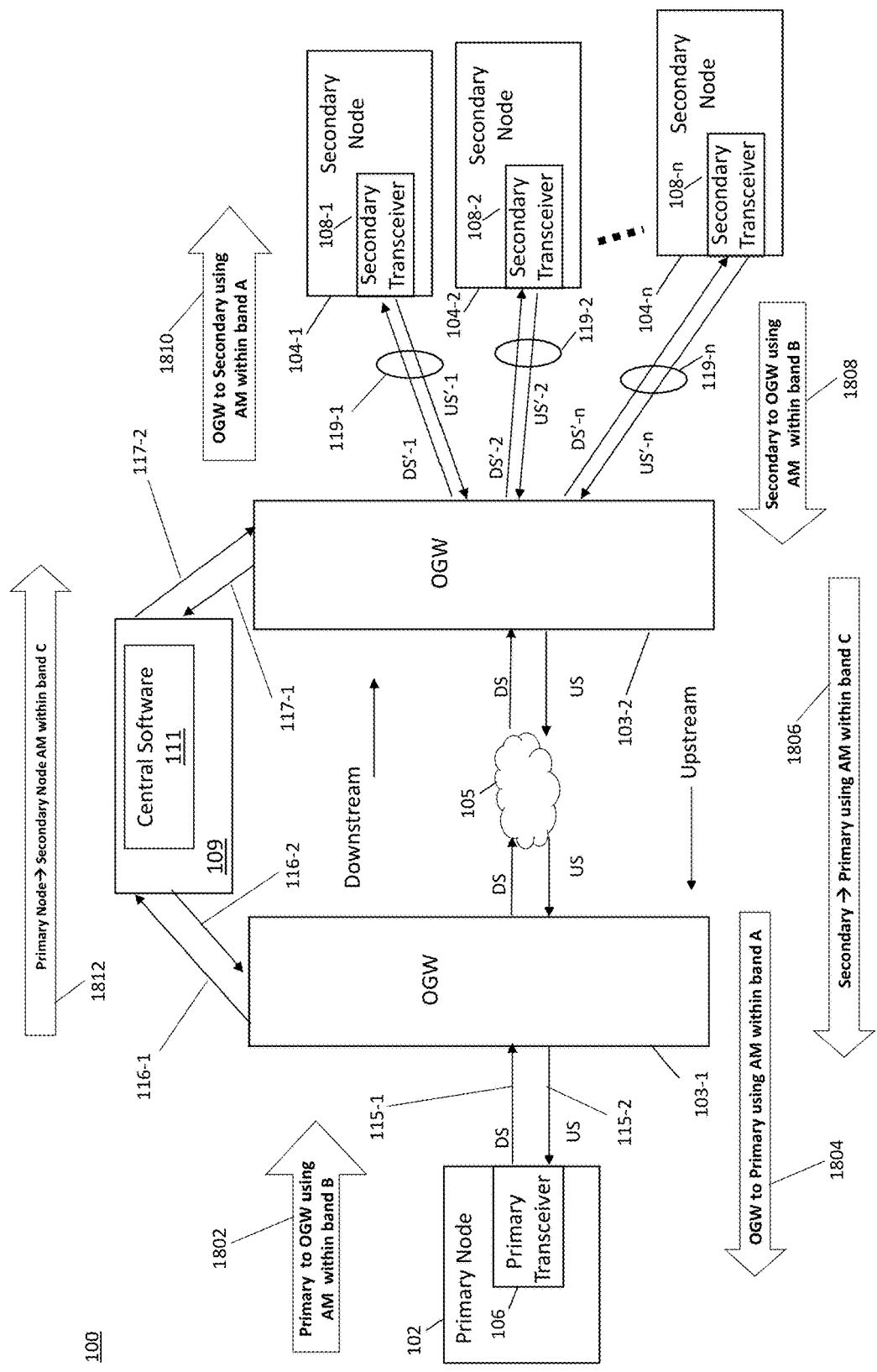
FIG. 18 is a diagram of an example optical communication system.
Figure 19:
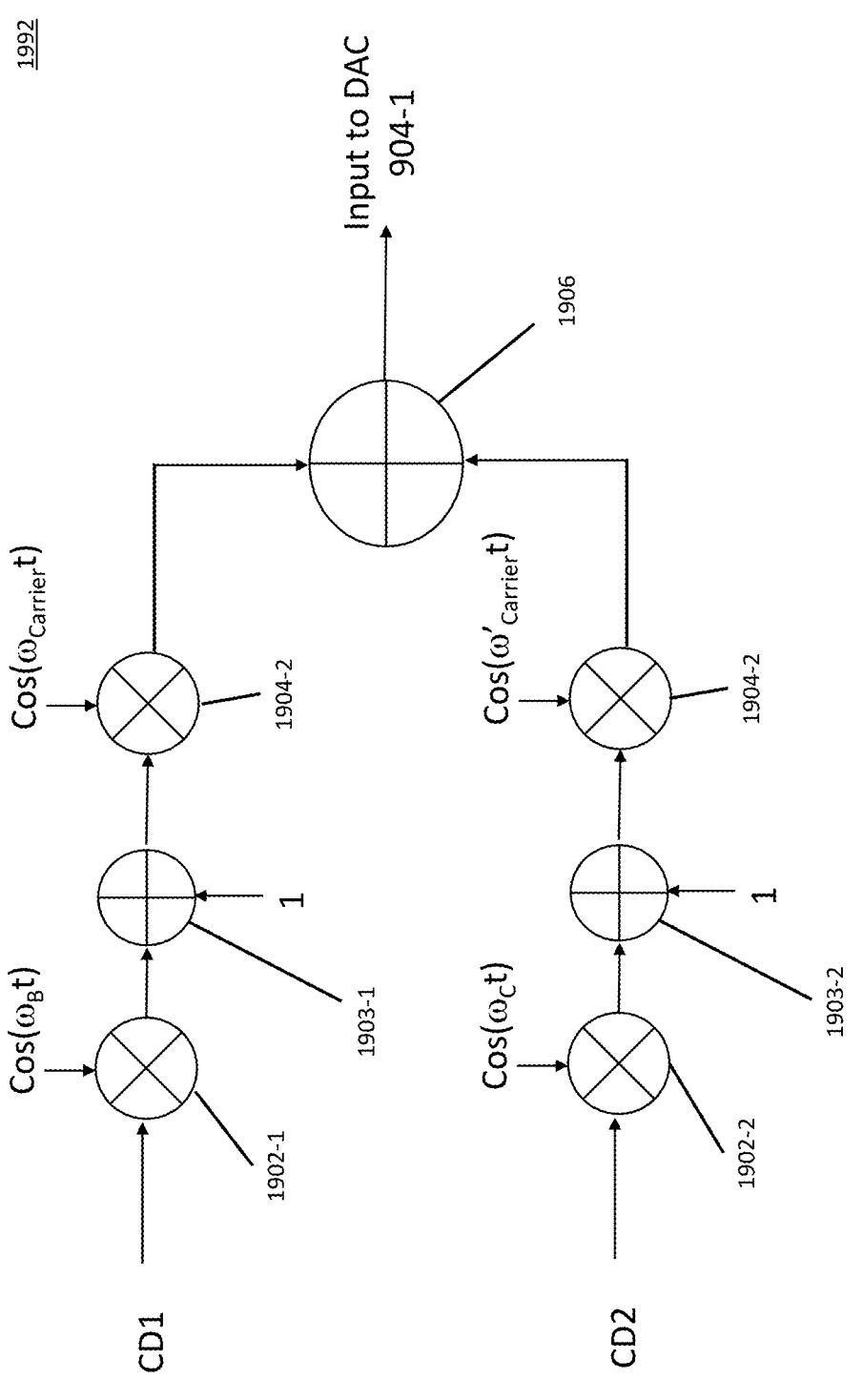
FIG. 19 is a diagram of an example amplitude modulation generating circuit.
Figure 20:
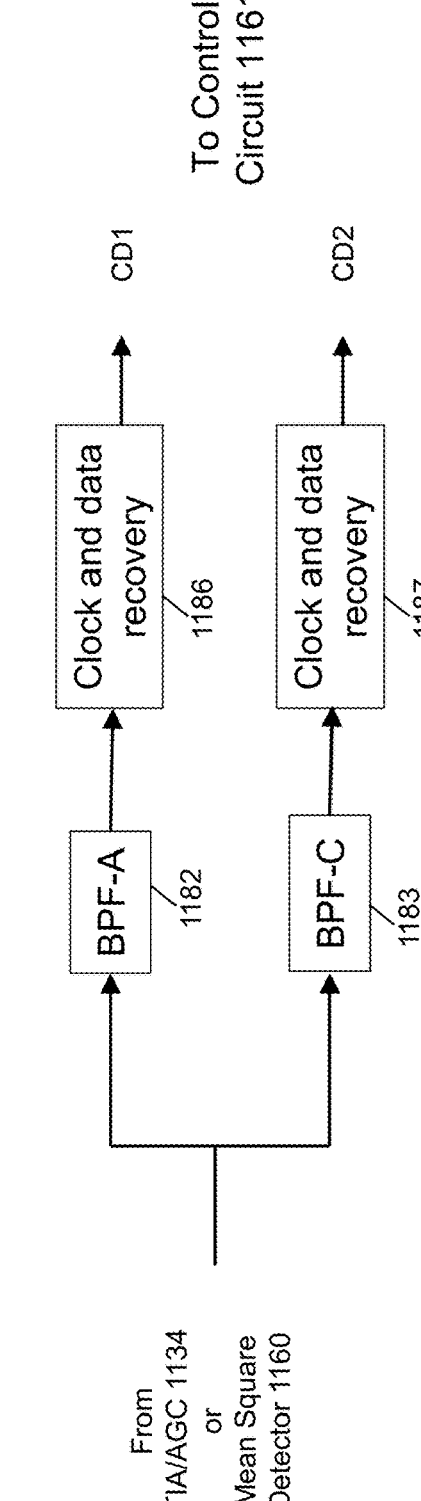
FIG. 20 is a diagram of example circuitry for recovering control information from signal supplied to a transceiver.

Example data paths and uses for those data paths are discussed in greater detail below and shown in the drawings. For instance, FIGS. 1 and 2A-2C show examples of data path connections can be established between devices on an optical communications network. Further, FIGS. 3-17 show examples implementations in which transceivers or transceiver modules communicate control information or data with each other (e.g., by way of a polarization modulated optical signal) and communicate with line system components, such as an optical gateway (e.g., by way of amplitude modulation of the optical signals output from the transceiver). Further, FIGS. 18-20 show example implementations in which data path connections are established by amplitude modulating the optical signals that are output from the transceiver at different frequencies associated with different components in an optical communication system. For example, an amplitude modulation at a first frequency or over a first band of frequencies can be associated with communication between a primary or hub node and a line system component in a first direction, an amplitude modulation at a second frequency or over a second band of frequencies can be associated with communication between a primary node and one or more secondary or edge nodes in the first direction, and an amplitude modulation at a third frequency or over a third band of frequencies can be associated with communication between a line system component and one or more secondary or edge nodes in the first direction. Such communication in the first direction may be carried out on a first optical communication path. Further, FIGS. 21-35 show example implementations for configuring network devices (e.g., transceivers, optical gateways, and/or other devices) on an optical communication system.

In a further example, an amplitude modulation at the first frequency or over the first band of frequencies can be associated with communication between a secondary or edge node and a line system component in a second direction, an amplitude modulation at the second frequency or over a second band of frequencies can be associated with communication between one or more secondary node or edge nodes and the hub or primary node in the second direction, and an amplitude modulation at the third frequency or over the third band of frequencies can be associated with communication between a line system component and the primary or hub node in the second direction. Such communication in the second direction can be carried out on a second optical communication path.

I. Example Data Paths

Before describing the above noted data paths, an example optical communication system in which such data paths may be provided is described below. In particular, FIG. 1A shows a block diagram of an example optical communication system 100. The optical communication system 100 includes, for example, a primary node 102, such as a router. A primary transceiver or transceiver module 106, for example, is provided in the primary node 102 that supplies a downstream signal (DS) to an optical fiber link 115-1 (e.g., part of a first or downstream optical communication path), and receives an upstream signal (US) from an optical fiber links 115-2 (e.g., part of a second or upstream optical communication path). In some implementations, a primary transceiver or primary transceiver module may be referred to as a hub transceiver or hub transceiver module. The downstream optical signal DS is fed by a fiber link 115-1 to an optical line system component, such as an optical gateway OGW 103-1. As discussed in greater detail below with reference to FIG. 3, the optical signals DS and US each include a plurality of optical subcarriers, such as Nyquist optical subcarriers. The OGW 103-1 also supplies the signal US on a fiber link 115-2 to a primary transceiver 106.

As described below with reference to FIG. 7 the OGW 103-1 includes optical and electrical components that extract control channel information carried by the signal DS and supply such information to a central software 111, which may run on a network management system 109, including one or more computers and/or processors. As shown in FIG. 1A, a link 116-1 may supply such control information to the central software 111. As further described below with reference to FIG. 7, additional control information may be provided over a link 116-2 to the OGW 103-1, such that the optical and electrical circuitry in OGW 103-1 further outputs the signal US with such additional control information for detection by the transceiver 106.

The OGW 103-1 outputs the signal DS to one or more optical links, line system components (e.g., one or more optical amplifiers, such as erbium doped optical amplifiers), wavelength selective switches (WSSs), power splitters and/ or combiners, and optical multiplexers and/or demultiplexers (e.g., an arrayed waveguide grating). Such components are represented in FIG. 1A by a sub-system 105. After propagating through the sub-system 105, the signal DS is supplied, for example, to another optical gateway (OGW) 103-2, which, in this example, may include an optical splitter in addition to the components or devices shown in FIG. 7. Accordingly, the OGW 103-2 may provide a power split portion of the signal DS (e.g., DS'-1 to DS'-n) to a respective one of secondary transceivers 108-1 to 108-*n*. Each of the secondary transceivers 108-1 to 108-*n* is provided in a respective one of the secondary nodes 104-1 to 104-*n*, and at least one of the transceivers is coupled to a terminal end of the downstream optical communication path. In some implementations, a secondary transceiver or secondary transceiver module may be referred to as an edge transceiver, edge transceiver module, leaf transceiver, or leaf transceiver module. Each secondary node 104 may have a structure similar to the primary node 102 and may operate in a manner similar to that described above with respect to the primary node 102.

The OGW 103-2 may operate in a manner similar to that described above with respect to the OGW 103-1 to supply control information on a link 117-1 to the control software 111 and to separately supply the same or different control information to the secondary transceivers 108. In addition, the OGW 103-2 may operate in a manner similar to that of the OGW 103-1 to receive control information from the central software 111 via a link 117-2, and separately receive the same or different control information from the transceivers 108. The links 117-1 and 117-2 may carry the same type of signals as the links 116-1 and 116-2.

As further shown in FIG. 1A, each secondary transceiver 108 may have a structure similar to and operate in manner similar to that described above with respect to the primary node 106. In one example, however, each of the secondary transceivers 108 may supply a modulated optical signal US'-1 to US'-n in an upstream direction. Each such optical signal may include one or more optical subcarriers. Collectively, a number the optical subcarriers output from the secondary transceivers 108 may be equal to, less than, or greater than the number of optical subcarriers output from the primary transceiver 106.

The optical signals US'-1 to US'-n may be combined by a combiner in the OGW 103-2, and output to the sub-system 105 in combined form as the upstream optical signal US. The optical signal US may then be provided to the OGW

103-2, which outputs the optical signal US onto a fiber link 115-2, which supplies the optical signal US to the primary transceiver 106.

Figure 1B:
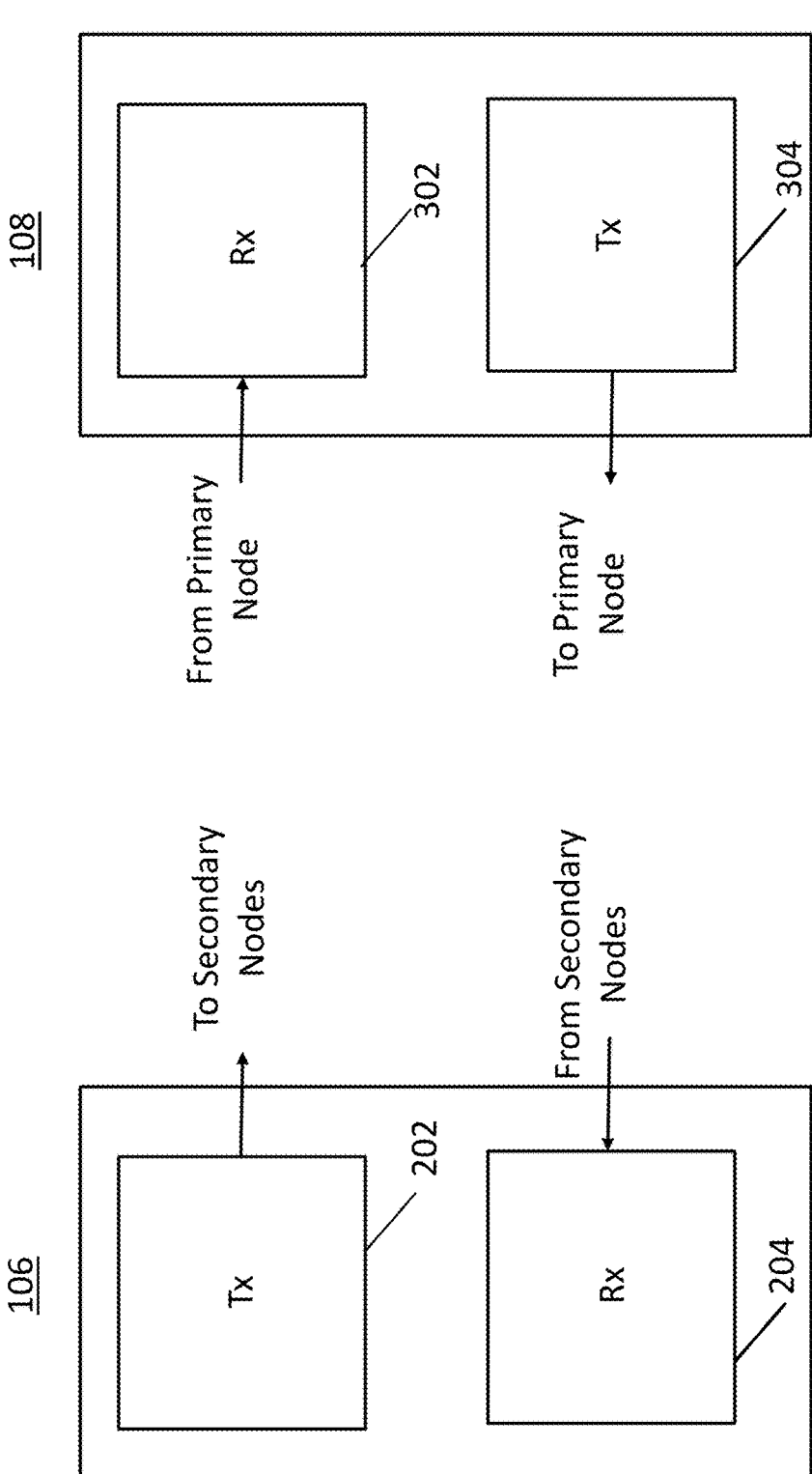
FIG. 1B shows block diagrams of primary node and secondary node transceivers illustrated in FIG. 1A.

FIG. 1B illustrates primary node 110 in greater detail. Primary node 106 may include a transmitter 202 that supplies a downstream modulated optical signal including subcarriers, and a receiver that 204 that may receive upstream subcarriers carrying data originating from the secondary nodes, such as nodes 108-1 to 108-*n*. Transmitter 202 and receiver 204, in one example, collectively constitute a primary node or hub node transceiver.

FIG. 1B further shows a block diagram of one of secondary nodes 108, which may include a receiver circuit 302 that receives one or more downstream transmitted subcarriers, and a transmitter circuit 304 that transmits one or more subcarriers in the upstream direction. Collectively, receiver circuit 302 and transmitter circuit 304 constitute a secondary node or edge node transceiver Details of the transmitters and receivers of the hub and edge node transceivers are presented below with reference to FIGS. 4A, 4B, 5, 6A, 6B, 6C, 8, and 9A-9C. It is understood that the hub and edge node receivers have a similar structure and operate in a similar manner. Also, the hub and edge node transmitters have a similar structure and operate in a similar manner.

Figure 2A:
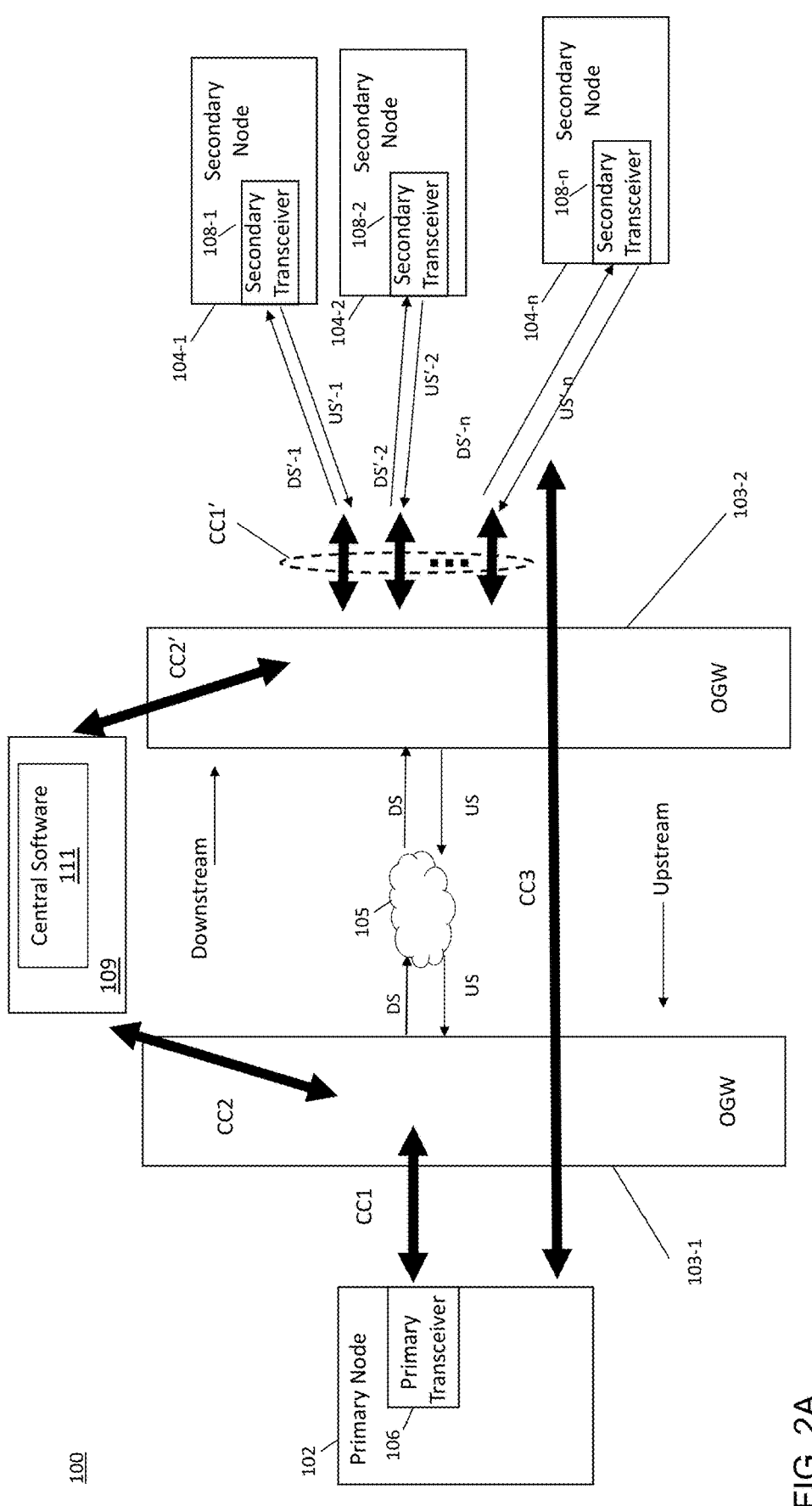
FIGS. 2A-2C are diagrams of example data paths for communicating control information in the optical communication system shown in FIG. 1.

FIG. 2A shows the system 100 labeled with various data paths. For example, a data path CC1 provides communication of control information between the OGW 103-1 and the primary transceiver 106. Data paths CC2 and CC2' facilitate control information communication between the OGW 103-1 and the OGW 103-2, respectively, and the central software 111. In addition, a data path CC3 provides communication of control information between one or more secondary transceivers 104 and the primary transceiver 106, and, further, a data path CC1' provide control information between the OGW 103-2 and the secondary transceivers 108. As noted above, the data paths disclosed herein may provide communication between the central software 111 and the transceivers and need not provide such communication with intervening node equipment, such as a router. Although FIG. 2A shows a first optical gateway (103-1) and a second optical gateway (103-2), it is understood that, in another example, only one such optical gateway may be provided near the primary node 102, such that only the OGW 103-1 is included in the system 100. In that case, the OGW 103-2 can be replaced with an optical splitter/combiner, as discussed below with reference to FIGS. 2B and 2C. Alternatively, the OGW 103-1 may be replaced with a splitter/combiner, such that, in a further example, the system 100 only includes the OGW 103-2 near the secondary nodes 104.

Figure 2B:
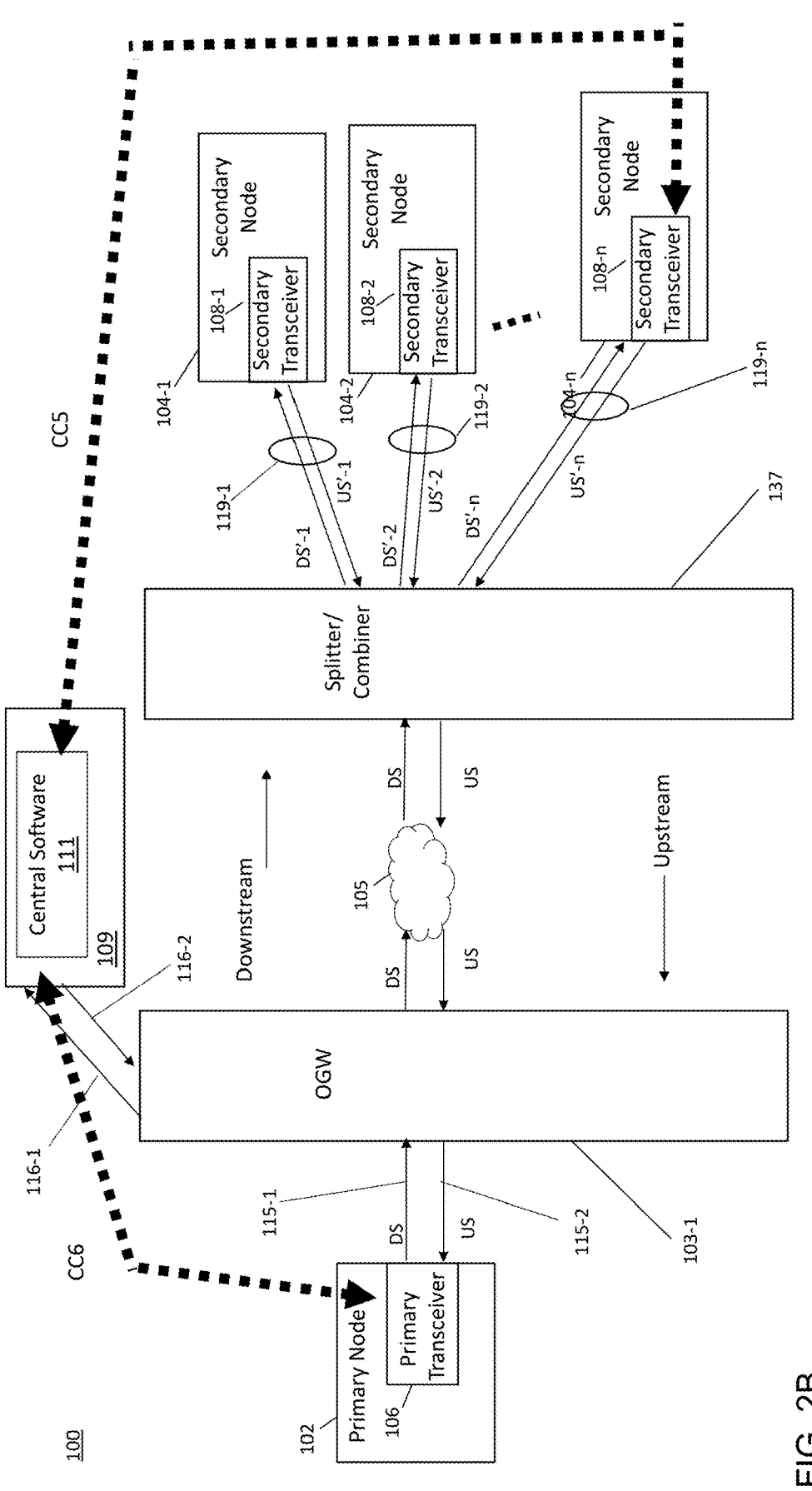

FIG. 2B shows an example of an idealized data path CC5 between the secondary transceiver 108-*n* and the central software 111. As noted above, in some implementations, due to incompatibilities between the transceivers and the host node equipment, the data path CC5 cannot be made directly to the transceiver 108-*n*. Here, the OGW 103-2 is replaced by a splitter/comber 137 (a line system component). Accordingly, data path connections by which control information may be communicated between the transceiver 108-*n*, the central software 111, and the network management system 109 will next be described with reference to FIG. 2C.

Figure 2C:
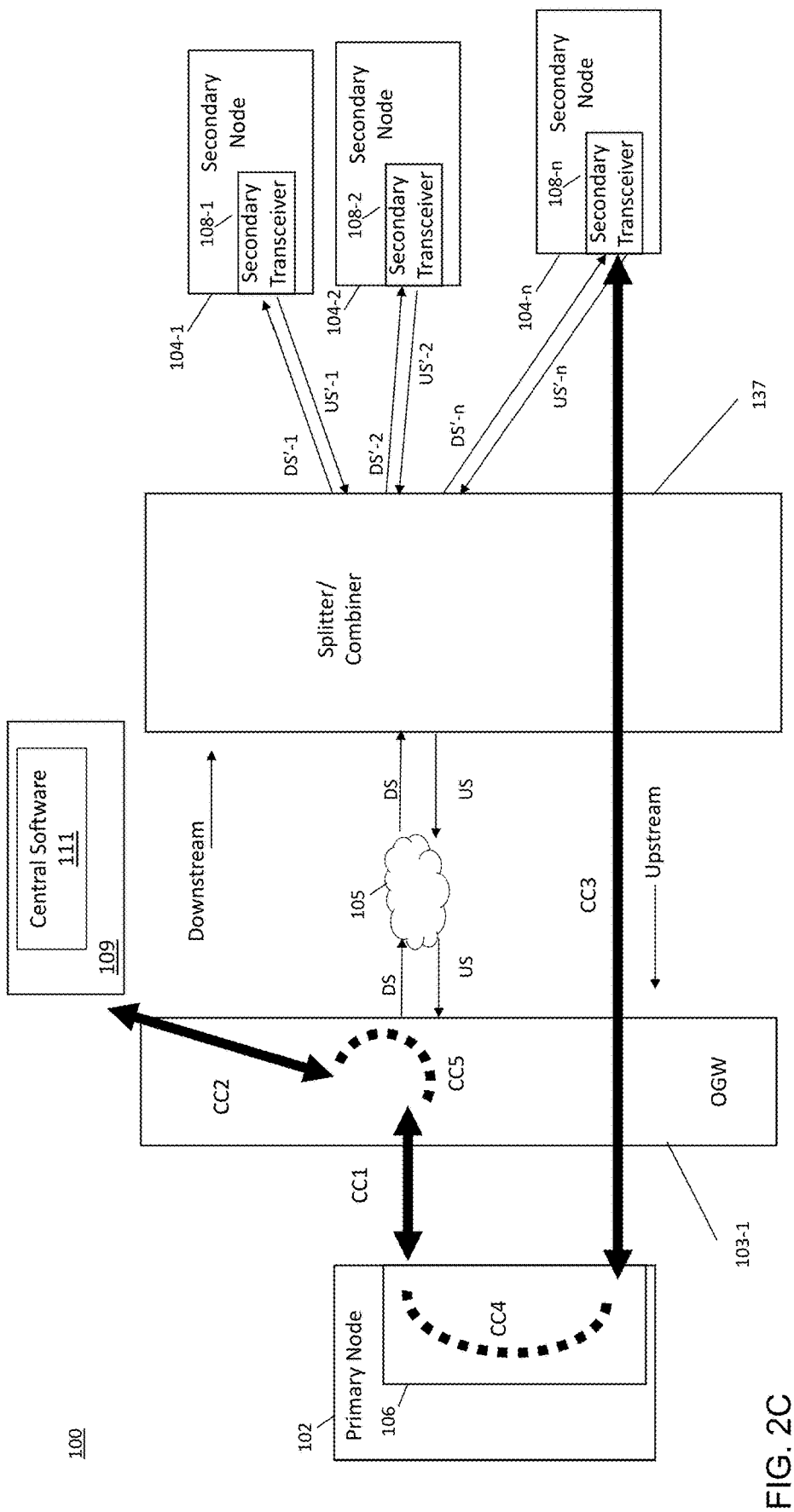

As shown in FIG. 2C, communication of control information between the secondary transceiver 108-*n* and the central software 111 can be made through a data path CC3 (e.g., extending through the OGW 103-1 and the OGW 103-2), a data path CC4 through the transceiver 106, a data path CC1 to the OGW 103-1, a data path CC3 through the OGW 103-1, and a data path CC2 to the central software 111. As a result, communication of control information between the central software 111 and the secondary transceiver 108-*n* may be made independent of the node equipment in the secondary node 104-*n*. Rather, in this example, such communication is made through upstream transmission through the line system components, the transceiver 106, and the downstream transmission to the OGW 103-1, which outputs the control information to the central software 111 and the network management system 109.

Alternatively, in some implementations, the secondary transceiver 108-*n* and the central software 111 can be directly connected with one another by the data path CC5. Accordingly, in those implementations, control information may be communicated between the transceiver 108-*n* and the central software 111 directly (e.g., without being first relayed through the primary transceiver 106 and/or any OGWs). In some implementations, the data path CC5 can be implemented, at least in part, using a VLAN.

Similarly, as shown in FIG. 2B, in some implementations, the primary transceiver 106 and the central software 111 can be directly connected with one another by a data path CC6. Accordingly, in those implementations, control information may be communicated between the primary transceiver 106 and the central software 111 directly (e.g., without being first relayed through any OGWs). In some implementations, the data path CC6 can be implemented, at least in part, using a VLAN.

A first example of a data path implementation will next be described with reference to FIGS. 3-17. In the first example, groups of optical subcarriers (e.g., Nyquist subcarriers) are amplitude modulated to carry control information to/from the transceivers and the line system component (e.g., the optical gateway). Further, in the first example, additional control information is exchanged between the primary transceiver and one or more secondary transceivers by modulating a polarization of an optical signal occupying a relatively narrows spectrum, for example, between two spectrally adjacent optical subcarriers. A second example of a data implementation based on amplitude modulation at different frequencies is further described below with respect to FIGS. 18-20.

II. First Data Path Implementation Example—Communication Between Transceiver And Line System Components Based On Amplitude Modulation In some implementations, a two-way communications channel can be established between the devices of the optical communications network. As an example, a two-way communications channel can be established between two transceivers (e.g., a hub transceiver and an edge transceiver). As another example, a two-way communications channel can be established between a transceiver and an optical gateway.

Figure 3:
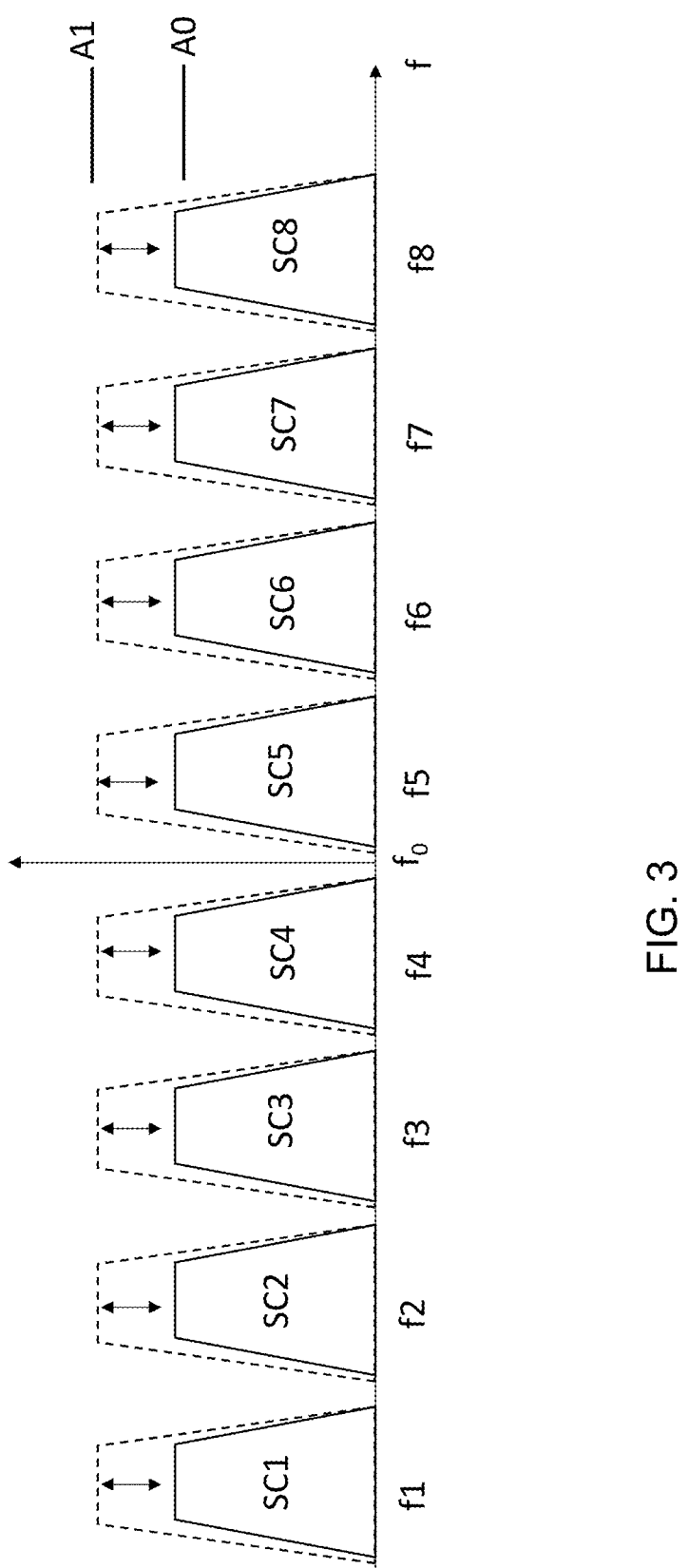
FIG. 3 is a diagram of example subcarriers of a communication channel and an out-of-band communication signal generated using an optical communication system.

As an example, FIG. 3 illustrates a plurality of subcarriers, SC1 to SC8 that may be output by the transmitter of a transceiver. Each of the subcarriers SC1 to SC8 may have a corresponding one of a plurality of frequencies f1 to f8. In addition, each of the subcarriers SC1 to SC8 may be a Nyquist subcarrier. Nyquist subcarriers are a group of optical signals, each carrying data, where (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the Nyquist frequency, as determined by the baud rate of such subcarrier.

As discussed in greater detail below, the optical subcarriers SC1 to SC8 are generated by modulating light output from a laser. The frequency of such laser output light is f0 and is typically a center frequency such that half the subcarrier subcarriers (e.g., f5 to f8) are above f0 and half the subcarrier frequencies (e.g., f1 to f4) are below f0.

As further shown in FIG. 3, the amplitudes of the subcarriers SC1 to SC8 may be collectively amplitude modulated together to vary the amplitude of each subcarrier between a first amplitude A1 and a second lower amplitude A0. When the subcarriers SC1 to SC8 each have an amplitude A1, a '1' bit, for example, is transmitted. On the other hand, when the subcarriers SC1 to SC8 each have an amplitude A0, a '0' bit, for example, is transmitted. In this manner, amplitude modulation is employed to transmit control information from the primary node transceiver 106, for example, to a line system component, as well as from the line system component to the primary node transceiver 106. Communication from a line system component to a secondary node transceiver 108 may be carried out by amplitude modulating an upstream optical signal (including subcarriers) at a line system component in accordance with certain control information followed by transmitting a polarization modulated signal carrying such control information from the primary node transceiver 106 to the secondary node transceiver 108.

Various mechanisms may be employed to amplitude modulate the optical subcarriers SC1 to SC8. Several examples of such mechanisms will next be described. First, however, a description of the operation of a transmitter module 955 provided in the primary transceiver 106 will next be described with reference to FIGS. 4A, 4B, and 5.

Figure 4A:
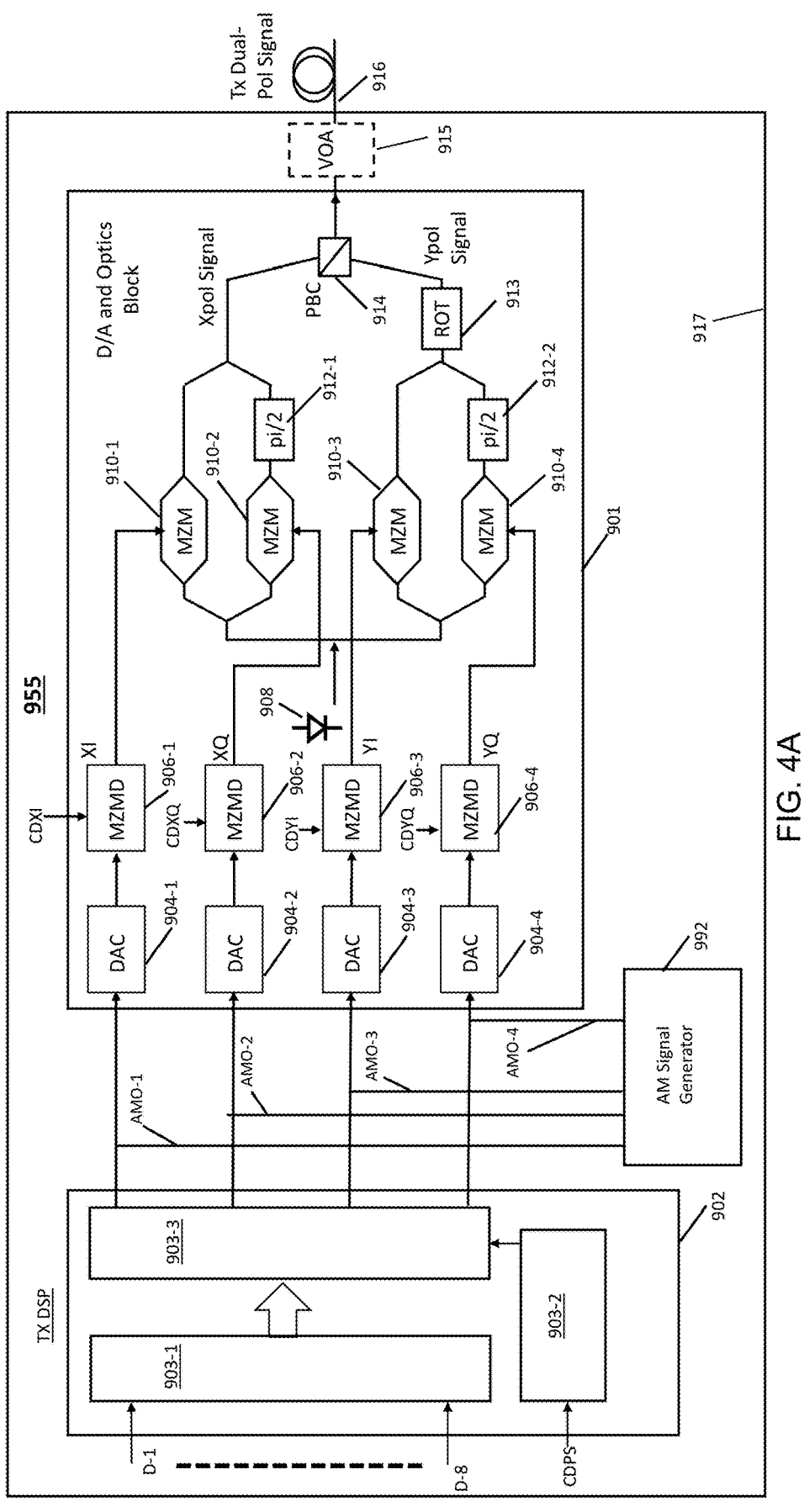
FIG. 4A is a diagram of an example transmitter module of an optical communication system.

FIG. 4A is a diagram of an example transmitter 955 that can be included, for instance, in the primary transceiver 106 as transmitter 202 shown in FIG. 1B. It is understood that transmitters 302 in the secondary transceivers 108 may have a similar configuration as that shown in FIG. 4A. The transmitter 955 includes a digital signal processor 902 including circuit blocks 903-1, 903-2, and 903-3. In this example, the circuit block 903-1 receives first data including one or more of eight data streams D1 to D8, each carrying user data or information. Such data is processed (e.g., as discussed in greater detail with respect to FIG. 5), and the processed data is provided to the circuit block 903-3. Second data, including, for example, control information, CDPS, destined for a downstream transceiver (e.g., the transceivers 108) may be input to the block 903-2, which processes such control information and supplies the control information to the block 903-3. The circuit block 903-3 is discussed in greater detail below with respect to FIGS. 15 and 16.

As further shown in FIG. 4A, the block 903-3 supplies digital signals to digital-to-analog conversion circuits 904-1 to 904-4 of a D/A and Optics block 901.

Each of the DACs 904 is operable to output second electrical signals based on the first electrical signals supplied by the Tx DSP 902. The D/A and optics block 901 also includes modulator driver circuitry 906 ("driver circuits 906") corresponding to each of Mach-Zehnder modulator drivers (MZMDs) 906-1, 906-2, 906-3, and 906-4. Each of the driver circuits 906 is operable to output third electrical signals based on the second electrical signals output by each of the DACs 904.

The D/A and optics block 901 includes optical modulator circuitry 910 ("modulator 910") corresponding to each of the MZMs 910-1, 910-2, 910-3, and 910-4. Each of the modulators 910 is operable to supply or output first and second modulated optical signals based on the third electrical signals. The first modulated optical signal includes multiple optical subcarriers 300 carrying user data and is modulated to include control data to be transmitted between nodes of the system 100, and the second modulated optical signal is, for example, polarization modulated, such as polarization shift-keyed (PolSK), based on the second (control) data. Generation and detection of the second modulated optical signal is described in further detail below with respect to FIG. 10).

Each of the modulators 910-1 to 910-4 of the D/A and optics block 901 may be a Mach-Zehnder modulator (MZM) that modulates the phase and/or amplitude of the light output from a laser 908. As further shown in FIG. 4A, a light beam output from the laser 908 (also included in the block 901) is split such that a first portion of the light is supplied to a first MZM pairing including the MZMs 910-1 and 910-2 and a second portion of the light is supplied to a second MZM pairing including the MZMs 910-3 and 910-4.

The first portion of the light is further split into third and fourth portions, such that the third portion is modulated by the MZM 910-1 to provide an in-phase (I) component of an X (or TE) polarization component of a modulated optical signal, and the fourth portion is modulated by the MZM 910-2 and fed to a phase shifter 912-1 to shift the phase of such light by 90 degrees in order to provide a quadrature (Q) component of the X polarization component of the modulated optical signal.

Similarly, the second portion of the light is further split into fifth and sixth portions, such that the fifth portion is modulated by the MZM 910-3 to provide an I component of a Y (or TM) polarization component of the modulated optical signal, and the sixth portion is modulated by the MZM 910-4 and fed to a phase shifter 912-2 to shift the phase of such light by 90 degrees to provide a Q component of the Y polarization component of the modulated optical signal.

The optical outputs of the MZMs 910-1 and 910-2 are combined to provide an X polarized optical signal including I and Q components and fed to a polarization beam combiner (PBC) 914 provided in the block 901. In addition, the outputs of the MZMs 910-3 and 910-4 are combined to provide an optical signal that is fed to a polarization rotator 913, further provided in the block 901, that rotates the polarization of such optical signal to provide a modulated optical signal having a Y (or TM) polarization. The Y polarized modulated optical signal is also provided to a PBC 914, which combines the X and Y polarized modulated optical signals to provide a polarization multiplexed ("dual-pol") modulated optical signal onto an optical fiber 916. In some examples, the optical fiber 916 may be included as a segment of optical fiber in an example optical communication path of the system 100.

In some implementations, the polarization multiplexed optical signal output from the D/A and optics block 901 includes the subcarriers SC0-SC8 (e.g., of FIG. 3), for example, such that each data subcarrier 300 has X and Y polarization components and I and Q components. Moreover, each data subcarrier SC0 to SC8 may be associated with, or corresponds to, a respective one of the outputs of the switches SW-1 to SW-8 associated with the DSP 902.

Next, several examples of amplitude modulation of the subcarriers SC1 to SC8 (see FIG. 3) will be described. As shown in FIG. 4A, each of the control signals CDXI, CDXQ, CSYI, and CDYQ may be supplied to respective one of the Mach-Zehnder modulation driver circuits 906-1 to 906-4. These control signals are indicative of control data to be communicated with the line system components, and, based on these control signals, the driver circuits 906 may further adjust the analog signals received from the DACs 904 in accordance with such control data, such that the modulators 910 are driven in such a manner as to collectively amplitude modulate the subcarriers SC1 to SC8 to carry the control data.

In another example, a variable optical attenuator (VOA) 915 may be provided to receive an optical signal including the subcarriers SC1 to SC8 output from the polarization beam combiner 914. The VOA 915 may operable to adjust or vary the attenuation of the subcarriers based on a control signal supplied thereto. By varying the attenuation experienced by the optical subcarriers SC1 to SC8, the amplitude or intensity of such subcarriers may be adjusted or controlled, such that the subcarriers SC1 to SC8 are amplitude modulated to carry control information based on the control signal supplied to the VOA 915.

A transmitter 955 (202 in FIG. 1B) may be provided in the module 917, which may also house a receiver portion (204 in FIG. 1B) of the primary transceiver 106. Although the VOA 915 is shown inside the module 917, it is understood that the VOA 915 may be provided outside the module 917 to provide amplitude modulation of the subcarriers SC1 to SC8 external to the module 917.

In another example, amplitude modulation may be achieved by providing an amplitude modulation (AM) signal generator 992 which provides each of outputs AMO-1 to AMO-4 to a respective input of the DACs 904-1 to 904-4. These signals are generated in such a way that the DACs 904 output analog signals that include an amplitude modulation overlaying or superimposed on the data carrying DAC outputs. Based on such DAC outputs, the Mach-Zehnder modulator driver circuits (MZMDs) 906, in turn, output drive signal to the MZMs 910, as noted above. Accordingly, the combined MZM outputs supply optical subcarriers superimposed with an amplitude modulation based on the outputs of the signal generator 992 (see also FIG. 3). Both X and Y polarization components, for example, of each optical subcarrier are subject to such amplitude modulation.

Figure 4B:
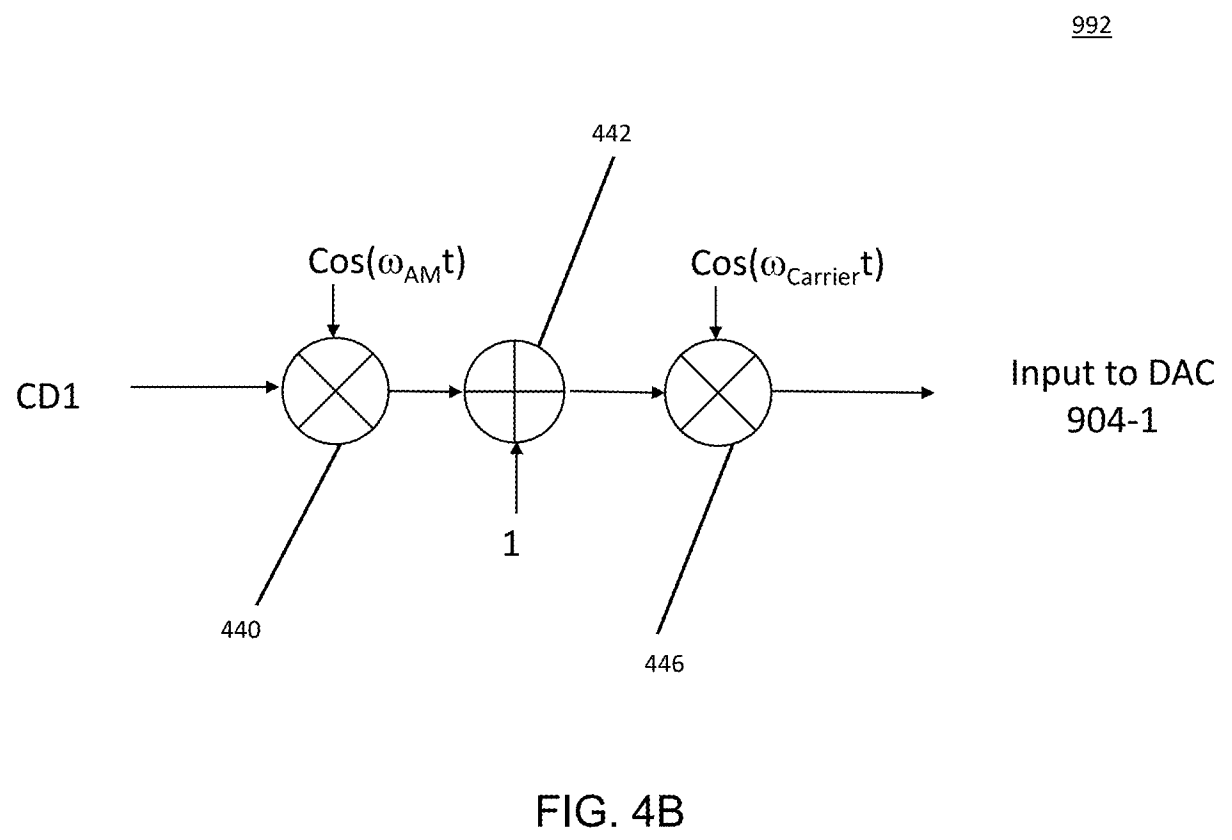

An AM signal generator portion 992 provides an input to the DAC 904-1 and is shown in detail in FIG. 4B. In this example, the AM signal generator portion 992-1 receives control data CD1, which may be multiplied, with a multiplier 440, by a cosine function, $\cos(\omega_{AM}t)$, where $\omega_{AM}$ is indicative of a frequency of the amplitude modulation and t is time. The resulting product is output from the multiplier 440 and provided to an adder circuit 442, which adds the number to the product output from the multiplier 440 to ensure that a positive number is obtained. The output or sum of the adder 442 is next provided to a multiplier circuit 446, which multiplies such sum by another cosine function, $\cos(\omega_{carrier}t)$, where co carrier is a carrier frequency and t is time. In one example, $\omega_{Carrier}$ is equal to zero. In other examples, $\omega_{Carrier}$ is on the order of multiple GHz. The resulting product (AMO-1) is added or combined with a corresponding output of the DSP 902 and input to the DAC 904-1.

It is understood that circuitry similar to that shown in FIG. 4B is also included in the AM signal generator 992 to provide similar signals (AMO-2 to AMO-3) to the inputs of remaining the DACs 904-2 to 904-4. As noted above, based on such inputs, the MZMs 910 (collectively, the MZMs are also considered a modulator), output optical subcarriers that are collectively amplitude modulated, as shown in FIG. 3, to carry control information. The example shown in FIG. 4B may be implemented as an alternative to the other amplitude modulation examples described in connection with FIG. 4A, as well as described below in connection with FIG. 6A.

Figure 5:
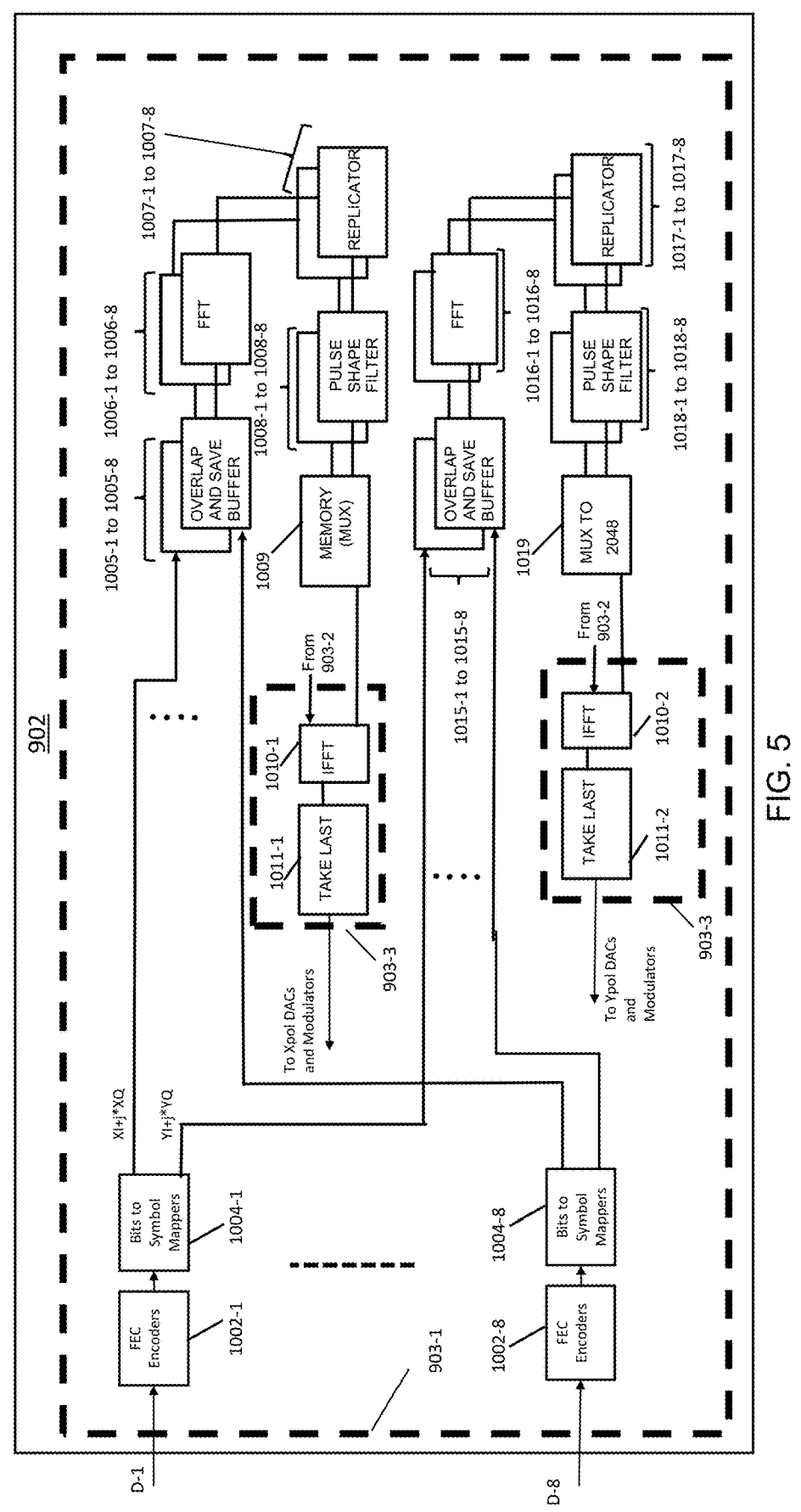
FIG. 5 is a diagram of an example transmitter component of an optical communication system.

FIG. 5 shows the DSP 902, including blocks 903-1 and 903-3, in greater detail. As noted above, the block 903-1 receives user data streams or inputs D1 to D8. A shown in FIG. 5, each such data stream is supplied to a respective one of the forward error correction (FEC) encoders 1002-1 to 1002-8. The FEC encoders 1002-1 to 1002-8 carry out forward error correction coding on a corresponding one of the switch outputs, such as, by adding parity bits to the received data. The FEC encoders 1002-1 to 1002-8 may also provide timing skew between the subcarriers to correct for skew introduced during transmission over one or more optical fibers. In addition, the FEC encoders 1002-1 to 1002-8 may interleave the received data.

Each of the FEC encoders 1002-1 to 1002-8 provides an output to a corresponding one of multiple bits to symbol circuits, 1004-1 to 1004-8 (collectively referred to herein as "1004"). Each of the bits to symbol circuits 1004 may map the encoded bits to symbols on a complex plane. For example, the bits to symbol circuits 1004 may map four bits to a symbol in a dual-polarization Quadrature Phase Shift Keying (QPSK) or and m-quadrature amplitude modulation (m-QAM, m being a positive integer) constellation, such as 8-QAM, 16-QAM, and 64-QAM. Each of the bits to symbol circuits 1004 provides first symbols, having the complex representation XI+j*XQ, associated with a respective one of the data input, such as D0, to a DSP portion 1003. Data indicative of such first symbols may carried by the X polarization component of each subcarrier SC0-SC8.

Each of the bits to symbol circuits 1004 may further provide second symbols having the complex representation YI+j*YQ, also associated with a corresponding one of the data inputs D0 to D8. Data indicative of such second symbols, however, is carried by the Y polarization component of each of the subcarriers SC-1 to SC-8.

As further shown in FIG. 5, each of the first symbols output from each of the bits to symbol circuits 1004 is supplied to a respective one of first overlap and save buffers 1005-1 to 1005-8 (collectively referred to herein as overlap and save buffers 1005) that may buffer 256 symbols, for example. Each of the overlap and save buffers 1005 may receive 128 of the first symbols or another number of such symbols at a time from a corresponding one of bits to symbol circuits 1004. Thus, the overlap and save buffers 1005 may combine 128 new symbols from the bits to symbol circuits 1004, with the previous 128 symbols received from the bits-to-symbol circuits 1004.

Each overlap and save buffer 1005 supplies an output, which is in the time domain, to a corresponding one of the fast Fourier Transform (FFT) circuits 1006-1 to 1006-8 (collectively referred to as "FFTs 1006"). In one example, the output includes 256 symbols or another number of symbols. Each of the FFTs 1006 converts the received symbols to the frequency domain using or based on, for example, a fast Fourier transform. Each of the FFTs 1006 may include 256, for example, memories or registers, also referred to as frequency bins or points, that store frequency components associated with the input symbols. Each of the replicator components 1007-1 to 1007-8 may replicate the 256 frequency components associated with of the FFTs 1006 and store such components in 512 or another number of frequency bins (e.g., for T/2 based filtering of the subcarrier) in a respective one of the plurality of replicator components. Such replication may increase the sample rate. In addition, replicator components or circuits 1007-1 to 1007-8 may arrange or align the contents of the frequency bins to fall within the bandwidths associated with pulse shaped filter circuits 1008-1 to 1008-8 described below.

Each of the pulse shape filter circuits 1008-1 to 1008-8 may apply a pulse shaping filter to the data stored in the 512 frequency bins of a respective one of the plurality of replicator components 1007-1 to 1007-8 to thereby provide a respective one of multiple filtered outputs, which are multiplexed and subject to an inverse FFT, as described below. The pulse shape filter circuits 1008-1 to 1008-8 calculate the transitions between the symbols and the desired subcarrier spectrum so that the subcarriers can be spectrally packed together for transmission (e.g., with a close frequency separation). The pulse shape filter circuits 1008-1 to 1008-8 may also be used to introduce timing skew between the subcarriers to correct for timing skew induced by links between nodes shown in FIG. 1, for example. A memory component 1009, which may include a multiplexer circuit or memory, may receive the filtered outputs from the pulse shape filter circuits 1008-1 to 1008-8, and multiplex or combine such outputs together to form an element vector.

The output of the memory 1009 is fed to the block 903-3, which includes, in this example, an IFFT circuit or component 1010-1. The IFFT circuit 1010-1 may receive the element vector and provide a corresponding time domain signal or data based on an inverse fast Fourier transform (IFFT). In one example, the time domain signal may have a rate of 64 G Sample/s. A take last buffer or memory circuit 1011-1 may select the last 1024 or another number of samples from an output of the IFFT component or circuit 1010-1 and supply the samples to the DACs 904-1 and 904-2 at 64 G Sample/s, for example. As noted above, the DAC 904-1 is associated with the in-phase (I) component of the X pol signal and DAC 904-2 is associated with the quadrature (Q) component of the Y pol signal. Accordingly, consistent with the complex representation XI+j XQ, the DAC 904-1 receives values associated with XI and the DAC 904-2 receives values associated with jXQ. Based on these inputs, the DACs 904-1 and 904-2 provide analog outputs to the MZMD 906-1 and the MZMD 906-2, respectively, as discussed above.

As further shown in FIG. 5, each of the bits to symbol circuits 1004-1 to 1004-8 outputs a corresponding one of symbols indicative of data carried by the Y polarization component of the polarization multiplexed modulated optical signal output on the optical communication path or fiber 916. As further noted above, these symbols may have the complex representation YI+j*YQ. Each such symbol may be processed by a respective one of the overlap and save buffers 1015-1 to 1015-8, a respective one of the FFT circuits 1016-1 to 1016-8, a respective one of the replicator components or circuits 1017-1 to 1017-8, the pulse shape filter circuits 1018-1 to 1018-8, and the multiplexer or memory 1019 of block the 903-1. Moreover, the output of the multiplexer or memory 1019 may be fed to the block 903-3, which further includes a IFFT 1010-2, and a take last buffer or memory circuit 1011-2, to provide processed symbols having the representation YI+j*YQ in a manner similar to or the same as that discussed above in generating processed symbols XI+j*XQ output from the take last circuit 1011-1. In addition, symbol components YI and YQ are provided to the DACs 904-3 and 904-4, respectively. Based on these inputs, the DACs 904-3 and 904-4 provide analog outputs to the MZMD 906-3 and the MZMD 906-4, respectively, as discussed above.

In one example, described in greater detail below, block 903-3 also receives outputs from block 903-2 as noted above and discussed in greater detail below with respect to FIG. 13. Block 903-2 may be optionally provided to provided transmission of control signals by way of an additional subcarrier which, in a further example, is polarization multiplexed. In the current example, however, when amplitude modulation is employed, such transmission may be omitted or provided in addition to the amplitude modulation described herein.

While FIG. 5 shows the Tx DSP 902 as including a particular quantity and arrangement of functional components, in some implementations, the DSP 902 may include additional functional components, fewer functional components, different functional components, or differently arranged functional components. In addition, typically the number of overlap and save buffers, FFTs, replicator circuits, and pulse shape filters associated with the X component may be equal to the number of data inputs, and the number of such circuits associated with the Y component may also be equal to the number of switch outputs. However, in other examples, the number of data inputs may be different than the number of these circuits. As noted above, based on the outputs of the MZMDs 906-1 to 906-4, multiple optical subcarriers SC0 to SC8 may be output onto the optical fiber 916.

Figure 8:
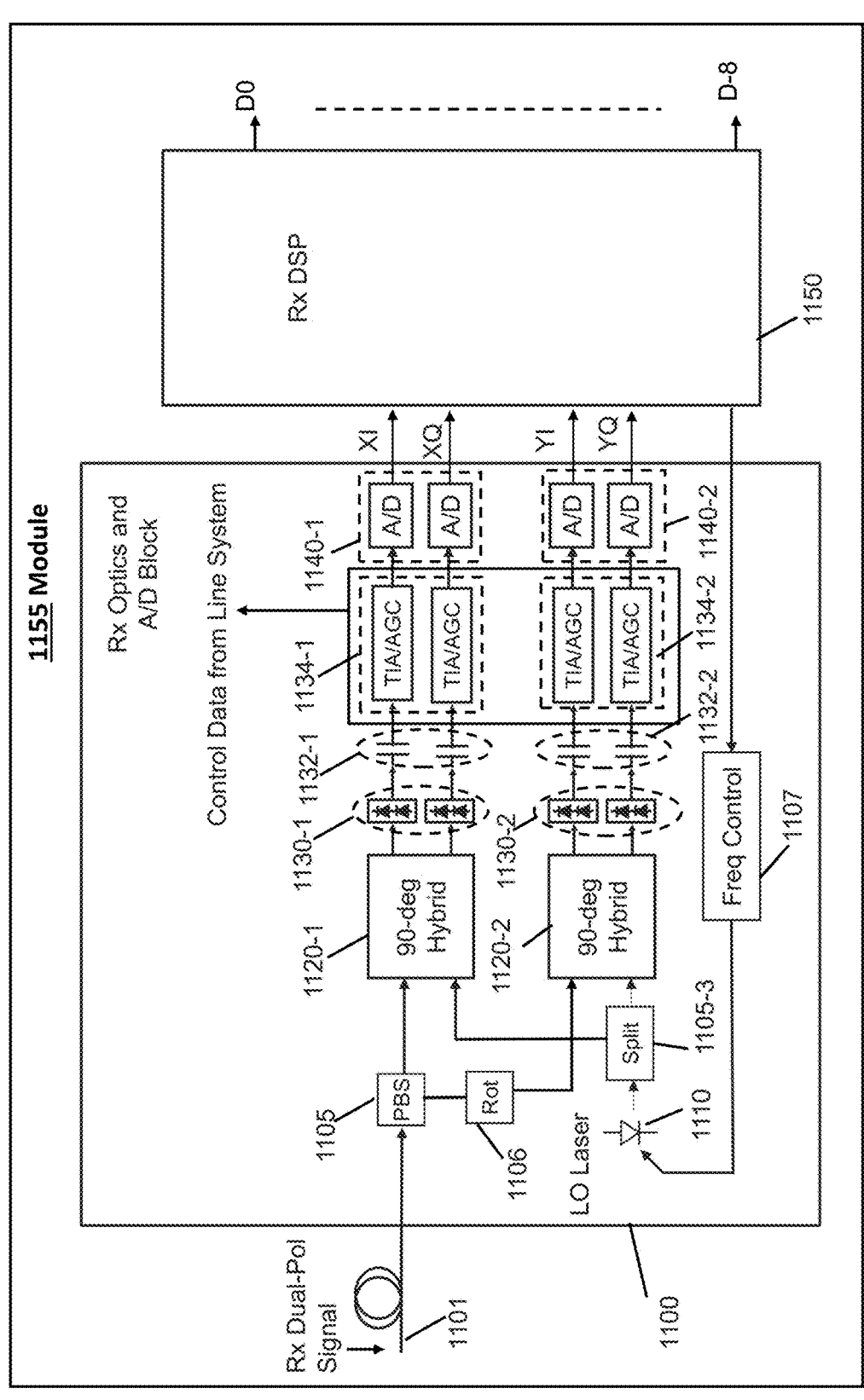
FIG. 8 is a diagram of example components of a receiver module of an optical communication system.

A further example of circuitry that may be employed to allow the amplitude modulation subcarriers SC1 to SC8 to carry control information will next be described with reference to FIG. 6A. Here, a plurality of multiplier circuits 1020-1 to 1020-8, which may be complex multiplier circuits, are provided within the DSP 902, to receive a respective one of outputs O1 to O8 from a corresponding one of the pulse shape filters 1018-1 to 1018-8. Each of the multiplier circuits 1020-1 to 1020-8 receives a corresponding one of gain parameters G1 to G8, such that, in this example, each of the outputs O1 to O8 is multiplied by a corresponding one of the gain parameters G1 to G8. Each output O1 to O8 is associated with a respective one of the subcarriers SC1 to SC8. Moreover, each is associated with a gain or amplitude of a respective one of the subcarriers. That is, the amplitude of each of the optical subcarriers SC1 to SC8 output from the optical modulators 910 may be based on the gain parameters G1 to G8. Thus, by varying the gain parameters G1 to G8, the amplitude of the optical subcarriers SC1 to SC8 may also be varied or modulated. The gain parameters G1 to G8, may therefore be adjusted or controlled to amplitude modulate the subcarriers SC1 to SC8, as shown in FIG. 8, to carry control information to the line system components.

In some implementations, the gain of each multiplier 1020 is software programmable (or may be implemented in firmware) along with a frequency shaping function in a filter 1018 preceding the multiplexing performed by the multiplexer or memory 1019.

Figure 6A:
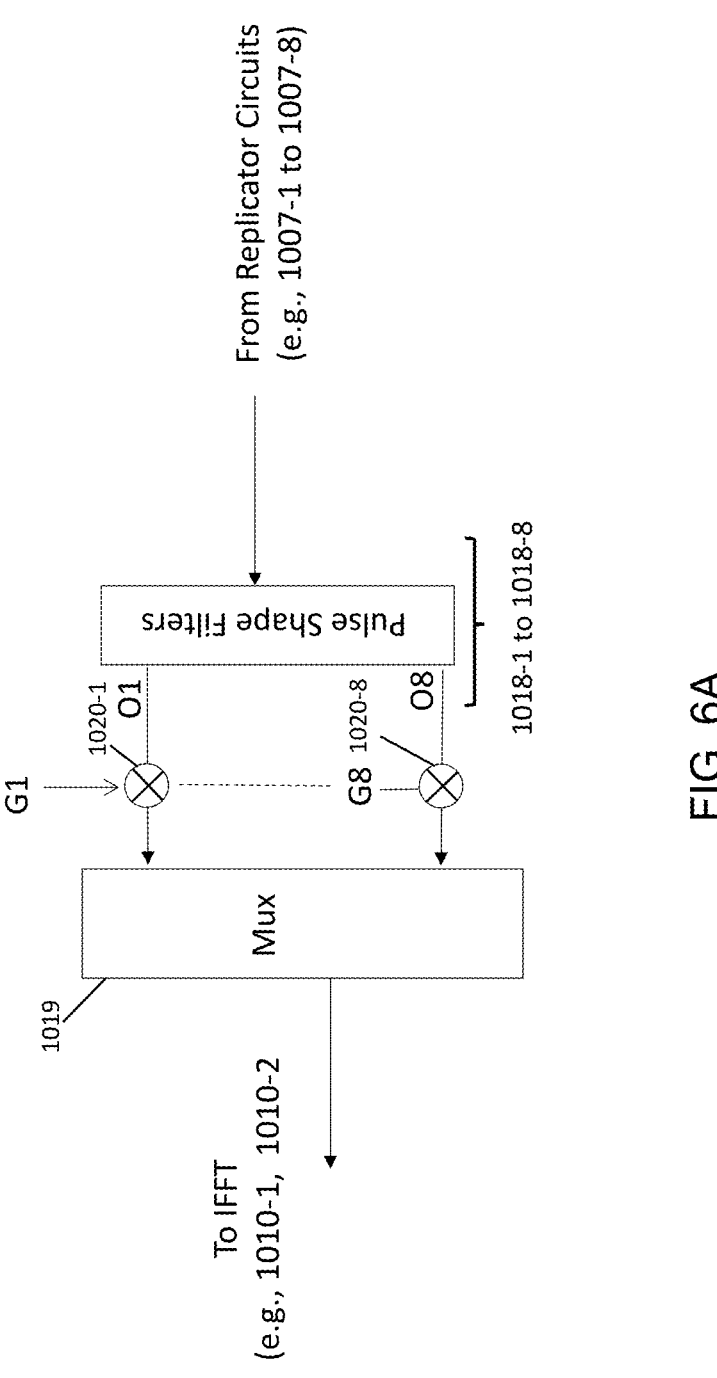
FIG. 6A is a diagram of example devices for adjusting the gain of a signal generating using an example transmitter component.

Preferably, in the example shown in FIG. 6A, the gain parameter changes or variations are synchronized to occur at the same time or substantially the same time so that the amplitudes of the subcarriers SC1 to SC8 vary at the same time or substantially the same time. Moreover, the above-described multiplier circuits 1020 may be included in the DSP 902 to provide amplitude modulation of the Y polarization component of each of the subcarriers SC1 to SC8. It is understood that similar multiplier circuits may be provided between the pulse shape filters 1008 and the memory 1009 to provide corresponding amplitude modulation of the X polarization component of each subcarrier SC1 to SC8.

As discussed in greater detail below, optical subcarriers may be selectively output by transceivers 106 and/or 108.

Control signals may be provided to such transceivers, as described herein, and control information or data associated with or carried by such data, in one example, includes messages or instructions indicating the number of optical subcarriers to be output by each transceiver. The number of optical subcarriers that may be output, however, can vary over time in accordance with bandwidth of data capacity requirements of the transceiver. For example, if at one point in time, network bandwidth requirements are such that transceivers 108-1 transmits 200 Gbit/s to primary node transceiver 106, and, each subcarrier carries data associated with 100 Gbit/s transmission, transceiver 108-1 outputs two optical subcarriers (2 subcarriers X 100 Gbit/s).

As noted above, however, bandwidth requirements are often not static. Accordingly, in the current example, at another point in time, the network capacity requirements may be such that transceiver 108-1 transmits 100 Gbit/s to primary node transceiver 106. Control information, as noted above, is therefore, provided to transceiver 108-1 including instructions for transmitting one optical subcarrier, instead of two. As a result, transceiver 108-1, turns off or cancels on of the subcarriers that previously had been transmitted. On the other hand, if, for example, additional bandwidth or capacity is required to be output from transceiver 108-1, further instructions may be provided to increase the number of optical subcarriers output from transceiver 108-1. In a similar manner control information may be provided to increase or decrease, as required, the number of optical subcarriers output from each of transceiver 108. Similarly, instructions may be provided to primary node transceiver 106 to increase or decrease the number of optical subcarriers output therefrom.

Figure 6B:
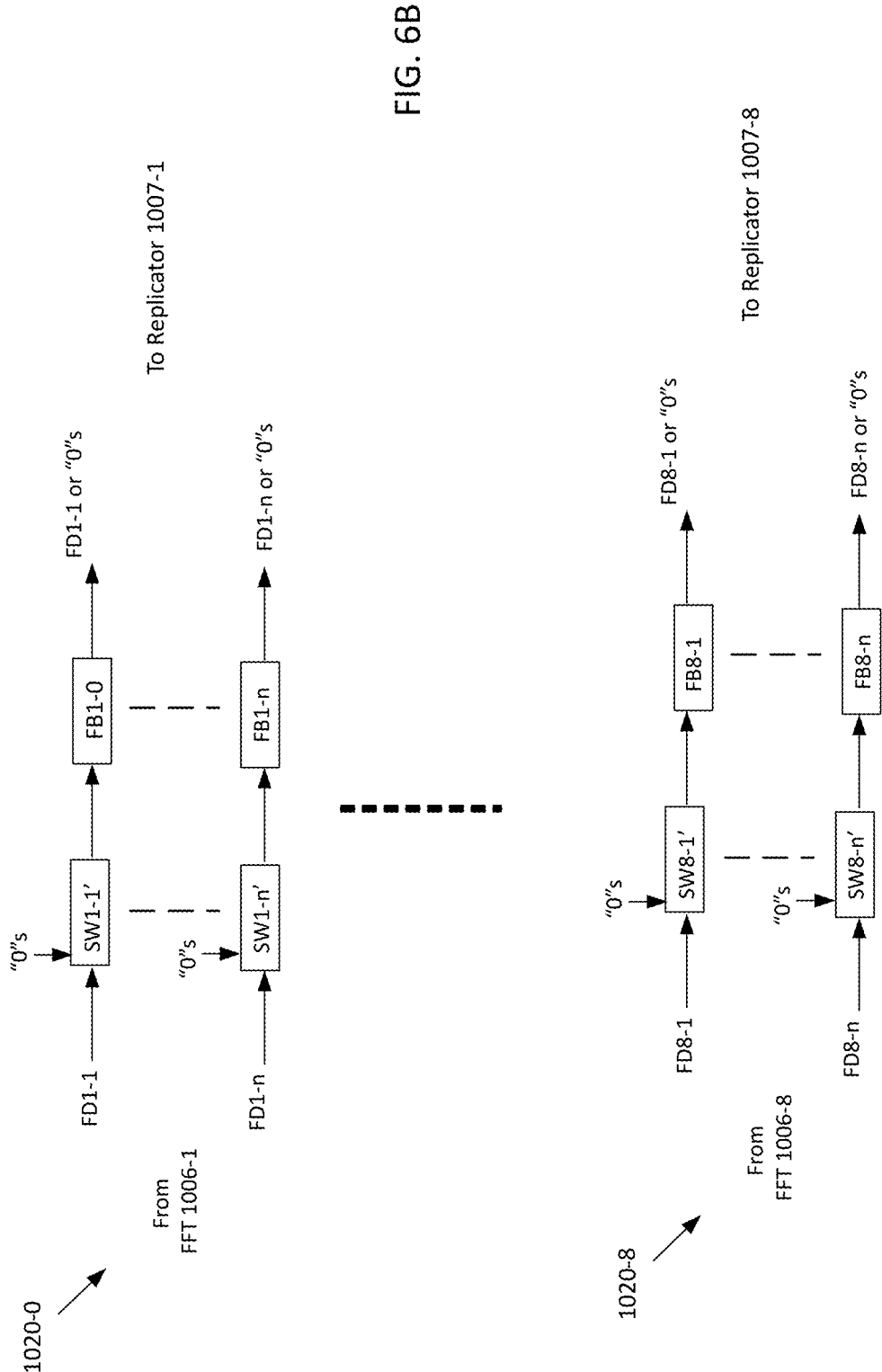
FIG. 6B illustrates a portion of a primary node transmitter DSP in greater detail consistent with an aspect of the present disclosure.
Figure 6C:
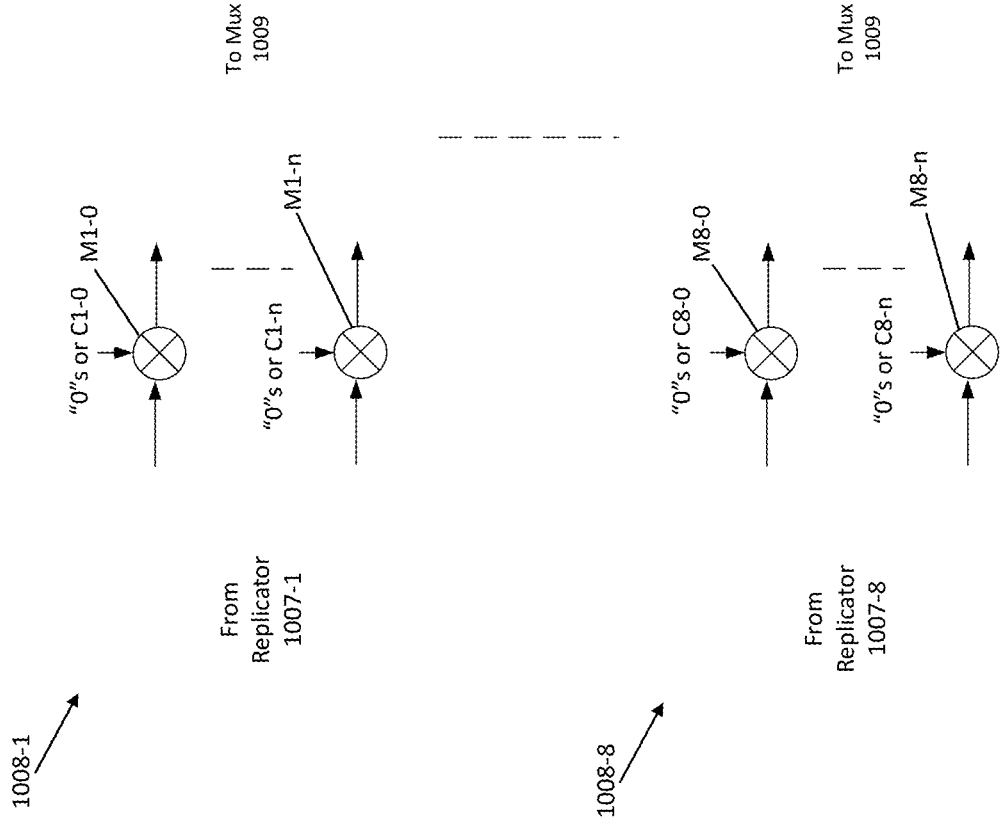
FIG. 6C illustrates a portion of a primary node transmitter DSP in greater detail consistent with another aspect of the present disclosure.

Example circuitry for adding optical subcarriers or reducing the number of optical carriers output from transceivers 106 and 108 will next be described with reference to FIGS. 6B and 6C.

As noted above, FFTs 1006 and 1016 include a plurality of bins, also referred to frequency bins, which, in one example, are memories or registers storing frequency components generated by the FFTs. Selected frequency bins FB are shown in FIG. 6B. Groups of such frequency bins FB are associated with given optical subcarriers. Accordingly, for example, a first group of frequency bins, FB1-0 to FB1-$n$, is associated with optical subcarrier SC1 and a second group of frequency bins FB8-0 to FB8-$n$ with SC8 (where n is a positive integer). As further shown in FIG. 10*b*, each of frequency bins FB is further coupled to a respective one of switches SW. For example, each of frequency bins FB1-0 to FB1-$n$ is coupled to a respective one of switches SW1-0 to SW1-$n$, and each of FB8-0 to FB8-$n$ is coupled to a respective one of switches or switch circuits SW8-0 to SW8-$n$.

Each switch SW selectively supplies either frequency domain data output from one of FFT circuits 1006-1 to 1006-8 or a predetermined value, such as 0. In order to block or eliminate transmission of a particular subcarrier, the switches SW associated with the group of frequency bins FB associated with that subcarrier are configured to supply the zero value to corresponding frequency bins. Accordingly, for example, in order to block subcarrier SC1, switches SW1-0' to SW1-$n'$ supply zero (0) values to a respective one of frequency bins FB1-0 to FB1-$n$. Further processing, as described below, of the zero (0) values by replicator components 1007 as well as other components and circuits in DSP 902 result in drive signals supplied to modulators 910, such that subcarrier SC1 is omitted from the optical output from the modulators. As a result, optical subcarriers may be removed or cancelled so that the number of optical subcarriers is reduced.

On the other hand, switches SW' may be configured to supply the outputs of FFTs 1006, i.e., frequency domain data FD, to corresponding frequency bins FB. Further processing of the contents of frequency bins FB by replicator components 1007 and other circuits in DSP 902 result in drive signals supplied to modulators 910, whereby, based on such drive signals, optical subcarriers are generated that correspond to the frequency bin groupings associated with that subcarrier. In this way, optical subcarriers may be added, so that the number of optical subcarriers may be increased.

In the example discussed above, switches SW1-0' to SW1-$n$' supply frequency domain data FD1-0 to FD1-$n$ from FFT 1006-1 to a respective one of switches SW1-0' to SW1-$n$.' These switches, in turn, supply the frequency domain data to a respective one of frequency bins FB1-0 to FB1-$n$ for further processing, as described in greater detail above.

In a further example, a corresponding one of pulse shape filters 1008-1 to 1008-8 may selectively generate zeroes or predetermined values that, when further processed, also cause one or more subcarriers SC to be omitted from the output of either primary node transmitter 202 or secondary node transmitter 304. In particular, as shown in FIG. 10*c*, pulse shape filters 1008-1 to 1008-8 are shown as including groups of multiplier circuits M1-0 to M1-$n$ M8-1 to M8-$n$ (also individually or collectively referred to as M). In one example, each multiplier circuit M constitutes part of a corresponding butterfly filter. In addition, in another example, each multiplier circuit grouping is associated with a corresponding one of subcarriers SC.

Each multiplier circuit M receives a corresponding one of output groupings RD1-0 to RD1-$n$ RD8-0 to RD8-$n$ from replicator components 1007. In order to remove or eliminate one of subcarriers SC, multiplier circuits M receiving the outputs within a particular grouping associated with that subcarrier multiply such outputs by zero (0), such that each multiplier M within that group generates a product equal to zero (0). The zero products then are subject to further processing similar to that described above to provide drive signals to modulators 910 that result in a corresponding subcarrier SC being omitted from the output of the transmitter (either transmitter 202 or 304).

On the other hand, in order to provide or add a subcarrier SC, each of the multiplier circuits M within a particular groping may multiply a corresponding one of replicator outputs RD by a respective one of coefficients C1-0 to C1-$n$ . . . C8-0 to C8-$n$, which results in at least some non-zero products being output. Based on the products output from the corresponding multiplier grouping, drive signals are provided to modulators 910 to output the desired subcarrier SC from the transmitter (either transmitter 202 or 304).

Accordingly, for example, in order to block or eliminate subcarrier SC1, each of multiplier circuits M1-0 to M1-$n$ (associated with subcarrier SC1) multiplies a respective one of replicator outputs RD1-0 to RD1-$n$ by zero (0). Each such multiplier circuit, therefore, provides a product equal to zero, which is further processed, as noted above, such that resulting drive signals cause modulators 910 to provide an optical output without SC1. In order to reinstate SC1, multiplier circuits M1-0 to M1-$n$ multiply a corresponding one of appropriate coefficients C1-0 to C1-$n$ by a respective one of replicator outputs RD1-0 to RD1-$n$ to provide products, at least some of which are non-zero. Based on these products, as noted above, modulator drive signals are generated that result in subcarrier SC1 being output. Other subcarriers may be added or removed at each secondary node and the primary node in a similar manner as that described above.

The above examples are described in connection with generating or removing the X component of a subcarrier SC. The processes and circuitry described above is employed or included in DSP 902 and optical circuitry used to generate the Y component of the subcarrier to be blocked. For example, switches and bins circuit blocks 1022-1 to 1022-8, have a similar structure and operate in a similar manner as switches and bins circuit blocks 1021 described above to provide zeroes or frequency domain data as the case may be to selectively block the Y component of one or more subcarriers SC. Alternatively, multiplier circuits, like those described above in connection with FIG. 10*c* may be provided to supply zero products output from selected pulse shape filters 1018 in order to block the Y component of a particular subcarrier or, if non-zero coefficients are provided to the multiplier circuits instead, generate the subcarrier.

Thus, the above examples illustrate mechanisms by which subcarriers SC may be selectively blocked from or added to the output of transmitter 202. Since, as discussed below, DSPs and optical circuitry provided in secondary node transmitters 304 are similar to that of primary node transmitter 202, the processes and circuitry described above is provided, for example, in the secondary node transmitters 304 to selectively add and remove subcarriers SC' from the outputs of the secondary node transmitters, as described in connection with FIGS. 13*b*-13*k*. Moreover, consistent with the present disclosure, the circuitry described above in connection with FIGS. 10*b* and/or 10*c* may be configured so that a first number of optical subcarriers are output from the transmitter (in either the primary node transceiver 106 or the secondary node transceivers 108) during a first period of time based on initial capacity requirements. Later, during a second period of time, a second number of optical subcarriers can be output from the hub and/or leaf transmitters based on capacity requirements different than the first capacity requirements.

In a further example, control circuit 1161 (discussed below in connection with FIGS. 9A and 9B) may provide signals, based on instructions associated with the AM modulated signals noted above, to control switches SW' to supply either zeros or frequency domain data, as noted above. Alternatively, control circuit 1161 may provide, based on alternative instructions associated with the AM modulated signals, either the coefficients or zeros noted above for adding or removing optical subcarriers. Thus, in one example, the control information or data received by control circuit 1161 may be indicative of the number of optical subcarriers to be output from a transceiver housing or including control circuit 1161.

Reception and transmission of control information at a line system component, such as the optical gateway (OGW) 103-1 will next be described with reference to FIG. 7. As noted above, the techniques described herein are used to provide communications between a hub or primary node 102 using amplitude modulation (AM) of the subcarriers SC1 to SC8.

Figure 7:
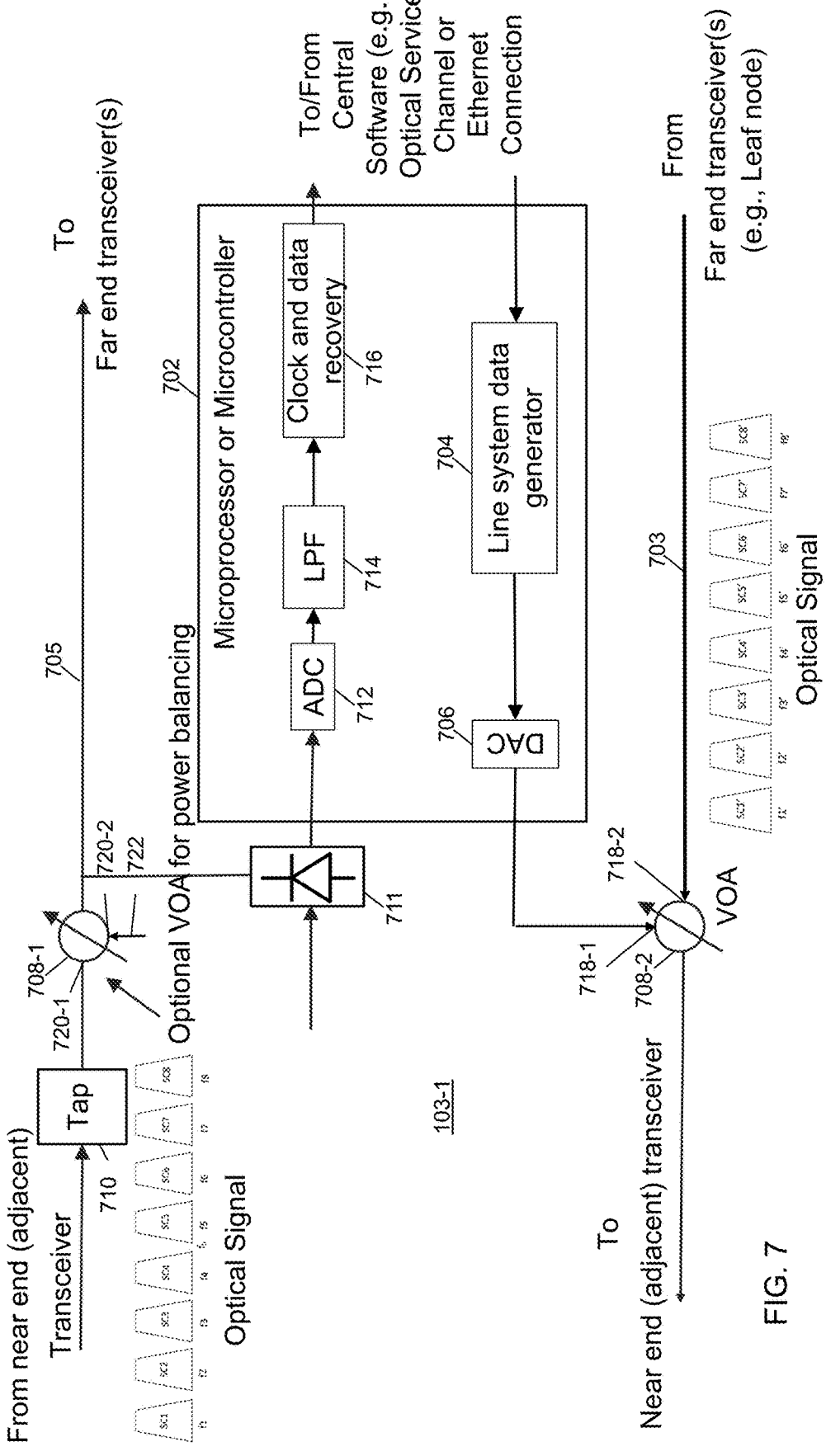
FIG. 7 is a diagram of example devices of an example line system component in an optical communication system.

As shown in FIG. 7, the OGW 103-1 generally includes a microprocessor or DSP 702, a line system data generator 704, a digital-to-analog conversion circuit 706 ("DAC 706"), and one or more variable optical attenuators (VOAs) 708-1, 708-2. In some implementations, one or more of the components of the OGW 103-1 can be placed at various locations along an optical communication path between an example primary or hub node 102 and an example secondary or edge node 104 of the system 100. For example, one or more of the components of the OGW 103-1 can be placed adjacent to a splitter/combiner or in between two distinct splitters that are each intermediate a primary node 102 and a secondary node 104. The OGW 103-1 may also be provided adjacent an optical amplifier.

Transmission of control information from the OGW 103-1 to either transceiver 106 or one of the transceivers 108 will next be described. Control information is provided based on the status of the line system component or other information associated with the line system component. Such information may include operations, administration, maintenance, and provisioning (OAM&P) information, such as, if the line system component is adjacent an optical amplifier, the gain of the amplifier or which optical signals (by wavelength) are input to the amplifier. Alternatively, the control information may include an indication of which optical signals and subcarriers are input to/output from specified ports of a WSS. Such information may be supplied to circuitry in the microprocessor or microcontroller 702 referred to as a line system data generator 704, which control data that is to be transmitted to a near end transceiver, for example. The line system generator may provide the control data based on measured parameters associated with the optical communication path or fiber links 705 and/or 703, for example. Alternatively, control information may be supplied to the line system generator 704 by the central software 111. In a further example, control information may be supplied directly from the central software to the DAC 706. In any event, the OGW 103-1 typically transmits control information to the transceiver closest to it, namely the primary transceiver 106. The OGW 103-2, having a similar construction as the OGW 103-1, transmits control information to one or more of the transceivers 108, which are closest to the OGW 103-2.

The line system data generator 704 may supply the control information as a digital or binary electrical signal to a digital-to-analog conversion circuit 706, which converts the received signal to an analog signal indicative of the control information to be transmitted. The analog signal is then provided to a variable optical attenuator (VOA) 708-2, for example via an optical input port 718-1 (e.g., an interface for receiving optical signals). The VOA 706-2 may also receive an optical signal including a plurality of the subcarriers SC1' to SC8', each having a corresponding one of the frequencies f1' to f8', for example via an optical input port 718-2. In this example, the subcarriers SC1' to SC8' are transmitted from one or more of the secondary transceivers 108 on an optical fiber or optical communication path 703. Based on the analog signal received via the input port 718-1, the VOA 708-2 collectively adjusts the attenuation, and thus the amplitude or intensity, of subcarriers SC1' to SC8' based on the control information. As a result, the subcarriers SC1' to SC8' are amplitude modulated to carry such control information to a receiver in either the primary transceiver 106 or a receiver in one or more of the secondary transceivers 108.

Detection of an optical signal including amplitude modulated subcarriers transmitted on an optical communication path 705 from a near end transceiver, such as the subcarriers SC1 to SC8 transmitted from primary node transceiver 106, will next be described. The optical signal is input to an optical tap 710, which may provide an optical power split portion of the optical signal (e.g., 1% to 10%) to a photodiode circuit 711. A remaining portion of the optical signal continues to propagate along optical communication path

705. A VOA 708-1 may optionally be provided for power balancing. For example, the VOA 708-1 can receive the signal output by the optical tap 710 via an optical input port 720-1, and attenuate the signal according to an analog signal 722 received via the optical input port 720-2 (e.g., control information received from on more sources).

As further shown in FIG. 7, the tapped portion of the optical signal is converted by the photodiode circuit 711 to a corresponding analog electrical signal (e.g., a voltage or a current). The analog signal is fed to an analog-to-digital conversion circuit 712, which supplies digital signals based on the received analog signal. Such digital signals are optionally provided to a bandpass pass filter 714 and then output to a conventional clock and data recovery circuitry 716, which outputs the control information to the central software 111, for example by way of an optical signal (e.g., an optical service channel (OSC)), or by way of an electrical signal (e.g., an Ethernet signal).

A parameter associated with line system component may be adjusted or controlled based on the received control information. For example, if the line system component includes an optical amplifier, such as an erbium doped fiber amplifier, the control information may include instructions or other data for adjusting a gain of the optical amplifier. Alternatively, or in addition, the control information may include information for adjusting an attenuation of the VOA 708-1.

Detection of amplitude modulated subcarriers output from the OGW 103-1 will next be described with reference to FIGS. 8 and 9A, which show an optical receiver that may be provided in the primary transceiver 106 as receiver 204 in FIG. 1B or one or more of the secondary transceivers 108 as receiver 304. It is understood that the structure and operation of the OGW 103-2 is similar to that of the OGW 103-1. The module 1155 is included as a receiver in the transceiver 106, for example. It is understood that the transmitter and receiver provided in the secondary transceivers 108 may have a similar structure and operate in a similar manner as the transmitter and receiver provided in the primary transceiver 106. That is, such transmitters in both the primary and the second transceivers may have structure similar to or the same as the transmitter 955 and the receiver module 1155, respectively.

Referring now to FIG. 8, the optical receiver 1100 of the receiver module 1155 may include a receiver (Rx) optics and A/D block 1100, which, in conjunction with a Rx DSP 1150, may carry out coherent detection. The block 1100 may include a polarization splitter 1105 with first and second outputs, a local oscillator (LO) laser 1110, such as a semiconductor laser, 90 degree optical hybrids or mixers 1120-1 and 1120-2 (referred to generally as hybrid mixers 1120 and individually as hybrid mixer 1120), detectors 1130-1 and 1130-2 (referred to generally as detectors 1130 and individually as detector 1130, each including either a single photodiode or balanced photodiode), and AC coupling capacitors 1132-1 and 1132-2. A frequency control circuit 1107 may be provided to adjust or control a frequency of light output form LO laser 1110, as well as shared laser 908 described below (FIG. 9C), based on signal output from DSP 1150. In one example, frequency control circuit 1107 may include a heater provided adjacent laser 1110 or 908, the temperature of which, as well as the laser, being controlled based on an output from DSP 1150. In another example, frequency control circuit 1107 may include a circuitry that controls the amount of current supplied to the laser. The frequency of light output from laser 1110 or 908 is typically a function of the temperature of the laser as well as the current supplied to the laser. Thus, by controlling the temperature and/or the current supplied to the laser, the frequency of the light output from laser 1110 may also be adjusted. In a further example, circuit 1161, described below may provide signals for controlling the frequency of laser 1110 or laser 908.

In one example, one laser may be provided that is "shared" between the transmitter and receiver portions in the transceivers 106 and/or the transceivers 108. For example, a splitter 999 can provide a first portion of light output from the laser 908 to the MZMs 910 in the transmitter portion of the transceiver. Further, the splitter 999 can provide a second portion of such light acting as a local oscillator signal fed to 90 degree optical hybrids 1120 in the receiver portion of the transceiver, as shown in FIG. 9C. In this example, the laser 1110 may be omitted.

The block 1100 also includes trans-impedance amplifiers/ automatic gain control circuits 1134 ("TIA/AGC 1134") corresponding to the TIA/AGC 1134-1 and 1134-2, analog- to-digital conversion circuitry 1140 ("ADC 1140") corre- sponding to the ADCs 1140-1 and 1140-2, and an Rx DSP 1150. The ADCs 1140-1 and 1140-2 may be referred to generally as the ADCs 1140 and individually as the ADC 1140.

The polarization beam splitter (PBS) 1105 may include a polarization splitter that receives an input polarization mul- tiplexed optical signal including the optical subcarriers SC0 to SC8 supplied by an optical fiber link 1101, which may be, for example, an optical fiber segment as part of one of optical communication paths of the system 100. The PBS 1105 may split the incoming optical signal into the two X and Y orthogonal polarization components. The Y compo- nent may be supplied to a polarization rotator 1106 that rotates the polarization of the Y component to have the X polarization. Hybrid mixers 1120 may combine the X and rotated Y polarization components with light from a local oscillator laser 1110. For example, the hybrid mixer 1120-1 may combine a first polarization signal (e.g., the component of the incoming optical signal having a first or X (TE) polarization output from a first port of the PBS 1105) with light from the local oscillator laser 1110, and the hybrid mixer 1120-2 may combine the rotated polarization signal (e.g., the component of the incoming optical signal having a second or Y (TM) polarization output from a second port of the PBS 1105) with the light from the local oscillator laser 1110.

The detectors 1130 may detect mixing products output from the optical hybrids, to form corresponding voltage signals, which are subject to AC coupling by the capacitors 1132-1 and 1132-2, as well as amplification and gain control by the TIA/AGCs 1134-1 and 1134-2. In some implemen- tations, the TIA/AGCs 1134 are used to smooth out or correct variations in the electrical signals output from the detector 1130 and the AC coupling capacitors 1132. Accord- ingly, in one example, since the amplitude modulation of the received subcarriers may manifest itself as such variations, the control information associated with such amplitude modulation may be derived based on the magnitude or the amount of correction of such electrical signals. Accordingly, as shown in FIG. 8, line system control data may be output from the TIA/AGC circuits.

As further shown in FIG. 8, the outputs of the TIA/AGCs 1134-1 and 1134-2 are supplied to the ADCs 1140, which convert the outputs of the TIA/AGCs, which analog voltage signals, for example, to digital samples or digital signals. Namely, two detectors or photodiodes 1130-1 may detect the X polarization signals to form the corresponding voltage signals, and a corresponding two ADCs 1140-1 may convert the voltage signals to digital samples associated with the first polarization signals after amplification, gain control and AC coupling. Similarly, two detectors 1130-2 may detect the rotated Y polarization signals to form correspond- ing voltage signals, and a corresponding two ADCs 1140-2 may convert such voltage signals to digital samples associ- ated with the second polarization signals (Y polarization) after amplification, gain control and AC coupling. The Rx DSP 1150 may process the digital samples associated with the X and Y polarization components to the output data D0 to D8 associated with the subcarriers SC1 to SC8.

While FIG. 8 shows optical receiver 1100 as including a particular quantity and arrangement of components, in some implementations, the optical receiver 1100 may include additional components, fewer components, different com- ponents, or differently arranged components. The quantity of the detectors 1130 and/or ADCs 1140 may be selected to implement an optical receiver 1100 that is capable of receiv- ing a polarization-multiplexed signal. In some instances, one of the components illustrated in FIG. 8 may carry out a function described herein as being carry outed by another one of the components illustrated in FIG. 8.

Consistent with the present disclosure, in order to demodulate the subcarriers SC0 to SC8, the local oscillator laser 1110 may be tuned to output light having a wavelength or frequency relatively close to one or more of the subcarrier wavelengths or frequencies to thereby cause a beating between the local oscillator light and the subcarriers.

In one example, the local oscillator laser may be a semiconductor laser, which may be tuned thermally or through current adjustment. If thermally tuned, the tempera- ture of the local oscillator laser 1110 is controlled with a thin film heater, for example, provided adjacent the local oscil- lator laser. Alternatively, the current supplied to the laser may be controlled, if the local oscillator laser is current tuned. The local oscillator laser 1110 may be a semiconduc- tor laser, such as a distributed feedback laser or a distributed Bragg reflector laser.

Figure 9A:
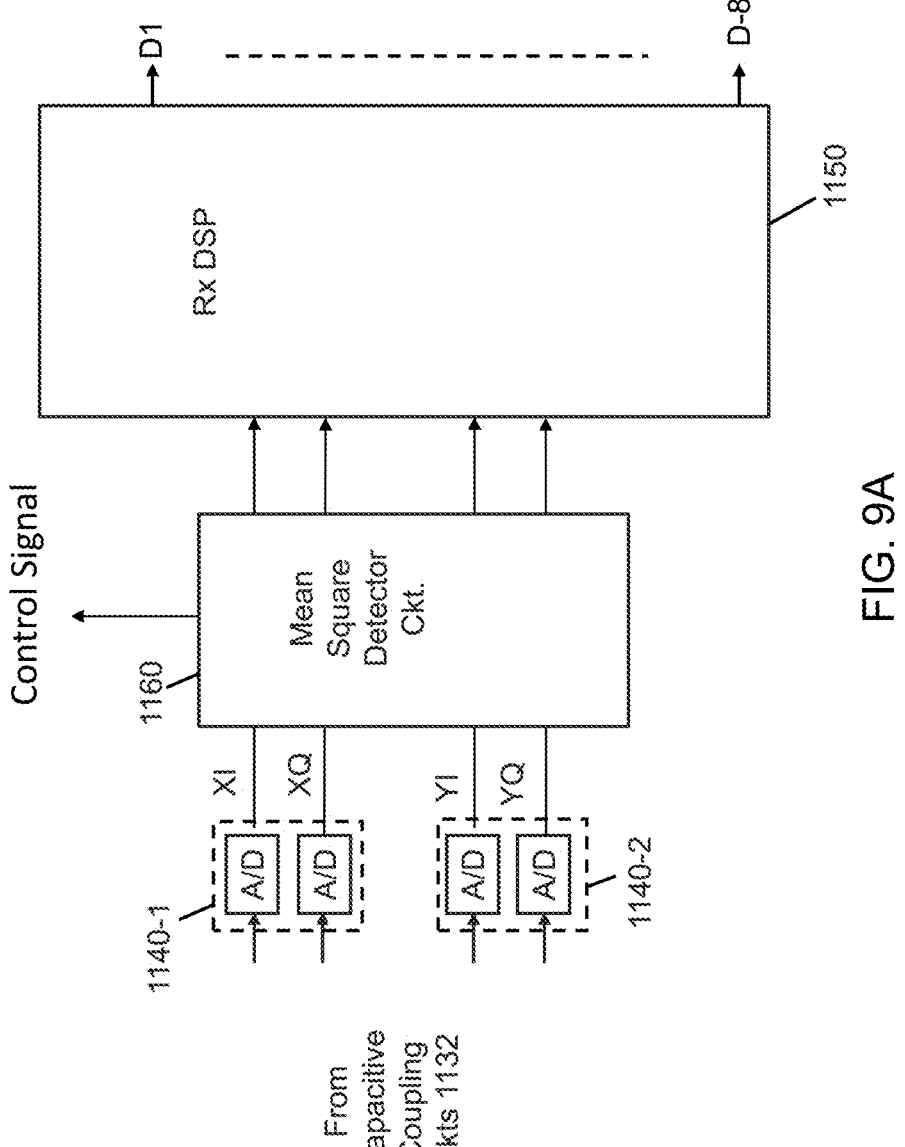
FIG. 9A is a diagram of additional example components of a receiver module of an optical communication system.

Alternatively, control information carried by the above the above-described amplitude modulation may also be detected with a mean square detector ("MSD") circuit 1160 discussed in greater detail with respect to FIG. 9A. For example, the MSD 1160 is coupled to the analog-to-digital conversion circuitry (ADCs 1140) and is operable to receive digital samples received from the ADCs 1140 and output such digital samples to the RX DSP 1150. The MSD circuit 1160 is configured to measure the average power of the received signal. In one example, the average power is calculated by summing the squares of the in-phase and quadrature components of both the X and Y polarizations (average power=$I_X^2+Q_X^2+I_Y^2+Q_Y^2$). In a further example, Ix, Qx, are the outputs of the ADCs 1140-1 and Iy, Qy are the outputs of the ADCs 1140-2. A low pass filter may be provided if high AM frequencies are employed.

By calculating the average power, as noted above, changes in such average power may also be determined and interpreted as the above-described amplitude modulation. Conventional processing of such amplitude modulation, optionally within the MDS circuit 1160, may be employed to provide a control ("CS" in FIG. 9A) associated with such amplitude modulation. Such CS, in turn, may be processed to provide control information or data to a control circuit 1161 (see FIG. 9B), as described below.

Figure 9B:
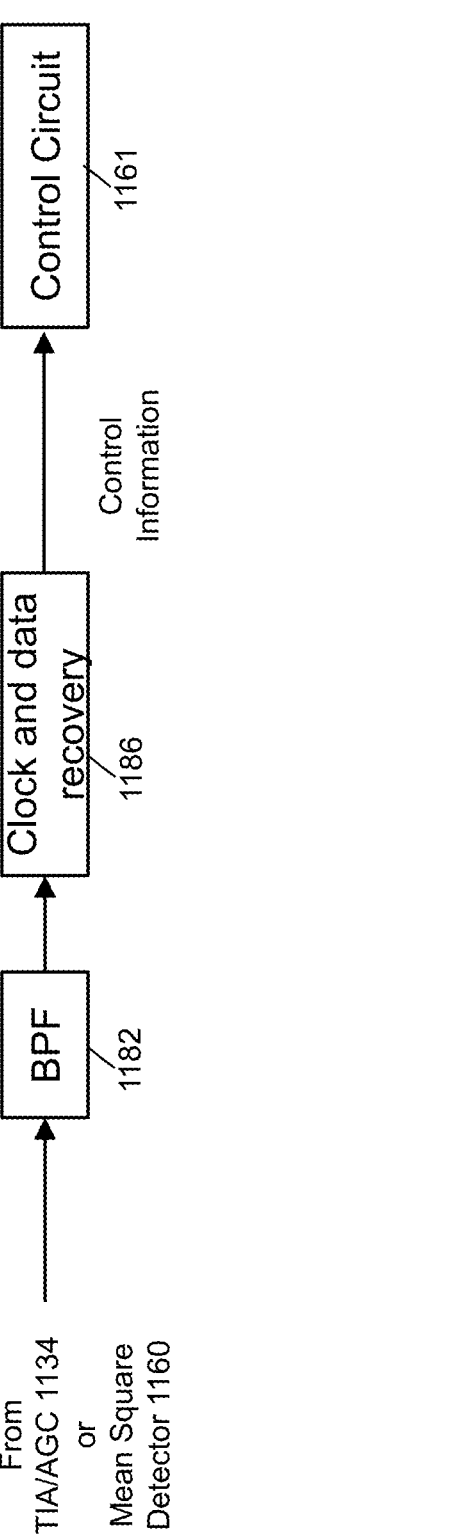
FIG. 9B is a diagram of example circuitry that may be provided in a receiver to output control information.
Figure 9C:
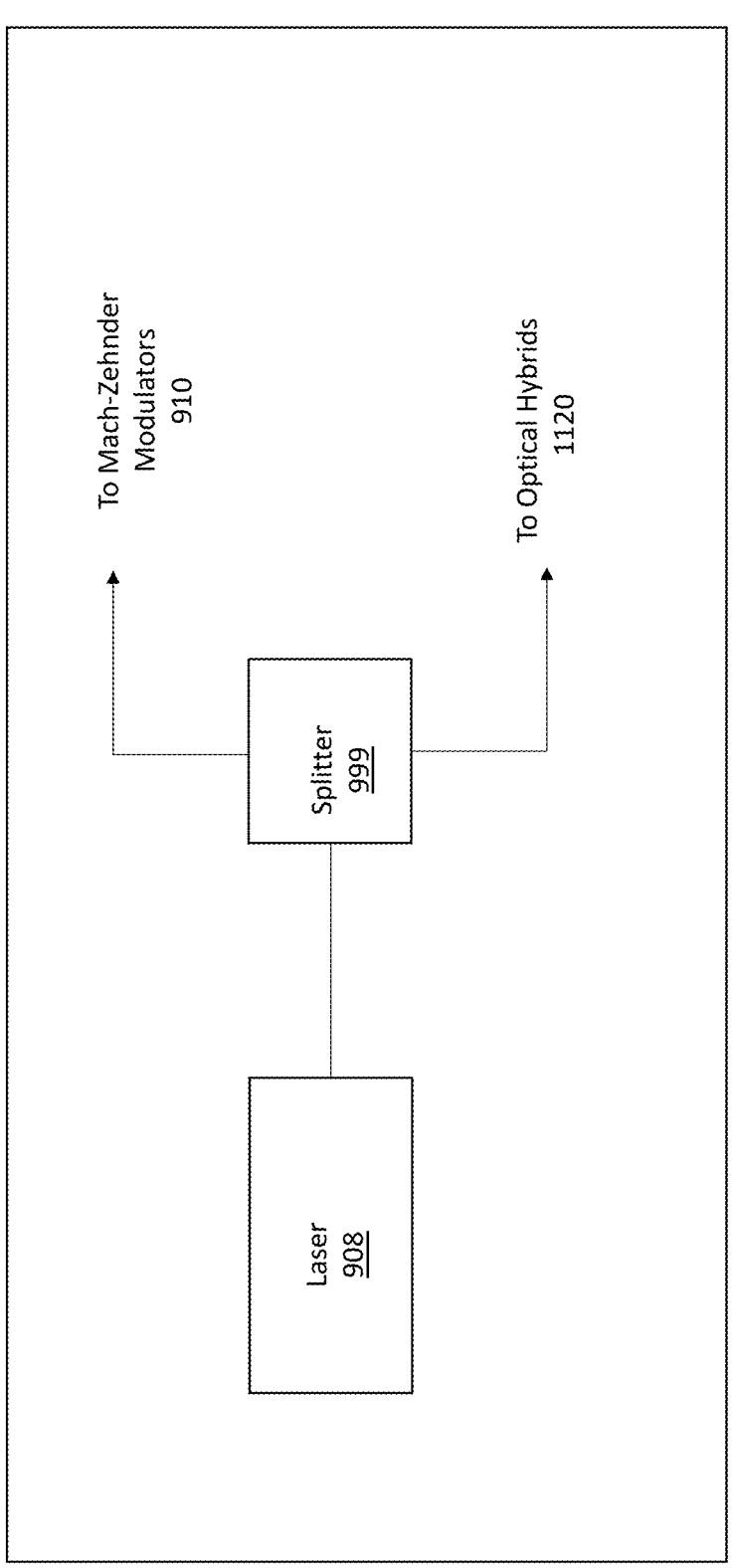
FIG. 9C is a diagram of an example shared laser.

As shown in FIG. 9B, in order to supply control data or information based on the outputs from either the TIA/AGC circuits 1134 or the mean square detector 1160, the outputs from either circuit are provided to a bandpass filter (BPF) 1182, for example, which passes frequency components corresponding to the amplitude modulation frequency associated with control information. The filtered output from the BPF 1182 is next supplied to a clock and data recovery circuit 1186, which extracts the control information from the filtered output in a known manner and, in one example, supplies the control information or data to control circuit 1161, as noted above. In one example, the control circuit may include a microprocessor circuit, for controlling or adjusting one or more parameters associated with the transmitter and/or receiver portions of the secondary node transceiver based on messages included in the control information or data. As used herein, the term microprocessor may include any computer or processor-based or microprocessor-based system including systems using microcontrollers, reduced instruction set computers (RISC), application specific integrated circuits (ASICs), programmable gate array (PGA), field programmable gate array (FPGAs), logic circuits, and any other circuit or processor capable of executing the functions described herein. Microprocessor 1161 may be integrated with either DSP 1150 or DSP 902, or may be provided separate from each of these DSPs.

As noted above, both X and Y polarization components of each optical subcarrier are amplitude modulated. The circuitry shown in FIG. 9B is associated with the X polarization component. It is understood that similar circuitry is provided to extract control information from the Y polarization component, for example, to improve accuracy of the detected control information.

Returning to FIG. 9A, the Rx DSP 1150 processes the digital samples supplied thereto to provide user data streams D1 to D8, which were input to the Tx DSP 902, as noted above in connection with FIGS. 4A and 5.

III. First Data Path Implementation Example—Communication Between Primary and Secondary Transceivers Based on Polarization Modulation As discussed above, control information is communicated between the transceivers in the primary (102)/secondary nodes (104) and line system components by way of amplitude modulation of the subcarriers. Communication between the primary node transceiver 106 and the secondary transceiver 108 will next be described.

Figure 10:
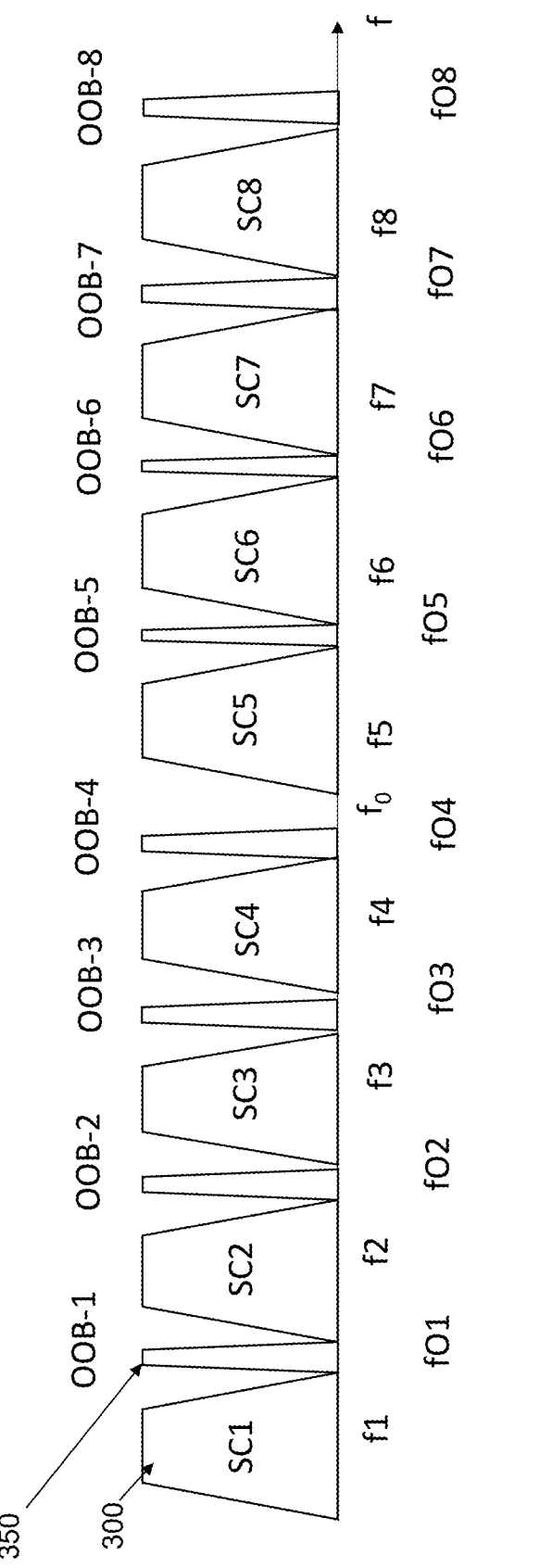
FIG. 10 is a diagram of example subcarriers and multiple out-of-band communication signals generated using an optical communication system.

FIG. 10 shows an example of multiple subcarriers 300 (first optical signals, SC1 to SC8) and multiple communication signals 350 (second optical signals OOB-1 to OOB-8). Each of the subcarriers SC1 to SC8, as noted above, are modulated to carry user data. Such modulation may be selected from the group including BPSK, QPSK, and m-amplitude quadrature modulation (m-QAM), where m is a positive integer. Each of the optical signals OOB-1 to OOB-8 may carry transceiver-to-transceiver control information and may be polarization modulated. Such polarization modulation may include polarization shift-keying (PolSK). Preferably, each of the optical signals OOB-1 to OOB-8 has a respective one of the frequencies fO1 to fO8 that is spectrally adjacent a corresponding one of the subcarrier frequencies f1 to f8, such that at least some of the frequencies fO1 to fO8 are between an adjacent pair of subcarrier frequencies (e.g., the frequency fO1 is between the frequencies f1 and f2, and the frequency fO5 is between the frequencies f5 and f6). However, in the example shown in FIG. 10, the frequency fO8 is adjacent the frequency f8, but is not between two adjacent subcarrier frequencies.

In some implementations, both the subcarriers SC1 to SC8 and optical signals OOB1 to OOB8 may be generated in accordance with modulator drive signal based electrical signals output from the DSP 902, for example. Thus, first control information associated with the above described amplitude modulation may be transmitted in parallel or concurrently with second control information carried by the optical signals OOB-1 to OOB-8, as well as user data carried by subcarriers the SC1 to SC8. Moreover, one laser and modulator combination may be used to generate both the subcarriers and optical signals OOB1 to OOB8. Additional lasers are not required to generate a control channel.

Figure 11:
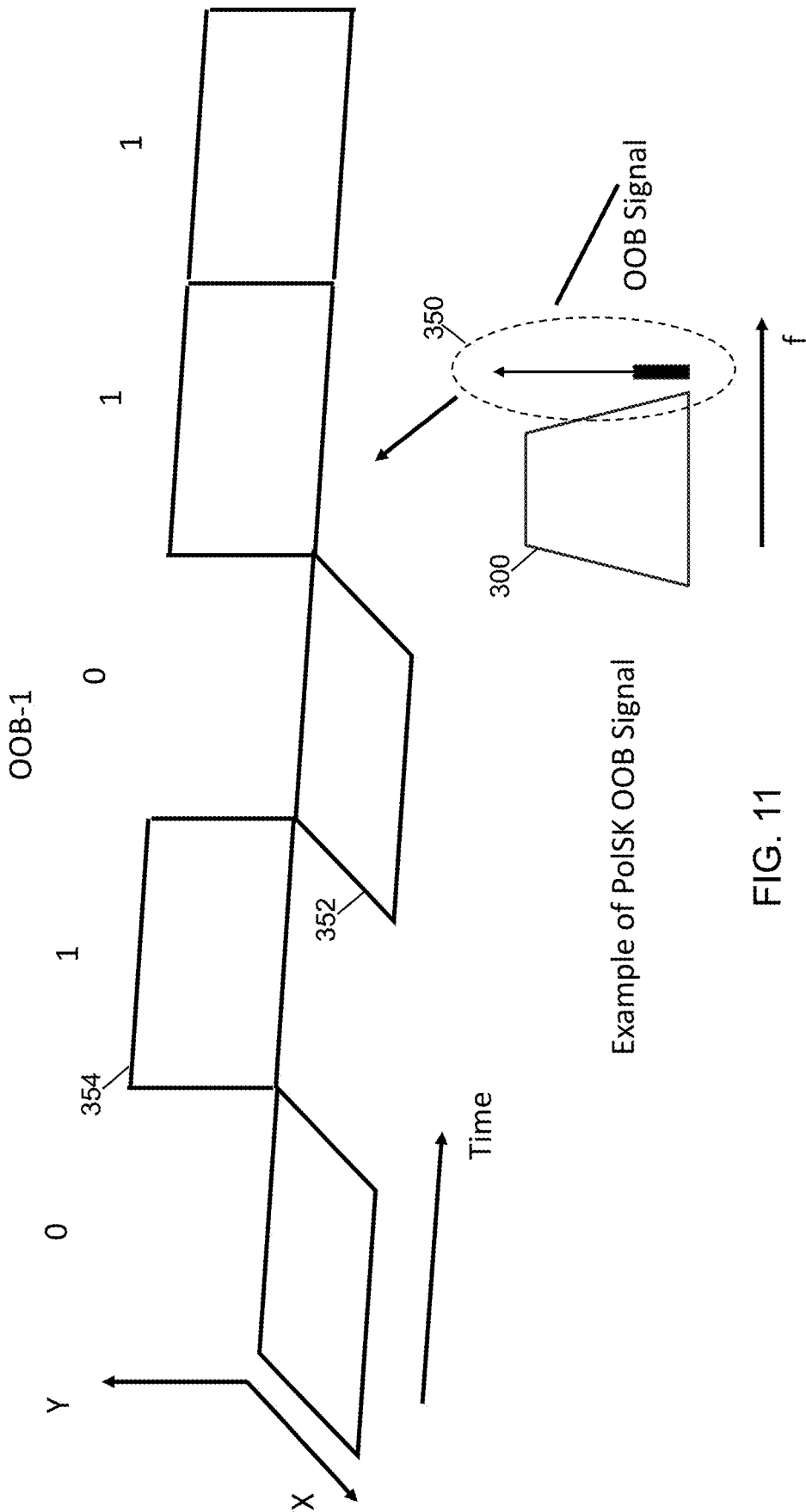
FIG. 11 is a diagram of an X polarization and the Y polarization of an example polarization shift keying (PolSK) out-of-band communication signal.

FIG. 11 depicts an example of an X polarization component and a Y polarization component of OOB-1. In the example illustrated in FIG. 11, the OOB-1 may have either an X polarization 352 or a Y polarization 354 depending on the data to be transmitted. For example, if a '1' bit of control data is to be transmitted, the OOB signal 350 is output with light primarily having the Y (e.g., transverse magnetic or TM) polarization or polarization state. On the other hand, if a '0' bit of control data is to be transmitted, the OOB signal 350 is output with light primarily having the X (e.g., transverse electric or TE) polarization or polarization state. Thus, control data may be transmitted by modulating the polarization of the OOB signal 350 to switch or shift between first and second polarization states.

Figures 12A, 12B:
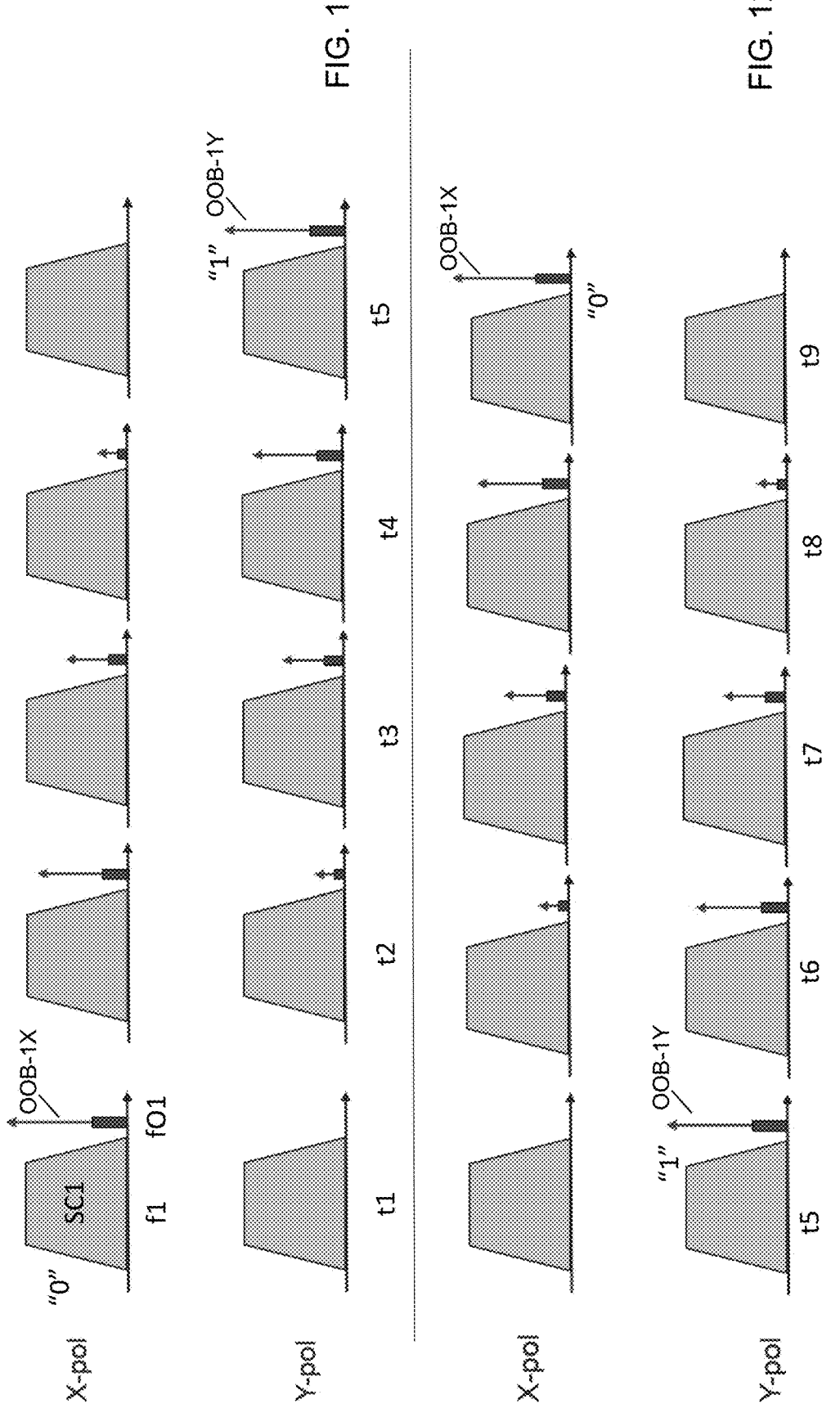
FIGS. 12A and 12B are diagrams of an example PolSK out-of-band communication signal shifting from the X polarization to the Y polarization.

FIG. 12A illustrates in greater detail a transition from a '1' bit, in which optical energy in optical signal OOB-1 is entirely (in this example) in one polarization state ("X-pol") to a '0' bit, in which optical energy is transferred to the other polarization state ("Y-pol") at time t1. In FIGS. 12A and 12B, the amount of optical energy or intensity in the X polarization component of the signal OOB-1 is represented by an arrow OOB-1X, and the amount of optical energy or intensity in the Y polarization component of the signal OOB-1 is represented by an arrow OOB-1Y. As further shown in FIG. 12 A, at times t2 to t4, the amount of optical energy in the X polarization component of the signal OOB-1 decreases, while the amount of optical energy in the Y polarization component of the signal OOB-1 increases. At time t5, the X polarization component of OOB-1 has little or no optical energy, and the amount of optical energy in Y polarization component of 00B-1 is at a maximum, thereby indicating a '1' bit.

FIG. 12B illustrates a transition from the '0' bit back to the '1' bit. Namely, as noted above, a maximum amount of optical energy is present in the Y polarization at time t5. At times t6 to t8, however, the amount of optical energy in the Y polarization component of OOB-1 decreases, while the amount of optical energy in the X polarization component of OOB-1 increases. At time t9, the optical energy in the X polarization component of OOB-1 is at a maximum, thereby corresponding to a '0' bit of control data.

As seen in FIGS. 12A and 12B, at each time instant t1 to t9, the sum of the optical energy in the X (OOB-1X) and Y (OOB-1Y) polarization components of the signal OOB-1 remains constant, in this example. That is, the amplitude of the optical signal OOB-1 does not change. Accordingly, the signal OOB-1 does not interfere with or create noise in the amplitude modulated signals described above that communicate control information between the transceivers and the line system component(s). The signal OOB-1 may therefore be transmitted concurrently with such amplitude modulated signals to provide an additional control channel, which, as noted above facilitates communication of control information between the primary transceiver 106 and the secondary transceiver 108.

Although polarization modulation of the optical signal OOB-1 is described above, it is understood that the remaining optical signals OOB-2 to OOB-8 may similarly be polarization modulated to transmit '0' and '1' bits in the same manner as that described above to provide communication of control information to the secondary transceivers 108.

Transmission OOB signals will next be described in further detail with reference to FIG. 13, which shows the Tx DSP block 903-2. As noted above with respect to FIG. 4A, the Tx DSP block 902 includes the block 903-1 and the block 903-2. The block 903-1 receives the data streams D-1 to D-8, which are associated with a respective one of the subcarriers SC1 to SC8. The block 903-2, however, receives control data to be transmitted on one or more of the optical signals OOB-1 to OOB-8, for example. The outputs of both blocks are fed to a further DSP block, block 903-3, which, based on the received inputs from the block 903-1 and 903-2, provides digital signals. These digital signals, as noted above, are converted to analog signals by the DACs 904, and then further processed by the driver circuits 906, which, in turn, provide drive signals to the modulators 910. Based on such drive signals, the modulators 910 modulate light or an optical signal output from laser 908 to provide a modulated optical signal including, in this example, the subcarriers SC1 to SC8 carrying signal indicative of the user data and the optical signals OOB-1 to OOB-8 carrying signal indicative of the control information to be communicated between transceivers (e.g., the transceiver 106 and the transceiver(s) 108).

The blocks 903-1 and 903-3 of the Tx DSP 902 are described above with reference to FIGS. 4 and 5. The block 903-2 of the Tx DSP 902 will next be described with reference to FIG. 13.

Figure 13:
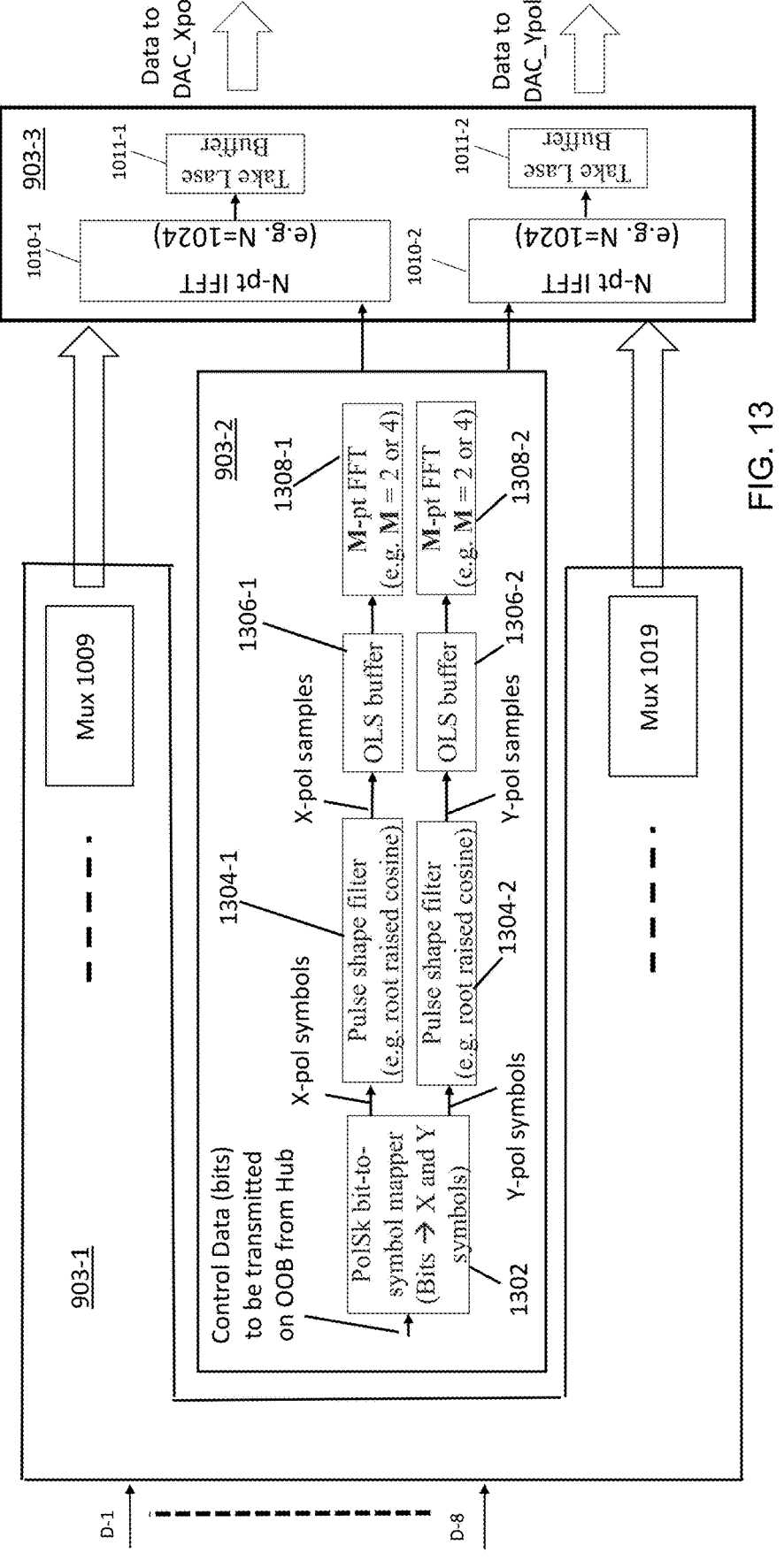
FIG. 13 is a diagram of example devices of a transmitter component that are used to generate a PolSK out-of-band communication signal for transmitting control channel data.

As shown in FIG. 13, control data to be transmitted from the primary node transceiver 106, for example, may be input to a mapper circuit 1302, which maps the received bits to X and Y symbols to be carried by the X and Y components, respectively, of the OOB signals. The mapper circuit 1302 has a first output that supplies symbols to be carried by the X polarization component (X-pol symbols) to a first pulse shape filter circuit 1304-1. The mapper circuit 1302 also has a second output that supplies symbols to be carried by the X polarization component (Y-pol symbols) to a second pulse shape filter circuit 1304-2. Both filter circuits 1304-1 and 1304-2 include, in one example, root raised cosine filter circuitry. The outputs of the filter circuits 1304-1 and 1304-2 are supplied to overlap and save ("OLS") buffer circuits or memories 1306-1 and 1306-2, respectively. The buffer circuits or memories 1306-1 and 1306-2 provide outputs to corresponding Fast Fourier Transform (FFT circuits) 1308-1 and 1308-2, which convert the buffer circuit outputs to frequency domain data. Such data is stored in memories or bins, associated with the frequencies of the OOB signals. Each OOB signal has a relatively narrow bandwidth and carries control data at a rate substantially less than the data rates associated with the subcarriers SC1 to SC8. Accordingly, each OOB signal has a limited number of corresponding frequency bins. In the example shown in FIG. 13, in which the circuit block 903-2 provides signals for generating one of the OOB signals, such as the signal OOB-1, two or four such bins are required to store the frequency domain data associated with the signal OOB-1.

The outputs of the FFT 1308-1 are provided to the IFFT 1010-1, and the outputs of the FFT 1308-2 are provided to the IFFT 1010-2. Further processing by the IFFT 1010-1 and the IFFT-2, the lake last buffers or memory circuits 1011-1 and 1011-2, the DACs 904, and the driver circuits 906 is described above with respect to FIGS. 4 and 5. Upon application of the drive signal outputs from the driver circuits 910, the optical modulators 910 outputs the optical subcarriers SC1 to SC8, as well as the polarization modulated optical signals OOB-1 to OOB-8.

In particular, when a '1', for example, is to be transmitted on the signal OOB-1, the Y-polarization component has a maximum amount of optical energy, while the X polarization component has a minimal amount of optical energy, as noted above. To generate such X and Y components, drive signals are provided such that over frequencies associated with the signal OOB-1, X polarized light is passed from laser 908 through modulators 910-3 and 910-4, polarization rotated to have a Y polarization and then output through a polarization beam combiner (PBC) 914. The modulators 910-1 and 910-2, however, substantially block such light at such frequencies, such that no light or little light having an X polarization is input to the PBC 914 for output onto the fiber 916. Accordingly, at the frequencies associated with the OOB-1, light having the Y polarization is output onto the fiber 916.

On the other hand, when a '0', for example, is to be transmitted on the signal OOB-1, the X-polarization component has a maximum amount of optical energy, while the Y polarization component has a minimal amount of optical energy, as further noted above. To generate such X and Y components, drive signals are provided such that over frequencies associated with the signal OOB-1, X polarized light is passed from laser 908 through the modulators 910-1 and 910-2 and then output through the polarization beam combiner (PBC) 914. The modulators 910-3 and 910-4, however, substantially block such light at such frequencies, such that no light or little light having an Y polarization is input to the PBC 914 for output onto the fiber 916. Therefore, at the frequencies associated with the OOB-1, light having the Y polarization is output onto the fiber 916.

As noted above with respect to FIG. 8, OOB signals are received by a receiver along with the optical subcarriers and, therefore, are subject to polarization demultiplexing, optical mixing, with local oscillator light, photoelectric conversion to analog electrical signals, processing by TIA/AGC circuits, and analog-to-digital conversion prior to input to the Rx DSP 1150. As discussed in greater detail below, however, the Rx DSP 1150 may have separate blocks for respectively outputting user data associated with the subcarriers SC1 to SC8 (block 1403 (FIG. 14)) and control data (block 1402 (FIG. 14)).

Figure 14:
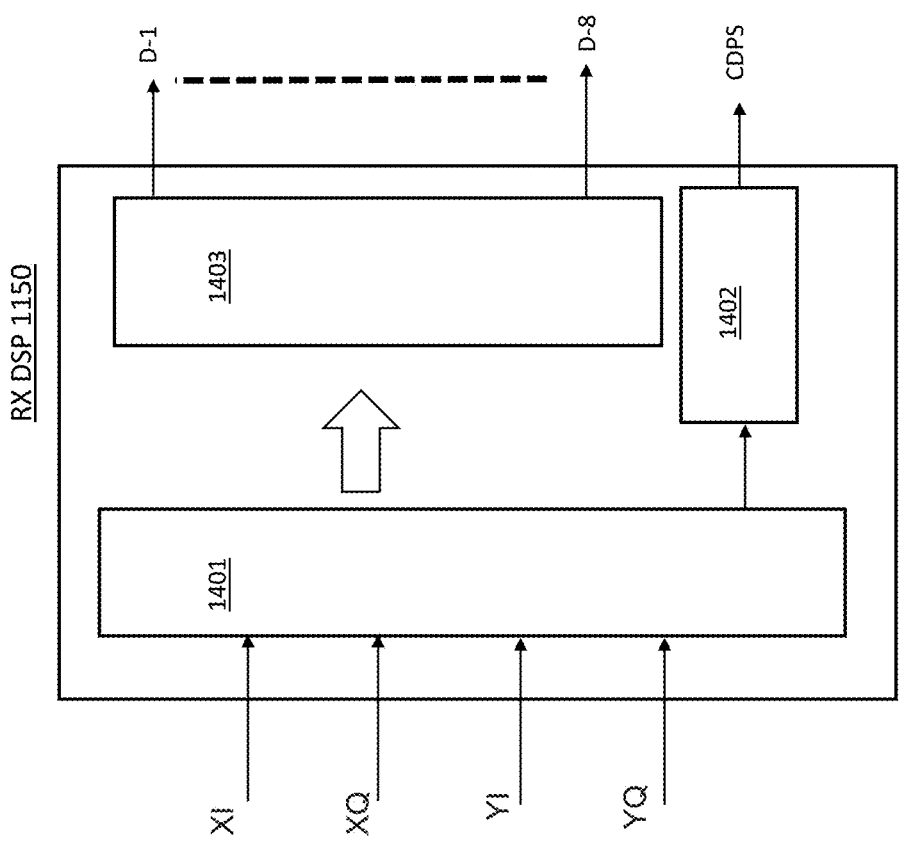
FIG. 14 is a diagram of an example receiver component of an optical communication system.

As shown in FIG. 14, the Rx DSP 1150 may include three blocks, two of which are noted above as the blocks 1401 and 1402. The DSP block 1401 includes circuitry that receives the outputs of the analog-to-digital conversion circuits 1140-1 and 1140-2. As further shown in FIG. 14, the DSP block 1401 supplies outputs which are processed by the block 1403 to the output data streams D1 to D8. Other outputs are processed by the block 1402 and output as transceiver-to-transceiver control data CDPS.

Figure 15:
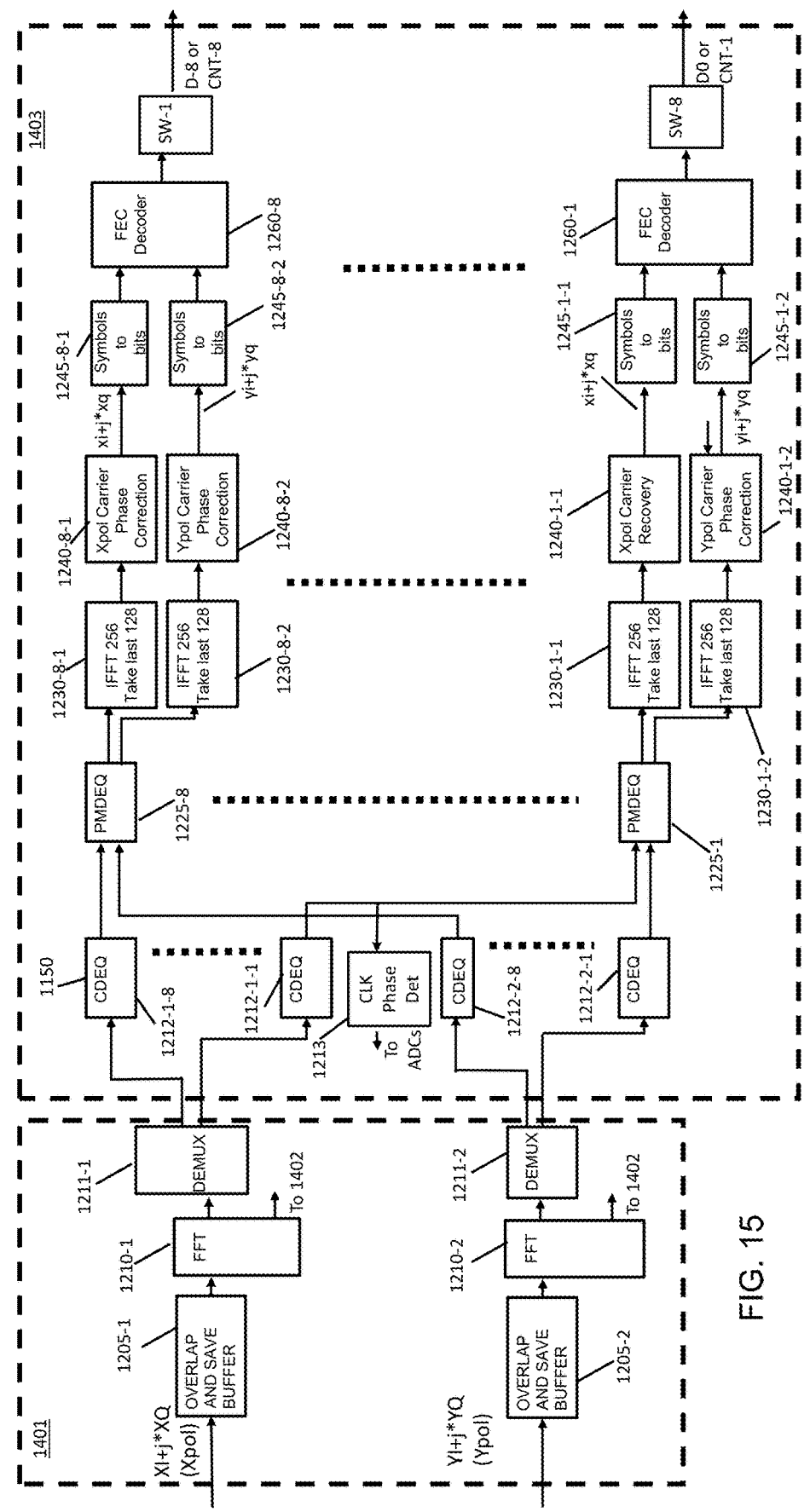
FIGS. 15 and 16 are diagrams of an example receiver component used to generate PolSK out-of-band communication signal.

FIG. 15 shows the blocks 1401 and 1403 in greater detail. As noted above, the analog-to-digital (A/D) circuits 1140-1 and 1140-2 output digital samples corresponding to the analog inputs supplied thereto. In one example, the samples may be supplied by each A/D circuit at a rate of 64 G Sample/s. The digital samples correspond to symbols carried by the X polarization the optical subcarriers and may be represented by the complex number XI+jXQ. The digital samples may be provided to a buffer or memory circuit, such as overlap and save buffers 1205-1 and 1205-2, as inputs to the Rx DSP block 1401. The FFT component or circuit 1210-1, also included in the block 1401, may receive the 2048 vector elements, for example, from the overlap and save buffer 1005-1 and convert the vector elements to the frequency domain using, for example, a fast Fourier transform (FFT). The FFT component 1210-1 may convert the 2048 vector elements to 2048 frequency components, each of which may be stored in a register or "bin" or other memory, as a result of carry outing the FFT.

The frequency components may then then be demultiplexed, and groups of such components may be supplied to a respective one of chromatic dispersion equalizer circuits CDEQ 1212-1-0 to 1212-1-8 as inputs to the block 1403. Each of the CDEQ circuits may include a finite impulse response (FIR) filter that corrects, offsets or reduces the effects of, or errors associated with chromatic dispersion of the transmitted optical subcarriers. Each of the CDEQ circuits 1212-1-0 to 1212-1-8 supplies an output to a corresponding polarization mode dispersion (PMD) equalizer circuit 1225-0 to 1225-8.

It is noted that digital samples output from the A/D circuits 1140-2 associated with Y polarization components of subcarrier SC1 may be processed in a similar manner to that of digital samples output from the A/D circuits 1140-1 and associated with the X polarization component of each subcarrier. Namely, the overlap and save buffer 1205-2, the FFT 1210-2 and the CDEQ circuits 1212-2-0 to 1212-2-8 may have a similar structure and operate in a similar fashion as the buffer 1205-1, the FFT 1210-1 and the CDEQ circuits 1212-1-0 to 1212-1-8, respectively. For example, each of the CDEQ circuits 1212-2-0 to 1212-2-8 may include an FIR filter that corrects, offsets, or reduces the effects of, or errors associated with chromatic dispersion of the transmitted optical subcarriers. In addition, each of the CDEQ circuits 1212-2-0 to 1212-2-8 provide an output to a corresponding one of the PMDEQ 1225-0 to 1225-8.

As further shown in FIG. 15, the output of one of the CDEQ circuits, such as the CDEQ 1212-1-0 may be supplied to a clock phase detector circuit 1213 to determine a clock phase or clock timing associated with the received subcarriers. Such phase or timing information or data may be supplied to the ADCs 1140-1 and 1140-2 to adjust or control the timing of the digital samples output from the ADCs 1140-1 and 1140-2.

Each of the PMDEQ circuits 1225 may include another FIR filter that corrects, offsets or reduces the effects of, or errors associated with PMD of the transmitted optical subcarriers. Each of the PMDEQ circuits 1225 may supply a first output to a respective one of the IFFT components or circuits 1230-0-1 to 1230-8-1 and a second output to a respective one of the IFFT components or circuits 1230-0-2 to 1230-8-2, each of which may convert a 256 element vector, in this example, back to the time domain as 256 samples in accordance with, for example, an inverse fast Fourier transform (IFFT).

Time domain signals or data output from the IFFT 1230-0-1 to 1230-8-1 are supplied to a corresponding one of the Xpol carrier phase correction circuits 1240-1-1 to 1240-8-1, which may apply carrier recovery techniques to compensate for X polarization transmitter (e.g., the laser 908) and receiver (e.g., the local oscillator laser 1110) linewidths. In some implementations, each carrier phase correction circuit 1240-1-1 to 1240-8-1 may compensate or correct for frequency and/or phase differences between the X polarization of the transmit signal and the X polarization of light from the local oscillator 1110 based on an output of the Xpol carrier recovery circuit 1240-0-1, which performs carrier recovery in connection with one of the subcarrier based on the outputs of the IFFT 1230-01. After such X polarization carrier phase correction, the data associated with the X polarization component may be represented as symbols having the complex representation xi+j*xq in a constellation, such as a QPSK constellation or a constellation associated with another modulation formation, such as an m-quadrature amplitude modulation (QAM), m being an integer. In some implementations, the taps of the FIR filter included in one or more of the PMDEQ circuits 1225 may be updated based on the output of at least one of the carrier phase correction circuits 1240-0-1 to 1240-8-01.

In a similar manner, time domain signals or data output from the IFFT 1230-0-2 to 1230-8-2 are supplied to a corresponding one of the Ypol carrier phase correction circuits 1240-0-2 to 1240-8-2, which may compensate or correct for the Y polarization transmitter (e.g., the laser 908) and receiver (e.g., the local oscillator laser 1110) linewidths. In some implementations, each carrier phase correction circuit 1240-0-2 to 1240-8-2 may also corrector or compensate or correct for frequency and/or phase differences between the Y polarization of the transmit signal and the Y polarization of light from the local oscillator laser 1110. After such Y polarization carrier phase correction, the data associated with the Y polarization component may be represented as symbols having the complex representation yi+j*yq in a constellation, such as a QPSK constellation or a constellation associated with another modulation formation, such as an m-quadrature amplitude modulation (QAM), m being an integer. In some implementations, the output of one of the circuits 1240-0-2 to 1240-8-2 may be used to update the taps of the FIR filter included in one or more of the PMDEQ circuits 1225 instead of or in addition to the output of at least one of the carrier recovery circuits 1240-0-1 to 1240-8-1.

As further shown in FIG. 15, the output of carrier recovery circuits (e.g., the carrier recovery circuit 1240-0-1), may also be supplied to the carrier phase correction circuits 1240-1-1 to 1240-8-1 and 1240-0-2 to 1240-8-2 whereby the phase correction circuits may determine or calculate a corrected carrier phase associated with each of the received subcarriers based on one of the recovered carriers, instead of providing multiple carrier recovery circuits, each of which being associated with a corresponding subcarrier.

Each of the symbols to bits circuits or components 1245-0-1 to 1245-8-1 may receive the symbols output from a corresponding one of the circuits 1240-0-1 to 1240-8-1 and map the symbols back to bits. For example, each of the symbol to bits components 1245-0-1 to 1245-8-1 may map one X polarization symbol, in a QPSK or m-QAM constellation, to Z bits, where Z is an integer. For dual-polarization QPSK modulated subcarriers, Z is four. Bits output from each of the components 1245-0-1 to 1245-8-1 are provided to a corresponding one of the FEC decoder circuits 1260-0 to 1260-8.

Y polarization symbols are output form a respective one of the circuits 1240-0-2 to 1240-8-2, each of which having the complex representation yi+j*yq associated with data carried by the Y polarization component. Each Y polarization, like the X polarization symbols noted above, may be provided to symbols to a corresponding one of the bit to symbol circuits or components 1245-0-2 to 1245-8-2, each of which having a similar structure and operating a similar manner as the symbols to bits component 1245-0-1 to 1245-8-1. Each of the circuits 1245-0-2 to 1245-8-2 may provide an output to a corresponding one of the FEC decoder circuits 1260-0 to 1260-8.

Each of the FEC decoder circuits 1260 may remove errors in the outputs of the symbol to bit circuits 1245 using forward error correction. Such error corrected bits, which may include user data for output to or output from the secondary node 108, may be supplied as a corresponding one of the outputs D1 to D8 from block 1403.

It is noted that, in the above example, eight overlap and save buffers, FFTs, replicators, pulse shape filters with the X and Y polarizations, respectively, in the Tx DSP corresponding in number to the number of optical subcarriers that may be generated, i.e., eight. Likewise eight CDEQs IFFTs, carrier phase correction circuits, symbol to bits circuits and FEC encoders are provided for each polarization in the Rx DSP corresponding to the eight subcarriers. If more subcarriers are to be generated, such as 16, than a corresponding number of such components are preferably provided in the Tx and Rx DSPs.

Figure 16:
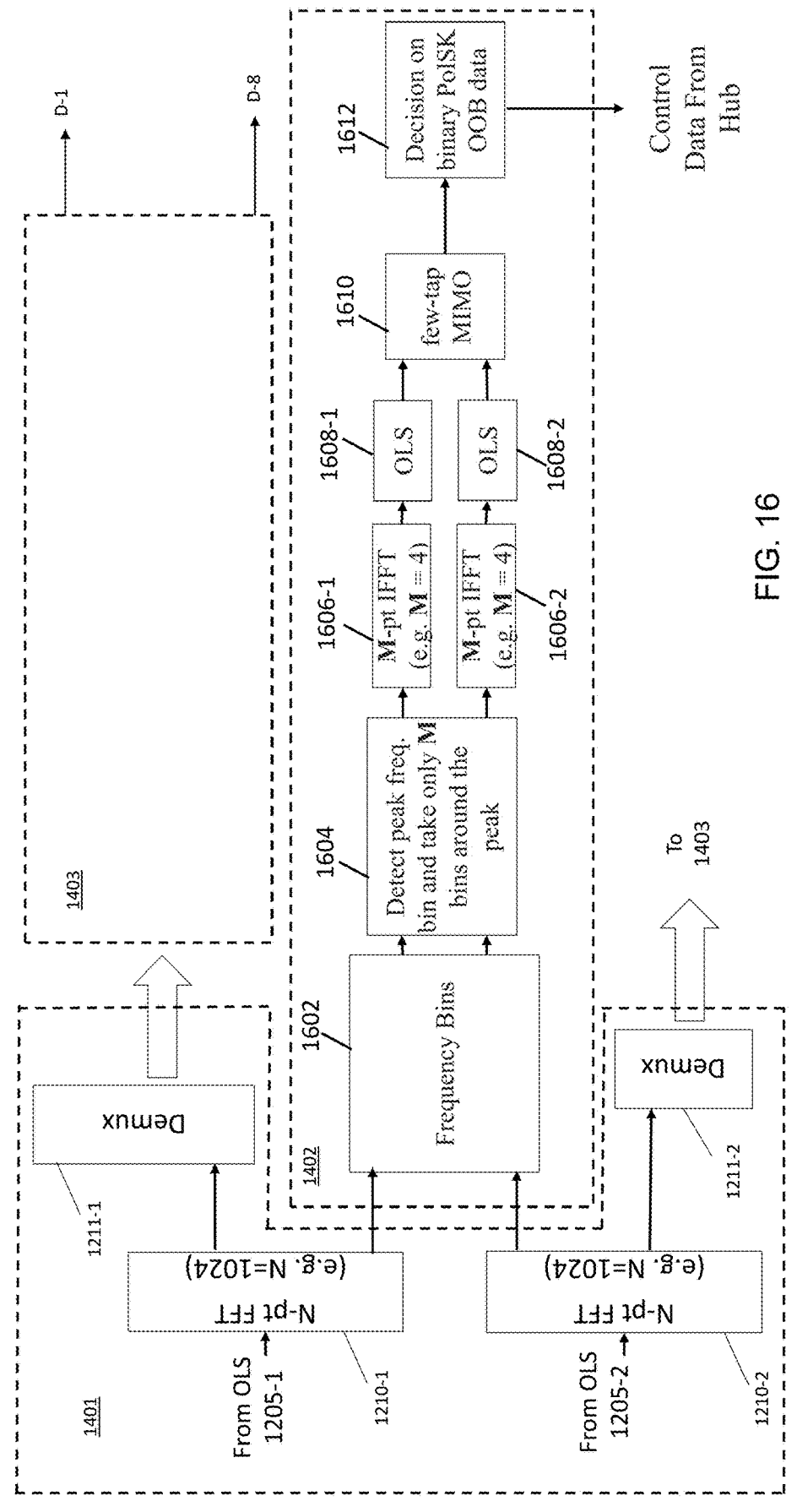

FIG. 16 shows the Rx DSP block with an emphasis on the details of the block 1402. As noted above, the block 1402 receives outputs from the block 1401, and, based on such outputs, supplies control data carried by an OOB signal, such as the signal OOB-1. The block 1402 includes frequency bins or memories 1602 which receives outputs from the FFT 1210-1 and 1210-2. Such outputs are frequency domain data corresponding associated with data carried by the signal OOB-1, for example. Turning to FIG. 17, such frequency bins that are associated with the signal OOB-1. More specifically, each of the respective frequency bins 1602 can correspond to particular frequencies associated with OOB-1. Such bins store frequency domain data associated with OOB-1. Since the signal OOB-1, for example, has a relatively narrow bandwidth, not all of the bins 1602 will store data. Accordingly, the circuitry 1604 detects a peak frequency bin and outputs the data stored in the bin, as well M bins adjacent to it (M may be an integer, such as 2 or 4). For example, as shown in FIG. 17, the bin 1702 is the peak frequency bin, and the M=2 bins adjacent to the bin 1702 are the bins 1704, 1706, 1708, and 1710. The outputs of these bins are provided to an inverse Fast Fourier Transform (IFFT) circuits 1606-1 (associated with the X component of the signal OOB-1) and 1606-2 (associated with the Y component of the signal OOB-1). The IFFT circuits 1606 supply time domain data to buffers, such as the overlap and save buffer circuits 1608-1 and 1608-2, and the buffered time domain data is supplied to a filter, including, for example, a multiple-input-multiple-output (MIMO) filter 1610 having a limited number of taps. The filter 1610 is provided to correct for distortions in the data output from the buffer circuits 1608-1 and 1608-2 that may be attributable to a rotation of the X and Y polarization components of the signal OOB-1, for example, during propagation along an optical fiber link.

As further shown in FIG. 16, the filter 1610 provides an output to a decision circuit that outputs either '0' or '1' bits based on such output. These bits constitute control data (CDPS in FIG. 13) output from the hub or the primary transceiver 106, for example. Similar circuitry may be provided in the receiver portion of the transceiver 106 to detect and output control data output from one or more of the secondary transceivers 108.

While FIGS. 15-17 show the Rx DSP 1150 as including a particular quantity and arrangement of functional components, in some implementations, the DSP 1150 may include additional functional components, fewer functional components, different functional components, or differently arranged functional components.

IV. Second Data Path Implementation Example—Communication Between Primary and Secondary Transceivers Based on Amplitude Modulation at a Plurality of Frequencies In the above First Data Path Implementation Example, the optical subcarriers output from a transceiver, such as the primary transceiver 106, are subject to amplitude modulation to carry control information associated with a first data path (e.g., data path CC1 in FIG. 2A). Further, as noted above, polarization modulation may be employed on a spectrally narrow optical signal to carry addition control information associated with a second data path (e.g., data path CC3 in FIG. 2A). In some implementations, amplitude modulation may be employed to carry control information associated with different data paths. For example, as described in greater detail below, the optical subcarrier shown in FIG. 3 may be subject to a first, second, and third amplitude modulations in both the downstream and upstream directions. Each such amplitude modulation may be at a different frequency and may be associated with different control information, as well as a different data path. In one example, the modulation frequencies are between 1 MHz and 2 MHz (band A), 3 MHz and 4 MHz (band B), and 6 MHz and 7 MHz (band C), although other bands or ranges may be employed. Accordingly, the amplitude modulation is at frequencies less than that associated with the transmitted user data, which is approximately in a range of 10 GHz to 100 GHz.

FIG. 18 shows the optical system 100 of FIG. 1A further labeled with arrows indicating the direction and amplitude modulation employed to exchange control information between transceivers, optical gateways, and central software to thereby realize alternative data path implementations to those described above with references to FIGS. 1-17. As shown in FIG. 18, the arrow 1802 indicates that the optical subcarriers, such as the SC1 to SC8, output from a transmitter in the primary transceiver 106 may be amplitude modulated at a first frequency or frequencies in band B, for example, to carry control information to the OGW 103-1 and for further transmission to the central software 111, as noted above. The optical subcarriers may be further amplitude modulated in the transmitter of the primary transceiver 106 at a frequency or frequencies in band C, for example, to provide control information to one or more secondary transceivers 108 through the OGW 103-1, the sub-system 105, and the OGW 103-2 (indicated by the arrow 1812). In addition, the OGW 103-2 may also amplitude modulate the optical subcarriers passing therethrough at a frequency in band A to provide control information, such as from the central software 111, as further noted above, to one or more of the secondary transceivers 108 (indicated by the arrow 1810).

As further shown in FIG. 18, the arrow 1808 indicates that one or more of the optical subcarriers SC1 to SC8 output from a transmitter in one of the secondary transceivers 108, for example, may be amplitude modulated at a frequency or frequencies in band B, for example, to carry control information to the OGW 103-2 and for further transmission to the central software 111, as noted above. The optical subcarriers may be further amplitude modulated in the transmitter of one of the secondary transceivers 108 at a frequency or frequencies in band C, for example, to provide control information to the primary transceiver 106 through the OGW 103-2, the sub-system 105, and the OGW 103-1 (indicated by the arrow 1806). Such amplitude modulation transmission is shared, in one example, among each transceiver 108. In that case, more than one of the secondary transceivers 108 may transmit control information at a frequency in band C at the same time. Accordingly, control information transmission from the secondary transceivers 108 to the primary transceiver 106 may be carried out in bursts of relatively short duration to reduce the likelihood that control information output from one of the secondary transceivers 108 will interfere or collide with the control information output from another second transceiver. Due to this possibility of collisions, in some implementations, the secondary transceivers can assume the control information was not received by the primary transceiver and can retransmit the control information (e.g., at a random or pseudo random interval) until the primary transceiver 106 sends an acknowledgement message to the secondary transceiver 108 that sent the control information that such information was successfully received. In some implementations, one or more "back off" algorithms can be used to ensure secondary transceivers that are independently controlled will successfully send control information to the primary transceiver. One such example is the pseudo-random exponential back off algorithm.

In addition, the OGW 103-1 may also amplitude modulate the optical subcarriers passing therethrough at a frequency in band A to further provide control information, such as from central software 111, as further noted above, to the primary transceiver 106 (indicated by the arrow 1804).

Generation of multiple amplitude modulated data paths will next be described. As noted above, the optical subcarriers can be amplitude modulated, collectively, to carry control information associated with a particular data path (see FIG. 3). FIG. 19 shows example circuitry 1992 that may be included in the AM signal generator 992 described above with respect to FIG. 4A instead of the circuitry 992-1. Here, the AM signal generator 992 is modified to include the circuitry 1992 to amplitude modulate the subcarriers at different frequencies to carry first and second control information, instead of amplitude modulation at one frequency, as noted above with respect to FIG. 4B. As in the example noted above, the AM signal generator 992 provides each of the outputs AMO-1 to AMO-4 to a respective input of the DACs 904-1 to 904-4 (see FIG. 4A). These signals are generated in such a way that the DACs 904 output analog signals that include multiple amplitude modulated signals overlaying or superimposed on the data carrying DAC outputs. Based on such DAC outputs, the Mach-Zehnder modulator driver circuits (MZMDs) 906, in turn, output drive signal to the MZMs 910, as noted above. Accordingly, the combined MZM outputs supply optical subcarriers superimposed with multiple amplitude modulated signals at different frequencies based on the outputs of the signal generator 992, whereby both the X and Y polarization components of each optical subcarrier are subject to such amplitude modulation.

Returning to FIG. 19, the circuitry 1992 includes a multiplier circuit 1902-1 that multiplies first control information CD1 by a cosine function, $\cos(\omega_B t)$, where $\omega_B$ is indicative of a frequency of the amplitude modulation and t is time. For example, (OB may correspond to an amplitude modulation frequency within band B for transmission of control information to the OGW 103-1 and further transmission to the central software 111 (see arrow 1802 in FIG. 18). In a similar manner as that described above in regard to FIG. 4B, the output of the multiplier 1902-1 is provided to the adder 1903-1 which adds 1 to product supplied by the multiplier 1902-1 to ensure that a positive number is obtained. As further shown in FIG. 19, the resulting sum output from the adder 1903-1 is provided to a multiplier 1904-2, which multiplies such sum by a carrier frequency $\omega_{Carrier}$.

The circuitry 1992 also includes, for example, a multiplier circuit 1902-2 that multiplies control information CD2 by a cosine function, $\cos(\omega_C t)$, where $\omega_C$ is indicative of a frequency of another amplitude modulation and t is time. For example, co c may correspond to a frequency within band C for transmission of control information to the transceivers 108 via the OGW 103-1, the sub-system 105, and the OGW 103-2 (the arrow 1812 in FIG. 18). The adder 1903-2 and the multiplier 1904-2 operate in a similar manner as the adder 1903-1 and the multiplier 1904-1 (except that the multiplier 1904-1 multiplies the output of the adder 1903-2 by cos $(\omega'_{Carrier} t)$). As further shown in FIG. 12, the outputs of the multiplier circuits 1904-1 and 1904-2 are provided to an adder circuit 1906, which adds such outputs and the resulting sum (AMO-1 in FIG. 4A) is combined with a corresponding output from the DSP 902 and input to the DAC 904-1. Accordingly, amplitude modulation at different frequencies, a first amplitude modulation in band B and a second amplitude modulation in band C, are fed to the DAC 904-1. As a result, both X and Y polarization components of each optical subcarrier are amplitude modulated at multiple frequencies to carry multiple control information streams.

It is understood that additional circuitry similar to that shown in FIG. 19 is also included in the AM signal generator 992, in this example, to provide similar signals (AMO-2 to AMO-4) to the inputs of remaining the DACs 904-2 to 904-4. As noted above, based on such inputs, the combined output of the MZMs 910 supplies optical subcarriers that are collectively amplitude modulated, such that both the first and second amplitude modulation signals are superimposed onto the optical subcarriers to thereby carry first and second control information intended for the OGW 103-1 and a secondary transceiver 108, respectively, for example.

The OGW-1 and the OGW-2 in FIG. 19 generate and amplitude modulated subcarriers in a manner similar to that described in connection with FIG. 7. As noted with respect to FIG. 18, the OGW-1 may provide amplitude modulated optical subcarriers supplied to the primary transceiver 106 at a frequency within band A (see arrow 1804), and the OGW-2 may modulate the optical subcarriers supplied to one or more of the transceivers 108 also in band A (see arrow 1810).

Moreover, one or more of the secondary transceivers 108 may include transmitter circuitry, similar to the circuitry 1992, to amplitude modulate subcarrier(s) output therefrom with multiple amplitude modulation frequencies (see arrows 1806 and 1808), each corresponding to a respective control data stream or data path.

Detection of control information carried by amplitude modulated subcarriers at a receiver, such as a module 1155, in the primary node 106 will next be described with reference to FIGS. 8, 9A and 20. As noted above, with respect to FIGS. 8 and 9A, control information or data may be determined based on outputs from either the TIA/AGCs circuits 1134 (FIG. 8) or the mean square detector 1160 (FIG. 9A), each of which supplies electrical signals based on electrical signals output from the photodiode circuitry 1130. FIG. 9B shows additional circuitry for filtering the outputs of either of the circuits 1134 or 1160 in order to output control information associated with one control information stream. FIG. 20 shows circuitry 2002 that may replace the circuitry shown in FIG. 9B to provide first (CD1) and second (CD2) control information or control information streams associated with first and second amplitude modulations, respectively, of the optical subcarriers.

As shown in FIG. 20, the outputs of either the TIA/AGC 1134 or the mean square detector 1160 may be provided to the first and the second bandpass filters 1182 and 1183. The first bandpass filter 1182 passes signals associated with a first amplitude modulation having a frequency or frequencies, for example, in band C associated with the transceiver-to-transceiver data paths (see arrows 1806 and 1812 in FIG. 18). Moreover, the second bandpass filter 1183 passes signals associated with a second amplitude modulation having a frequency or frequencies, for example, in band A associated with the OGW (either OGW-1 or OGW-2) to transceiver data paths. The output of the bandpass filter 1182 is supplied to clock and data recovery circuit 1186 to thereby supply first control information CD1 associated with the first amplitude modulation of the subcarriers, and the output of bandpass filter 1183 is supplied to the clock and data recovery 1187 to thereby provide second control information CD2 associated with the second amplitude modulation of the subcarriers.

The circuitry 2002 is provided to detect and output control information associated with the X polarization component of the optical subcarriers. As noted above, however, each optical subcarrier also has a Y polarization component, which is also amplitude modulated. It is understood, that circuitry similar to the circuitry 2002 is provided, for example, to output control information associated with the amplitude modulation of the Y polarization component of each optical subcarrier. In a further example, control information or data CD1 and CD2 may be provided to control circuit 1161, such that such control information may be used to control or adjust a parameter or function of either the primary or secondary transceivers. In a further example, one or both of the CD1 and CD2 may include information indicative of a number of subcarriers to be output from a transceiver, as noted above. As further noted above, such information may be used by control circuit 1161 to adjust the number of optical subcarriers, by either adding or reducing, the number of optical subcarriers that are output from the transceiver.

An example implementation of the data path connections, CC3, CC4, CC1, CC5, and CC2 that facilitate control channel communication between the secondary transceiver 108-*n* and the network management system 109 (and the central software 111) will next be described. As noted above, the secondary transceivers 108, such as the transceiver 108-*n* output optical subcarriers carrying data, such as one or more of the optical subcarriers SC1 to SC8, and such subcarriers may be amplitude modulated at a first frequency, such as a frequency in band C, to carry first control information. In addition, the subcarriers may be further amplitude modulated at a second frequency, such as a frequency in band B, to carry second control information. Such amplitude modulated optical signals are generated by circuitry similar to that shown in FIGS. 4A and 20, for example. These signals are transmitted as part of the upstream signal US along an optical communication path including the OGW 103-2, the subsystem 105, and the OGW-1, the optical fiber 115-2, to a receiver, such as the module 1155 shown in FIG. 8, provided in the primary transceiver 106, thereby implementing the data path CC3. At the OGW 103-2, the second control information may be detected and supplied to the central software 111 and the network management system 109, as described above with reference to FIG. 7. For example, a tapped portion of the incoming optical signal to the OGW 103-2 is detected by a photodiode, similar to the photodiode 711, and the resulting electrical signal is processed by circuitry in a microprocessor or microcontroller, similar to that shown in FIG. 7, to output the second control data to the central software 111 in the network management system 109.

As noted above with respect to FIGS. 8, 9A and 20, the TIA/AGCs 1134 or the mean square detector 1160 may output signals indicative of the first control information to the bandpass filters 1182 and 1183. The bandpass filter 1182, however, passes signals associated frequencies in band C. Such signals are associated with the first control data. Upon processing of the output of the bandpass filter 1182 by the clock and data recovery circuit 1186 (see FIG. 20), the first control data is output. Such control information, in one example, may be provided to the DSP 902 or control circuitry in the receiver or transmitter portions of the primary transceiver 106 to report status of the secondary transceiver 108-*n* or to adjust a parameter, parameter associated one or more of the optical subcarriers SC1 to SC8 output from the transceiver 106.

Alternatively, control information CD1 may be input to the AM signal generator 992, to amplitude modulate the optical subcarriers in a manner similar to that described with reference to FIGS. 4A, 4B, and 20, to thereby implement the data path CC4. For example, the optical subcarrier may be amplitude modulated at a frequency in band B to thereby carry the control information CD1, which originated from the transceiver 108-*n*. The optical subcarriers are transmitted on another optical communication path, including the fiber 115-1, to the OGW 103-1 (data path CC1). Again referring to FIG. 7, a portion of the amplitude modulated optical subcarriers is output from a tap, such as the tap 711, converted to an electrical signal, which is then processed by a microprocessor or microcontroller (data path CC5) to provide the control information (originating from the secondary node 108-*n*) to the network management system 109 and the central software 111 (data path CC2).

Thus, in the above example, control information is provided, along with user data carried by the optical subcarriers, without additional optical or electrical components, from a transceiver to the central software in a manner that bypasses the node equipment housing such transceiver. Moreover, by amplitude modulating the optical subcarriers to carry the control information, more capacity is made available for transmission of user data. In addition, although the above example employed amplitude modulation to carry the control information from the secondary transceiver 108-*n* to the primary transceiver 106, polarization modulation, such as polarization shift keying, as described above, may be employed to carry such control information, to implement data path CC3.

Similar data paths may be employed in the opposite direction as that described above to transmit control information from the central software 111 to the transceiver. Alternatively, as described previously, control information may be provided to/from the central software via an optical gateway (OGW) nearest the transceiver intended for such control information.

It is noted that amplitude modulation at frequencies associated with control information intended for the central software 111 may propagate from, for example, the primary transceiver 106 to one or more of the secondary transceivers 108. Since such control information is not intended for receipt at the secondary transceivers 108, the bandpass filters 1182 and 1183, for example, are configured to block or filter out frequencies associated with that control information. Accordingly, in the above example, control information for output to the central software 111 is associated with amplitude modulation frequencies band B. Since, each OGW includes a tap to detect such amplitude modulation (see FIG. 7), such amplitude modulation is blocked by the OGWs 103-1 and 103-2 and is transmitted with the subcarriers to the secondary transceivers 108. Accordingly, as noted above, bandpass filters 1182 and 1183 pass signals with frequencies associated with control information to be received by the secondary transceivers 108, namely, in the above example, frequencies in bands A and C, such that signals associated with band B are blocked or not processed in the transceivers 108. As noted above, such information may be used by control circuit 1161 provided in the transceivers, to control or adjust a parameter or function of the transceivers, such as the number of optical subcarriers to be output from the transceiver.

III. Example Techniques for Configuring Transceivers with Respect to an Optical Communications Network As described herein, in some implementations, two or more transceivers can exchange information with one another directly to configure themselves for use on an optical communications network by of transmission of amplitude modulated (AM) signals and the information associated with such signal may be used by circuitry in the transceivers, such as control circuit 1161 to adjust or control a parameter or functionality of the transceiver. As an example, transceivers can communicate with one another to establish control paths and/or communication path between them, and reconfigure the control paths and/or communication paths dynamically (e.g., to correct for misconfigurations with respect to the network, to optimize the performance of the transceivers, etc.). In some implementations, this process can be performed by the transceivers, independent from the central software, the host equipment, and/or the node equipment.

Figure 21:
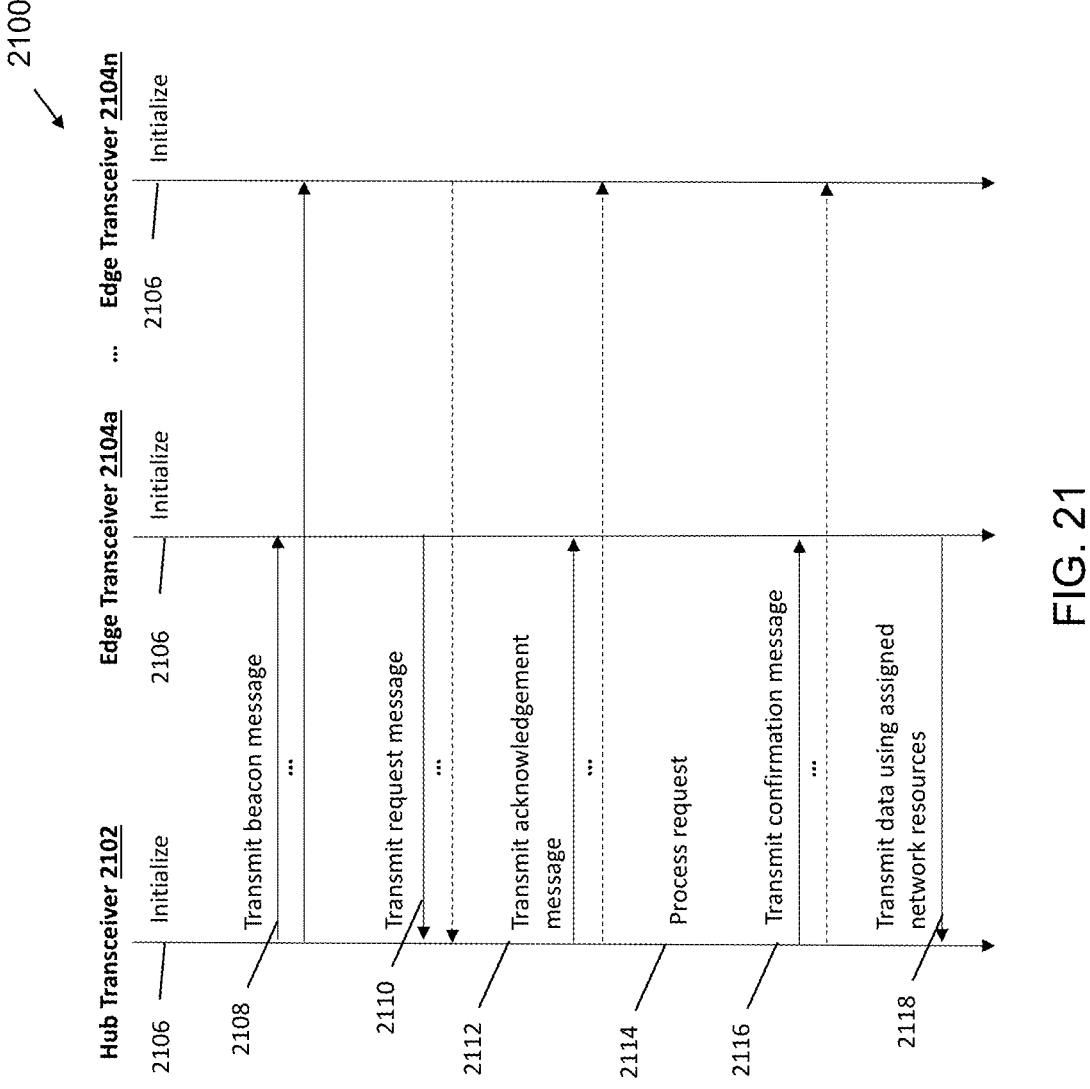
FIG. 21 is a diagram of an example process for configuring transceivers for use on an optical communications network

As an example, FIG. 21 shows a process 2100 for configuring transceivers for use on an optical communications network. The process 2100 can be performed by a hub transceiver 2102 and one or more edge transceivers 2102a-2102n. In some implementations, the hub transceiver 2102 can be similar to the primary transceivers 106 described herein (e.g., with respect to FIGS. 1, 2A-2C, and 18). In some implementations, each of the edge transceivers 2102a-2102n can be similar to the secondary transceivers 108 described herein (e.g., with respect to FIGS. 1, 2A-2C, and 18).

Figure 29:
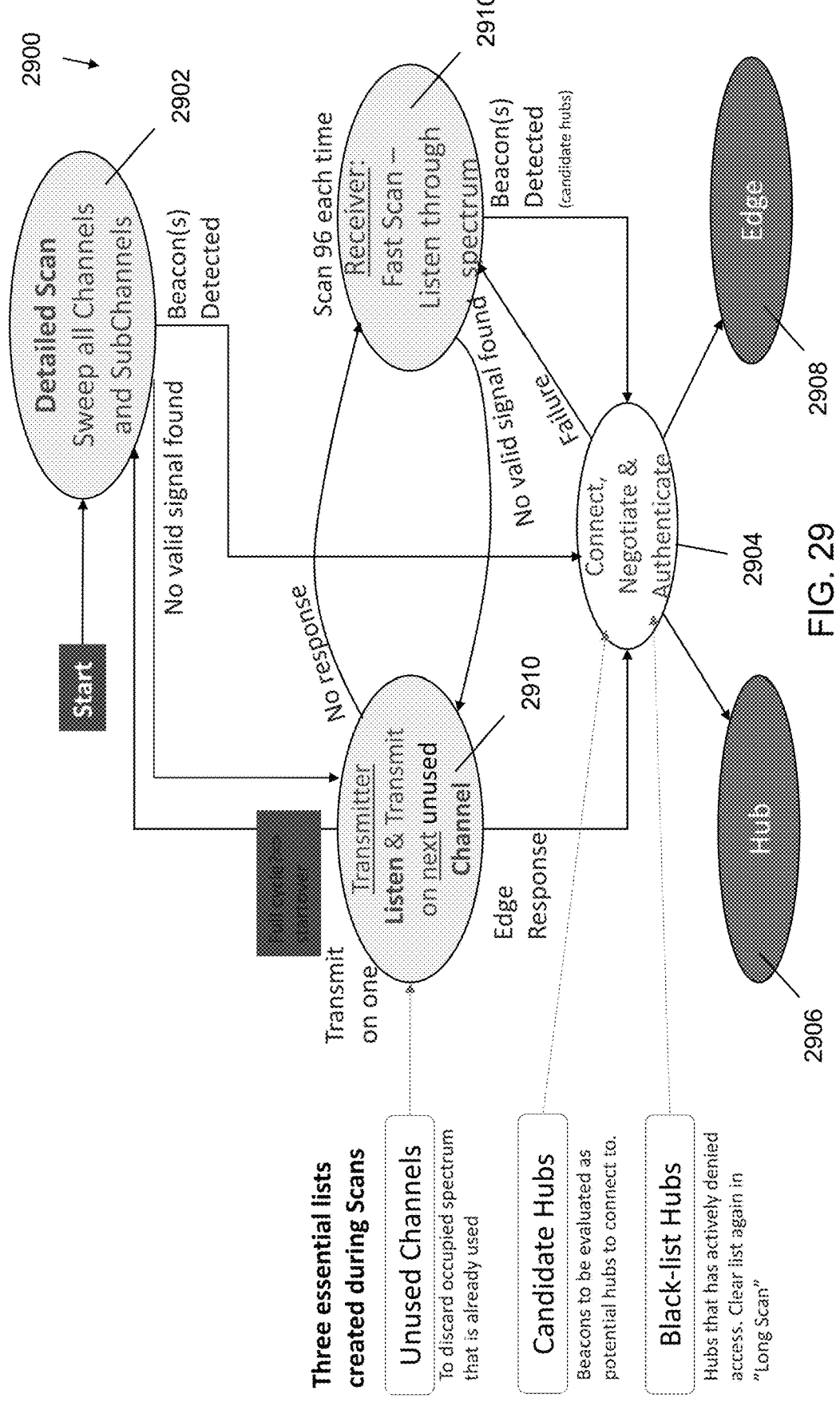
FIG. 29 is a diagram of an example process for dynamically configuring a transceiver as a hub transceiver or an edge transceiver.

In some implementations, at least some of the transceivers can be initially identical to one another (e.g., initially identical in configuration). In some implementations, these transceivers can be re-configured to function as a hub transceiver or an edge transceiver as a part of a configuration process (e.g., once the transceivers have established communications with one another). An example configuration process is shown in FIG. 29.

According to the process 2100, each of the hub transceiver 2102 and the edge transceivers 2102a-2102n are initiated for operation (block 2106).

As an example, the hub transceiver 2102 can power up one or more of its components (e.g., one or more of the components described with respect to FIGS. 4A, 4B, 5, and 6). Further, the hub transceiver 2102 can determine which optical spectrum has been assigned to it for creation and distribution of optical subcarriers among edge transceivers for communication over the optical communications network, and "power up" each of those optical subcarriers In some implementations, an "idle" optical subcarrier may be transmitted that carries information indicative of a blank data frame, which can be a data frame that includes a pre-defined pattern of data, such as all zeros, all ones, or some other pattern of bits. In some implementations, the idle subcarrier can carry information indicative of a random or pseudo-random data (e.g., a pseudo random bit sequence, PRBS).

Figure 33:
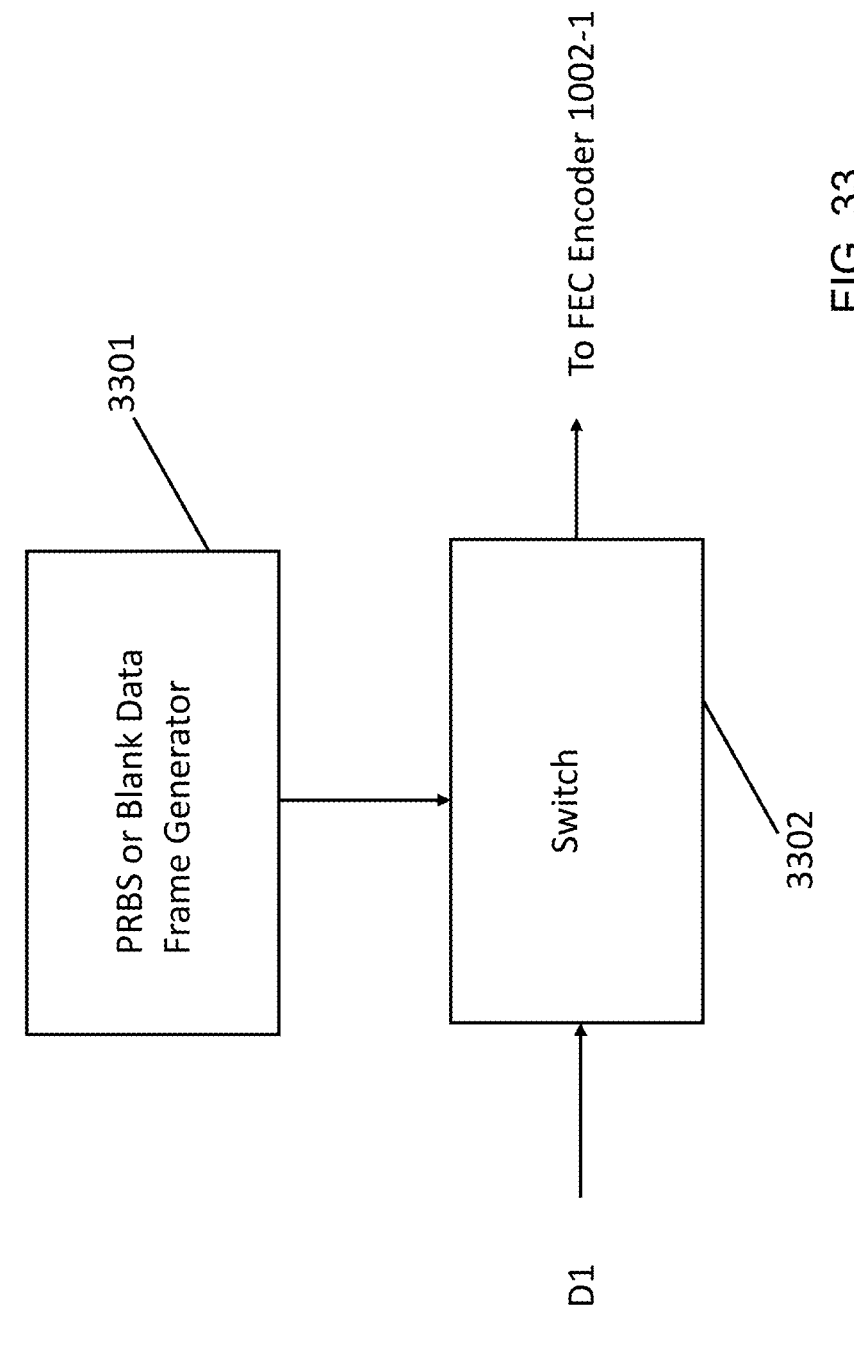
FIG. 33 is a diagram of example of circuitry for generating an optical subcarrier carrying data associated with a PRBS or blank packets.

FIG. 33 shows an example of circuitry 3300, which may be employed to generate an optical subcarrier, here, SC1, carrying data associated with a PRBS or blank packets, such that optical subcarrier SC1 is an idle subcarrier. Circuitry 3300 includes generator circuit 3301, which generates PRBS or blank frames as an output. Circuitry 3300 also includes a switch 3302 that is coupled to receive the output of circuit 3301 as well as user data stream D1. In a first mode, switch 3302 supplies user data stream D1 to FEC encoder circuit 1002-1, which in turn supplies an encoded output that is further processed, as described in connection with FIGS. 4A and 5, to provide optical subcarrier SC1.

Switch 3302, under control of control circuit 1161, for example, may be configured in a second mode, in which switch 3302 supplies the PRBS or blank data frames to FEC encoder circuit 1002-1 instead of user data stream D1. In that case, the PRBS or blank data frames are processed, as described in connection with FIGS. 4A and 5, to provide optical subcarrier SC1 carrying information indicative of such PRBS or blank data frames, such that optical subcarrier SC1 may be considered an idle subcarrier.

Examples of optical subcarriers are described, for example, with respect to FIGS. 3 and 10. In some implementations, data regarding the hub transceiver's assigned optical subcarriers can be stored in a storage device of the hub transceiver and/or in a firmware of the hub transceiver. In some implementations, data regarding the hub transceiver's assigned optical subcarriers can be transmitted to the hub transceiver from an external source (e.g., the central software 111).

In some implementations, the hub transceiver 2102 can also determine the allocation of data capacity or bandwidth associated with optical subcarriers to one or more of the edge transceivers for use on the optical communications network. In some implementations, data regarding these allotments also can be stored in a storage device of the hub transceiver and/or in a firmware of the hub transceiver.

Further, the edge transceivers 2102a-2102n also can power up one or more of their components (e.g., one or more of the components described with respect to FIGS. 8, 9A, and 9B). Further, the edge transceivers 2102a-2102n can monitor the optical communications network for the presence of the hub transceiver 2102. For instance, the edge transceivers 2104a-2104n can "scan" or search the optical signals output from one or more hub transceivers prior to establishing communication with such hub transceiver(s). Such scanning is described in greater detail below.

After initialization, the hub transceiver 2102 broadcasts a beacon message to each of the edge transceivers 2104a-2104n (block 2108) by way of, for example, one or more of the AM signals noted above. The beacon message includes information that enables each of the edge transceivers to request an allotment of bandwidth associated with one or more optical subcarriers for use on the optical communications network. For example, the beacon message can include the identity of the hub transceiver 2102 (e.g., a unique identifier that differentiates the hub transceiver from other hub transceivers on the optical communications network). As another example, the beacon message can include a list of bandwidths of each of the optical subcarriers that have been assigned to the hub transceiver 2102 for allotment, the properties of each of the optical subcarriers (e.g., the frequencies and bandwidths associated with each optical subcarrier), and the status of each of the optical subcarriers (e.g., whether it has already been allotted to an edge transceiver, or whether it available for allotment to an edge transceiver). As another example, the beacon message can include an indication of the number of edge transceivers that are currently connected to hub transceiver 2102 and/or an identifier of each of those edge transceivers (e.g., a unique identifier that differentiates the edge transceiver from other edge transceivers on the optical communications network). As another example, the beacon message can include an indication the properties of the hub transceiver 2102 (e.g., the type of modulation used by the hub transceiver 2102 in communicating with other types, the type of error correction used by the hub transceiver 2102, or any other information regarding the hub transceiver 2102 and its operations). As another example, the beacon message can include instructions for requesting an allotment of one or more optical subcarriers (e.g., an indication of a procedure that is to be followed by the edge transceiver to request an allotment of one or more optical subcarrier from the hub transceiver, the number of idle optical subcarriers that are required to enable certain line systems and communications protocols, etc.). The information associated with the beacon message may be carried by an AM signal noted above and received by control circuit 1161 present in each of the hub and/or leaf nodes for adjusting the functionality or configuration of one or more components or circuits shown in FIGS. 4A, 4B, 5, 6A, 8, and 9A-9C in the hub and/or leaf nodes.

In some implementations, the beacon message can be broadcast to multiple ones of the edge transceivers 2104a-2104n (or to all the edge transceivers 2104a-2104n) concurrently. For example, the beacon message can be broadcast to each of the edge transceivers 2104a-2104n using a common OOB baseband carrier, such as the AM signals noted above, whereby each of the edge transceivers 2104a-2104n receives a respective copy of the beacon message concurrently (or substantially concurrently). Further, the beacon message can be broadcast repeatedly over a period of time (e.g., periodically or intermittently).

After receiving the beacon message from the hub transceiver 2102, each of the edge transceivers 2104a-2104n can transmit a message to the hub transceiver 2102 requesting allotment of bandwidth associated with the optical subcarriers (block 2110). The bandwidth allotment request may be a request for to assign an optical subcarrier to the edge transceiver. Alternatively, the allotment request may be a request for a certain amount of capacity, which may be distributed over multiple subcarriers or may be associated with one subcarrier. For example, the bandwidth allotment request may be a request for data capacity associated with a specific subcarrier. Such a request may include a reference to or an identification of a specific optical subcarrier. In another example, the bandwidth allotment or allocation request may be a request for capacity without reference to a particular subcarrier. In that case, the hub transceiver may assign bandwidth associated with one subcarrier or may assign bandwidth shared by multiple subcarriers. That is, in one example, if each subcarrier has an associated bandwidth or capacity of 100 Gbit/s, and the edge transceiver requests 100 Gbit/s, the hub may assign one subcarrier to the edge transceiver, or assign 50 Gbit/s from two subcarriers to the edge transceiver.

In the example shown in FIG. 21, control circuit 1161 in a first edge transceiver 2104a can determine, based on the beacon message, that one or more particular optical subcarriers or a certain amount of bandwidth or capacity are available for use on the optical communications network. In turn, the edge transceiver 2104a can generate a request message in accordance with the instructions provided in the beacon message, and include in the request message an indication of the available bandwidth or one or more requested optical subcarriers (e.g., a list of the identifiers of the requested optical subcarriers or bandwidth, such as an index value). In one example, the request message may be output by control circuit 1161 as signal supplied to a VOA, such as VOA 915 in FIG. 4A, to amplitude modulate (AM) the optical subcarriers supplied by the leaf node transmitter. Alternatively, the message may be output as data CD1, which is subject to further processing as discussed above in FIG. 4B to output the AM signal. In a further example, the message may output by control circuit 1161 as a plurality of gain values G1 to G8 to generate the AM signal, as noted above with respect to FIG. 6A. It is understood that, in one example, the transmission and receipt of all messages described herein between the hub and edge nodes may be carried out using the AM signal generation and detection techniques described herein.

In some implementations, each of the edge transceivers 2104a-2104n can transmit respective request messages in a manner similar to that described above to the hub transceiver 2102 over a common communications channel (e.g., a "party line"). For example, each of the edge transceivers 2104a-2104n can repeatedly transmit the respective request messages periodically or intermittently, such as according to a random or pseudo random interval) until the edge transceiver receives the message acknowledging the request, or until a certain "time-out" interval has expired. Accordingly, the hub transceiver 2102 may receive multiple request messages from multiple edge transceivers using the common communications channel, such as a common AM frequency, over time.

Upon receiving a request message, a control circuit 1161 in the hub transceiver 2102 detects the information contained in the message in a manner similar to that described. Based on the received information, control circuit 1161 in the hub generates a message that is carried by a further AM signal generated in a manner described above (see, for example, FIGS. 4A, 4B, and 6A). The further AM signal is transmitted to the edge transceiver 2104a acknowledging the request (block 2112). In some implementations, the edge transceiver 2104a can repeatedly transmit the message requesting allotment of bandwidth (e.g., repeat step 2110 periodically or intermittently, such as according to a random or pseudo random interval) until the edge transceiver receives the message acknowledging the request, or until a certain "time-out" interval has expired.

Further, upon receiving the request message, the hub transceiver 2102 processes the request in a manner similar to that described above (block 2114). As an example, the hub transceiver 2102 can determine whether the request can be fulfilled (e.g., whether the requested bandwidth is available or one or more optical subcarriers are still available for allotment to an edge, or whether the one or more digital subcarriers have already been allotted). If so, the hub transceiver 2102 can fulfill the request (e.g., by assigning the one or more requested optical subcarrier or the requested bandwidth to the edge transceiver 2104a that had made the request, and monitoring those optical subcarrier(s) for transmission from the edge transceiver). Further, the hub transceiver can record the subcarrier assignment and/or bandwidth allotment (e.g., in a storage device or in its firmware). However, if the request cannot be fulfilled, the hub transceiver 2102 can determine, in some instances, one or more modifications to the request that would enable the request to be fulfilled (e.g., identifying additional bandwidth or optical subcarriers that are available to be assigned to the edge transceiver).

In some implementations, processing the request can also include authenticating an identifier of the edge transceiver 2104*a* (e.g., an Initial Device Identifier, IDevID), verifying the role associated to the edge transceiver 2104*a* with respect to the optical communications network (e.g., the role of an "edge" transceiver), modifying the role assigned to the edge transceiver 2104*a*, verifying that the edge transceiver 2104*a* can perform particular operations with respect to the optical wireless network, verifying licenses associated with the edge transceiver 2104*a*, updating the licenses associated with the edge transceiver 2104*a*, and/or any other function. In one example, control circuit 1161 may be configured to carry out each of the foregoing based on information contained in the received message.

In some implementations, one or more of the edge transceivers can be associated with a license that regulates the use of those edge transceivers. For example, a first entity (e.g., a vendor of the edge transceivers) may grant a license to a second entity (e.g., a user of the edge transceivers) that authorizes the edge transceiver to operate according to a particular set of capabilities (e.g., a particular bandwidth or throughput) and/or perform a particular set of operations (e.g., one or more of the operations described herein). Data regarding this license can be stored on the edge transceivers, and modified if any changes to the license are made (e.g., as a part of the process 2100). The edge transceivers can operate in accordance with the license data.

In some implementations, a license may authorize the use of one or more particular transceivers. For example, if a user wishes to deploy 100 transceivers, he may obtain a license authorizing the use of those 100 transceivers, and install those 100 transceivers in an optical communications network. Data regarding that license can be transmitted to and stored on those transceivers to regulate their use.

In some implementations, a license may authorize the use of a particular number of licenses, regardless of the specific transceivers that are used at any given time. For example, if a user wishes to deploy 100 transceivers, he may obtain a license authorizing the use 100 transceivers, and deploy 100 transceivers in an optical communications network. Data regarding that license can be transmitted to and stored on those transceivers to regulate their use. Subsequently, the user can replace one or more of those transceivers with other transceivers, so long as the total number of deployed transceivers does not exceed 100. In some implementations, this may be referred to as a "floating" license.

In some implementations, an edge transceiver's license can be verified continuously, periodically, or intermittently (e.g., by the central software 111 or some other component). In some implementations, an edge transceiver that does not comply with the license can be remotely disabled (e.g., by the central software 111 or some other component) until an updated license is provided or the edge transceiver is reconfigured to comply with the license.

After processing the request, the hub transceiver 2102 transmits a message to the edge transceiver 2104*a* confirming that the request was processed (block 2116) in a manner similar to that described above. If the request was successfully fulfilled by the hub transceiver 2102, the message can include an indication that the requested bandwidth was successfully allotted or one or more optical subcarriers were assigned to the edge transceiver 2104*a*. If the request could not be fulfilled by the hub transceiver, for example, by control circuit 1161 in the hub transceiver, the message can include an indication that the requested subcarrier assignment or bandwidth allocation could not be completed, and an indication of one or more one or more modifications to the request that would enable the request to be fulfilled (e.g., an indication of one or more alternative optical subcarriers that are available for assignment or, for example, another amount of bandwidth is available, such as a lesser amount than that requested).

Upon receiving a message confirming that the requested optical subcarrier was successfully assigned or the requested bandwidth had been allotted to the edge transceiver 2104*a*, the edge transceiver 2104*a* can transmit data to the hub transceiver 2102 using the assigned optical subcarriers (e.g., as described with respect to FIGS. 3 and 10) (block 2218).

Alternatively, upon receiving a message indicating that the requested bandwidth could not be allotted or the requested optical subcarrier could not be assigned could not be assigned to the edge transceiver 2104*a*, the edge transceiver 2104*a* can modify its request and transmit the modified request to the hub transceiver 2102 (e.g., repeating step 2110).

Some or all of the process 2100 can be repeated until each of the edge transceivers 2104*a*-2104*n* has been allotted a respective bandwidth or assigned a particular optical subcarrier assigned to each such edge transceiver.

As described above with respect to FIG. 21, in some implementations, each of the edge transceivers 2102*a*-2102*n* can monitor the optical communications network for the presence of the hub transceiver 2102. Detecting the presence of hub transceivers will next be described with reference to FIGS. 22A to 22E.

Figures 22A, 22B, 22C:
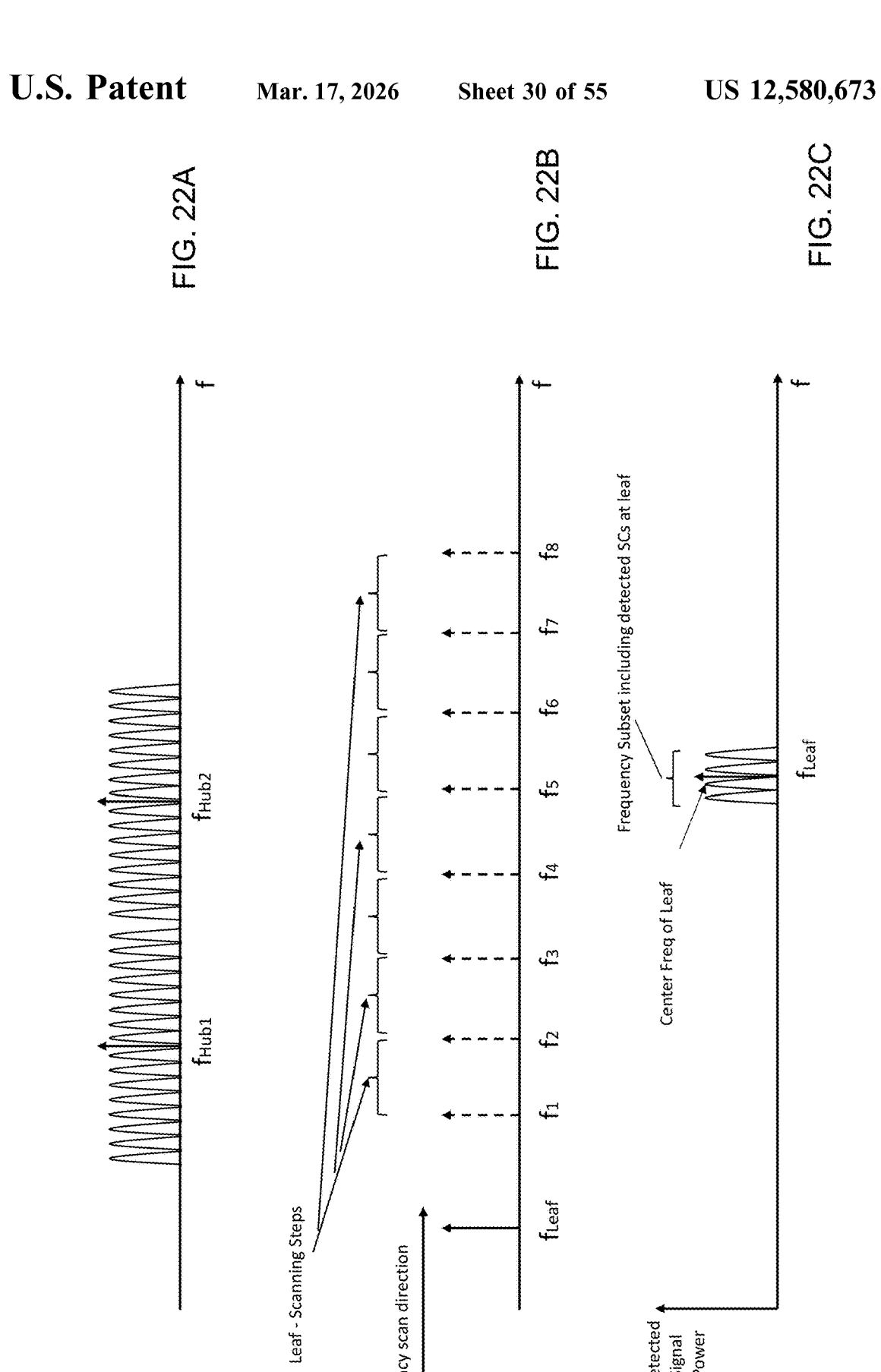
FIG. 22A-22C are diagrams of an example technical for performing an optical spectrum analysis.
Figure 22D:
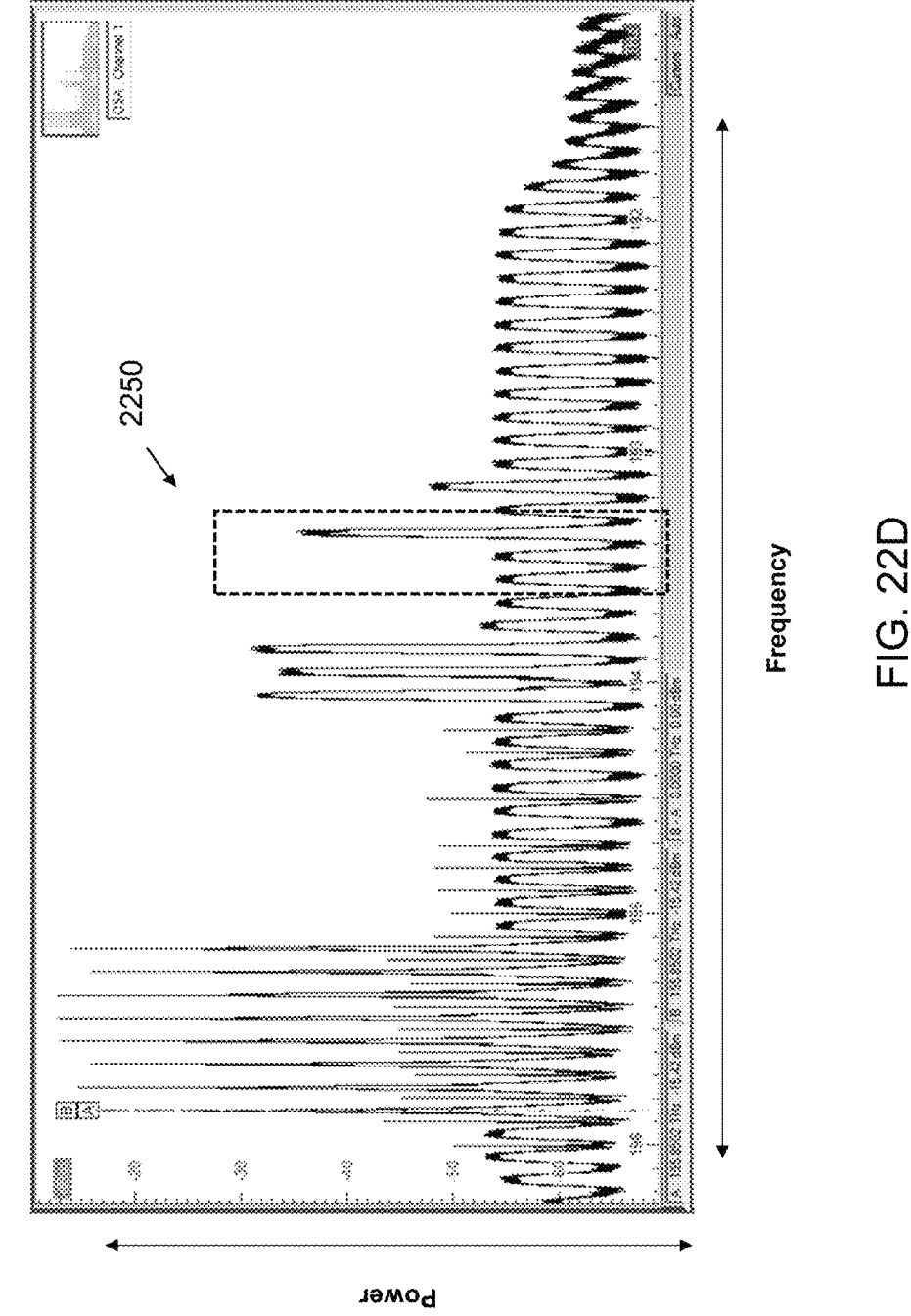
FIGS. 22D and 22E are diagrams of an example power spectrum generated based on an optical spectrum analysis.

As noted above, the frequency of light or an optical signal output local oscillator laser 1110 (FIG. 8) or shared laser 908 (FIG. 9C) can be tuned based on an output from control circuit 1161 or DSP 1150. As shown in FIG. 22A, assuming that there are multiple hub transceivers that are optically coupled to a given one of edge transceivers 2104, the edge transceiver, in one example, receives optical subcarriers output from a first hub transceiver that define a range of frequencies, SC Group 1, based on a difference in frequency between the highest subcarrier frequency and the lowest subcarrier frequency in that group of subcarriers. Optical subcarriers output from a second hub transceiver define a range of frequencies, SC Group 2, based on a difference in the highest subcarrier frequency and the lowest subcarrier frequency in the group of subcarriers output from the second hub. The first and second hub transceivers are similar to the hub transceivers described above. Typically, the laser in the first hub transceiver has a frequency fHub1, which is central or in the middle of SC Group 1, and the laser in the second hub transceiver has a frequency fHub2 that is central or in the middle of SC Group 2.

As shown in FIG. 22B, the edge transceiver laser, such as laser 908 or 1110, described above may be tuned in a manner described above to change in frequency of light output thereof over a range of frequencies, such as the C-Band (1530-1565 nm). In one example, the light output from laser 908 or 1110 is scanned or tuned in a step-wise manner, such that each step is the same. That is, in one example, the frequency of the local oscillator light (fLeaf) output from laser 908 or 110 is increased, starting at or near the lowest frequency of the tunable frequency range, such as the C-Band, to the highest frequency or a frequency near the highest frequency, in steps or increments of 50 GHz or some other frequency increment. In practice, the step size can be smaller or larger, depending on the implementation. In another example, the steps or increments may be nonuniform or not equal to one another. Also, the scan may be made by decreasing the local oscillator frequency in increments instead of increasing the local oscillator frequency, as described above. In the example shown in FIG. 22B, fLeaf is initially set to frequency f1, and then increased in a step-wise manner to frequency f8, such that the fLeaf remains fixed for a predetermined period of time at each of frequency f1-f8 before advancing to the next frequency. Such period of time is sufficient for circuitry described above in the receiver portion of the transceiver to detect the AM modulation of the subcarriers output from the hub transceiver. Accordingly, a number of frequencies (e.g., a number of frequency subsets) are scanned.

In another example, the local oscillator frequency may be continuously scanned or tuned within frequency ranges, such as ranges between frequencies f1 and f2; f2 and f3; f3 and f4; f5 and f6; and f7 and f8. In a further example, the local oscillator frequency may be scanned or tuned with spectral gaps between successive ranges. Accordingly, in the example shown in FIG. 22B, the local oscillator frequency may be scanned between frequencies f1 and f2; f3 and f4; f5 and f6; and f7 and f8, whereby the ranges between f2 and f3; f4 and f5; and f6 and 7 are skipped. Such skipping may be employed to realize a faster scan or search of the optical outputs of the hub or hubs.

When the frequency of light output laser 908 or 1110 is within SC Group 1, the light output from laser 908 or 1110 will "beat" with light at such subcarrier frequency. In another example, when such local oscillator light is within a predetermined frequency range of the light output from the hub transceiver, such beating may occur. As a result, the circuitry described above in FIGS. 8, 9A, and 9B, in one example, detects the amplitude modulation of the incoming light based on coherent detection. Data associated with such modulation, includes, for example, an identification of hub transceiver as well as the frequency of light output by the laser provided in the hub. In addition, the data may include instructions for tuning laser 908 or 1110 to have a center frequency (fLeaf) at which a group of subcarriers output from the hub and designated for the edge or leaf node may be detected in a manner similar to that described above with reference to FIGS. 8 and 15. In the example shown in FIG. 22C, the edge or leaf transceiver has a bandwidth sufficient to detect and process four subcarriers output from the hub transceiver, two subcarriers on either side of fLeaf. Instructions included in the data associated with the above-described amplitude modulation may identify one or more of these subcarriers for use by the leaf or edge node or that the edge node should communicate with another hub.

The edge node may detect amplitude modulation of the subcarriers output from the second hub and have frequencies in SC Group 2 in a manner similar to that described above. In one example, after the subcarriers output from both hubs have been detected, the edge node may communicate with the optical gateway in a manner described above (see FIG. 7) with request for the optical gateway to identify which hub the edge node should communicate with. The optical gateway, in turn, provides information identifying which subcarriers have been designated for the edge node, and laser 908 or 1110 in the edge node is tuned accordingly for processing of the information or data carried by such subcarriers in a manner similar to that described above in connection with FIGS. 7 and 8.

In some implementations, an edge transceiver laser can scan a particular frequency range according to a particular step size. For example, an edge transceiver laser, such as laser 908 or 1110, can tune to a particular frequency in the frequency range (e.g., using a local oscillator) and measure the power of the signal at that frequency (e.g., using one or more of the components of the receiver optics and A/D block 1100 and Rx DSP 1150, as shown in FIGS. 8, 9A, and 9B). Further, the edge transceiver can repeat the measurement process for multiple different frequencies within the frequency range (e.g., by increasing or decreasing the tuned frequency according to the step size). As noted above, in some implementations, an edge transceiver can scan a particular frequency range according to a step size such as 50 GHz. However, in practice, the step size can be smaller or larger, depending on the implementation.

Figure 22E:
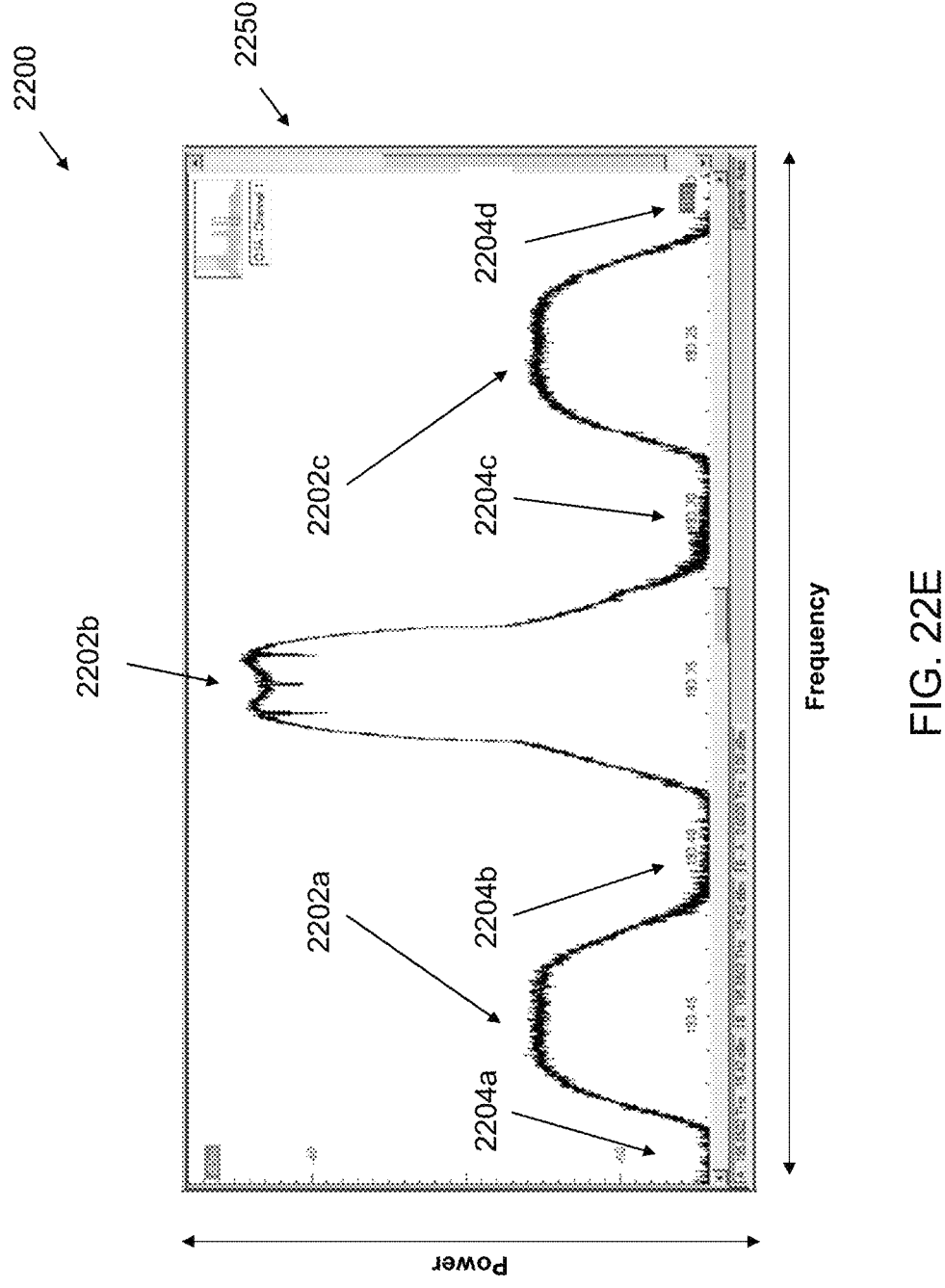

FIG. 23D shows the power spectrum 2200 across a particular frequency range (e.g., an example "full" or "complete" frequency range scanned by the edge transceivers), and FIG. 22E shows the power spectrum 2200 across a subset of that frequency range (e.g., indicated by the box 2250). In this example, the horizontal axis of the power spectrum 2200 indicates the frequency of the received signal, and the vertical axis indicates that power of the signal at the frequency.

The power spectrum can be used to identify a carrier signal or other frequencies of optical subcarriers output from a hub transceiver. For instance, in the example shown in FIG. 22E, the power spectrum 2200 includes three peaks 2202*a*-2202*c*, and several valleys 2204*a*-2204*d*. The valleys 2204*a*-2204*d* indicate a relative absence of power in particular frequency bands (e.g., indicating that the carrier signal of the hub transceiver is unlikely to be in those frequency bands).

In contrast, the peaks 2202*a*-2002*c* indicate a relatively higher power in particular frequency bands, which may associated with the modulated optical signal output from a hub transceiver or some other localized peak in power (e.g., an amplified spontaneous emission (ASE) that does not correspond to a carrier signal). In some implementations, an edge transceiver can distinguish between a carrier signal of a hub transceiver and other signals (e.g., an ASE) based on the power of the received signal in particular frequency bands. For instance, circuitry described above in the edge receiver can determine that the frequency or frequency band having the highest power is likely to be a carrier signal from a hub transceiver, whereas frequency or frequency bands having comparatively lower power is likely to be an extraneous signal (e.g., an ASE). As an example, as shown in FIG. 22E, the edge transceiver can determine, based on the power spectrum 2200, that the frequency band for peak 2202*b* is likely to contain a carrier signal from a hub transceiver, whereas the peaks 2202*a* and 2202*c* are likely to be ASEs.

In some implementations, an edge transceiver can distinguish between four different states based on the power spectrum, and based on whether a beacon message was received using a particular frequency or frequency band.

For example, a first state can correspond to the presence of a carrier signal from the hub transceiver 2102. In some implementations, the first state can be identified by identifying, using the circuitry shown in FIG. 9A, for example, a peak in the power spectrum that is above a particular first threshold power (e.g., an empirically determined threshold value), and determining that a beacon message was received in the corresponding frequency or frequency band. In the example shown in FIG. 22E, the peak 2202*b* could correspond to the first state.

As another example, a second state can correspond to the presence of subcarriers from another hub transceiver, as detected in a manner similar to that described above with respect to FIGS. 22A-22C, that is not compatible with the edge transceiver (e.g., a "legacy" hub transceiver). In some implementations, the first state can be identified by identifying a peak in the power spectrum that is above a particular first threshold power (e.g., an empirically determined threshold value), and determining that a beacon message was not received in the corresponding frequency or frequency band.

As another example, a third state can correspond to the presence of an ASE (e.g., implying that a line system passband is open, but that a hub transceiver has not been powered up yet). In some implementations, the third state can be identified by identifying a peak, in a manner similar to that described above, in the power spectrum that is less than the first threshold power but greater than a second threshold power (e.g., another empirically determined threshold value). In the example shown in FIG. 22E, the peaks 2202a and 2202c could correspond to the third state.

As another example, a fourth state can correspond to an unused communications channel. In some implementations, the third state can be identified by identifying a peak in the power spectrum in a manner similar to that described above that is less than a third threshold power (e.g., another empirically determined threshold value). In the example shown in FIG. 22E, the valleys 2204a-2204d correspond to the fourth state.

In some implementations, an edge transceiver can distinguish between the four different states based on a relative comparison of the powers of the identified peaks and valleys. For example, the edge transceiver can identify the N peaks having the greatest power among the peaks, and identify those peaks as potentially including a beacon message from a hub transceiver (e.g., either the first state or the second state). Upon confirming that a beacon message was received in one of the frequencies or frequency bands corresponding to a particular peak of the N peaks, the edge transceiver can identify that peak as corresponding to the first state. Further, upon confirming that a beacon message was not received in one of the frequencies or frequency bands corresponding to the other peaks of the N peaks, the edge transceiver can identify those peaks as corresponding to the second state. Further, the edge transceiver can identify the peaks other than the N peaks as corresponding to the third state or the fourth state.

As described above with respect to FIG. 21, in some implementations, the hub transceiver 2102 can broadcast a beacon message by employing AM modulation, for example, to multiple ones of the edge transceivers 2104a-2104n (or to all the edge transceivers 2104a-2104n) concurrently. For instance, in another example, the beacon message can be broadcast to each of the edge transceivers 2104a-2104n using a common OOB baseband carrier, such that each of the edge transceivers 2104a-2104n receives a respective copy of the beacon message concurrently (or substantially concurrently).

Figure 23B:
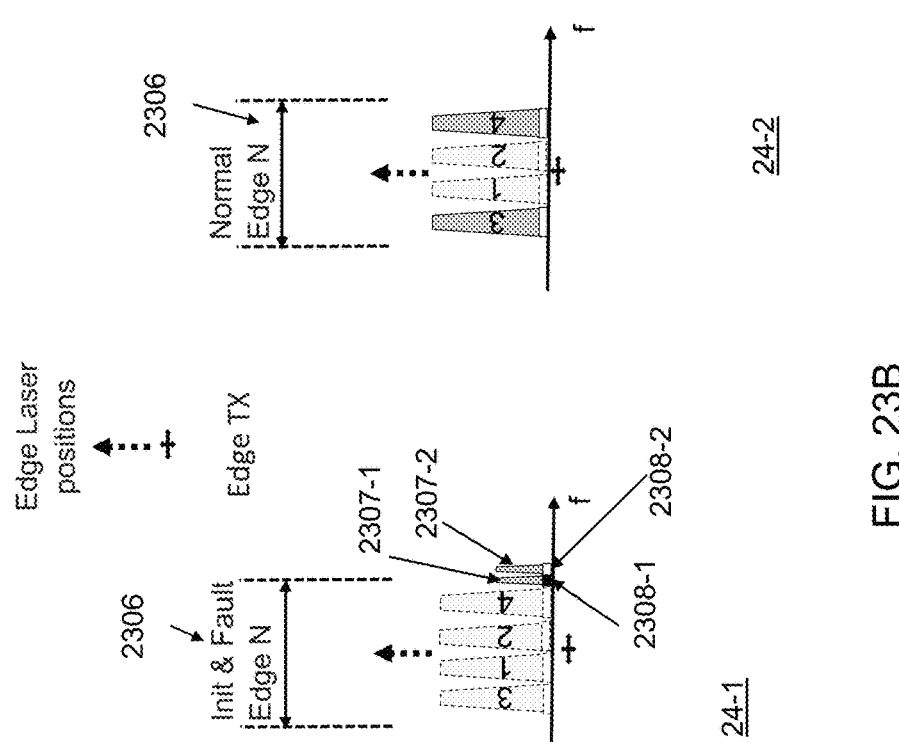
FIG. 23B is a diagram of an example signal transmission by an edge transceiver.
Figure 23A:
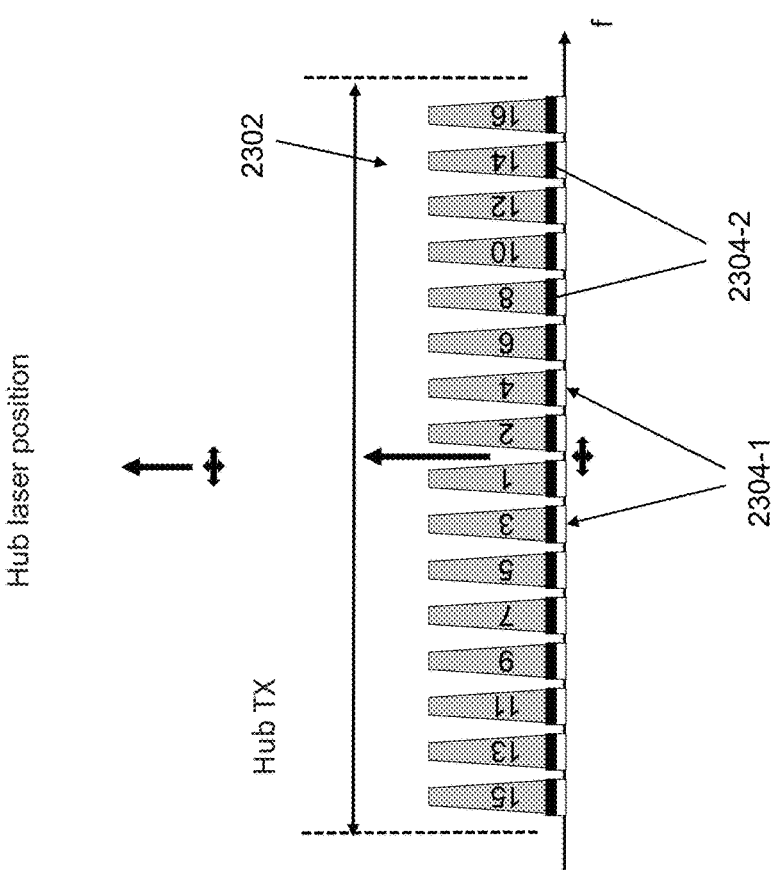
FIG. 23A is a diagram of an example broadcast transmission by a hub transceiver.

An example depiction of a broadcast transmission of a beacon message from a hub transceiver is shown in FIG. 23A during an initialization phase, for example, when an edge transceiver, such as edge transceiver 2104a, is initially coupled to the hub node. As shown in FIG. 23A and in one example, the beacon message may constitute first and second amplitude modulations imparted across subcarrierss 1-16 (collectively labeled as 2302) output from a hub transceiver. Such amplitude modulation is generated in a manner similar to that described above, such as in connection with FIGS. 3, 4A, 5, and 6A, and are represented by rectangles 2304-1 and 2304-2 on each of the optical subcarriers 1-16. in FIG. 23A. In one example, the first amplitude modulation may have an associated first frequency, such as a frequency in a range of 5 MHz to 6 MHz, and the second modulation has an associated second frequency, such as a frequency in a range of 3 MHz to 4 MHz. In a further, example, the first modulation carries data indicative of first control information intended for the optical gateway, and, accordingly, is detected by the optical gateway in a manner similar to that described above in connection with FIG. 7. In an implementation, the second modulation carries data indicative of second control information intended for the edge nodes, and, accordingly, is detected by the receiver in the edge node transceiver in a manner similar to that described above in connection with FIGS. 8, 9A, and 9B. In some implementations, the identity of the center frequency or position of the hub laser can be provided in a beacon message that is broadcast by the hub transceiver 2102.

In the edge node, local oscillator light, supplied from a laser, such as laser 908 (FIG. 9C) or 1110 discussed above, may be tuned in a manner similar to that described above to detect the second amplitude modulation embedded over or imparted onto optical subcarriers 1-16 (see FIGS. 8, 9A, and 9B). In some implementations, circuitry in the edge node, such as control circuit 1161, receive the control information associated with the second amplitude modulation, and, based on the received control information, control circuit 1161 may generate a message that is used to amplitude modulate a subcarrier that is transmitted back to the hub transceiver. The message may include a request for an allotment of bandwidth or capacity of an assignment of one or more subcarriers to the edge node. In one example, a transmitter laser, such laser 908 (see FIGS. 4A and 9C) may be tuned in a manner noted above to have a frequency, such that upon modulation, the resulting subcarrier(s) may be detected by the hub by coherent detection.

FIG. 23B shows a power spectral density plot showing a first subcarrier, 2307-1, that carries control information, such as the bandwidth allotment request in the form of an amplitude modulation represented by rectangle 2308-1. A second optical subcarrier, 2307-2, is shown that may be amplitude modulated to carry control information to the optical gateway. Rectangle 2308-2 represents such amplitude modulation of the second optical carrier 2307-2.

Figure 34:
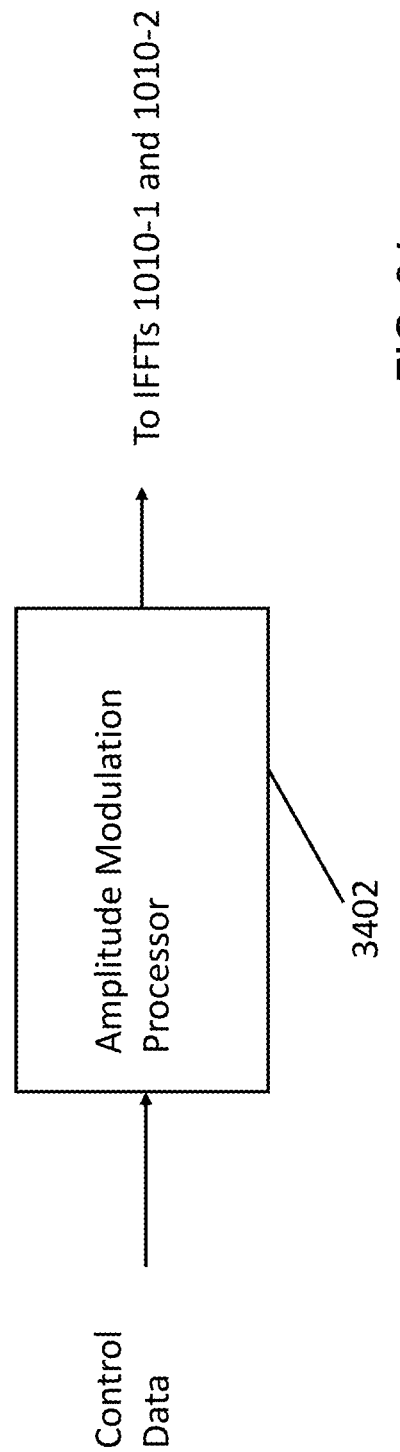
FIG. 34 is a diagram of example circuitry for generating subcarriers and respective amplitude modulations thereof.

FIG. 34 illustrates circuitry, which, in one example, is employed to generate the subcarriers 2307-1 and 2307-2 and respective amplitude modulations thereof, 2308-1 and 2308-2 during the initialization phase. Namely, as noted above with respect to FIGS. 5 and 14, inverse Fast Fourier Transform circuits 1010-1 and 1010-2 may receive inputs from circuit block 903-2 to generate polarization multiplexed signal, which constitutes a subcarrier, also referred to above as an out of band (OOB) signal. In the example shown in FIG. 34, instead of supplying signal from circuit block 903-2 in a Tx DSP provided in the edge node, signals indicative of an amplitude modulation carrying control data or information are input to IFFTs 1010-1 and 1010-2. As a result, instead of a polarization multiplexed signal or optical subcarrier being output, an amplitude modulated optical subcarrier 2307-1 and 2307-2 is output.

As with the polarization multiplexed optical subcarrier described above, the amplitude modulated optical subcarrier has less power and a narrower spectral width than optical subcarriers associated with transmission of information indicative of user data.

In one example, multiple edge nodes may transmit their respective optical subcarriers 2307-1 and/or 2307-2, as in a "party line." In some implementations, the amplitude modulation of each edge node may interfere or collide with one another. Accordingly, in one example, the edge nodes may continue to periodically retransmit their respective control information including the bandwidth allocation message until an acknowledgment is received from the hub node confirming that the requested optical subcarrier(s) or bandwidth was successfully assigned or allocated to the edge transceiver 2104*a*. In another example, the messages may be time division multiplexed to avoid such collisions.

In the hub, detection of AM modulation of subcarriers received from the edge node is similar to that described in the edge node (see FIGS. 8, 9A, and 9B). After receiving the bandwidth allotment or optical subcarrier assignment request from the edge node, a control circuit 1161 in the hub may assign one or more optical subcarriers or the bandwidth associated with such subcarriers to the requesting edge node. The hub node may then collectively modulate optical subcarriers 1-16 output therefrom in a manner similar to that described above to transmit data indicative of such assignment information (see FIGS. 4A, 4B, 5, and 6A). The edge node receives such optical subcarriers and detects the assignment information in a manner similar to that noted above. Based on such assignment information, control circuit 1161 in the edge node may provide signal to activate those portions of the edge node Rx and Tx DSPs for receiving/processing and transmitting the assigned optical subcarriers, and de-activate those portions of Rx and Tx DSP that would otherwise process data associated with the un-allocated optical subcarriers (see FIGS. 6B and 6C). Further based on the assignment information, the edge node laser (either laser 908 shown in FIG. 4A or the shared laser in FIG. 9C) is tuned in a manner described above to provide optical subcarriers having the frequencies indicated by the assignment information.

Accordingly, in the example shown in FIG. 23B, the assignment information provided by the hub node designated subcarriers 3 and 4 to a particular edge node. As a result, the corresponding power density plot 24-2 shows such optical subcarriers. Such subcarriers may not be transmitted prior to assignment by the hub node. Accordingly, power density plots show non-assigned subcarriers 1 and 2 (plot 24-2) in phantom. In addition, subcarriers 1-4 are shown in phantom in plot 24-1 prior to receiving the bandwidth assignment from the hub. In addition, after processing of the beacon and bandwidth assignment message, subcarriers 2307-1 and 2307-2 may not be required and are optionally not transmitted post-bandwidth assignment.

Figure 23C:
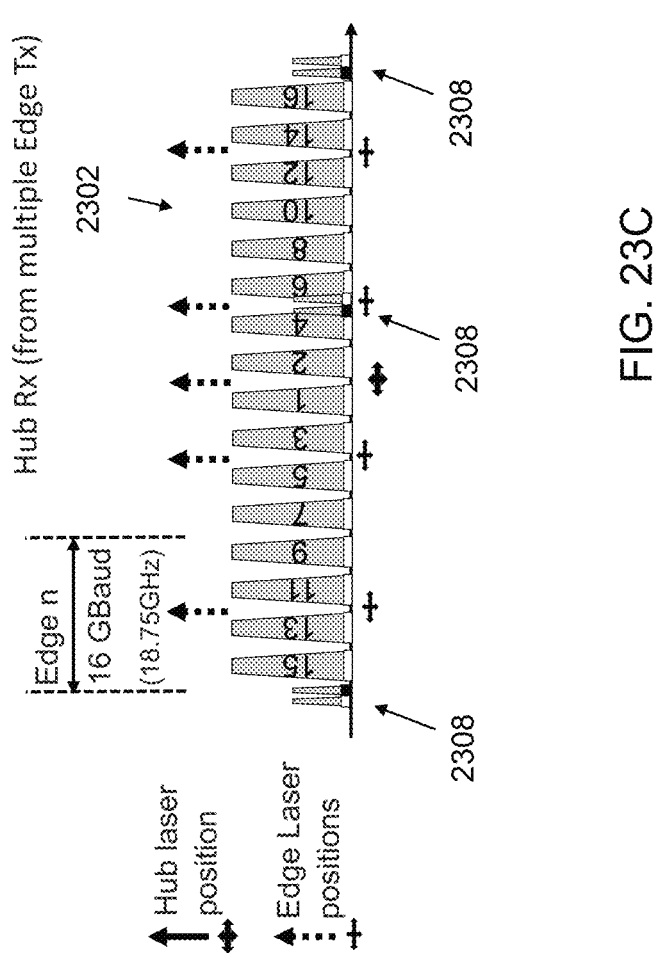
FIG. 23C is a diagram of an example signal reception by a hub transceiver.

An example depiction of subcarrier received by the hub transceiver is shown in FIG. 23C. As shown in FIG. 23C, the hub transceiver receives optical subcarriers 2302 (in this example, the optical subcarriers 1-16) transmitted by the edge transceivers, each such optical subcarrier carrying data. In a further example, the hub transceiver receives request messages and/or telemetry data from one or more of the edge transceivers according to one or more respective optical subcarriers including, for example, optical subcarriers 2307-1 and 2307-2, shown as optical subcarriers 2308.

In the example shown in FIG. 23C, based on assignment instructions received from the hub node, optical subcarriers 9, 11, 13, and 15 are transmitted from a first edge node; optical subcarriers 7, 5, and 3 are received from a second edge node; optical subcarrier 1 is transmitted from a third edge node; optical subcarrier 2 is transmitted from a fourth edge node; optical subcarriers, 4, 6, and 8 are transmitted from a fifth edge node; and optical subcarriers 10, 12, 14, and 16 are transmitted from a sixth edge node.

As described above with respect to FIG. 21, a hub transceiver can allot bandwidth or assign one or more optical subcarriers to each of the edge transceivers for use in transmitting data on the optical communications network. Example allotment techniques are shown and described with respect to FIGS. 24A and 24B. For ease of explanation, "assignment of subcarriers" or "allotment of subcarriers" and related terms refer to the assignment or allocation of bandwidth associated with the subcarriers or the data carried by the subcarriers.

In some implementations, a hub transceiver initially can assign a bandwidth or data associated with multiple contiguous optical subcarriers to a particular edge transceiver. The first optical subcarrier can be designated as a data optical subcarrier (e.g., an optical subcarrier that includes information indicative of user data), whereas the one more optical subcarriers following the data optical subcarrier can be designated as idle optical subcarriers (e.g., optical subcarriers that do not include an encoded version of the data, such as a "blank" optical subcarrier having a carrier signal only). Such idle subcarriers may carry a random bit sequence (PRBS), such as that generated by a PRBS generator circuit or may carry idle packets, which include a predetermined sequence of bits, such as all "1"s or all "0"s, as noted above.

Figure 24A:
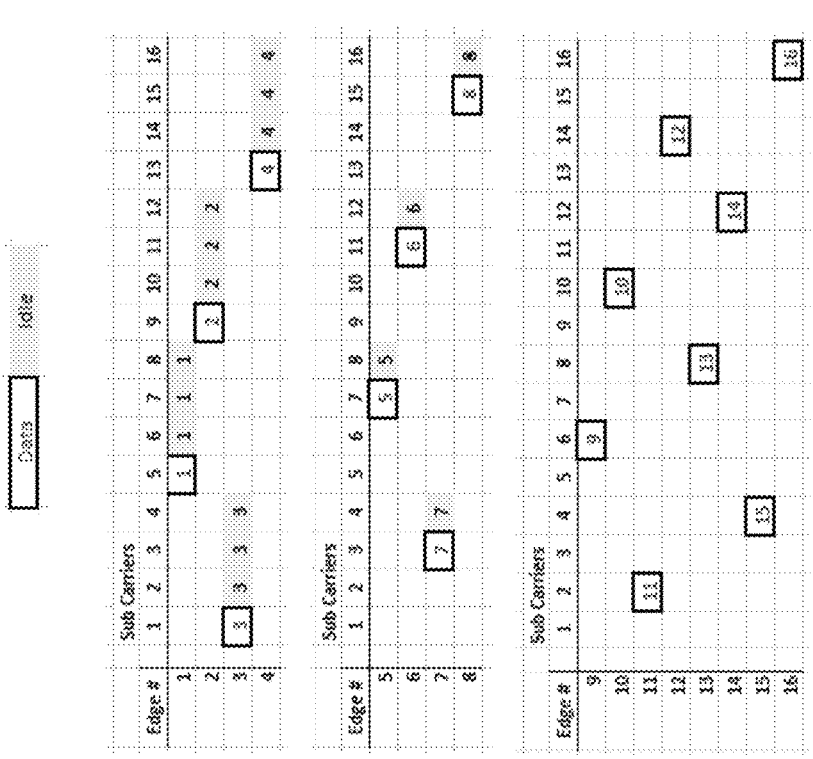

For instance, in the example shown in FIG. 24A, edge transceivers 1-4 have been assigned four continuous optical subcarriers each. For each edge transceiver, the leading optical subcarrier is designated as a data optical subcarrier, and the trailing three optical subcarriers are designated as idle optical subcarriers.

This can be beneficial, for example, as it maintains a degree of separation between each of the data optical subcarriers that are assigned to the edge transceivers, which may increase the compatibility with the optical communications network or robustness of the optical communications network against interference.

When some or all of available optical subcarriers are allotted (e.g., either as data or idle optical subcarriers), the hub transceiver can re-assign at least some of the idle optical subcarriers for use by new edge transceivers that are added to the network. Further, the idle optical subcarriers can be re-assigned in such a way that a certain degree of separation is maintained between the resulting data optical subcarriers. Such re-assignment in the uplink direction from the edge nodes to the hub node can be achieved by turning on and off subcarriers, as discussed above in connection with FIGS. 6A and 6B. Further, in the receiver portions of the edge transceiver, similar circuitry may be provided at the outputs of FFTs 1210-1 and 1210-2 in FIG. 15 to zero out and thereby frequency components associated with subcarriers carrying data not intended for a particular subcarrier. In addition, such circuitry may selectively allow the frequency components to be further processed, such that information associated therewith is output by the edge node for which the information is intended. In this example, therefore, bandwidth and data may be dynamically assigned to the edge nodes. In a further example, signals for controlling the circuitry described above in FIGS. 6A and 6B may be provided by control circuit 1161 in a manner similar to that described above. For ease of explanation, a given edge node is referred to herein as being assigned or allotted subcarriers even though the photodetectors of that edge node may also receive optical subcarriers other than the allotted subcarriers. Data or information associated with such un-allotted subcarriers is blocked or not decoded, in one example, in a manner similar to that described above.

In the example shown in FIG. 24A, once all of the optical subcarriers 1-16 have been assigned to the edge transceiver 1-4, the hub transceiver can begin re-assigning the idle optical subcarriers for use by new edge transceiver 5-8. For example, the hub transceiver can re-assign subcarriers 7 and 8 to a new edge transceiver 5 (where the optical subcarrier 7 is a data optical subcarrier, and the optical subcarrier 8 is an idle optical subcarrier). Similarly, the hub transceiver can re-assign subcarriers 11 and 12 to a new edge transceiver 6 (where the optical subcarrier 11 is a data optical subcarrier, and the optical subcarrier 12 is an idle optical subcarrier), re-allot subcarriers 3 and 4 to a new edge transceiver 7 (where the optical subcarrier 3 is a data optical subcarrier, and the optical subcarrier 4 is an idle optical subcarrier), and re-allot subcarriers 15 and 17 to a new edge transceiver 8 (where the optical subcarrier 15 is a data optical subcarrier, and the optical subcarrier 16 is an idle optical subcarrier). Accordingly, the resulting data optical subcarriers (e.g., optical subcarriers 1, 3, 5, 7, 9, 11, 13, and 15) are still separated from one another by at least one idle optical subcarrier between them.

When a total separation of data optical subcarriers is no longer feasible (e.g., the number of edge transceivers exceeds half of the total number of optical subcarriers available for allotment), the hub transceiver can re-allot any of the remaining idle optical subcarriers for use by new edge transceivers that are added to the network. This is beneficial, for example, as it enables the hub transceiver to maximize usage of the available optical subcarriers as needed.

For instance, in the example shown in FIG. 24A, after re-allotting optical subcarriers to accommodate the edge transceiver 5-8, the hub transceiver can re-allot any remaining idle optical subcarriers for use by new edge transceiver 9-16. This re-allotment can be performed until no more idle optical subcarriers remain.

In some implementations, optical subcarriers can be allotted according to one or more specific rules based on the capabilities of the edge transceivers. As an illustrative example, given 16 spectrally contiguous optical subcarriers (SC1-SC16), optical subcarriers can be allotted to transceivers having a first bandwidth capability or capacity (e.g., 100 Gbit/s) by searching for four contiguous optical subcarriers starting on SC5, SC9, SC1, and SC13, in that order.

Further, optical subcarriers can be allotted to transceivers having a second, lower bandwidth capability (e.g., 50 Gbit/s) by searching for blocks of four contiguous optical subcarriers with an odd/even pair of optical subcarriers free. The search order can be, for example, SC5, SC7, SC9, SC11, SC3, SC1, SC13, and SC15, in that order. If there are no partially filled blocks, the same search order for transceivers having the first bandwidth capability (e.g., 100 Gbit/s) can be used (e.g., by searching for four contiguous optical subcarriers starting on SC5, SC9, SC1, and SC13, in that order).

Further, optical subcarriers can be allotted to transceivers having a third, lower bandwidth capability (e.g., 25 Gbit/s) by searching for blocks of four contiguous optical subcarriers with a single optical subcarrier free. If there are no so such blocks, the same search order for transceivers having the second bandwidth capability (e.g., 50 Gbit/s) can be used (e.g., by searching for partially filled odd/even pairs of optical subcarriers). Finally, if there are no partially filled odd/even pairs of optical subcarriers, the same search order for transceivers having the first bandwidth capability (e.g., 100 Gbit/s) can be used (e.g., by searching for four contiguous optical subcarriers starting on SC5, SC9, SC1, and SC13, in that order).

Figure 24B:
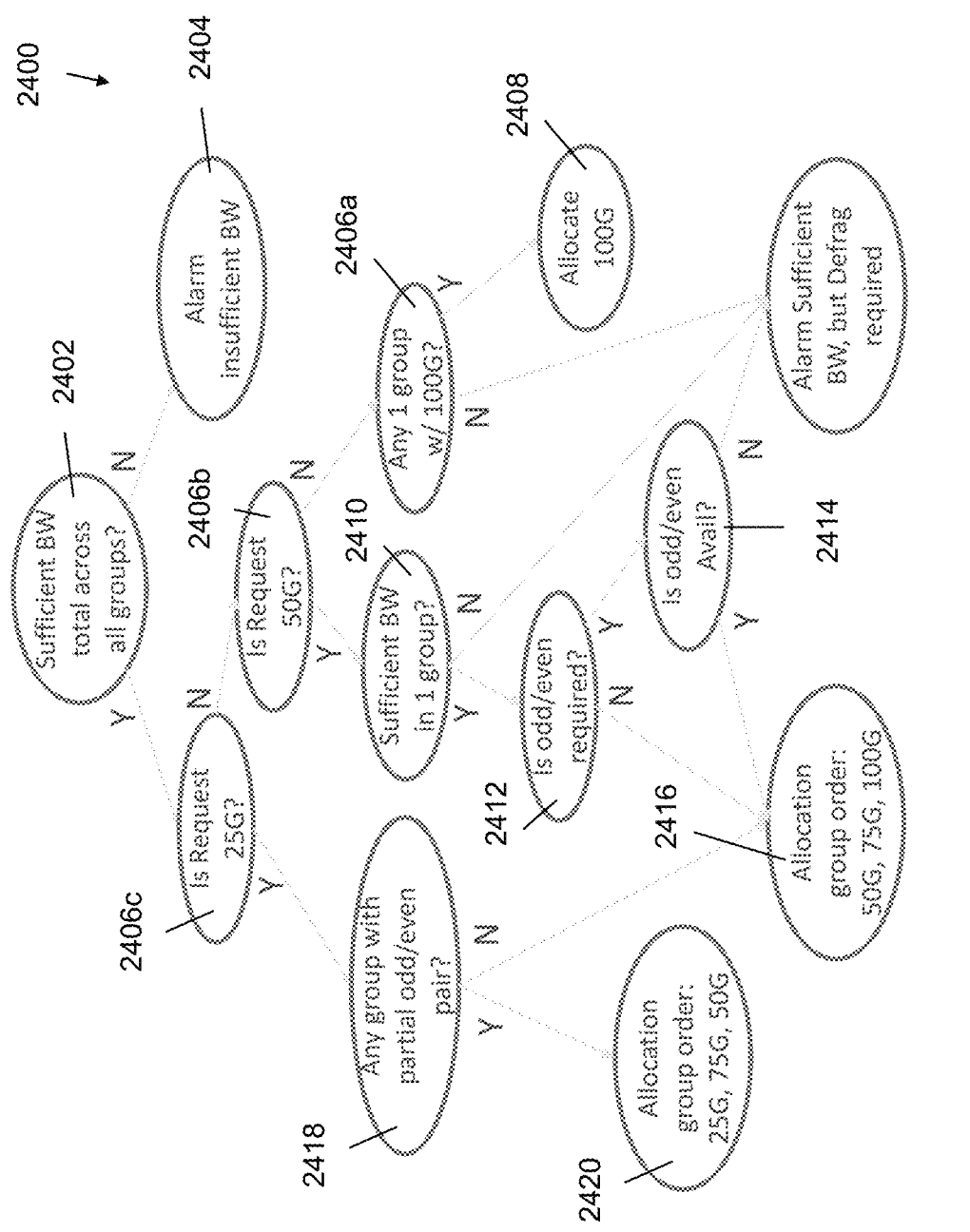
Figure 25:
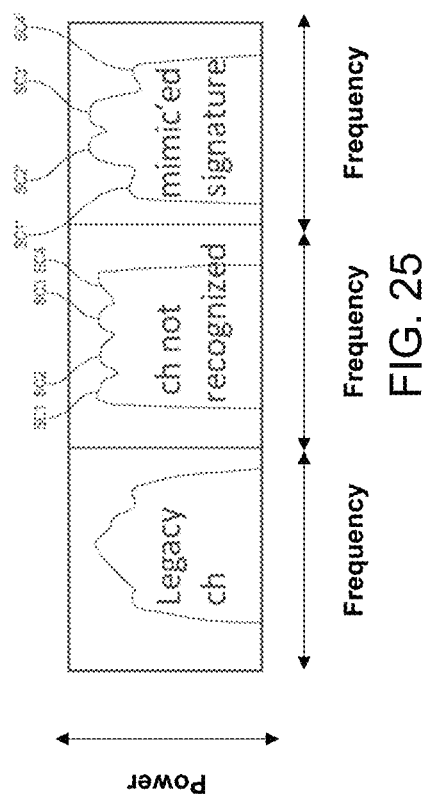
FIG. 25 is a diagram of using multiple optical subcarriers to mimic the power signature of a legacy system.

FIG. 24B shows an example process 2400 for allotting optical subcarriers to edge transceivers according to one or more specific rules based on the capabilities of the edge transceivers (e.g., one or more of the rules discussed above). The process 2400 can be performed, for example, by a hub transceiver upon receipt of a request for allotment of one or more optical subcarriers by an edge receiver.

According to the process 2400, the hub transceiver determines whether there is sufficient bandwidth across each of the groups of optical subcarriers (e.g., whether there is enough bandwidth to satisfy the requirements of each of the edge transceivers that are requesting or have requested allocation of optical subcarriers from the hub transceiver). If not, the hub transceiver generates a notification or alarm indicating that there is insufficient bandwidth (e.g., a notification or alarm that is presented to a user) (block 2404).

Alternatively, if there is sufficient bandwidth across the groups, the hub transceiver determines the type of configuration of the edge transceiver that made the request. For example, the hub transceiver can determine whether the request was made by an edge transceiver having a first type of configuration (e.g., a 100 Gbit/s edge transceiver), a second type of configuration (e.g., a 50 Gbit/s edge transceiver), or a third type of configuration (e.g., a 25 Gbit/s edge transceiver) (blocks 2406a-2406c, respectively).

If the edge transceiver has the first type of configuration (e.g., a 100 Gbit/s edge transceiver), the hub transceiver can allocate optical subcarriers to the edge transceiver according to the corresponding assignment protocol discussed above (block 2408). For example, given 16 spectrally contiguous optical subcarriers (SC1-SC16), optical subcarriers can be allotted to transceivers having a first bandwidth capability or capacity (e.g., 100 Gbit/s) by searching for four contiguous optical subcarriers starting on SC5, SC9, SC1, and SC13, in that order.

If the edge transceiver has the second type of configuration (e.g., a 50 Gbit/s edge transceiver), the hub transceiver can allocate optical subcarriers to the edge transceiver according to the corresponding assignment protocol discussed above (block 2410). For example, the hub transceiver can initially determine whether there is sufficient bandwidth in any groups of optical subcarriers to fulfill the request (block 2410). If so, optical subcarriers can be allotted to transceivers having a second, lower bandwidth capability (e.g., 50 Gbit/s) by determining whether an odd/even pair of optical subcarriers is required by that edge transceiver (block 2412) and if so, whether any such pairs are available (block 2414). If so, the hub transceiver can search for blocks of four contiguous optical subcarriers with an odd/even pair of optical subcarriers free (block 2416). The search order can be, for example, SC5, SC7, SC9, SC11, SC3, SC1, SC13, and SC15, in that order. If there are no partially filled blocks, the same search order for transceivers having the first bandwidth capability (e.g., 100 Gbit/s) can be used (e.g., by searching for four contiguous optical subcarriers starting on SC5, SC9, SC1, and SC13, in that order).

If the edge transceiver has the third type of configuration (e.g., a 25 Gbit/s edge transceiver), the hub transceiver can allocate optical subcarriers to the edge transceiver according to the corresponding assignment protocol discussed above (block 2418). For example, the hub transceiver can allot optical subcarrier to transceivers having a third, lower bandwidth capability (e.g., 25 Gbit/s) by determine whether there are any groups of optical subcarriers having a partially "filled" odd/even pair (e.g., continuous optical subcarriers where one optical subcarrier has already been allotted, and the other optical subcarrier has not yet been allotted) (block 2418).

If so, the hub transceiver can allocate an optical subcarrier based on the allocation order described above (e.g., block 2420). For example, the hub transceiver can search for blocks of four contiguous optical subcarriers with a single optical subcarrier free. If there are no so such blocks, the same search order for transceivers having the first bandwidth capability (e.g., 50 Gbit/s) can be used (e.g., by searching for partially filled odd/even pairs of optical subcarriers).

Alternatively, if there are no partially filled odd/even pairs of optical subcarriers, the same search order for transceivers having the first bandwidth capability (e.g., 100 Gbit/s) can be used (e.g., by searching for four contiguous optical subcarriers starting on SC5, SC9, SC1, and SC13, in that order) (block 2416).

During the process 2400, if the hub transceiver determines that there is sufficient total amount of bandwidth to fulfill the request, but that there are no available optical subcarriers or groups of optical subcarriers that fulfill the assignment protocol or rules (e.g., the arrangement of available optical subcarriers does not satisfy the assignment protocol or rules), the hub transceiver can generate a notification or alarm to a user indicating that a "defragmentation" of the optical subcarriers may be required (e.g., a re-assignment of the optical subcarriers to the edge transceivers to consolidate assigned optical subcarriers in certain groups to the consolidate unassigned optical subcarriers in other groups). In some implementations, the hub transceiver can automatically perform the defragmentation (e.g., by reassigning the optical subcarriers to the edge transceivers).

In some implementations, an edge transceiver can transmit data using multiple optical subcarriers concurrently in order to enable backwards compatibility with legacy network devices (e.g., legacy devices that require that signals have a particular power signature that spans multiple optical subcarriers). For example, referring to FIG. 25 (left pane), a legacy device may require that a signal have a "domed" or "curved" power signature (e.g., having a higher power in a center of a particular frequency range, and lower power towards the peripheries of the frequency range). Further, this power signature could span across several optical subcarriers.

However, if the power signal does not have this power signature, the legacy device may not recognize the optical subcarrier signals as a valid legacy signal. For example, referring to FIG. 25 (center pane), an edge transceiver could generate a signal by transmitting data using four contiguous optical subcarriers (denoted as SC1-SC4), such that the width of the power signature approximates the power signature that is recognized by the legacy device. However, in this example, the edge transmission module transmits the signal according to a similar power across each of the optical subcarriers (e.g., resulting in an approximately rectangular power signal, rather than a domed power signature). Thus, a legacy device may not recognize the signal as a valid signal.

To improve capability for the legacy device, the edge transceiver can instead transmit a signal that mimics the power signature that is recognized by the legacy device. For example, referring to FIG. 25 (right pane), the edge transceiver can generate a signal that has a higher power in the center optical subcarriers (e.g., SC2' and SC3'), and a comparatively lower power in the peripheral optical subcarriers (e.g., SC1' and SC4'). Thus, the resulting signal can be recognized by the legacy device.

Moreover, if one of subcarriers, if one of subcarriers, such as SC2' is not assigned to carry information indicative of user data, such subcarrier may still carry random data, e.g., a PRBS, or blank frames as noted above, instead of omitting such subcarrier in order, for example, to maintain power levels in the system. In that case SC2' may be a referred to as an idel subcarrier, as described herein.

As described above (e.g. with respect to FIG. 21), in some implementations, at least some of the transceivers can be initially identical to one another (e.g., initially identical in configuration). In some implementations, these transceivers can be re-configured to function as a hub transceiver or an edge transceiver as a part of a configuration process (e.g., once the transceivers have established communications with one another). This can be useful, for example, as it enables a single type of transceiver (e.g., a "universal" transceiver that can function as both a hub transceiver and as an edge transceiver) to be deployed at several locations on the network. Depending on the configuration of the network, each of the transceivers can be dynamically assigned (or reassigned) the role of a hub transceiver or an edge transceiver (e.g., to perform one or more of the operations described herein). Accordingly, the transceiver need not be physically replaced when the network is reconfigured and/or when its role in the network is changed.

As an example, FIG. 29 shows an example process 2900 for dynamically configuring a transceiver as a hub transceiver or an edge transceiver. In some implementations, the process 2900 can be performed by a transceiver has not yet been assigned the "role" of a hub transceiver or an edge transceiver, or by a transceiver that was previously assigned the role of a hub transceiver or an edge transceiver. A role can be, for example, a configuration of the transceiver (e.g., in software, hardware, or both) and/or a function or category functions assigned to the transceiver with respect to the optical communications network.

According to the process 2900, the transceiver conducts a scan of the channels and sub channels of the optical communication network to identify the presence of any hub transceivers that are transmitting beacon messages (block 2902). As an example, the transceiver can scan one or more optical subcarriers for the presence of a beacon message (e.g., a beacon message transmitted by amplitude modulating signals on multiple optical subcarriers, as described with respect to FIGS. 22A-22C).

Upon detecting a beacon message, the transceiver attempts to connect to the hub transceiver that is transmitting the beacon message, negotiate one or more communications channels with that hub transceiver, and authenticate its identify with that hub transceiver and/or authenticate the identity of that hub transceiver (block 2904) using the AM modulations discussed above and circuitry, such as control circuit 1161 in the hub and edge nodes. In some implementations, this can include performing one or more of the operations described with respect to FIG. 21 (e.g., transmitting a message requesting assignment of one or more of optical subcarriers to the hub transceiver, receiving a confirmation that one or more optical subcarriers have been assigned from the hub transceiver, and transmitting data according to the assigned optical subcarriers). In some implementations, the transceiver can also determine whether the beacon message has transmitted by a blacklisted hub transceiver (e.g., a hub transceiver to which it should not connect), and if so, terminate the connection with that hub transceiver.

Upon completion of these operations, the transceiver can configure itself as either a hub transceiver (block 2906) or an edge transceiver (block 2908).

In some implementations, the transceiver can configure itself as an edge transceiver by default. For example, the transceiver can connect to the hub transceiver that is transmitting the beacon message, negotiate one or more communications channels with that hub transceiver, and authenticate its identify with that hub transceiver and/or authenticate the identity of that hub transceiver. Upon completion of these operations, the transceiver can function as an edge transceiver and perform one or more other associated operations described herein.

In some implementations, the transceiver can configure itself as either a hub transceiver or a hub transceiver, depending on its own configuration and the configuration of the hub transceiver that is transmitting the beacon message. For example, the transceiver can assume the role of an edge transceiver, and the hub transceiver (e.g., the transceiver that had transmitted the beacon message) can retain the role of a hub transceiver. In some implementations, the transceiver can assume the role of a hub transceiver, and the hub transceiver (e.g., the transceiver that had transmitted beacon message) can switch to the role of an edge transceiver.

In some implementations, transceivers can be assigned the role of an edge transceiver or hub transceiver based on the number of optical subcarriers that have been allotted to each of the transceivers. For example, the transceiver that has been allotted a greater number of optical subcarriers can be assigned the role of a hub transceiver, and the transceiver that has been allotted a fewer number of optical subcarriers can be assigned the role of an edge transceiver. In some implementations, the transceivers can dynamically swap roles (e.g., when the allotment of optical subcarriers is modified).

In some implementations, if the transceivers are each allotted the same number of optical subcarriers, the transceivers can be assigned roles based on other factors. For example, each transceiver may be assigned a respective identifier (e.g., a numerical index value), and the transceiver having the lowest identifier can be assigned the role of the hub transceiver, or vice versa.

In some implementations, a remote device (e.g., the central software 111) can assign roles to transceivers. For example, in some implementations, the central software 111 can override the assignment of roles according to the process 2900 (e.g., by providing superseding assignments).

Alternatively, if the transceiver is unable to complete the operations described with respect to block 2904 (e.g., the transceiver was unsuccessful in connecting with the hub transceiver, negotiating one or more communications channels with the hub transceiver, authenticating its identify with that hub transceiver, and/or authenticating the identity of that hub transceiver), the transceiver enters a "receiver" mode (block 2910). While in the receiver mode, the transceiver laser 908 or 1110 scans through a spectrum of signal frequencies being transmitted on the optical communications network, and determines whether a beacon message is being transmitted on the optical communication network using one or more of those frequencies.

As noted above with respect to FIGS. 22A-22C, upon detecting another beacon message, the transceiver attempts to connect to the hub transceiver that is transmitting the beacon message, negotiate one or more communications channels with that hub transceiver, and authenticate its identify with that hub transceiver and/or authenticate the identity of that hub transceiver (block 2904).

Alternatively, if the transceiver does detect a beacon message after a period of time (e.g., after a certain number of frequencies or a certain range of frequencies has been scanned, or after a certain amount of time has elapsed), the transceiver switches to a "transmitter" mode (block 2912). While in the transmitter mode, the transceiver listens or scans its laser, such as laser 1110 or 908, to detect any signals being transmitted on the optical communications network, and identifies one or more channels that are not currently being used by other transceivers (e.g., one or optical subcarriers that are not being used to transmit data). The transceiver then transmits a message using the unused channel (e.g., a beacon message, as described above with respect to FIG. 21).

Upon receiving a response to the transmitted message (e.g., from an edge transceiver), the transceiver attempts to connect to the transceiver that transmitted the response, negotiate one or more communications channels with that transceiver, by way of exchanging AM signals as noted above, and authenticate its identify with that transceiver and/or authenticate the identity of that transceiver (block 2904). Upon successfully completing these operations, the transceiver can configure itself as either a hub transceiver (block 2906) or an edge transceiver (block 2908). In some implementations, the transceiver can configure itself as a hub transceiver by default. In some implementations, the transceiver can configure itself as either a hub transceiver or a hub transceiver, depending on its own configuration and the configuration of the hub transceiver that is transmitting the beacon message (e.g., as describe above).

Alternatively, if the transceiver does not receive any responses to the transmitted message for a period of time (e.g., after a pre-determined time out period), the transceiver switches back to the receiver mode (block 2910). The transceiver can switch between the receiver mode and the transmitter mode multiple times. (e.g., until it is assigned the role of a hub transceiver or the role of an edge transceiver, or until a time out period has elapsed and the process 2900 is restarted).

Referring back to block 2902, if the transceiver does not detect a beacon message during its initial laser scan, it can switch to the transmitter mode (block 2910) and perform the operations described above.

In some implementations, one or more of the transceivers or transceiver modules described herein can be used to retrofit network devices to enhance the capabilities of those network devices. As an example, referring to FIG. 1, one or more of the primary nodes 102 and the secondary nodes 104 may be of a "legacy" design that does not support one or more of the functions or operations described herein (e.g., a design that was implemented prior to the general availability of the one or more of the functions or operations). As another example, referring again to FIG. 1, one or more of the primary nodes 102 and the secondary nodes 104 may be devices that only support communications protocols that are not directly compatible with those described herein. One or more of the transceivers or transceiver modules described herein can be coupled to these nodes to provide additional functionality to those nodes and/or to enable those nodes to communicate with other deices according to the communications protocols described herein. Accordingly, the network devices can be adapted for use on the optical communications network in an efficient and cost effective manner (e.g., without requiring that the network devices be significantly modified or replaced). Further, this enables the transceivers or transceivers to be replaced independent from the node.

Figure 28A:
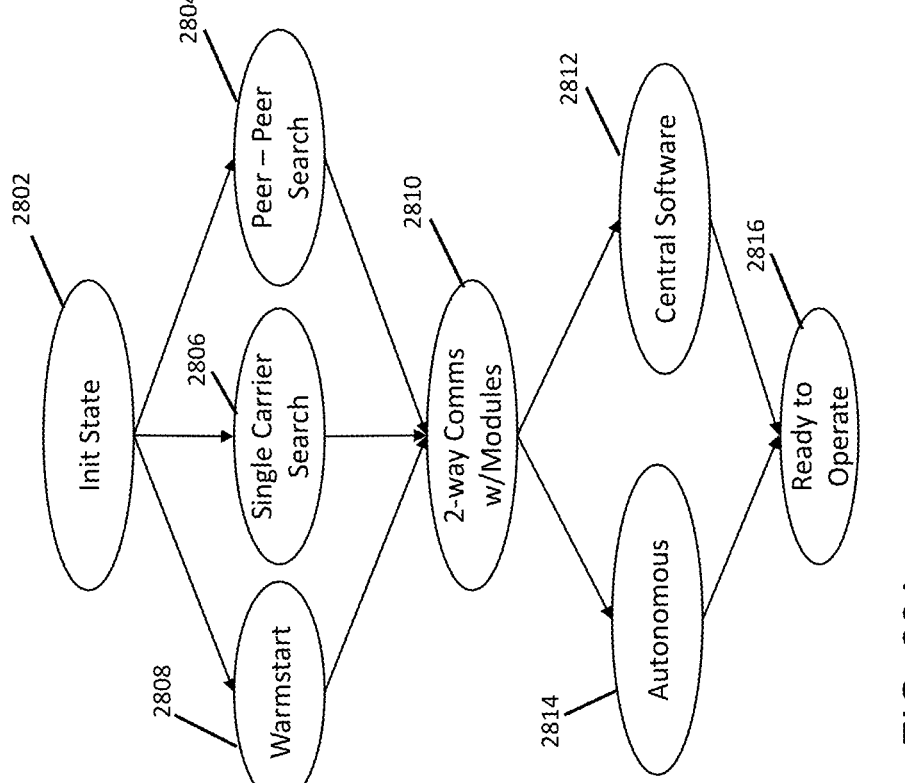
FIGS. 28A and 28B are state machine diagrams or flow diagram of phases for starting-up a transceiver . . . .

FIG. 28A illustrates a state machine or flow diagram of phases for starting-up a transceiver. In a first phase, 2802, the transceiver is placed in an initialization state in which, for example, power is supplied to the transceiver. The transceiver may then enter into one of phases 2804, 2806, 2808 for establishing two-way communication with another transceiver in the network. In phase 2804, multiple transceivers may be provided. The transceiver, therefore, scans the frequency of light output from its local oscillator in order to detect a beacon from the other transceivers, referred to herein as a "peer-to-peer search." The transceivers then exchange messages, as discussed above in connection with FIGS. 22A-22C. Alternatively, in phase 2806, which may be a "single carrier search," only two transceivers are provided, and such transceivers exchange messages without carrying out the scan. In phase 2808, the transceiver may begin transmitting and processing received optical subcarriers based on assignment information previously stored in the transceiver (the "warmstart" phase). Typically, data stored in a memory, such an electrically erasable programmable read only memory (EEPROM), identifies which of phases 2804, 2806, and 2808 the edge node transceiver should enter.

After completion of one of phases 2804, 2806, and 2808, the edge node transceiver enters into a two-way communication phase with the hub node (phase 2810) based on amplitude modulation of optical subcarriers discussed above in connection with FIGS. 23A-23C. During phase 2810, the transceiver will "negotiate" its role, e.g., whether the transceiver is to operate as an edge node or a hub node. Such negotiation is carried out by exchanging message including information indicative of the capacity, for example, of each transceiver. For example, if one transceiver has a capacity of 400 Gbit/s and the other has a capacity of 100 Gbit/s, the transceiver having the lower capacity will be designated the edge node and the higher capacity transceiver will be designated the hub node.

Following phase 2810, two optional phases are available, 2812 and 2814. Phase 2814 ("autonomous") is carried out in the absence of central software, wherein allocation and bandwidth and/or assignment of optical subcarriers is carried out by the hub and edge nodes. Assignment of hub and edge node roles may also be determined by the hub and edge nodes. Alternatively, when central software is present, such functions are carried by the central software and instructions are provided to the transceivers by way of the optical gateway, as discussed above, or through connections to the nodes housing the transceivers (phase 2812—"Central Software").

After transceiver roles and bandwidth has been allocated and/or optical subcarriers have been assigned to the edge nodes, the network is ready to begin operation including transmission of subcarriers carrying information indicative of user data (phase 2816).

Figure 28B:
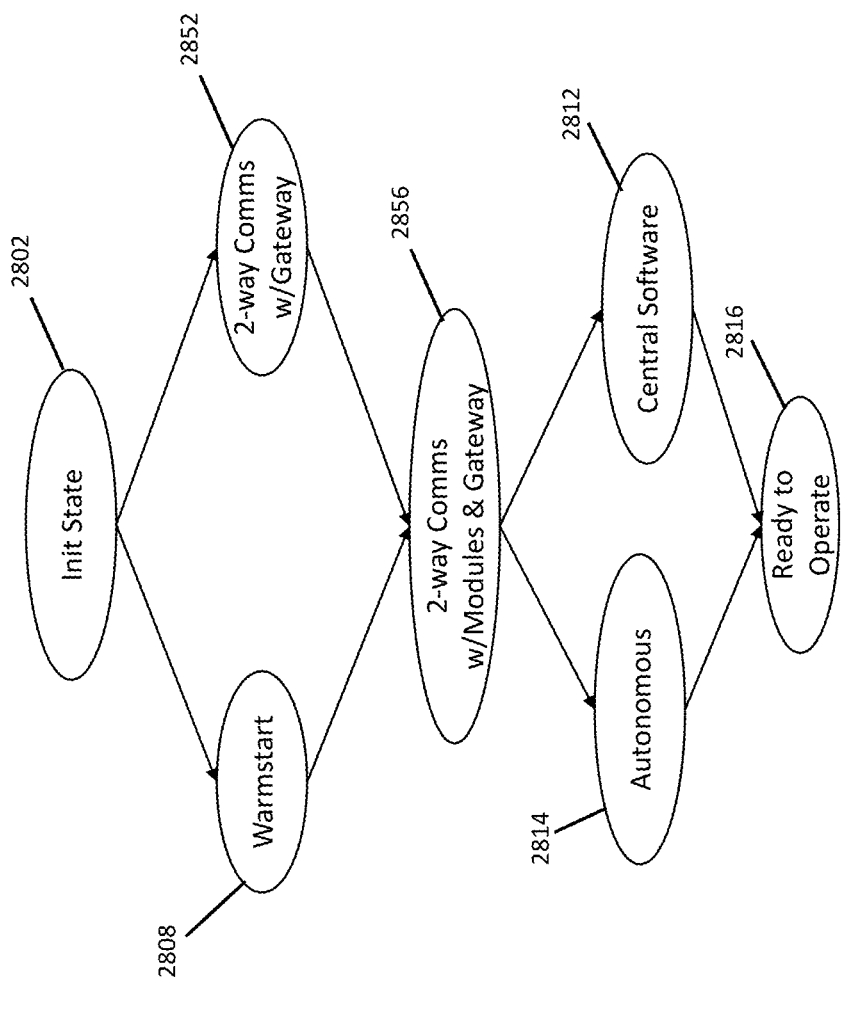

FIG. 28B illustrates an alternative state machine or process flow 2850 including phases for starting-up a transceiver in which in which central software communicates with transceivers without an initial "peer-to-peer" search (phase 2804) or a "single carrier search" (phase 2806) described above. In a first phase, 2802, the transceiver is placed in an initialization state, as described above. The transceiver may then enter into the "warmstart phase" (phase 2808), as further described above, or enter into two-way communication with the gateway (phase 2852). For example, as noted above with respect to FIG. 26, a laser 2638 is optionally provided in gateway 2600. If gateway 2600 is provided closer to the hub than the edge nodes, the laser may be provided as a source of light instead of one or more leaf lasers. As further shown in FIG. 26 and described above, such light from laser 2638 may be modulated, after passing through combiner 2460, by VOA 2608, which may be a fast VOA amplitude modulating (AM) such light based on an output of DAC 2606 at the frequencies noted above with respect to FIGS. 23A-23C. Accordingly, DAC 2606, in this example, provides such AM modulation indicative of a beacon message similar to that described above. The beacon message is based on outputs of microprocessor 2602, which are supplied to line system data generator 2604, which, based on such received signals, provides additional signals to DAC 2606 for driving VOA 2608. The outputs from microprocessor 2602 are based on instructions or information provided by central software 111 via Ethernet port 2612. Thus, based on such instructions or information, the central software can communicate with the transceiver by way of the above-described AM modulation of the light provided by laser 2638.

In another example, central software 111 may communicate with the transceiver through a host or node in which the transceiver is provided. Such communication may be by way of a virtual local area network (VLAN) providing Layer 2 (L2) management. As such, the transceiver may be able to send and receive messages based on instructions/data from central software 111 via related information provided by the host or node to the transceiver. In some implementations, central software 111 may provide instructions for assigning hub and edge node roles to the transceivers in the network. Such roles may be tentative, however, and can be changed.

After completion of phase 2852, transceivers may communicate with one another and the gateway (phase 2856) by way of the amplitude modulations described above. Since, at this point, the transceivers in the network have been activated and are communicating with one another, laser 2638, in one example, is no longer required to provide an optical output and may be deactivated. In phase 2856, hub and leaf roles may be assigned based on respective capacities of each transceiver.

Following phase 2852, either phase 2512 or phase 2514, as described above, may be entered into by the transceivers, after which the transceivers are available for exchange information associated with user data (phase 2816).

In some implementations, one or more of the transceivers or transceiver modules described herein can be physically coupled to a corresponding network device, and once coupled, provide the network device with enhanced capabilities. For example, each transceiver or transceiver module can include a physical communications interface (e.g., a plug or socket having one or more electrical conduits for transmitting and/or receiving electronic information) that can be inserted into a corresponding physical communication interface of a node (e.g., a corresponding socket or plug having one or more electrical conduits for transmitting and/or receiving electronic information). In some implementations, the transceiver or transceiver module may be referred to as a "pluggable" device or a "field replaceable unit (FRU)".

Figures 30A, 30B:
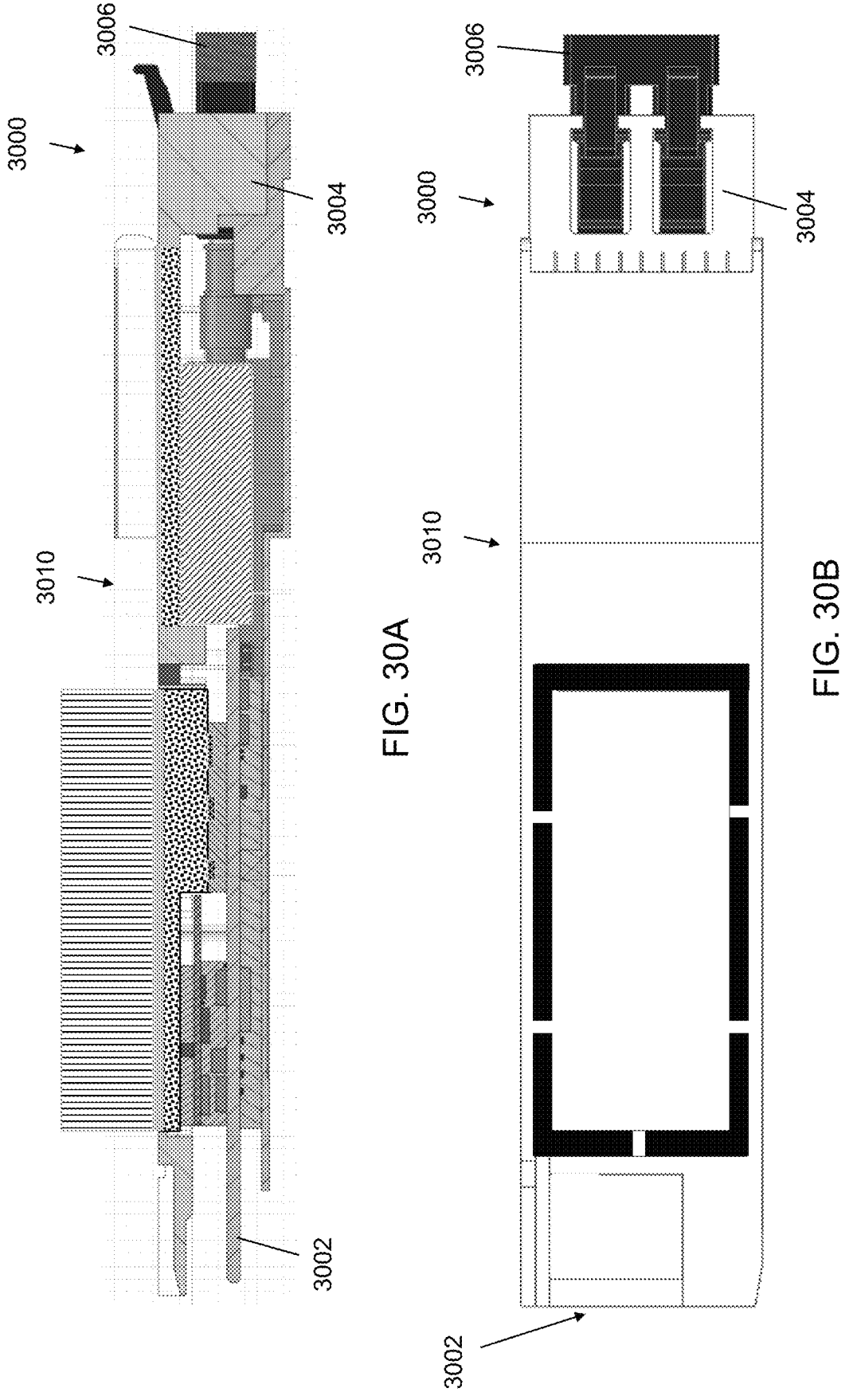
FIGS. 30A and 30B are diagrams of an example transceiver that can be plugged into another network device.

FIGS. 30A and 30B show an example of a pluggable device 3000 that can be configured to perform one or more of the operations described herein. FIG. 30A shows the pluggable device 3000 according to a cross-sectional side view, and FIG. 30B shows the pluggable device according to a top view.

As shown in FIGS. 30A and 30B, the pluggable device 3000 includes a first physical communications interface 3002 (e.g., a plug having one or more electrical conduits for transmitting and/or receiving electronic information) that is configured to couple with a corresponding physical communications interface of another device (e.g., a corresponding socket configured to receive the plug and form one or more electrical connections between the pluggable device 3000 and the other device). In some implementations, the pluggable device 3000 can be (or can include) a transceiver, as described herein (e.g., a primary or hub transceiver, or a secondary or edge transceiver). In some implementations, the other device can be a node, as described herein (e.g., a primary or nude node or a secondary or edge node).

Further, as shown in FIGS. 30A and 30B, the pluggable device 3000 includes a second physical communications interface 3004 (e.g., a socket having one or more electrical conduits for transmitting and/or receiving electronic information) that is configured to couple with a corresponding physical communications interface of a fiber optic cable 3006 (e.g., having a corresponding plug configured to insert into the socket and form one or more electrical connections between the pluggable device 3000 and the fiber optic cable 3006). In some implementations, the fiber optic cable 3006 can extend between the pluggable device 3000 and the fiber plant of an optical communications network. For example, the fiber optic cable 3006 can communicatively couple the pluggable device 3000 and an OGW.

Further, as shown in FIGS. 30A and 30B, the pluggable device 3000 includes a housing 3010. The housing 3010 can contain one or more of the components described herein (e.g., as described with respect to FIGS. 1B, 4A, 4B, 5, 6A-6C, 8, 9A-9C, 13-16, 19, and 20.

Once the pluggable device 3000 and a node are coupled together, the pluggable device 3000 can receive information from the node via the physical communications interface 3002 (e.g., information to be transmitted to the optical communications network), process the information such that it is suitable for transmission to the optical communications network (e.g., using one or more of the techniques described herein to establish one or more communications channels, and to encode the information for transmission), and transmit the information to the optical communications network via the physical communications interface 3004. Further, the pluggable device 3000 can receive information from the optical communications network that is to be delivered to the node via the physical communications interface 3004, process the information such that it is suitable for transmission to the node, and transmit the information to the node via the physical communications interface 30002.

In some implementations, one or more of the techniques described herein can be performed by the transceiver using the optical communications network, independent from the node. For example, in some implementations, the transceivers can automatically establish communications channels with one another, automatically discover interconnections between one another and other network devices, automatically identify and correct misconfigurations, automatically optimize their performance, automatically forward data between one another and other network devices, and/or automatically perform any other operation on the optical communication network. Further, these operations can be performed without requiring input, instructions, or configuration information from the nodes. Accordingly, the transceiver can be used to enable various operations to be performed on the optical communications network, even if the nodes were not originally designed to do so.

IV. Example Techniques for Regulating the Power of Signals on an Optical Communications Network As discussed above (e.g., with respect to FIGS. 1, 2A-2C, 7, and 18), an optical communications network can include one or more optical gateways (OGWs) to route data between transceivers. In some implementations, an optical gateway can control the power of signals that are routed through the optical gateway (e.g., by selectively attenuating a subset of the signals) in order to balance the power of signals that are delivered to other devices on the optical communications network. As can example, an optical gateway that control the power of signals that pass through it, such that the power of each of the signals that are delivered to a transceiver (e.g., a hub transceiver or an edge transceiver) are equal or approximately equal at the point of delivery. This can be beneficial, for example, in improving network devices' compatibility with the optical communications network or increasing the robustness of the optical communications network against interference.

Figure 26:
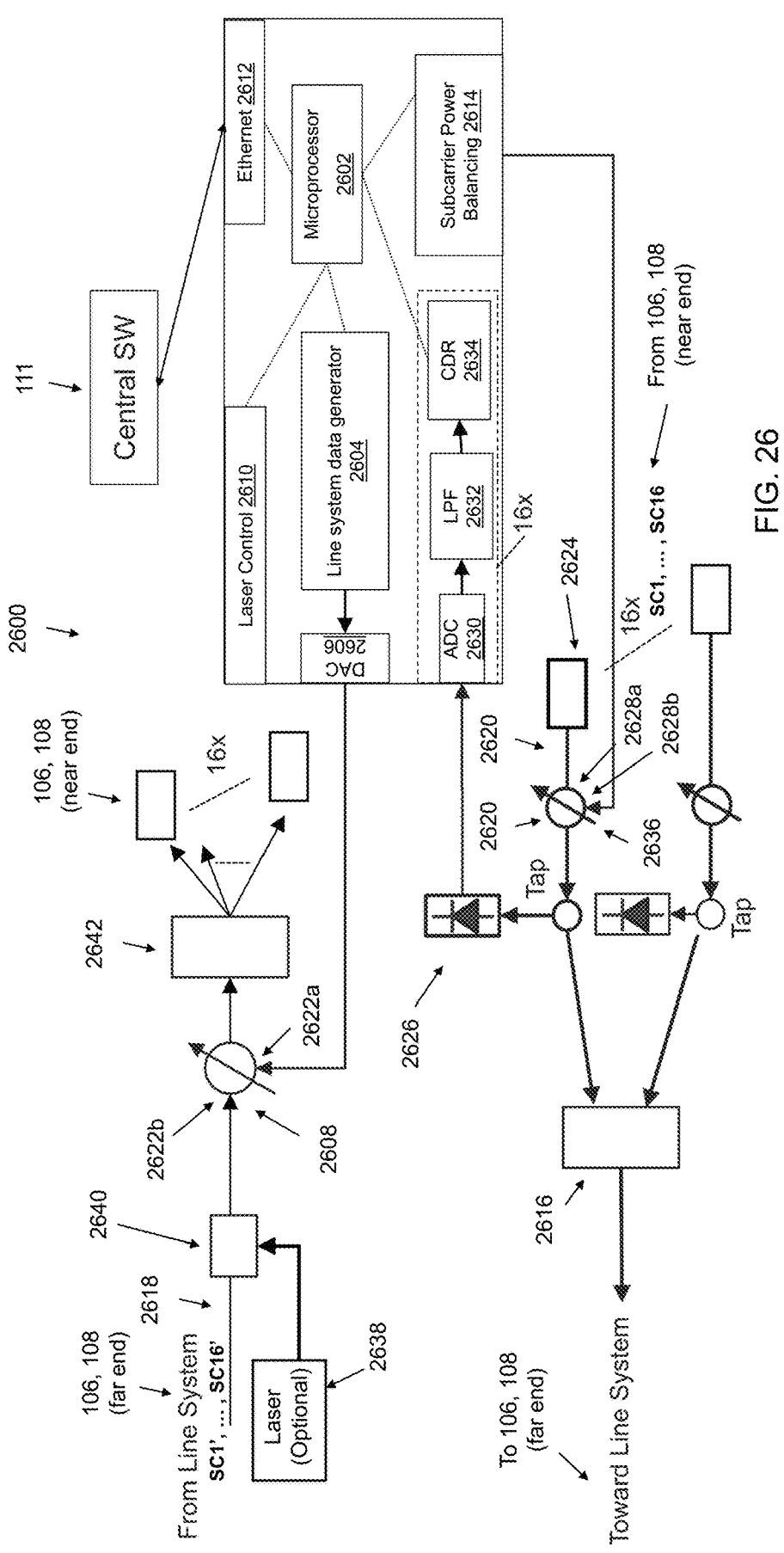
FIG. 26 is a diagram of an example optical gateway.

To illustrate, another example optical gateway 2600 is shown in FIG. 26. In general, the optical gateway 2600 can be similar to the line system component shown in FIG. 17.

For example, as shown in FIG. 26, optical gateway 2600 generally includes a DSP or microprocessor 2602, a line system data generator 2604, a DAC 2606, one or more variable optical attenuators 2608 and 2636, a laser control module 2610 for controlling a tunable laser 2638, an Ethernet module 2612, and an optical subcarrier power balancing module 2614. In some implementations, one or more of the components of the optical gateway 2600 can be placed at various locations along an optical communication path of the system 100 (e.g., between one or more hub transceivers 106 and edge transceivers 108). In some implementations, one or more of the components of the optical gateway 2600 can be placed adjacent to a splitter/combiner (e.g., the splitter 2642 and/or the combiner 2616 shown in FIG. 26) or in between two distinct splitters that are each intermediate a hub transceiver 106 and a secondary transceiver 108. The optical gateway 2600 may also be provided adjacent an optical amplifier.

In some implementations, control information can be provided to the optical gateway 2600 based on the status of the line system component or other information associated with the line system component. Such information may include operations, administration, maintenance, and provisioning (OAM&P) information, such as, if the optical gateway 2600 is adjacent an optical amplifier, the gain of the amplifier or which optical signals (by wavelength) are input to the amplifier. Alternatively, the control information may include an indication of which optical signals and subcarriers are input to/output from specified ports of the optical gateway. Such information may be supplied to circuitry in the microprocessor or microcontroller 2602 referred to as a line system data generator 2604, which control data that is to be transmitted to a near end transceiver (e.g., a hub transceiver 106 or edge transceiver 108) of the system 100. The line system generator may provide the control data based on measured parameters associated with the optical communication path or fiber links 2618 and/or 2620, for example. For example, as noted above with respect to FIG. 7, optical taps, such as tap 711 provide a portion of a transmitted optical signal including optical subcarriers to block 702 for determining such control information. Alternatively, control information may be supplied to the line system generator 2604 by the central software 111 (e.g., via the Ethernet module 2612, which includes one or more transceivers for transmitting and receiving data via an Ethernet network). In a further example, control information may be supplied directly from the central software 111 to the DAC 2606.

In some implementations, the line system data generator 2604 may supply the control information as a digital or binary electrical signal to the DAC 206, which converts the received signal to an analog signal indicative of the control information to be transmitted. The analog signal is then provided to the VOA 2608, for example via an optical input port 2622a (e.g., an interface for receiving optical signals). The VOA 2608 may also receive an optical signal including a plurality of optical subcarriers (e.g., optical subcarriers SC1' to SC16', each having a corresponding one of the frequencies f1' to f16') via an optical input port 2622b. In this example, the optical subcarriers SC1' to SC16' are transmitted from one or more far end transceivers (e.g., hub transceivers 106 and/or edge transceivers 108) on an optical fiber or optical communication path 2618. Based on the analog signal received via the input port 2622a, the VOA 2608 collectively adjusts the attenuation, and thus the amplitude or intensity, of optical subcarriers SC1' to SC16' based on the control information. As a result, the optical subcarriers SC1' to SC16' are amplitude modulated to carry such control information to one or more near end primary transceivers 102 or edge transceivers 104. Further, the optical subcarriers SC1' to SC16' can be split (e.g., by the splitter 2642) and transmitted to one or more near end transceivers (e.g., one or more hub transceivers 106 and/or edge transceivers 108). In the example shown in FIG. 26, the optical subcarriers SC1' to SC8' can be split and transmitted to 16 near end transceivers.

In some implementations, control information can be transmitted to one or more near end transceivers by injecting additional optical signals using a tunable laser 2638 and an optical tap 2640. For example, the microprocessor 2602 can encode the control information (e.g., using one or more modulation techniques) and control the VOA 2608 to generate patterns of optical signals representative of the encoded control information. These optical signals can be combined with the optical signals received from the far end transceivers, and transmitted to one or more near end transceivers. As another example, the microprocessor 2602 can instruct the laser control module 2610 to activate the tunable laser 2638 and transmit signal according to a particular transmit power (e.g., to supply an optical signal to the VOA 2608, such as when no far end transceivers are transmitting any optical signals).

In some implementations, the optical gateway 2600 also can detect optical signals including amplitude modulated subcarriers transmitted on an optical communication path 2620 from one or more near end transceivers (e.g., one or more hub transceivers 106 or edge transceivers 108), such as the optical subcarriers SC1 to SC16. The optical signals are input to optical taps 2620, which may provide optical power split portion of the optical signal (e.g., 1% to 10%) to respective photodiode circuits 2626. A remaining portion of the optical signal continues to propagate along optical communication path 2620. VOAs 2636 optionally may be provided for power balancing. For example, VOAs 2636 can receive the signal output by the optical taps 2624 via optical input ports 2628a, and attenuate the signal according to an analog signal 2630 received via optical input ports 2630b (e.g., control information received from one or more sources, such as the subcarrier power balancing module 2614).

In some implementations, the VOA 2608 can have greater capabilities than the VOAs 2636. For example, in some implementations, the VOA 2608 can be configured to switch between different levels of attenuation relatively rapidly (e.g., to provide amplitude modulated signals). In contrast, the VOAs 2636 can be configured to switch between different levels of attenuation relatively slowly (e.g., to provide power balancing, which may not require as rapid of shifting). Nevertheless, in some implementations, the VOAs 2608 and 2636 can be similar or identical.

As further shown in FIG. 26, the tapped portion of the optical signal is converted by the photodiode circuit 2626 to a corresponding analog electrical signal (e.g., a voltage or a current). The analog signal is fed to an analog-to-digital conversion circuit 2630, which supplies digital signals based on the received analog signal. Such digital signals are optionally provided to a filter 2632 (e.g., a low pass filter or band pass filter) and then output to a conventional clock and data recovery circuitry 2634, which outputs the control information to the central software 111, for example by way of an optical signal (e.g., an optical service channel (OSC)), or by way of an electrical signal (e.g., an Ethernet signal generated by the Ethernet module 2612).

As shown in FIG. 26, in some cases, the optical gateway 2600 can receive and process multiple optical subcarriers concurrently (e.g., the optical subcarriers SC1 to SC16) using an array of optical taps 2624, VOAs 2636, photodiode circuits 2626, ADCs 2630, filters 2632, CDRs, and/or clock and data recovery circuitry 2634. Further, multiple optical subcarriers (e.g., the optical subcarriers SC1 to SC16) can be combined (e.g., by the combiner 2616) and transmitted to the line system for routing to one or more far end transceivers (e.g., one or more hub transceivers 106 and/or edge transceivers 108). In the example shown in FIG. 26, sixteen optical subcarriers are processed (e.g., by an array of sixteen sets of the components described above), and combined and transmitted to the line system.

In some implementations, a parameter associated with line system component may be adjusted or controlled based on the received control information. For example, if the line system component includes an optical amplifier, such as an erbium doped fiber amplifier, the control information may include instructions or other data for adjusting a gain of the optical amplifier. Alternatively, or in addition, the control information may include information for adjusting an attenuation of the VOAs 2636.

As described herein, in some implementations, the optical gateway 2600 also can control the power of signals that are routed through the optical gateway 2600 (e.g., by selectively attenuating a subset of the signals) in order to balance the power of signals that are delivered to other devices on the optical communications network (e.g., far end transceivers, such as hub transceivers 106 or edge transceivers 108) and/or to improve the quality (e.g., increase the signal to noise ratio) of those signals). As an example, an optical gateway can control the power of signals that pass through it, such that the power of each of the signals that are delivered to a transceiver (e.g., a hub transceiver) are equal or approximately equal at the point of delivery. As another example, the optical gateway can control the power of signals that pass through it, such that the power of each of the signals that are delivered to a transceiver (e.g., a hub transceiver or an edge transceiver) do not deviate from one another by more than a particular threshold amount (e.g., an empirically determined value). As another example, the optical gateway can control the power of signals that pass through it, such that the signal to noise ratio of the signals that are delivered to a transceiver (e.g., a hub transceiver or an edge transceiver) are greater than a minimal threshold level (e.g., an empirically determined value).

As an example, the optical gateway 2600 can measure the properties of optical signals received from each of the optical taps 2624 (e.g., power) using the photodetector circuits 2626, and provide the measurements to the subcarrier power balancing module 2614. The subcarrier power balancing module 2614 can determine whether the power of those signals should be adjusted, and if so, instruct the VOAs 2636 to attenuate one or more of the optical signals selectively. For example, if subcarrier power balancing 2614 determines that the power of a particular optical signal should be reduced, the subcarrier power balancing module 2614 can selectively instruct the corresponding VOA 2636 to attenuate that signal. Further, the subcarrier power balancing module 2614 can continue receiving measurements from the photodetector circuits 2626 and adjusting the attenuation provided by the VOAs 2636 over time (e.g., as a control loop).

In some implementations, the subcarrier power balancing module 2614 can determine whether the power of any of the signals should be adjusted based on information received from one of the transceivers. For example, the subcarrier power balancing module 2614 can receive, from each of the destination transceivers, measurement data regarding the signals received by that transceiver (e.g., power, signal to noise ratio, etc.). In some implementations, if the power of a particular received signal exceeds the power of other received signals, the subcarrier power balancing module 2614 can selectively attenuate the higher powered signal using the corresponding VOA (e.g., to "balance" the powers of the signals received by the transceiver). In some implementations, if the signal to noise ratio of a particular received signal is less than a minimal threshold value, the subcarrier power balancing module 2614 can modify an attenuation of a signal (or stop attenuating the signal altogether) using the corresponding VOA (e.g., to increase the signal to noise ratio).

In some implementations, the measurement data can be received from the central software 111 and/or from one or more of the transceivers directly (e.g., using one or more of the control channels described herein, for example with respect to FIGS. 2A-2C).

In some implementations, the optical gateway 2600 also can selectively prevent one of more of the signals that it receives from being routed to another device. This feature can be useful, for example, if the optical gateway 2600 receives signals from a malfunctioning or errant transceiver (e.g., signals that do not conform with the communications protocols of the optical communications network). In some implementations, this feature can be performed by attenuating the optical signal selectively using one or more of the VOAs 2636 to block the signals from propagating through the optical gateway 2600. The VOAs 2636 can be controlled, for example, by the subcarrier power balancing module 2614 and/or the microprocessor 2602 based on measurements obtained by the photodiode circuits 2626.

In some implementations, power balancing can be performed by one or more of the transceivers themselves, independent of an optical gateway. This can be useful, for example, as it enables the transceivers to adjust their configuration automatically, with or without input from other devices.

For instance, a first transceiver (e.g., a hub transceiver 106 or an edge transceiver 108) can transmit signals to a second transceiver (e.g., hub transceiver 106 or an edge transceiver 108). Further, the first transceiver can receive measurement data from the second transceiver regarding the signal that was received from the first transceiver (e.g., measurements regarding one or more "quality metrics" that describe the properties of the signal, such as power, signal to noise ratio, etc.), as well as measurement data regarding one or more other signals received from one or more other transceivers (e.g., measurement regarding one more quality metrics, such as power, signal to noise ratio, etc.). In some implementations, if the power of the signal that was received by the second transceiver from the first transceiver deviates from the powers of the signals that were received by the second transceiver from the other transceivers, the first transceiver can adjust the transmit power of its signal to reduce or eliminate the deviation (e.g., to "balance" the powers of the signals received by the second transceiver). In some implementations, if the signal to noise ratio of a particular received signal is less than a minimal threshold value, the first transceiver can change its transmit power of its signal (e.g., to increase the signal to noise ratio).

As an example, if the power of the signal that is received by the second transceiver from the first transceiver is higher than the powers of the signals that are received by the second transceiver from the other transceivers, the first transceiver can decrease the power by which the signal is transmitted to the second transceiver (e.g., by reducing the power of a signal amplifier and/or reducing the power of a laser). As another example, if the power of the signal that is received by the second transceiver from the first transceiver is lower than the powers of the signals that are received by the second transceiver from the other transceivers, the first transceiver can increase the power by which the signal is transmitted to the second transceiver (e.g., by increasing the power of a signal amplifier and/or increasing the power of a laser). As another example, if the signal to noise ratio of the signal that is received by the second transceiver from the first transceiver is lower than a minimum threshold value, the first transceiver can modify the power by which the signal is transmitted to the second transceiver (e.g., by modifying the power of a signal amplifier and/or modifying the power of a laser).

In some implementations, a transceiver can receive measurement data from the central software 111 and/or from one or more of the transceivers directly (e.g., using one or more of the control channels described herein, for example with respect to FIGS. 2A-2C).

Figure 27:
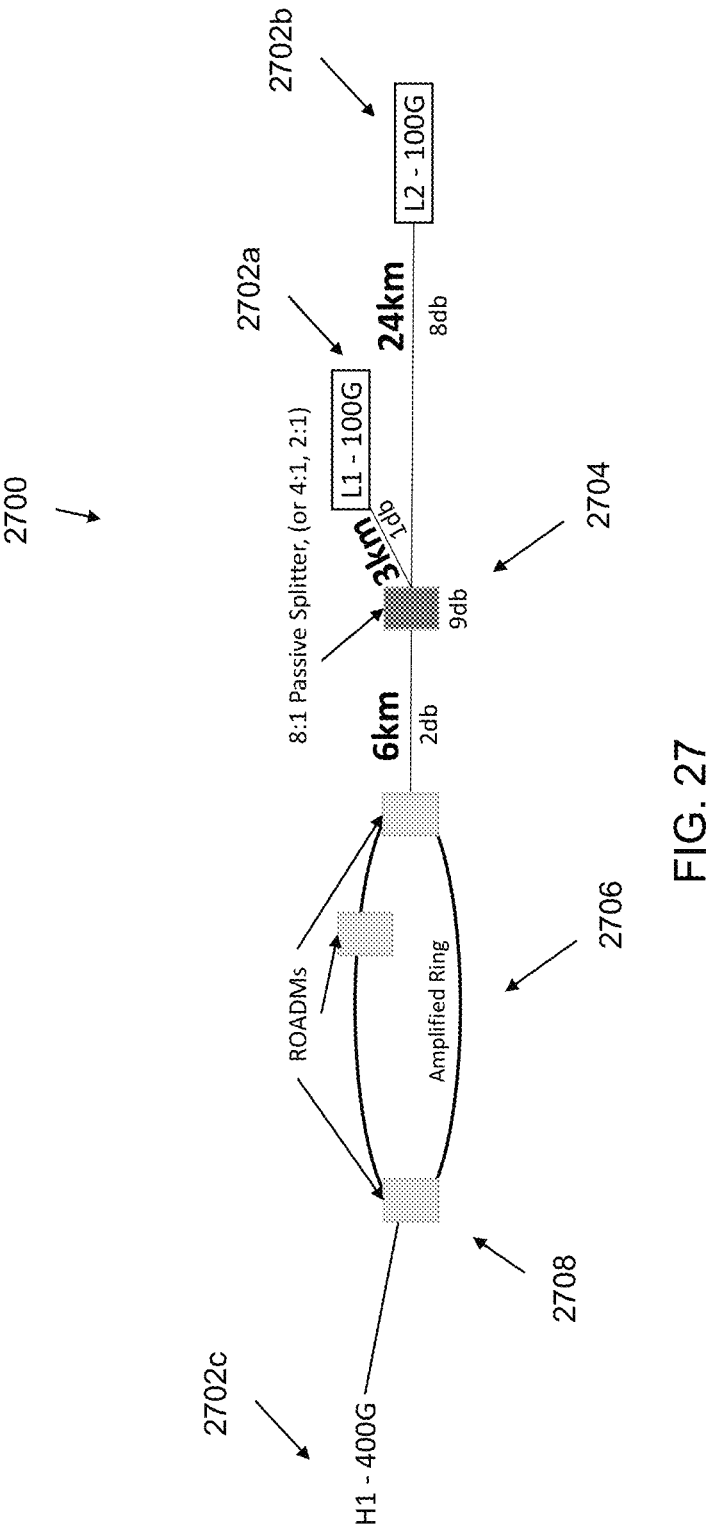
FIG. 27 is a diagram of an example network topography for which power balancing may be used.

The power balancing techniques described herein can provide various technical benefits. For example, FIG. 27 shows an example network topography 2700 of an optical communications network interconnecting a first transceiver 2702a and a second transceiver 2702b (e.g., edge transceivers) to a third transceiver 2702c (e.g., a hub transceiver). Each of the edge and hub transceivers can be implemented, for example, as described above. As shown in FIG. 27, the first transceiver 2702a and the second transceiver 2702b are communicatively coupled to a passive splitter 2704, which in turn is communicatively coupled to an amplified ring 2706 having multiple reconfigurable optical add-drop multiplexers (ROADMs) 2708. The third transceiver 2704b is communicatively coupled to one of the ROADMs 2708 of the amplified ring 2706. Due to the difference between (i) the signal path from the first transceiver 2702a to the third transceiver 2702c, and (ii) the signal path from the second transceiver 2702b to the third transceiver 2702c, signals transmitted by the first transceiver 2702a and the second transceiver 2702a will experience different degrees of attenuation as they travel to the third transceiver 2702c. Accordingly, the signals (e.g., corresponding to different optical subcarriers) may differ in power and/or signal to noise ratio upon delivery to the third transceiver 2702c. As described herein, the first transceiver 2702a and/or the second transceiver 2702b can receive measurement data from the third transceiver 2702c regarding the power of signals received by the third transceiver 2702c, and selectively control their transmission power to "balance" the power of signals received by the third transceiver 2702c (e.g., to reduce or eliminate a deviation in the powers of the received signals) and/or to improve of those signals.

Although the disclosure herein primarily discusses the assignment or allotment of digital subcarriers (and corresponding frequencies of frequency ranges) to transceivers for communication on an optical communication network), in some implementations, other network resource can also be assigned or allotted to transceivers for such communication, either instead of or in addition to those above. For example, in some implementations, a hub transceiver can assign or allot one or more time slots or ranges of time slots for edge transceivers to transmit and/or receive data on the optical communications network. This can be beneficial, for example, as it enables multiple edge transceivers to transmit and/or receive data using a common set of certain network resources (e.g., digital subcarriers, frequencies, etc.), but according to different times such that no two communications overlap in time and potentially interfere with one another (e.g., such that there is no "collision" between the communications).

Figure 35:
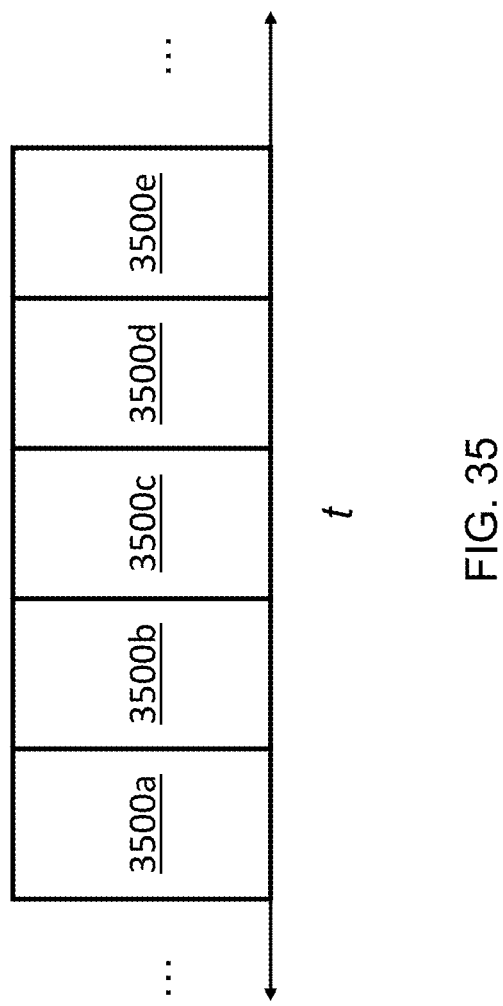
FIG. 35 is a diagram of example time slots that can be assigned to transceivers for communication on an optical communications network.

As an example FIG. 35 shows several example time slots 3500a-3500e. A hub transceiver can assign or allot one or more of these time slots to each edge transceiver, and transmit an indication of the assigned or allotted time slot(s) to each transceiver. In turn, each transceiver can transmit and/or receive data from the optical communications network according to the assigned time slot(s). In some implementations, the time slots that are assigned or allotted to each edge transceiver can repeat in time (e.g., according to a periodic pattern, or some other pattern).

V. Example Control Data and Telemetry Data

As described herein, in some implementations, the devices of an optical communications network can transmit control data and/or telemetry data to one or more other devices of the optical communications network by way of, for example, the amplitude modulation techniques and associated circuitry described above. As an example, a device can transmit, to one or more other devices, control data to instruct the other devices to perform certain actions, to modify the operation of the other devices, etc. As another example, a device can transmit, to one or more other devices, telemetry data regarding operations performed by one or more devices of the optical communications network and/or the status of the one or more devices.

In some implementations, a first transceiver (e.g., a hub transceiver or an edge transceiver) can transmit control data and/or telemetry data to a second transceiver (e.g., a hub transceiver or an edge transceiver) to control the operation of the second transceiver and/or to provide information to the second transceiver (e.g., regarding operations performed by the first transceiver or the status of the first transceiver). In some implementations, the control data and/or telemetry data can be transmitted between the devices using one or more of the control channels described herein, for example with respect to FIGS. 2A-2C.

Further, in some implementations, at least some of the control data and/or the telemetry data can be transmitted independent of the central software 111. For example, one transceiver can transmit information to another transceiver directly, without relying on the central software 111. This feature can be beneficial, for example, as it can enable transceivers to communicate with one another to coordinate their operations with respect to an optical communications network automatically.

In some implementations, a first transceiver (e.g., an edge transceiver) can transmit control data to a second transceiver (e.g., a hub transceiver) requesting that the first transceiver be allotted one or more optical subcarriers for use on the optical communications network. In response, the second transceiver to either allot the one or more requested optical subcarriers to the first transceiver (e.g., if the one or more requested optical subcarriers are available for allotment). An example of this control data is described, for example, with respect to FIG. 21.

In some implementations, a first transceiver (e.g., a hub transceiver) can transmit control data to a second transceiver (e.g., an edge transceiver) requesting that the second transceiver release or relinquish an optical subcarrier that had been previously allotted to the second transceiver. In response, the second transceiver can refrain from using the optical subcarrier with respect to the optical communications network.

In some implementations, a first transceiver (e.g., a hub transceiver) can transmit control data to a second transceiver (e.g., an edge transceiver) requesting that the second transceiver turn on or off an idle optical subcarrier (e.g., as described with respect to FIG. 24). In response, the second transceiver can turn on or off the idle optical subcarrier.

In some implementations, a first transceiver (e.g., a hub transceiver) can transmit control data to a second transceiver (e.g., an edge transceiver) requesting that the second transceiver disconnect from the optical communications network. In response, the second transceiver can relinquish any optical subcarriers that had been allotted to it for use on the optical communications network, and disconnect from the optical communications network.

In some implementations, a first transceiver (e.g., a hub transceiver or an edge transceiver) can transmit control data to a second transceiver (e.g., a hub transceiver or an edge transceiver) requesting that the second transceiver perform an optical spectral analysis or scan of its received signals in a manner similar to that described (e.g., as described with respect to FIGS. 22A-22C). The request can specify the parameters of the analysis (e.g., the range of frequencies that should be analyzed, the resolution of the analysis, the time during which the analysis should be conducted, the type of analysis that should be performed, the frequency bins that should be used for the analysis, etc.). In response, the second transceiver can perform the requested analysis, and transmit the results of the analysis to the first transceiver.

In some implementations, a first transceiver (e.g., a hub transceiver or an edge transceiver) can transmit control data to a second transceiver (e.g., a hub transceiver or an edge transceiver) requesting that the second transceiver upgrade or modify its firmware or software. In some implementations, the control data can include a copy of the upgraded firmware or software, or identify a network location from which the upgraded firmware or software can be retrieved. In response, the second transceiver can upgrade its firmware or software according to the request.

In some implementations, a first transceiver (e.g., a hub transceiver or an edge transceiver) can transmit control data to a second transceiver (e.g., a hub transceiver or an edge transceiver) requesting that the second transceiver forwarded particular data to a third transceiver (e.g., a hub transceiver or an edge transceiver). In response, the second transceiver can forward the identified data to the third transceiver. This can be useful, for example, as it may enable data to be transmitted between transceivers through one or more intermediaries, even if a direct network link is not available those transceivers.

In some implementations, a first transceiver (e.g., a hub transceiver or an edge transceiver) can transmit control data to a second transceiver (e.g., a hub transceiver or an edge transceiver) requesting that the second transceiver transmit telemetry data to the first transceiver. In response, the second transceiver can transmit the requested telemetry data to the first transceiver.

In some implementations, telemetry data can include information regarding the identity of the second transceiver. As an example, telemetry data can include information regarding the current status of the second transceiver (e.g., optical launch power, processor utilization, memory utilization, bandwidth utilization, other resource utilization, power state, temperature, etc.). As another example, telemetry data can include information a transmission of signals by the second transceiver (e.g., the transmit power, the optical subcarriers assigned to the second transceiver for data transmission and allotted for reception, the modulation schemes, such as BPSK, QPSK, and m-QAM, where M is a positive integer greater than 4) used to encode the transmitted data, or any other information regarding the transmission of data by the second transceiver). As another example, telemetry data can include information a receipt of signals by the second transceiver (e.g., the power of the received signals, the optical signal to noise ratio (OSNR) of the received signals, the optical subcarriers allotted to the second transceiver for data reception, the modulation schemes used to decode the received data, or any other information regarding the receipt of data by the second transceiver). As another example, telemetry data can include any other information regarding the second transceiver or operations performed by the second transceiver (e.g., information regarding any of the operations described herein).

FIG. 31A shows an example process 3100 that can be performed using one or more of the systems described herein. For instance, the process 3100 can be performed using an optical communication system including one or more of the components one or more hub transceivers and edge transceivers (e.g., as shown in FIGS. 1, 2A-2C, and 18).

According to the process 3100, a control module is communicatively coupled to an optical communications network (e.g., via one or more optical links, electrical links, wireless communications links, etc.). The control module receives, from one or more edge transceivers or hub transceiver of the optical communications network, telemetry data regarding at least one of a transmission or a receipt of data over the optical communications network (block 3102). As an example, an edge transceiver could be a secondary transceiver or edge transceiver 104, as described above. As another example, a hub transceiver could be a primary transceiver or hub transceiver 106, as described above.

In some implementations, the control module can be remote from the hub transceiver and the plurality of edge transceivers. For example, the control module can be implemented as a part of the central software 111, or as another component of the optical communications network. In some implementations, the control module can be included in one of the edge transceivers or the hub transceiver. In some implementations, the control module can be included in a node (e.g., a computer system) that is physically coupled to one of the edge transceivers or the hub transceiver (e.g., via a physical communications interface, such as a plug or socket, for instance as shown in FIG. 30).

In some implementations, the telemetry data can be received by the control module periodically, continuously, and/or intermittently.

The control module determines, based on the telemetry data, performance characteristics regarding the optical communications network (block 3104).

The control module transmits, based on the performance characteristics, a command to one or more of the edge transceivers or the hub transceiver to modify an operation with respect to the optical communications network (step block 3106).

The telemetry data and the command can be interrelated. As an example, the telemetry data can include an indication of a respective transmit power of one or more of the edge transceivers or the hub transceiver. Correspondingly, the command can include an indication to modify a respective transmit power of one or more of the edge transceivers or the hub transceiver.

As another example, the telemetry data can include an indication of a respective subset of network resources of the optical communications network assigned to one or more of the edge transceivers or the hub transceiver for use in communicating over the optical communications network. For instance, the network sources can be a particular bandwidth or range of bandwidths, frequencies or range of frequencies, optical subcarriers or range of optical subcarriers, time slots or range of time slots, and/or any other network resource that is used to communicate on the optical communications network. Correspondingly, the command can include an assignment of a different subset of network resources of the optical communications network to one or more of the edge transceivers or the hub transceiver for use in communicating over the optical communications network.

As another example, the telemetry data can include a temperature of a first edge communications of the plurality of edge transceivers. Correspondingly, the command can include an indication to modify a power provided to the first edge transceiver based on the temperature of the first edge transceiver. In some implementations, the command can include an indication to modify a power provided to one or more second edge transceiver of the plurality of edge transceiver based on the temperature of the first edge transceiver.

Additional examples of telemetry data and commands are described above.

VI. Example Discovery of Misconfigurations with Respect to the Optical Communications Network As described herein, in some implementations, the devices of an optical communications network can automatically detect misconfigurations with respect to the optical communication network, and automatically correct those misconfigurations. In some implementations, the detection and correction of misconfiguration can be performed independent of the central software 111. This can be beneficial, for example, as it may enable transceivers to adjust their configurations autonomously, such that communications on the optical communications network are not disrupted.

In some implementations, a first hub transceiver can determine that it and a second hub transceiver have been assigned respective sets of optical subcarriers (e.g., for allotment to their respective edge transceivers) that overlap or "collide" with one another. Due to this overlapping or colliding assignment, the hub transceivers may raise an alarm condition that the one or more of the same optical subcarriers have been allocated to two different hub transceivers, and would result in collisions or signal interference. The assignments can then be reviewed, and a new allocation of optical subcarriers can be provided to the hub transceivers without network disruption of the traffic that the first hub or the second hub are serving.

To detect this condition, the first hub transceiver can identify the sets of optical subcarriers that are assigned to the second hub transceiver by monitoring the optical network for messages transmitted from one or more edge transceivers and intended for the second hub transceiver. These edge messages may include an indication of the sets of optical subcarriers that are assigned to the second hub transceiver. For example, the message can include a copy or "echo" of the beacon message that is transmitted by the second hub transceiver to each of its edge transceivers, which includes a list of each of the optical subcarriers that are currently assigned to the hub transceiver and made available for allotment.

In some implementations, a first transceiver (e.g., a hub transceiver or an edge transceiver) and a second transceiver (e.g., a hub transceiver or an edge transceiver) are communicating to an optical gateway using overlapping or colliding communication channels (e.g., via overlapping frequencies or frequency bands). Due to these overlapping or colliding communications channels, the communications between the transceiver and the optical gateway may be misrouted or experience signal interference.

To correct this misconfiguration, upon detecting this overlap or collision, the optical gateway can request that the first transceiver use a different frequency or frequency band to communicate with the optical gateway (e.g., such that there is no longer an overlap or collision).

FIG. 31B shows an example process 3110 that can be performed using one or more of the systems described herein. For instance, the process 3110 can be performed using an optical communication system including one or more of the components one or more hub transceivers and edge transceivers (e.g., as shown in FIGS. 1, 2A-2C, and 18).

According to the process 3110, a first hub transceiver communicatively coupled to an optical communications network (e.g., via one or more optical links, electrical links, etc.). The first hub transceiver determines that the first hub transceiver is configured to assign a first subset of network resources of the optical communications network to a first subset of the edge transceivers for communication over the optical communications network (block 3112). As an example, each of the hub transceiver could be a primary transceiver or hub transceiver 106, as described above The first hub transceiver determines that a second hub transceiver is configured to assign a second subset of network resources of the optical communications network to a second subset of the edge transceivers for communication over the optical communications network (block 3114).

The first hub transceiver determines that the first subset of network resources overlaps the second subset of network resources (step 3116).

In some implementations, the network resources can include a particular bandwidth or range of bandwidths, frequencies or range of frequencies, optical subcarriers or range of optical subcarriers, time slots or range of time slots, and/or any other network resource that is used to communicate on the optical communications network.

In some implementations, the first subset of network resources can include a first frequency band, and the second subset of network resources can include a second frequency band. Determining that the first subset of network resources overlaps the second subset of network resources can include determining that the first frequency band overlaps the second frequency band overlap.

In some implementations, the first subset of network resources can include one or more first time slots for communicating over the optical communications network, and the second subset of network resources can include one or more second time slots for communicating over the optical communications networks. Determining that the first subset of network resources overlaps the second subset of network resources can include determining that the one or more first time slots overlap the one more second time slots.

In response to determining that the first subset of network resources overlaps the second subset of network resources, the first hub transceiver transmits a notification of the overlap to a control module of the optical communications network (step 3118).

In some implementations, the control module can be remote from the hub transceivers. For example, the control module can be implemented as a part of the central software 111, or as another component of the optical communications network. In some implementations, the control module can be included in one of the hub transceivers. In some implementations, the control module can be included in a node (e.g., a computer system) that is physically coupled to one of the hub transceivers (e.g., via a physical communications interface, such as a plug or socket, for instance as shown in FIG. 30).

In some implementations, the process 3110 can also include, in response to determining that the first subset of network resources overlaps the second subset of network resources, refraining from transmitting data during first subset of network resources by the first hub transceiver.

In some implementations, the first hub transceiver can determine that the second hub transceiver is configured to assign the second subset of network resources to the second subset of the edge transceivers based on messages transmitted by one or more of the second subset of the edge transceivers. For example, the first hub transceiver can receive one or more messages transmitted by one or more of the second subset of the edge transceivers and intended for delivery to the second hub transceiver, where the one or more messages include an indication of the second subset of network resources.

In some implementations, the first hub transceiver and/or the second hub transceiver can include an external connection interface for coupling to a network node. For example, the first hub transceiver and/or the second hub transceiver can include one or more of the physical communication interfaces shown and described with respect to FIG. 30. In some implementations, the network node can be a primary node or hub node 106.

VII. Example Discovery of Fiber Plant of the Optical Communications Network

In some implementations, an optical gateway (e.g., the optical gateway described with respect to FIGS. 7 and 26) can be configured to automatically determine the fiber topology or interconnections between it and the other devices of the optical communications network. As an example, the optical gateway can determine, for each of its ports (e.g., each of its physical interfaces for receiving a physical optical link, such as a fiber optical cable), the optical link that is coupled to that port, and the one or more other devices that are coupled to that optical link (e.g., one or more hub transceivers or edge transceivers). In some implementations, the optical gateway can determine, for each port, the identity of each of the transceivers that are coupled to that optical link (e.g., unique identifiers that distinguish the transceivers from other transceivers on the optical communications network).

This technique for "auto discovery" of interconnections on the optical network can provide various benefits. For example, this process may enable an optical gateway to automatically ascertain the configuration of at least a portion the optical communications network. In some implementation, this information can be provided to a user (e.g., to aid in the administration of the system, the identification and rectification of misconfigurations with respect to the system, the planning of improvements or enhancements of the system, etc.). In some implementation, this information can be provided to other devices of the system (e.g., to aid in the automatic configuration of the system, the automatic identification and rectification of misconfigurations with respect to the system, etc.).

FIG. 31C shows an example process 3120 that can be performed using one or more of the systems described herein. For instance, the process 3120 can be performed using an optical communication system including an optical gateway (e.g., as shown in FIGS. 1, 2A-2C, 7, 18, and 26).

According to the process 3120, an optical gateway communicatively coupled to an optical communications network (e.g., via one or more optical links, electrical links, etc.). As an example, the optical gateway can be the OGW 103-1 or the OGW 103-2. The optical gateway receives a plurality of signals from the optical communications network at a plurality of ports of the optical gateway (block 3122). Each port of the optical gateway includes one or more respective photodiodes (e.g., as shown in FIG. 7).

The optical gateway determines, for each port, (i) a respective link of the optical communications network communicatively coupling the port with at least one hub transceiver communicatively coupled to the optical communications network or with at least one edge transceiver communicatively coupled to the optical communications network, and (ii) an identity of the at least one hub transceiver or the at least one edge transceiver (block 3124). As an example, an edge transceiver could be a second transceiver or edge transceiver 104, as described above. As another example, a hub transceiver could be a primary transceiver or hub transceiver 106, as described above. In some implementation, each of the links can include one or more lengths of optical fiber.

In some implementations, according to the process 3120, the optical gateway can receive a first signal of the plurality of signals from at least one hub transceiver of a plurality of hub transceivers or from at least one edge transceiver of a plurality of edge transceivers. The optical gateway can determine a power of the received first signal, attenuate the first signal based on the power of the received first signal (e.g., using one or more VOAs). Further, the optical gateway can transmit the attenuated first signal to another transceiver of the optical communications network.

In some implementations, the first signal can be attenuated further based on one or more commands received from a control module of the optical communications network. In some implementations, the control module can be remote from the optical gateway and the transceivers. For example, the control module can be implemented as a part of the central software 111, or as another component of the optical communications network. In some implementations, the control module can be included in one of the transceivers or the optical gateway. In some implementations, the control module can be included in a node (e.g., a computer system)

that is physically coupled to one of the transceivers (e.g., via a physical communications interface, such as a plug or socket, for instance as shown in FIG. 30).

VIII. Other Example Processes for Performing the Techniques Described Herein

FIG. 31D shows an example process 3130 that can be performed using one or more of the systems described herein. For instance, the process 3130 can be performed using an optical communication system including a primary transceiver and a plurality to secondary transceivers (e.g., as shown in FIGS. 1, 2A-2C, and 18).

According to the process 3130, an edge transceiver is communicatively coupled to a first network node and to an optical communications network (e.g., via one or more optical links, electrical links, etc.). The edge transceiver receives a first message from a hub transceiver over a first communications channel of the optical communications network (block 3132). The first message includes an indication of available network resources on the optical communications network.

In some implementations, the network resources can include a particular bandwidth or range of bandwidths, frequencies or range of frequencies, optical subcarriers or range of optical subcarriers, time slots or range of time slots, and/or any other network resource that is used to communicate on the optical communications network.

In some implementations, the indication of the available network resources on the optical communications network can include an indication of a plurality of optical subcarriers of the optical communications network, and an identity (e.g., in index value, or some other identifier) of one or more of the optical subcarriers that are not currently assigned to the edge transceiver or any other edge transceivers of the optical communications network.

In some implementations, the first communications channel can include first signals that have been amplitude modulated with respect to each of the plurality of optical subcarriers. In some implementations, the second communications channel can include second signals transmitted according to one or more frequencies that do not coincide with the plurality of optical subcarriers. In some implementations, at least one of the first communications channel or the second communications channel corresponds to a respective optical subcarrier. Examples of these communications channels are described, for example, with respect to FIGS. 2A-2C, 21, and 23A-23C.

In some implementations, the first message can also include instructions for requesting assignment of the one or more of the optical subcarriers that are not currently assigned to the edge transceiver or any other edge transceivers of the optical communications network. Example instructions are described, for example, with respect to FIG. 21.

Additional details regarding the first message are described, for example, with respect to FIG. 21 (e.g., block 2108).

In some implementations, the edge transceiver could be a secondary transceiver or edge transceiver 104, as described above. In some implementations, the hub transceiver could be a primary transceiver or hub transceiver 106, as described above. Further, the first network node can be a computer system that is physically coupled to the edge transceiver (e.g., via a physical communications interface, such as a plug or socket, for instance as shown in FIG. 30).

The edge transceiver transmits, over a second communications channel of the optical communications network, a second message to the hub transceiver (block 3134). The second message includes an indication of a subset of the available network resources selected by the edge transceiver for use in communicating over the optical communications network.

Additional details regarding the second message are described, for example, with respect to FIG. 21 (e.g., block 2110).

The edge transceiver receives, from the hub transceiver, a third message acknowledging receipt of a selection by the edge transceiver (block 3136). Additional details regarding the third message are described, for example, with respect to FIG. 21 (e.g., block 2112).

In some implementations, the edge transceiver can transmit the second message to the hub transceiver periodically until the third message is received by the edge transceiver from the hub transceiver.

The edge transceiver receives, from the hub transceiver, a fourth message confirming an assignment of the selected subset of the available network resources to the edge transceiver for use in communicating over the optical communications network (block 3138). Additional details regarding the fourth message are described, for example, with respect to FIG. 21 (e.g., block 2116).

The edge transceiver transmits, using the selected subset of the available network resources, data from the first network node to a second network node via the hub transceiver (block 3140). As an example, the second network node can be another computer system on the optical communications network.

In some implementations, the edge transmit can receive additional messages from the hub transceiver, and perform certain operations is response. As an example, the edge transceiver can receive a message from the hub transceiver including a command to modify an assignment of network resources to the edge transceiver. In response, the edge transceiver can transmit data from the first network node to the second network node via the hub transceiver according to the modified assignment of network resources.

As another example, the edge transceiver can receive a message from the hub transceiver including a command to relinquish the subset of network resources that had been assigned to the edge transceiver. In response, the edge transceiver can refrain from transmitting data to the hub transceiver using the subset of network resources that had been assigned to the edge transceiver.

As another example, the edge transceiver can receive a message from the hub transceiver including a request for a status of the edge transceiver. In response, the edge transceiver can transmit the status of the edge transceiver to the hub transceiver. In some implementations, the edge transceiver can transmit the status of the edge transceiver to the hub transceiver periodically (e.g., without the hub transceiver making a request for it status).

As another example, the edge transceiver can receive a message from the hub transceiver including a command to modify a transmit power of the edge transceiver. In response, the edge transceiver can transmit data from the first network node to a second network node via the hub transceiver according to the modified transmit power.

As another example, the edge transceiver can receive a message from the hub transceiver including a command to forward data from the edge transceiver to a further transceiver communicatively coupled to the optical communications network. In response, the edge transceiver can forward the data to the further transceiver according to the fifth message. In some implementations, the further transceiver can be another edge transceiver of the optical communications network.

In some implementations, according to the process 3130, the edge transceiver can also determine a carrier frequency associated with the hub transceiver. To determine a carrier frequency associated with the hub transceiver, the edge receive can receive a signal from the hub transceiver via the optical communications network (e.g., by scanning a frequency range using a local oscillator of the edge transceiver, where the frequency range including a plurality of frequency subsets). Further, the edge transceiver can determine a plurality of power values of the optical signal, each of the plurality of power values being associated with a corresponding one of the plurality of frequency subsets. Further, the edge transceiver can determine, based on the plurality of power values, a carrier frequency associated with the hub transceiver. In some implementations, the power level can correspond to the carrier frequency is greater than the power values corresponding to the frequency ranges that do not coincide with the carrier frequency.

Additional details regarding determining a carrier frequency are described, for example, with respect to FIGS. 22A-22E.

In some implementations, according to the process 3130, the edge transceiver can also receive, from the hub transceiver, one or more quality metrics regarding a signal transmitted from the edge transceiver to the hub transceiver. Further, the edge transceiver can modify one or more control parameters for transmitting data based on the one or more quality metrics. In some implementations, the one or more control parameters can include a transmit power of the first edge transceiver. As an example, the edge transceiver can perform a power balancing operation according to the process described with respect to FIGS. 26 and 27.

FIG. 31E shows an example process 3150 that can be performed using one or more of the systems described herein. For instance, the process 3150 can be performed using an optical communication system including a primary transceiver and a plurality to secondary transceivers (e.g., as shown in FIGS. 1, 2A-2C, and 18).

According to the process 3150, a hub transceiver communicatively coupled to a first network node and to an optical communications network. The hub transceiver determines a plurality of optical subcarriers available for assignment by the hub transceiver to a plurality of edge transceivers for use in communicating over the optical communications network (block 3152). As an example, an edge transceiver could be a secondary transceiver or edge transceiver 104, as described above. As another example, a hub transceiver could be a primary transceiver or hub transceiver 106, as described above.

The hub transceiver assigns, to each of the edge transceivers, a respective subset of the optical subcarriers for use in communicating over the optical communications network (block 3154). Each of the subsets of the optical subcarriers includes a respective data optical subcarrier for transmitting data over the optical communications network. Further, at least one of the subsets of the optical subcarriers includes one or more respective idle optical subcarriers. In some implementations, the subsets of the optical subcarriers do not overlap.

In some implementations, for at least one of the subsets of the optical subcarriers, the data optical subcarrier and the one or more idle optical subcarriers can be continuous (e.g., spectrally continuous, such that there are no optical other optical subcarriers positioned between them spectrally).

In some implementations, for at least at least one of the subsets of the optical subcarriers, the data optical subcarrier can precede the one or more idle optical subcarriers (e.g., spectrally precede the one or more idle optical subcarriers).

Additional details regarding data and idle optical subcarriers are described, for example, with respect to FIG. 24.

The hub transceiver transmits, to each of the edge transceivers, an indication of the respective subset of the optical subcarriers assigned to the edge transceiver (block 3156). In response, the edge transceiver can transmit and/or receive data over the optical communication network using the subset of the optical subcarriers that were assigned to it.

In some implementations, the hub transceiver can include an external connection interface for coupling to a network node. For example, the hub transceiver can include one or more of the physical communication interfaces shown and described with respect to FIG. 30. In some implementations, the network node can be a primary node or hub node 106

Additional details regarding the process 3150 are described, for example, with respect to FIG. 24.

FIG. 31F shows an example process 3160 that can be performed using one or more of the systems described herein. For instance, the process 3160 can be performed using an optical communication system including a primary transceiver and a plurality to secondary transceivers (e.g., as shown in FIGS. 1, 2A-2C, and 18).

According to the process 3160, a hub transceiver determines a plurality of optical subcarriers available for assignment by the hub transceiver to a plurality of edge transceivers for use in communicating over an optical communications network (block 3162). The hub transceiver is communicatively coupled to a first network node and to the optical communications network.

Each of the edge transceivers is configured to be communicatively coupled to a respective second network node and to the optical communications network. Further, each of the edge transceivers has one of several types of configurations. For example, one or more of the edge transceiver can have a first type of configuration for communicating with the optical communications network according to a first bandwidth, where the first type of configuration is associated with a first optical subcarrier assignment protocol. As another example, one or more of the edge transceiver can have a second type of configuration for communicating with the optical communications network according to a second bandwidth, where the second type of configuration is associated with a second optical subcarrier assignment protocol. As another example, one or more of the edge transceiver can have a third type of configuration for communication with the optical communications network according to a third bandwidth, where the third type of configuration is associated with a third optical subcarrier assignment protocol.

In some implementations, the first bandwidth can be greater than the second bandwidth, and the second bandwidth can be greater than the third bandwidth. As an example, the first bandwidth can be 100 Gbit/s, the second bandwidth can be 50 Gbit/s, and the third bandwidth can be 25 Gbit/s.

Although three types of configurations are described above, fewer types of configurations or a greater number of types of configurations are also possible, depending on the implementation.

The hub transceiver assigns, to each of the edge transceivers, a respective subset of the optical subcarriers for use in communicating over the optical communications network (block 3164). In some implementations, the subsets of the optical subcarriers do not overlap.

Assigning the respective subset of the optical subcarriers can include, for each particular one of the edge transceivers, determining that the particular edge transceiver has the first type of configuration, the second type of configuration, or the third type of configuration. In response, the hub transceiver can assign the respective subset of the optical subcarriers to the particular edge transceiver according to a particular one of the optical subcarrier assignment protocols associated with the determined type of configuration.

In some implementations, the plurality of optical subcarriers can a plurality of groups, where each of the groups includes N contiguous optical subcarriers. In some implementations, N can be 4, or some other number (e.g., 8, 16, etc.).

In some implementations, assigning the respective subset of the optical subcarriers to the particular edge transceiver according to the first optical subcarrier assignment protocol can include determining that the optical subcarriers of a first group among the plurality of groups are not currently assigned to any of the edge transceivers, and in response, assigning at least one of the optical subcarriers of the first group to the particular edge transceiver.

Additional details regarding the first optical subcarrier assignment protocol are described, for example, with respect to FIG. 24 (e.g., the protocol described with respect the 100 Gbit/s transceivers).

In some implementations, assigning the respective subset of the optical subcarriers to the particular edge transceiver according to the second optical subcarrier assignment protocol can include determining that at least two but less than N of the optical subcarriers of a first group among the plurality of groups are not currently assigned to any of the edge transceivers, and in response, assigning at least one of the optical subcarriers of the first group to the particular edge transceiver.

Further, in some implementations, assigning the respective subset of the optical sub carriers to the particular edge transceiver according to the second optical subcarrier assignment protocol can include determining that none of the groups has at least two but less than N optical subcarriers that are not currently assigned to any of the edge transceivers. In response, the hub transceiver can determine that the optical subcarriers of a first group among the plurality of groups are not currently assigned to any of the edge transceivers, and assign at least one of the optical subcarriers of the first group to the particular edge transceiver.

Additional details regarding the second optical subcarrier assignment protocol are described, for example, with respect to FIG. 24 (e.g., the protocol described with respect the 50 Gbit/s transceivers).

In some implementations, assigning the respective subset of the optical subcarriers to the particular edge transceiver according to the third optical subcarrier assignment protocol can include determining that exactly one of the optical subcarriers of a first group among the plurality of groups are not currently assigned to any of the edge transceivers, and in response, assigning one of the optical subcarriers of the third group to the particular edge transceiver.

Further, in some implementations, assigning the respective subset of the optical subcarriers to the particular edge transceiver according to the third optical subcarrier assignment protocol can include determining that none of the groups has exactly one optical subcarrier that is not currently assigned to any of the edge transceivers. In response, the hub transceiver can determine that a first optical subcarrier of a first group among the plurality of groups is not currently assigned to any of the edge transceivers, and that a second optical subcarrier of the first group is currently assigned to one of the edge transceivers, where the first optical subcarrier and the second optical subcarrier are contiguous. Further, in response, the hub transceiver can assign one of the optical subcarriers of the first group to the particular edge transceiver.

Further, in some implementations, assigning the respective subset of the optical subcarriers to the edge transceiver according to the third optical subcarrier assignment protocol can including determining that none of the groups has exactly one optical subcarrier that is not currently assigned to any of the edge transceivers, and that none of the groups has (i) a first optical subcarrier that is not currently assigned to any of the edge transceivers, and (ii) a second optical subcarrier that is currently assigned, where the first optical subcarrier and the second optical subcarrier are contiguous. In response, the hub transceiver can determine that the optical subcarriers of a first group among the plurality of groups are not currently assigned to any of the edge transceivers, and assign at least one of the optical subcarriers of the first group to the edge transceiver.

Additional details regarding the third optical subcarrier assignment protocol are described, for example, with respect to FIG. 24 (e.g., the protocol described with respect the 25 Gbit/s transceivers).

The hub transceiver transmits, to each respective one of the edge transceivers, an indication of the respective subset of the optical subcarriers assigned to the particular edge transceiver (block 3166).

As noted above, with respect to FIGS. 23A-23C, amplitude modulation (AM) tones may be imposed on the optical subcarriers in order to transmit control information, for example, to the leaf nodes. Further examples of AM tones imposed on optical subcarriers will next be described with reference to FIGS. 36A, 36B, and 37. Each of the optical subcarriers described below are Nyquist subcarriers, for example.

Figure 36A:
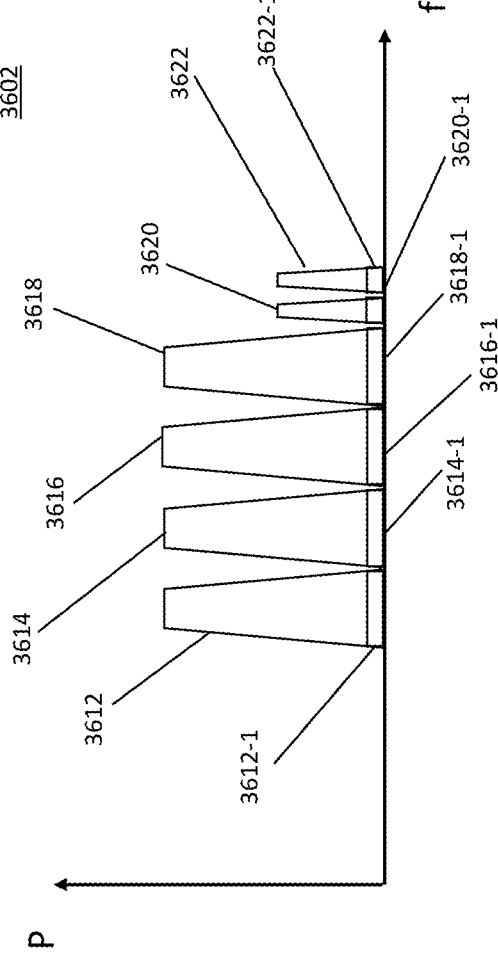
FIGS. 36A and 36B show examples of power spectral density plots consistent with an aspect of the present disclosure.

FIG. 36A shows a power spectral density plot 3602 including optical subcarriers 3612, 3614, 3616, and 3618, which, in one example, are output from a leaf or secondary node transmitter in a manner similar to that described above. As further shown in FIG. 36A, each of these optical subcarriers, in a further example, is amplitude modulated to carry a tone or AM tone. Each such tone is represented by a rectangles 3612-1 to 3618-1. As noted above, such tones may carry control information.

In addition to optical subcarriers 3612, 3614, 3616, and 3618, a leaf node, in one example, may also transmit along with such optical subcarriers additional optical subcarriers, such as optical subcarriers 3620 and 3622, each of which being amplitude modulated to carry AM tones represented by rectangles 3620-1 and 3622-1, respectively. The AM tones of such "small" optical subcarriers carry control information, and, in a further example, such control information includes clocking or timing information for the DSP in the hub node, such as, to carry out clock and data recovery in connection with information carried by the "larger" subcarriers 3612, 3614, 3616, and 3618. In one example, the "small" optical subcarriers may each carry different control information and, in another example, each small optical subcarrier may carry different control information. Moreover, AM tone 3620-1 may have the same or different AM frequency than AM tone 3622-1. In a further example, the AM modulation of optical subcarriers 3620 and 3622 is based on the control information associated with each such subcarrier.

Figure 36B:
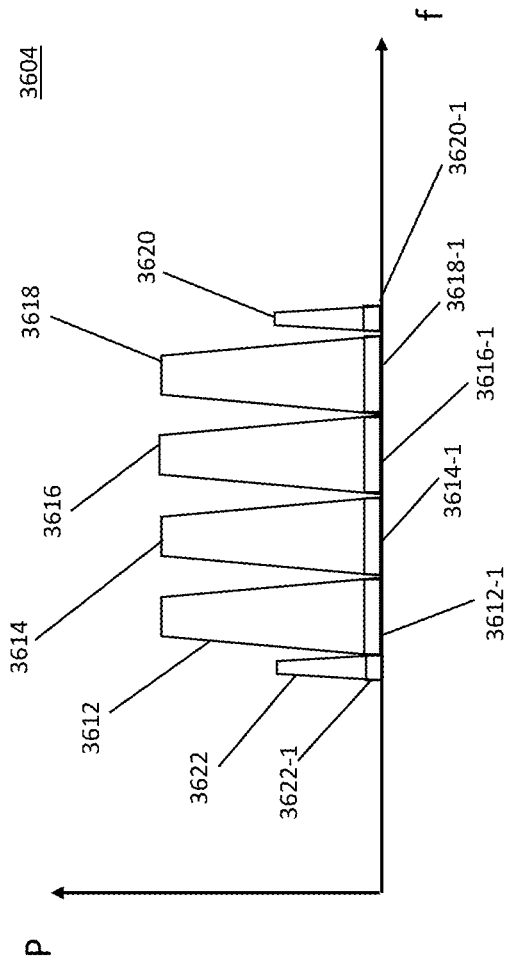

In the example shown in FIG. 36A, the "small" subcarriers 3620 and 3622 have frequencies that are greater than each of the frequencies associated with the "large" optical subcarriers 3612, 3614, 3616, and 3618. Alternatively, the frequencies of the optical subcarriers 3620 and 3622 may be less than the frequencies associated with optical subcarriers 3612, 3614, 3616, and 3618. In an additional example, as shown in FIG. 36B, the frequencies of each of the "large" optical subcarriers may each be greater than frequency associated with "small" optical subcarrier 3622 and less than optical frequencies associated with "small" optical subcarrier 3620.

In the above example, four "large" optical subcarriers are output from a leaf node. However, more or fewer "large" optical subcarriers may be output from such leaf or secondary node. As noted above, one leaf node, for example, may output "large" optical subcarriers 3612 and 3616, while another leaf node may output "large" optical subcarrier 3614 and yet another leaf node may output large optical subcarrier 3618. Generally, each of the "large" optical subcarriers carries information associated with user data. In addition, the number of "large" subcarriers supplied by each node may change based, for example, on traffic demands. In a further example, the one or more of the "small" optical subcarriers may carry information associated with user data instead of or in addition to control information.

Figure 37:
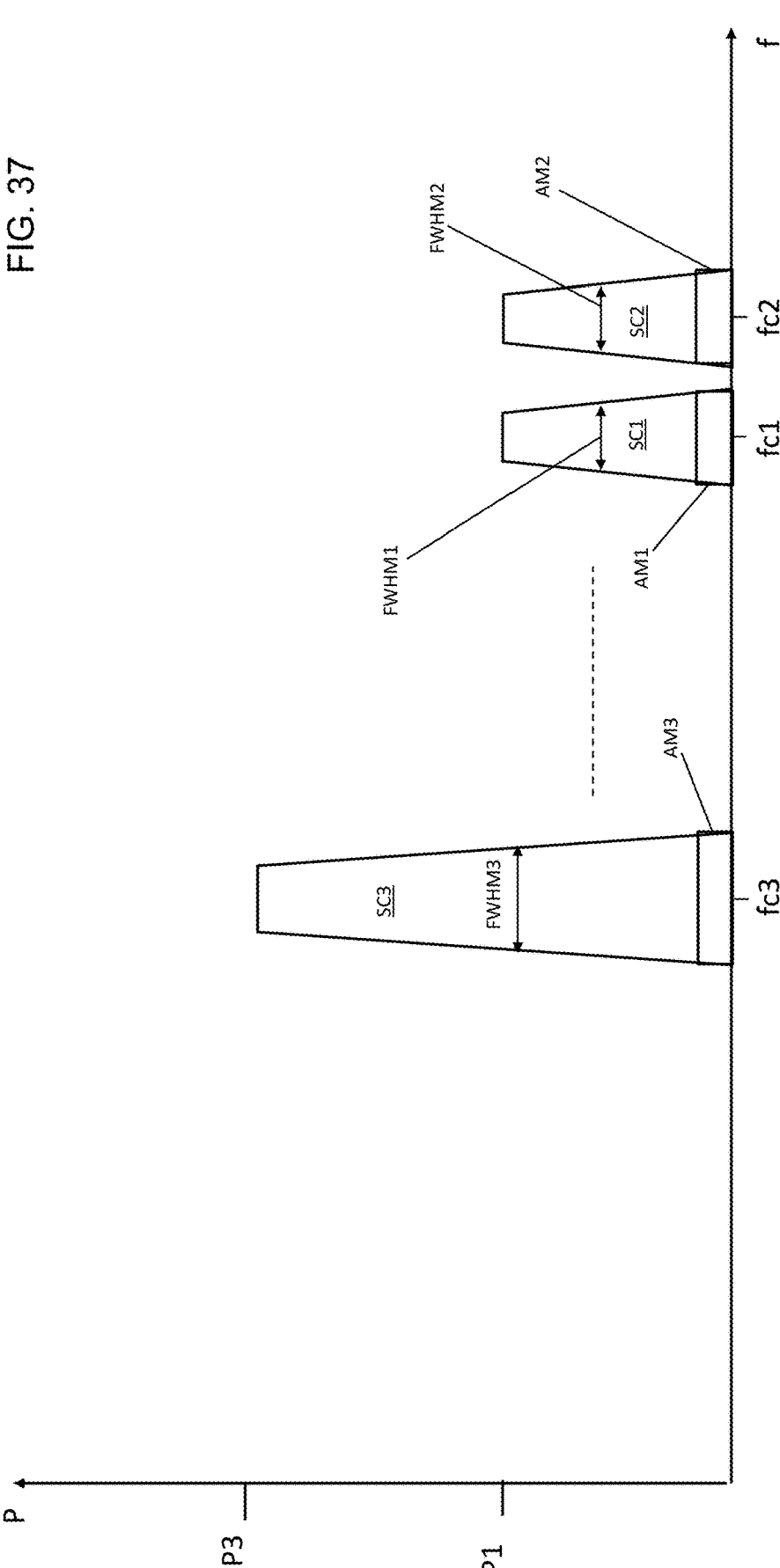
FIG. 37 shows examples of optical subcarriers consistent with a further aspect of the present disclosure.

FIG. 37 shows examples of one of "large" optical subcarriers SC3 and "small" optical subcarriers SC1 and SC2 in greater detail. It is understood, that other "large" optical subcarriers will have a similar power spectral density profile as that of "large" subcarrier SC3. As shown in FIG. 37, each of optical subcarriers SC1, SC2, and SC3 has a respective center frequency fc1, fc2, and fc3, as well as a respective spectral width or full-width half maximum (FWHM), FWHM1, FWHM2, and FWHM3. In the example shown, "large" optical subcarrier SC3 has a power level P3 at center frequency fc3, which is greater than the power level P1, which is the power level at center frequencies fc1 and fc2 of "small" optical subcarriers SC1 and SC2, respectively.

Each of optical subcarriers SC1 to SC3 is modulated with a respective one of AM tones AM1 to AM3 in a manner similar to that described above, for example, to carry control information, such as timing or clocking information. The AM modulation associated with each optical subcarrier is carried out based on respective control information associated with each such subcarrier, as noted above. Each such tone may have the same or different AM frequency. Moreover, in a further example, each "small" optical subcarrier may have the same or greater power level at its respective center frequency than the power level at the center frequencies of the "large" optical subcarriers. In that case, each "small" optical subcarrier has a smaller or narrower FWHM or spectral width than each of the "large" optical subcarriers.

In another example, each "small" optical subcarrier has an FWHM or spectral width that is greater than or equal to the FWHM or spectral width of each of the "large" optical subcarriers. Here, however, the power level at the center frequency of each "small" optical subcarrier is less than the power level at the center frequency of each of the "large" optical subcarriers.

Although the optical subcarriers shown in FIGS. 36A, 36B, and 37 are described as being output from the leaf or secondary nodes, it is understood that circuitry described above in the hub or primary node may output fewer "large" and/or "small" optical subcarriers or more "large" and/or "small" optical subcarriers. In an example in which the hub node outputs "small" optical subcarriers, each may be associated with a corresponding leaf or secondary node. In another example, each hub can output control information through amplitude modulation of one of the "small" optical subcarriers, and such control information intended for the secondary or leaf nodes is provided in a series of time slots, such as time slots 3500, as described above in connection with FIG. 35. In this manner, the "small" optical subcarrier is shared among the leaf nodes, such that one of the time slots includes control information intended for one of the leaf nodes and another one of the time slots includes control information intended for another one of the leaf nodes.

A brief review of the generation of the "large" and "small" optical subcarriers will next be described. It is understood that similar circuitry in both the hub/primary node and leaf/secondary nodes may be provided to generate such optical subcarriers. Namely, user data, such as one or more data streams, may be supplied to a digital signal processor, such as DSP 902 described above, and based on such user data or one or more data streams digital signals are provided to a digital-to-analog circuitry, such as circuits 904-1 to 904-4 described above. The digital-to-analog circuits generate analog signals based on the digital signals. Driver circuitry, such as driver circuits 906-1 to 906-4 further described above, are included to provide drive signals to a modulator. The modulator, which, in one example, includes multiple Mach-Zehnder interferometers or modulators, such as Mach-Zehnder modulators (MZMs) 910-1 to 910-4, receives an optical signal from a laser, such as laser 908, and the drive signals. The modulator, including the MZMs 910, modulates such optical signal based on the drive signals to provide the optical subcarriers described above, including both "large" and "small" subcarriers having the FWHM values and power levels further described above.

IX. Example Computer Systems

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, some or all of the components described herein can be implemented using digital electronic circuitry, or in computer software, firmware, or hardware, or in combinations of one or more of them. In another example, the process can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium also can be, or can be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows also can be performed by, and apparatus also can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 32:
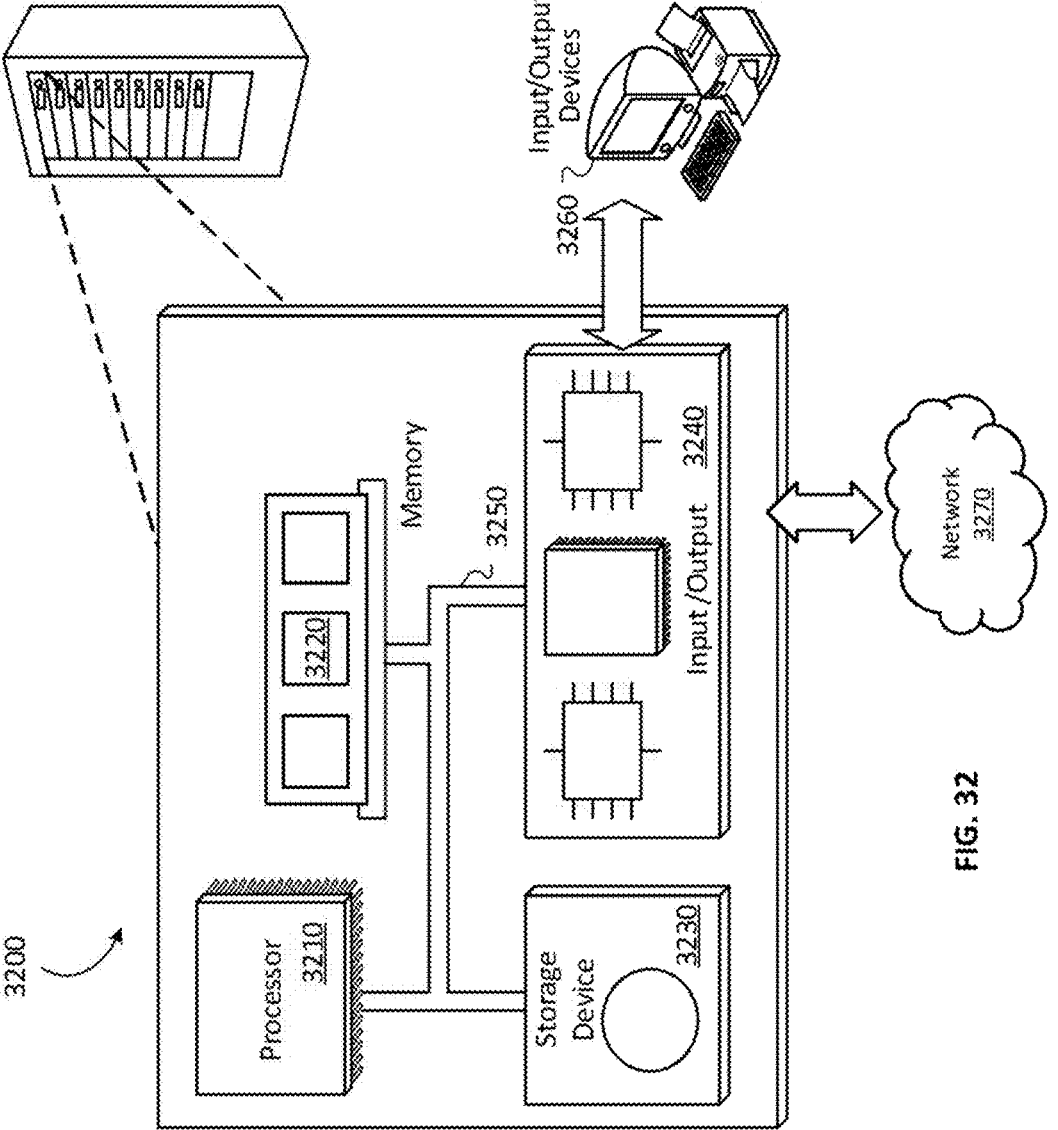
FIG. 32 is a diagram of an example computer system.

FIG. 32 shows an example computer system 3200 that includes a processor 3210, a memory 3220, a storage device 3230 and an input/output device 3240. Each of the components 3210, 3220, 3230 and 3240 can be interconnected, for example, by a system bus 3250. The processor 3210 is capable of processing instructions for execution within the system 3200. In some implementations, the processor 3010 is a single-threaded processor, a multi-threaded processor, or another type of processor. The processor 3010 is capable of processing instructions stored in the memory 3220 or on the storage device 3230. The memory 3220 and the storage device 3230 can store information within the system 3200.

The input/output device 3240 provides input/output operations for the system 3200. In some implementations, the input/output device 3240 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. for communicating with a network 3070 (e.g., via one or more network devices, such as switches, routers, and/or other network devices). In some implementations, the input/output device can include driver devices configured to receive input data and send output data to other input/output devices, e.g., keyboard, printer and display devices 3260. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations also can be combined in the same implementation. Conversely, various features that are described in the context of a single implementation also can be implemented in multiple embodiments separately or in any suitable sub-combination.

A number of implementations have been described. Nevertheless, it will be understood that various modifications may be made without departing from the spirit and scope of the invention. Accordingly, other implementations are within the scope of the claims.

What is claimed is:

1. An apparatus, comprising:
a laser operable to supply an optical signal;
a digital signal processor operable to receive at least one data stream and supply a plurality of digital signals based on said at least one data stream;
digital to analog circuitry operable to provide a plurality of analog signals based on the plurality of digital signals;
driver circuitry operable to supply a plurality of drive signal based on the analog signals; and a modulator operable to:
receive the plurality of drive signals, and
modulate the optical signal based on the plurality of drive signals to provide a plurality of optical subcarriers, such that a first one of the plurality of optical subcarriers has a first center frequency and a first power at the first center frequency, and a second one of the plurality of optical subcarriers has a second center frequency and a second power at the second center frequency, the first power being less than the second power, and the second one of the plurality of optical subcarriers being modulated based on a first modulation and a second modulation, the first modulation being an m-QAM modulation, where m is an integer greater than 4 and the second modulation is an amplitude modulation.

2. An apparatus in accordance with claim 1, wherein each of the plurality of optical subcarriers is a Nyquist subcarrier.

3. An apparatus in accordance with claim 1, wherein the first one of the plurality of optical subcarriers carries control information.

4. An apparatus in accordance with claim 3, wherein the control information includes clocking information.

5. An apparatus in accordance with claim 3, wherein the first one of the plurality of optical subcarriers is amplitude modulated based on the control information.

6. An apparatus in accordance with claim 1, wherein the first one of the plurality of optical subcarriers has a spectral width that is less than a spectral width of the second one of the plurality of optical subcarriers.

7. An apparatus in accordance with claim 1, wherein the first one of the plurality of optical subcarriers has a full width half maximum (FWHM) that is less than a FWHM of the second one of the plurality of optical subcarriers.

8. An apparatus in accordance with claim 1, wherein a third one of the plurality of optical subcarriers has a third center frequency and a third power at the third center frequency, the third power being less than the second power.

9. An apparatus in accordance with claim 8, wherein the first one of the plurality of optical subcarriers carries first control information and the third one of the plurality of optical subcarriers carries second control information.

10. An apparatus in accordance with claim 9, wherein the first one of the plurality of optical subcarriers is amplitude modulated based on the first control information, and the third one of the plurality of optical subcarriers is amplitude modulated based on the second control information.

11. An apparatus in accordance with claim 8, wherein the first one of the plurality of optical subcarriers and the third one of plurality of optical subcarriers each has a full width half maximum (FWHM) that is less than a FWHM of the second one of the plurality of optical subcarriers.

12. An apparatus in accordance with claim 1, wherein the second optical subcarrier carries information associated with user data.

13. An apparatus in accordance with claim 1, wherein said at least one data stream is a plurality of data streams.

14. An apparatus in accordance with claim 10, wherein the first amplitude modulation has an associated first amplitude modulation frequency and the second amplitude modulation has a second amplitude modulation frequency that is different than the first amplitude modulation frequency.

15. An apparatus, comprising:
a laser operable to supply an optical signal;
a digital signal processor operable to receive at least one data stream and supply a plurality of digital signals based on said at least one data stream;

digital to analog circuitry operable to provide a plurality of analog signals based on the plurality of digital signals;

driver circuitry operable to supply a plurality of drive signal based on the analog signals; and a modulator operable to:

receive the plurality of drive signals, and modulate the optical signal based on the plurality of drive signals to provide a plurality of optical subcarriers, such that:

a first one of the plurality of optical subcarriers has a first center frequency, a first power at the first center frequency, the first one of the plurality of optical subcarriers is amplitude modulated based on control information, and a second one of the plurality of optical subcarriers has a second center frequency and a second power at the second center frequency, the first power being less than the second power, the second one of the plurality of optical subcarriers carrying information associated with user data, such that the second one of the plurality of optical subcarriers being modulated based on a first modulation and a second modulation, the first modulation being an m-QAM modulation, where m is an integer greater than 4 and the second modulation is an amplitude modulation.

16. An apparatus, comprising:

a laser operable to supply an optical signal;

a digital signal processor operable to receive at least one data stream and supply a plurality of digital signals based on said at least one data stream;

digital to analog circuitry operable to provide a plurality of analog signals based on the plurality of digital signals;

driver circuitry operable to supply a plurality of drive signal based on the analog signals; and a modulator operable to:

receive the plurality of drive signals, and modulate the optical signal based on the plurality of drive signals to provide a plurality of optical subcarriers, such that:

a first one of the plurality of optical subcarriers has a first center frequency, a first power at the first center frequency, the first one of the plurality of optical subcarriers is amplitude modulated based on first control information, a second one of the plurality of optical subcarriers has a second center frequency, a second power at the second center frequency, the second one of the plurality of optical subcarriers is amplitude modulated based on second control information, and and a third one of the plurality of optical subcarriers has a third center frequency and a third power at the third center frequency, the first power and the second power being less than the third power, the second one of the plurality of optical subcarriers carrying information associated with user data, such that the third one of the plurality of optical subcarriers being modulated based on a first modulation and a second modulation, the first modulation being an m-QAM modulation, where m is an integer greater than 4 and the second modulation is an amplitude modulation.

17. An apparatus in accordance with claim 16, wherein the first one of the plurality of optical subcarriers has a first amplitude modulation frequency and the second one of the plurality of optical subcarriers has a second amplitude modulation frequency different than the first amplitude modulation frequency.

18. An apparatus, comprising:

a laser operable to supply an optical signal;

a digital signal processor operable to receive at least one data stream and supply a plurality of digital signals based on said at least one data stream;

digital to analog circuitry operable to provide a plurality of analog signals based on the plurality of digital signals;

driver circuitry operable to supply a plurality of drive signal based on the analog signals; and a modulator operable to:

receive the plurality of drive signals, and modulate the optical signal based on the plurality of drive signals to provide a plurality of optical subcarriers, such that a first one of the plurality of optical subcarriers has a first full width half maximum (FWHM), and a second one of the plurality of optical subcarriers has a second FWHM, which is less than the first FWHM, the first FWHM carrying control information, such that the first one of the plurality of optical subcarriers is modulated based on a first modulation and a second modulation, the first modulation being an m-QAM modulation, where m is an integer greater than 4 and the second modulation is an amplitude modulation.

19. An apparatus in accordance with claim 18, wherein each of the plurality of optical subcarriers is a Nyquist subcarrier.

20. An apparatus in accordance with claim 18, wherein the control information includes clocking information.

21. An apparatus in accordance with claim 18, wherein the first one of the plurality of optical subcarriers is amplitude modulated based on the control information.

22. An apparatus in accordance with claim 18, wherein a third one of the plurality of optical subcarriers has a third FWHM that is less than the second FWHM.

23. An apparatus in accordance with claim 22, wherein the control information is first control information, the third optical subcarrier carrying second control information.

24. An apparatus in accordance with claim 23, wherein the first one of the plurality of optical subcarriers is amplitude modulated based on the first control information, and the third one of the plurality of optical subcarriers is amplitude modulated based on the second control information.

25. An apparatus in accordance with claim 18, wherein the second optical subcarrier carries information associated with user data.

26. An apparatus in accordance with claim 18, wherein said at least one data stream is a plurality of data streams.

27. An apparatus in accordance with claim 24, wherein the first optical subcarrier is amplitude modulated at a first frequency and the third optical subcarrier is amplitude modulated at a second frequency different than the first frequency.

28. An apparatus in accordance with claim 1, wherein the first and second ones of the plurality of optical subcarriers carry information associated with user data.

29. An apparatus in accordance with claim 15, wherein the first and second ones of the plurality of optical subcarriers carry information associated with user data.

30. An apparatus in accordance with claim 18, wherein the first and second ones of the plurality of optical subcarriers carry information associated with user data.

31. An apparatus in accordance with claim 1, wherein the first one of the plurality of optical subcarriers carries control information in a series of time slots.

32. An apparatus in accordance with claim 15, wherein the first one of the plurality of optical subcarriers carries control information in a series of time slots.

33. An apparatus in accordance with claim 18, wherein the first one of the plurality of optical subcarriers carries control information in a series of time slots.

\* \* \* \* \*